US005975703A

United States Patent [19]

Holman et al.

[11] Patent Number: 5,975,703

[45] Date of Patent: Nov. 2, 1999

[54] IMAGE PROJECTION SYSTEM

[75] Inventors: Robert L. Holman, Evanston; Arthur Cox, Park Ridge, both of Ill.

[73] Assignee: Digital Optics International, Evanston, Ill.

[21] Appl. No.: 08/724,734

[22] Filed: Sep. 30, 1996

[51] Int. Cl.[6] .......... G03B 21/14

[52] U.S. Cl. .......... 353/20; 349/9; 359/501

[58] Field of Search .......... 353/20, 31, 7, 353/8; 349/9, 8; 359/464, 465, 472, 497, 501, 495, 494

[56] References Cited

U.S. PATENT DOCUMENTS

| | | | |
|---|---|---|---|
| 4,383,740 | 5/1983 | Bordovsky . | |
| 4,394,681 | 7/1983 | Rowe . | |
| 4,425,028 | 1/1984 | Gagnon et al. . | |
| 4,491,872 | 1/1985 | Boldt et al. . | |
| 4,500,172 | 2/1985 | Gagnon et al. . | |
| 4,578,710 | 3/1986 | Hasegawa . | |
| 4,613,207 | 9/1986 | Fergason . | |
| 4,623,223 | 11/1986 | Kempf . | |
| 4,647,166 | 3/1987 | Franken et al. . | |
| 4,824,214 | 4/1989 | Ledebuhr . | |
| 4,850,685 | 7/1989 | Kamakura et al. . | |
| 4,861,142 | 8/1989 | Tanaka et al. . | |
| 4,875,064 | 10/1989 | Umeda et al. . | |
| 4,908,702 | 3/1990 | Chao et al. . | |
| 4,936,657 | 6/1990 | Tejima et al. . | |
| 4,961,642 | 10/1990 | Ogino . | |
| 4,963,016 | 10/1990 | Heijnemans et al. . | |
| 4,969,731 | 11/1990 | Ogino et al. . | |
| 4,969,732 | 11/1990 | Wright et al. . | |
| 4,971,436 | 11/1990 | Aoki et al. . | |
| 4,976,536 | 12/1990 | Vogeley et al. . | |
| 5,042,921 | 8/1991 | Sato et al. | 349/9 |
| 5,046,837 | 9/1991 | Stroomer et al. . | |
| 5,048,949 | 9/1991 | Sato et al. . | |
| 5,092,664 | 3/1992 | Miyatake et al. . | |
| 5,092,671 | 3/1992 | Van Os . | |
| 5,116,117 | 5/1992 | Miyashita . | |
| 5,121,983 | 6/1992 | Lee . | |
| 5,123,729 | 6/1992 | Kondo et al. . | |
| 5,142,387 | 8/1992 | Shikama et al. . | |
| 5,153,752 | 10/1992 | Kurematsu et al. . | |
| 5,184,238 | 2/1993 | Wright . | |
| 5,187,510 | 2/1993 | Vogeley et al. . | |
| 5,221,982 | 6/1993 | Faris . | |
| 5,227,821 | 7/1993 | Vogeley et al. . | |
| 5,255,029 | 10/1993 | Vogeley et al. . | |
| 5,268,775 | 12/1993 | Zeidler . | |
| 5,272,496 | 12/1993 | Nicolas et al. | 353/20 |
| 5,278,595 | 1/1994 | Nishida et al. . | |
| 5,278,680 | 1/1994 | Karasawa et al. | 349/9 |
| 5,283,600 | 2/1994 | Imai . | |
| 5,299,036 | 3/1994 | Nicolas et al. . | |
| 5,300,966 | 4/1994 | Uehira et al. . | |
| 5,327,270 | 7/1994 | Miyatake . | |
| 5,333,021 | 7/1994 | Mitsutake et al. . | |
| 5,365,287 | 11/1994 | Vollmer et al. . | |
| 5,374,968 | 12/1994 | Haven et al. . | |
| 5,381,278 | 1/1995 | Shingaki et al. . | |

(List continued on next page.)

*Primary Examiner*—William Dowling
*Attorney, Agent, or Firm*—Michael D. Rechtin; Foley & Lardner

[57] ABSTRACT

An image projection device having a spatial light modulator and a polarized source system for illuminating the spatial light modulator such that light of a first polarization state illuminates one region of the spatial light modulator and light of a second polarization state illuminates another region of the spatial light modulator. Preferably, the image projection device includes a first set of polarization selective light processing elements, including a first conicoid element which passes light of the first polarization state and reflects light of the second polarization state and a second set of polarization selective light processing elements including a second conicoid element which passes light of the second polarization state and reflects light of the first polarization state.

33 Claims, 115 Drawing Sheets

U.S. PATENT DOCUMENTS

| | | | |
|---|---|---|---|
| 5,387,953 | 2/1995 | Minoura et al. . | |
| 5,387,991 | 2/1995 | Mitsutake et al. . | |
| 5,394,198 | 2/1995 | Janow . | |
| 5,394,204 | 2/1995 | Shigeta et al. . | |
| 5,404,185 | 4/1995 | Vogeley et al. . | |
| 5,408,282 | 4/1995 | Nagashima et al. . | |
| 5,418,584 | 5/1995 | Larson . | |
| 5,422,683 | 6/1995 | Tanigaki . | |
| 5,438,379 | 8/1995 | Kurematsu . | |
| 5,442,414 | 8/1995 | Janssen et al. . | |
| 5,446,510 | 8/1995 | Mitsutake et al. . | |
| 5,452,128 | 9/1995 | Kimura . | |
| 5,453,859 | 9/1995 | Sannohe et al. . | |
| 5,467,154 | 11/1995 | Gale et al. . | |
| 5,477,394 | 12/1995 | Shibazaki . | |
| 5,486,884 | 1/1996 | De Vaan . | |
| 5,491,525 | 2/1996 | Yamasaki et al. . | |
| 5,495,306 | 2/1996 | Shibazaki . | |
| 5,517,263 | 5/1996 | Minich et al. . | |
| 5,517,366 | 5/1996 | Togino | 359/497 |
| 5,537,171 | 7/1996 | Ogino et al. . | |
| 5,601,351 | 2/1997 | Van Den Brandt | 353/20 |
| 5,749,642 | 5/1998 | Kimura et al. | 353/98 |
| 5,772,299 | 6/1998 | Koo et al. | 353/20 |

$$\tan \phi = \frac{D'/2}{x}$$

$$T = \frac{D'}{2}(1+\tan \phi)$$

$$D' = \frac{3}{5} D$$

PRIOR ART

PRIOR ART $$y = 2D' \tan \phi$$

$$D' = a + 2y$$

PRIOR ART

FIG 94A
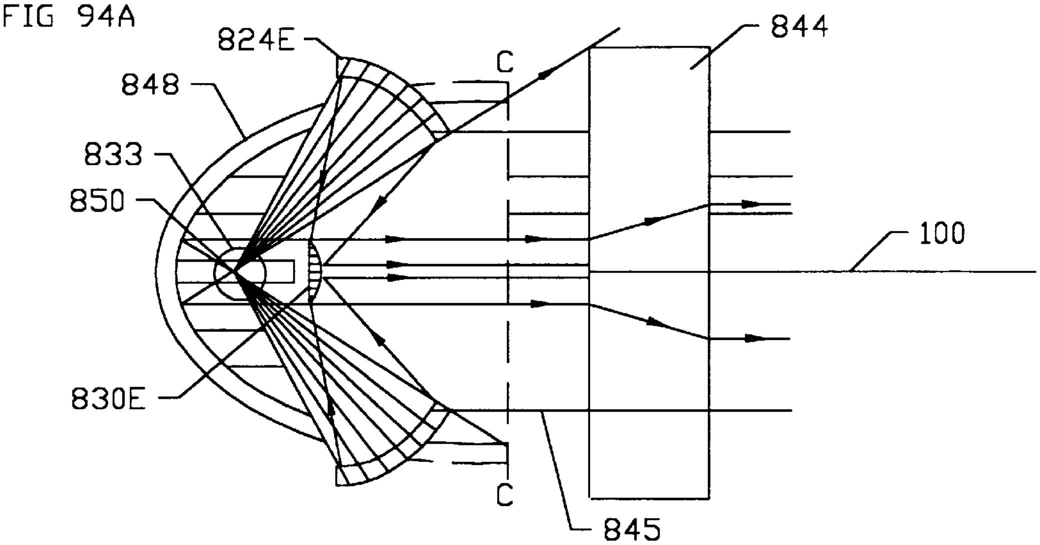
FIG 94B
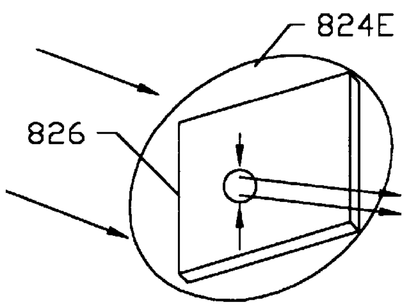
FIG 94C
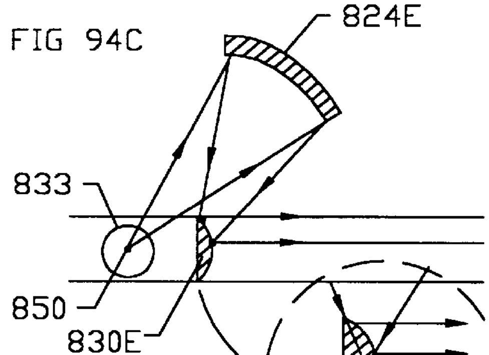
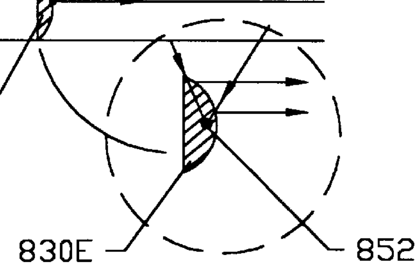
FIG 94D
FIG 94E
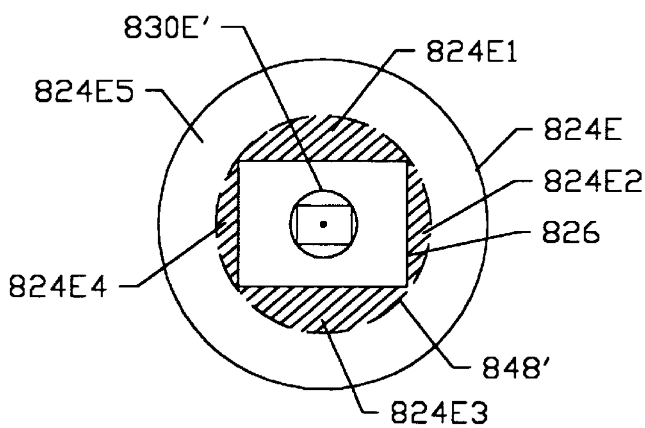

PRIOR ART

IMAGE PROJECTION SYSTEM

The present invention is concerned generally with an optical system and method for generating an image on a projection screen using a highly compact geometry. More particularly, the optical system uses polarized light manipulated by at least one of a conicoid, or plane optical elements to effect a folded mirror system to project an image onto a screen.

Currently available image projection systems are quite large with their dimensions (particularly the cabinet depth) making such systems cumbersome and requiring special preparation of a space for their use. Furthermore, in such projection systems which employ LCDs the light output from the source has all polarized states but the system makes use of only one state of polarization, thus eliminating about half the light available for imaging on the projection screen.

It is, therefore, an object of the system to provide an improved image projection system and method of use.

It is another object of the system to provide a novel system and method for projecting an image on a screen using a highly compact optical system.

It is a further object of the invention to provide an improved system and method for processing polarized input light using plane reflecting and transmitting optical elements.

It is a further object of the invention to provide an improved system and method for processing polarized input light using conicoidal optical elements.

It is yet another object of the invention to provide an improved system and method for manipulating polarized light using a primary paraboloidal (or modified paraboloidal) element which is coaxially aligned with an inner, smaller secondary hyperboloidal (or modified hyperboloidal) element or ellipsoidal (or modified ellipsoidal) element to output a single polarization state image for display on a projection screen.

It is yet a further object of the invention to provide an improved system and method for manipulating polarized light using a convex conicoidal reflecting surface, a negative lens, a polarization-selective and converting reflecting/transmitting plane and a Fresnel lens, so as to output a single polarization state image for display on a projection screen.

It is also an object of the invention to provide an improved system and method for manipulating polarized light using a convex conicoidal reflecting surface, a polarization converting plane, a polarization-selective mirror plane, a positive lens section and a Fresnel lens, to output a single polarization state image for display on a projection screen.

It is yet another object of the invention to provide an improved system and method for manipulating polarized light using a primary concave conicoidal reflector which is coaxially aligned with an inner, smaller secondary convex conicoid reflector that converts polarization state and that selectively reflects/transmits depending on polarization state to output a single polarization state image for display on a projection screen.

It is an additional object of the invention to provide a novel system and method for supplying light components of substantially orthogonal polarizations for separate areas of an image for output onto a projection screen.

It is still another object of the invention to provide an improved system and method for separating different light polarization states to reconstruct an image on a projection screen.

It is also an additional object of the invention to provide a novel system and method for providing light of a first polarization to a first LCD region and light of another polarization to a second LCD region for controlled transmission of images onto a projection screen.

It is also an object of the invention to provide an improved method and system for providing light of different polarization states to an LCD which programmably transmits selected polarization states for image display on a projection screen.

It is also an additional object of the invention to provide a novel method and system including a voltage adjusted LCD for controlled transmission of selected polarization states for reconstruction as an image on a projection screen.

It is yet a further object of the invention to provide a novel system and method for splitting different light polarization states of an image and using a compact mirror system to reassemble and display the image onto a projection screen.

It is an additional object of the invention to provide an improved system and method for manipulating polarized light using a polarization converting mirror plane that is optimally tilted with respect to a reflecting plane whose reflectance or transmissivity depends on polarization state and that is parallel to a viewing screen which can embody a Fresnel lens, to fit within the minimum possible volume and to output a single polarization state image for display on a projection screen.

It is another object of the invention to provide an improved method and system for controlling differently polarized light beams using a highly compact planar mirror system in conjunction with polarization converter elements to output an image onto a projection screen.

It is another object of the invention to provide an improved system and method for controlling differently polarized light beams using a highly-compact planar mirror system in conjunction with polarization splitting and converting elements to output an image onto a projection screen.

It is still another object of the invention to provide an improved system and method using polarization splitter films to separate different polarization states of an image for projection onto a screen.

It is another object of the invention to provide an improved optical system and method for display of an image on a projection screen, including a highly compact lens and/or reflector system having a spatial light modulator insensitive to polarization state of light.

It is also a further object of this invention to improve the contrast of a projection screen system by placing the elements of a bracketing lens pair between the output of the illumination source and the entrance pupil of the projection lens.

It is still a further object of the invention to improve the throughput efficiency of a projection system by placing the positive and negative lens elements of an approximately telescopic lens pair between the illumination source output and the aperture of an SLM.

It is yet a further object of this invention to correct for aberrations in isolated sections of a projection screen illumination system by including that section within the elements of a bracketing or other specified optical lens pair, using either conventional lens elements or lens elements with one or more of their surface functions modified with aspherizing terms.

It is yet a further object of the invention to provide a novel optical display system and method for generating tiled image portions which can be assembled to produce an enlarged projection screen display of a full composite image.

It is yet an additional object of the invention to provide a novel system and method for display of an image on a projection screen using polarized light and correcting for an image hole arising from a hole in the light input structure of the system.

It is yet a further object of the invention to provide an improved system and method for manipulating polarized light for display of an image on a projection screen using conicoidal elements coupled with a beam compressor element to eliminate an image hole arising from a physical hole in one of the conicoidal elements.

It is still another object of the invention to provide improved methods of expanding and compressing beams of light using physically separated prismatic Fresnel-type layers or conic forms of refractive material.

It is also an additional object of the invention to provide a novel system and method for manipulating polarized light using at least one ogived or tilted conicoidal element to eliminate a hole in a display image arising from a physical hole in one of the conicoidal elements.

It is another object of the invention to provide an improved system and method for efficiently transforming the cross-sectional shape of an optical system's light beam, from circular to rectangular, using reciprocating conicoidal mirrors and a beam expander device to recycle light from the periphery of the circular input beam, to the central portion of the rectangular output beam, with good cross-sectional beam uniformity and without any light passing through or near the light source or arc.

It is still another object of the invention to provide an improved system and method for efficiently transforming the cross-sectional shape of an optical system's light beam, from circular to rectangular, using an adiabatically varying lightpipe cross-sectional area combined with a total internally reflecting non-imaging optic angle transforming element.

It is another object of the invention to provide a compact means for converting an unpolarized beam of rectangular cross-section into a single rectangular beam divided into adjacent regions of uncontaminated orthogonal polarizations, using combinations of prisms and polarization-selective coatings.

It is still another object of the invention to provide a compact means for converting an unpolarized input beam into a polarized output beam free of contaminating polarization states, using a conicoidal polarization converting reflector with physical inlet hole combined with reciprocating composite lens elements and a flat or weakly curved plane of polarization selective material.

It is an additional object of the invention to provide an improved system and method for manipulating unpolarized light by means of reciprocating conicoidal mirrors, beam expanders, positive and negative lens elements and polarization-selective reflecting materials, so as to output a single beam of light having rectangular cross-section and two adjacent regions of uncontaminated orthogonal polarizations.

It is a further object of the invention to provide an improved method for increasing the throughput efficiency function of an optical system by means of a reverse raytrace process that interatively launches rays from the entrance pupil of a projection lens, back through designated launch points on an SLM and through the system's interatively aspherized lens and reflector surfaces, to a target area corresponding to the system's light source.

It is still a further object of the invention to provide an improved method for increasing the throughput efficiency function of an optical system by means of a reverse raytrace process that further includes weighting factors for the actual spatial and angular properties of the system's light source.

It is yet a further object of the invention to provide an improved method for increasing the throughput efficiency function of an optical system by means of a reverse raytrace process that further includes weighting factors for intrinsic brightness non-uniformities that are observed on the system's projection screen or on the system's SLM (image) plane.

It is also an object of the invention to provide an improved system and method for producing and manipulating orthogonally polarized light of selected colors using an LCD color-splitting prism cube, polarization-selective coatings and prism elements, so as to output either one tri-color beam composed of two uncontaminated orthogonal polarization states, or two uncontaminated orthogonally polarized tri-color beams, each having passed through separate portions of each color's LCD image.

It is a further object of the invention to provide a novel optical system using two cross-firing LCD color-splitting prism cubes and intervening polarization-selective coupling elements, for the purpose of outputting a single beam whose orthogonal polarization states correspond to separate color images, which then are processed for one of three-dimensional viewing, increased image resolution or image comparison.

It is also a further object of the invention to provide an improved system and method having a folded mirror, asymmetrical arrangement with a polarization splitting (also referred equivalently as polarization selective reflecting) mirror enabling substantial reduction of depth of the projection system.

Other objects and advantages of the invention will be apparent from the detailed description and drawings described hereinbelow.

BRIEF DESCRIPTION OF THE DRAWINGS

FIG. 94A is a cross-sectional view of a variation on the embodiment of FIG. 90 using a collimating light and alternative mirror design, FIG. 94B is a perspective view of one type of output mirror with rectangularly-shaped open-aperture used in FIG. 94A, FIG. 94C is a magnified cross-sectional view of the reciprocating mirrors of FIG. 94B, FIG. 94D is a magnified cross-section of the small mirror in FIG. 94C, and FIG. 94E shows a front sectional view of the beam profile taken along line C—C in FIG. 94A;

FIG. 120A shows an optimized alignment of a 3M-type selective reflecting film sheet when applied to a curved surface and FIG. 120B shows individual facet portions from an aligned film stock;

Figure 88:
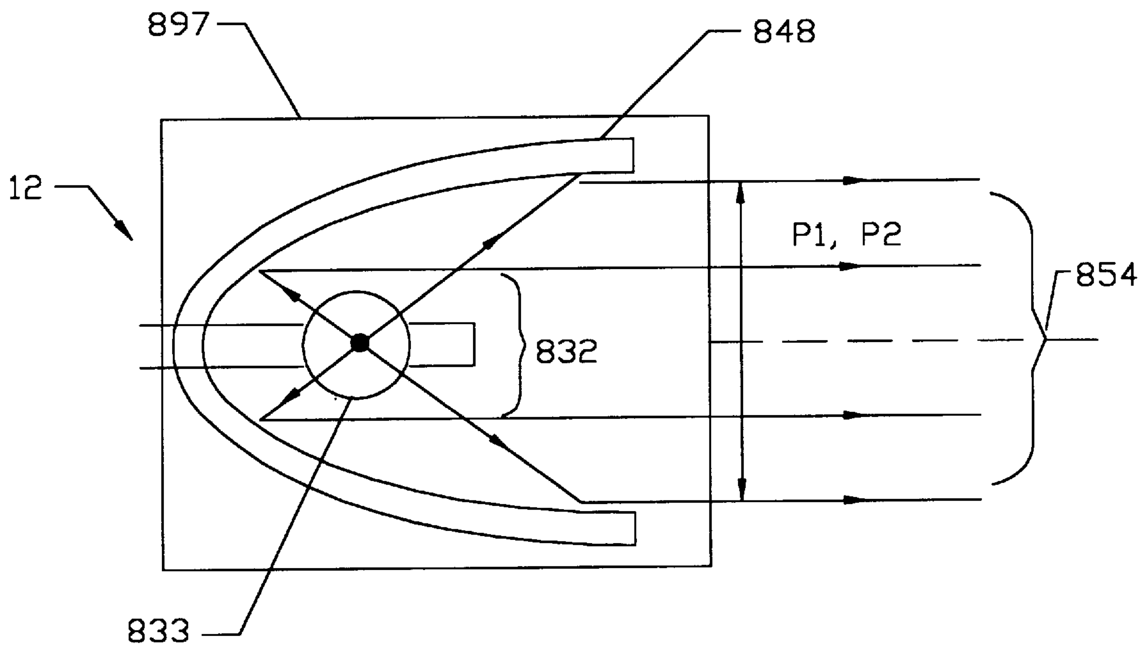
FIG. 88 is a prior art paraboloidal (collimating) light source.
Figure 92:
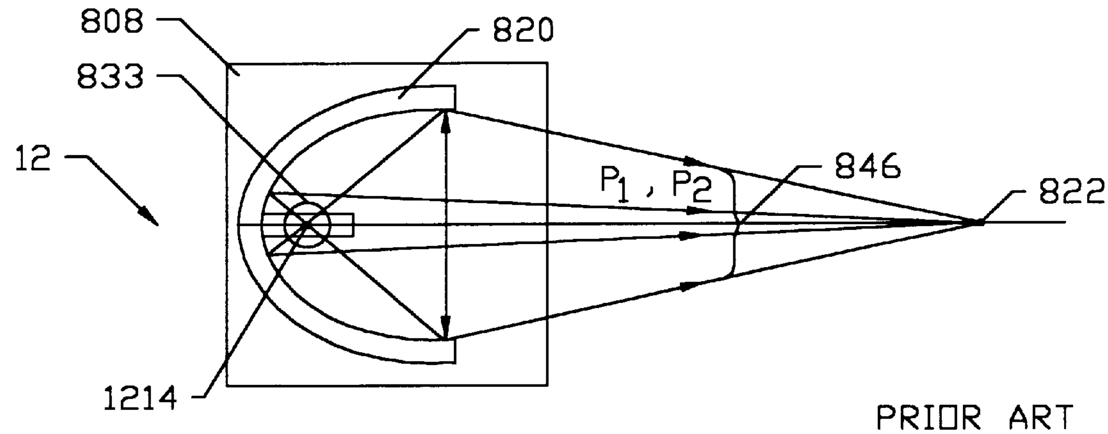
FIG. 92 is of a conventional ellipsoidal (converging) light source.
Figure 112:
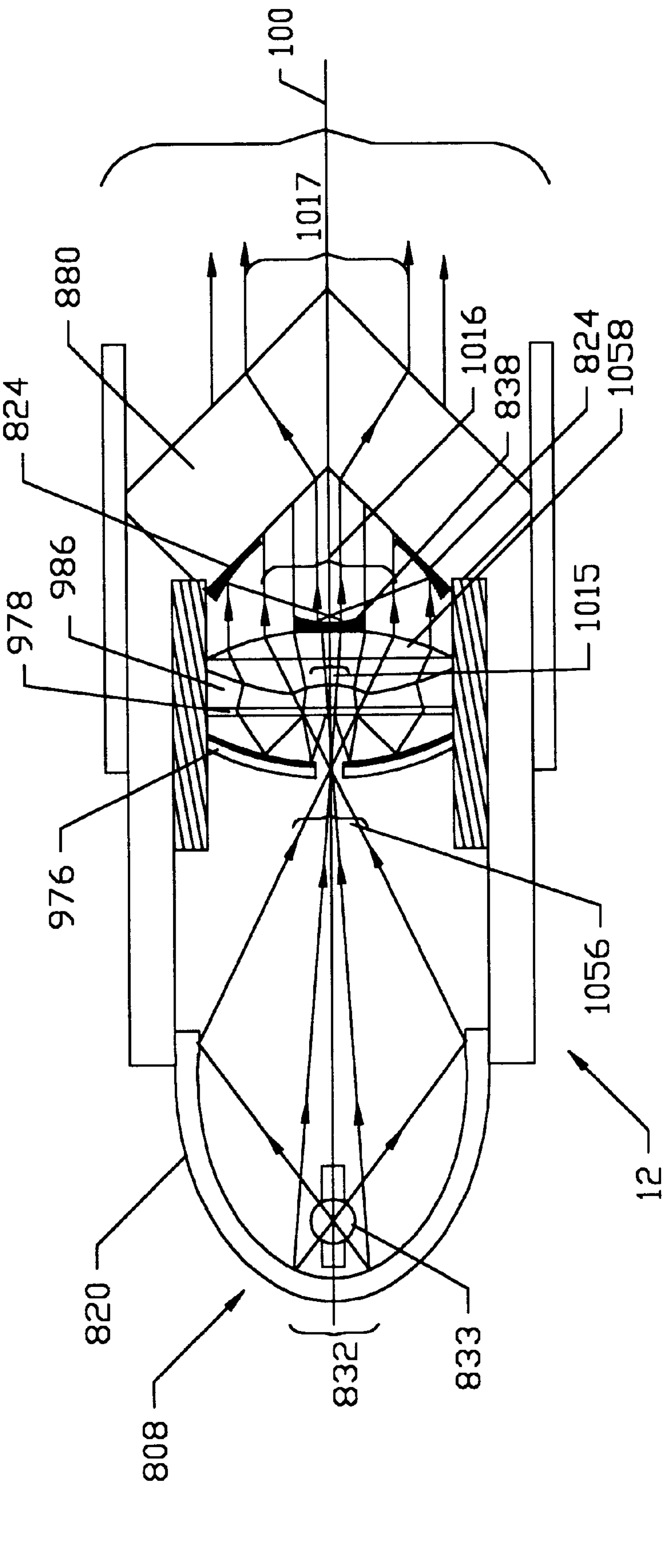
FIG. 112 is a rectangular beam-shape variation on the embodiment of FIG. 109 using the system of FIG. 98.
Figure 121A:
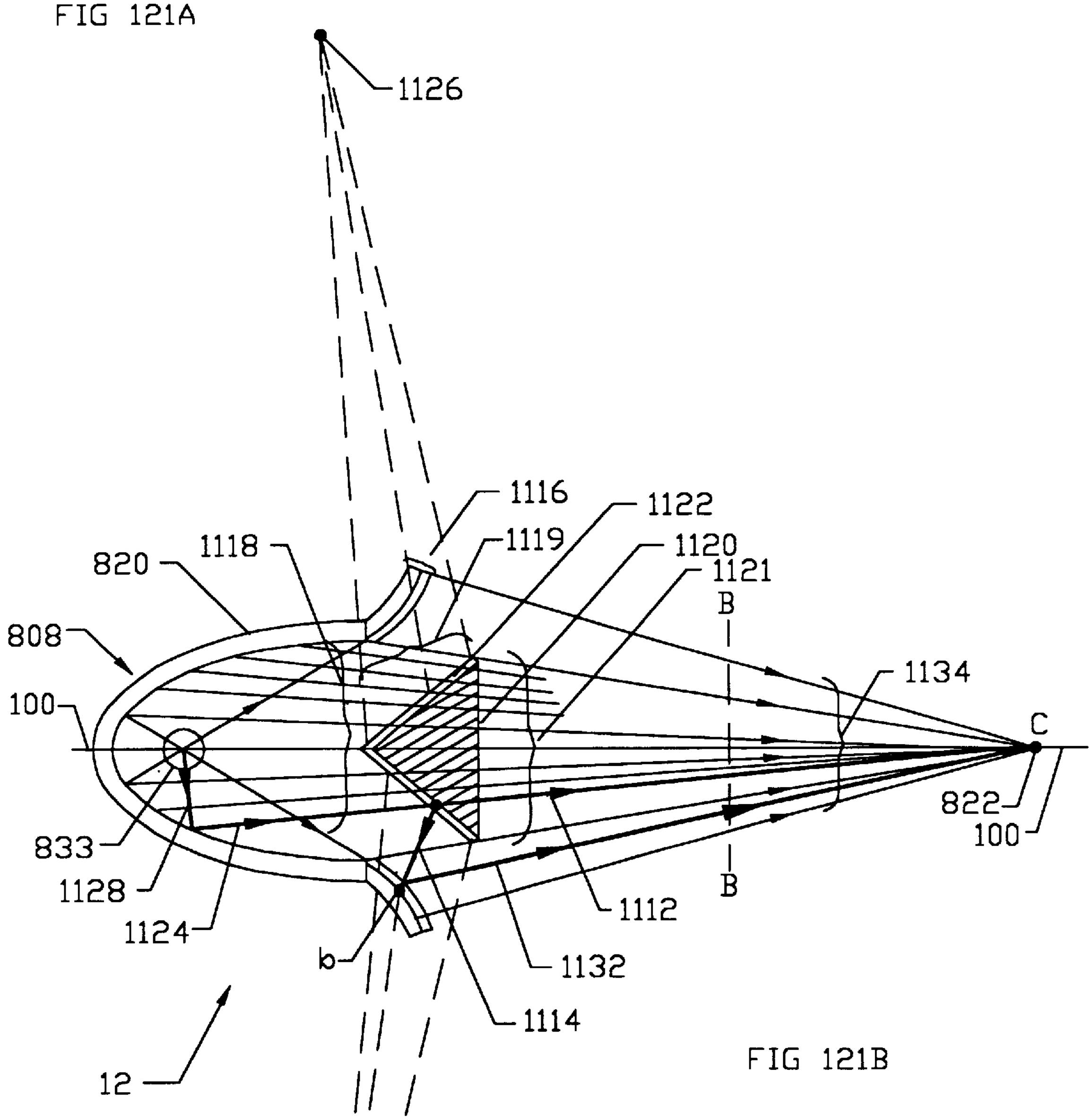
Figure 121B:
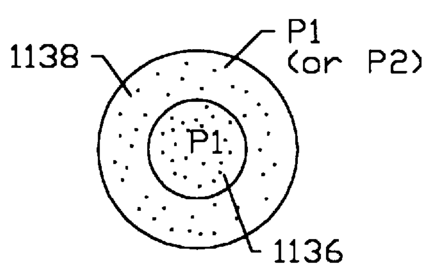
Figure 121:
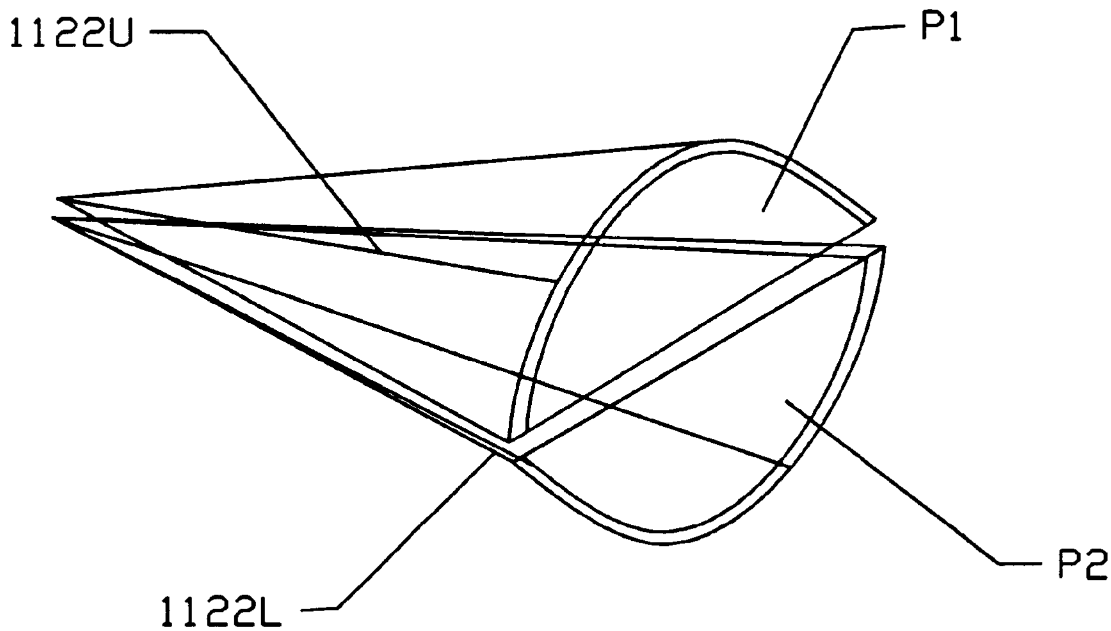
Figure 122:
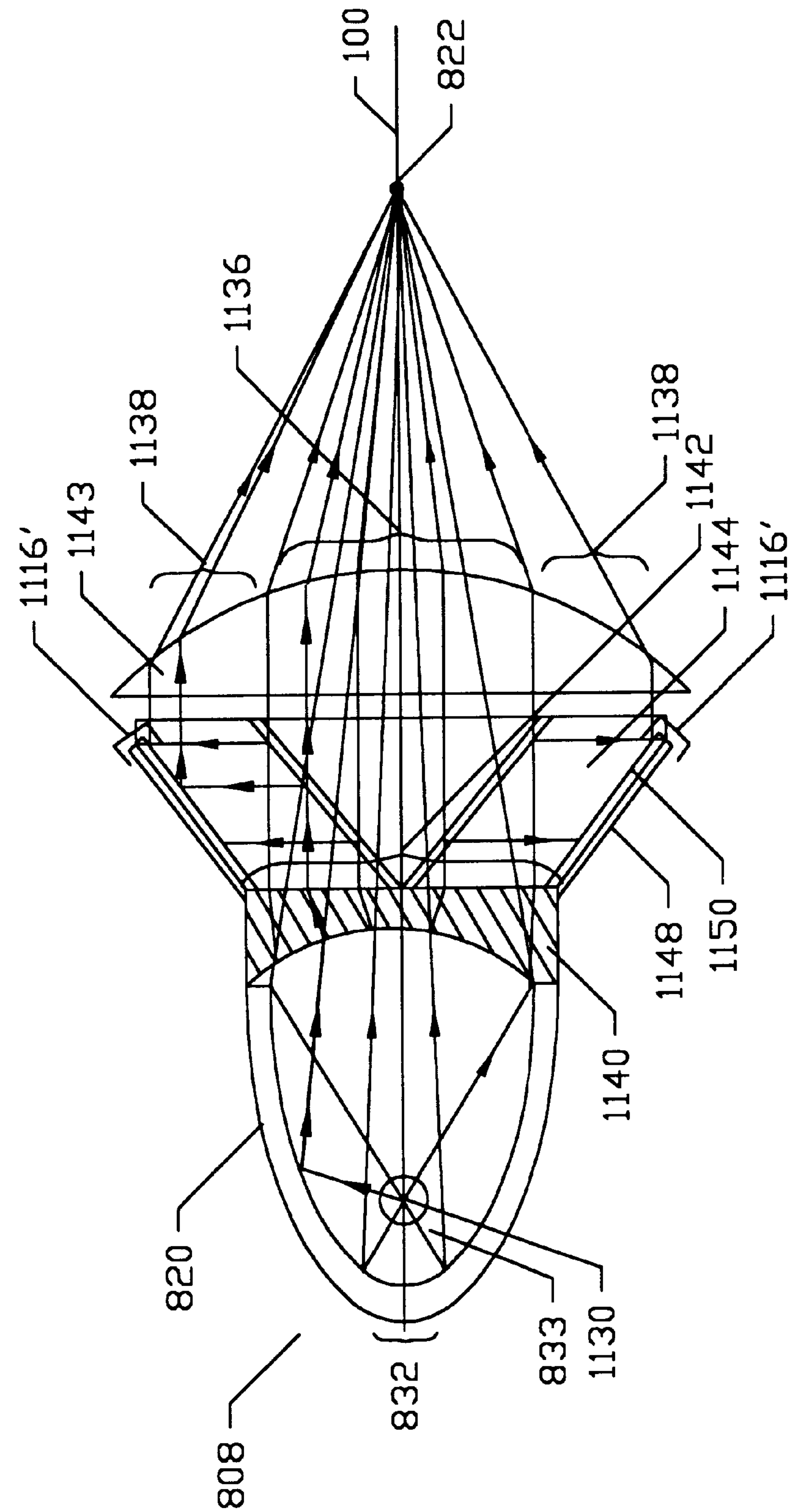
Figure 123A:
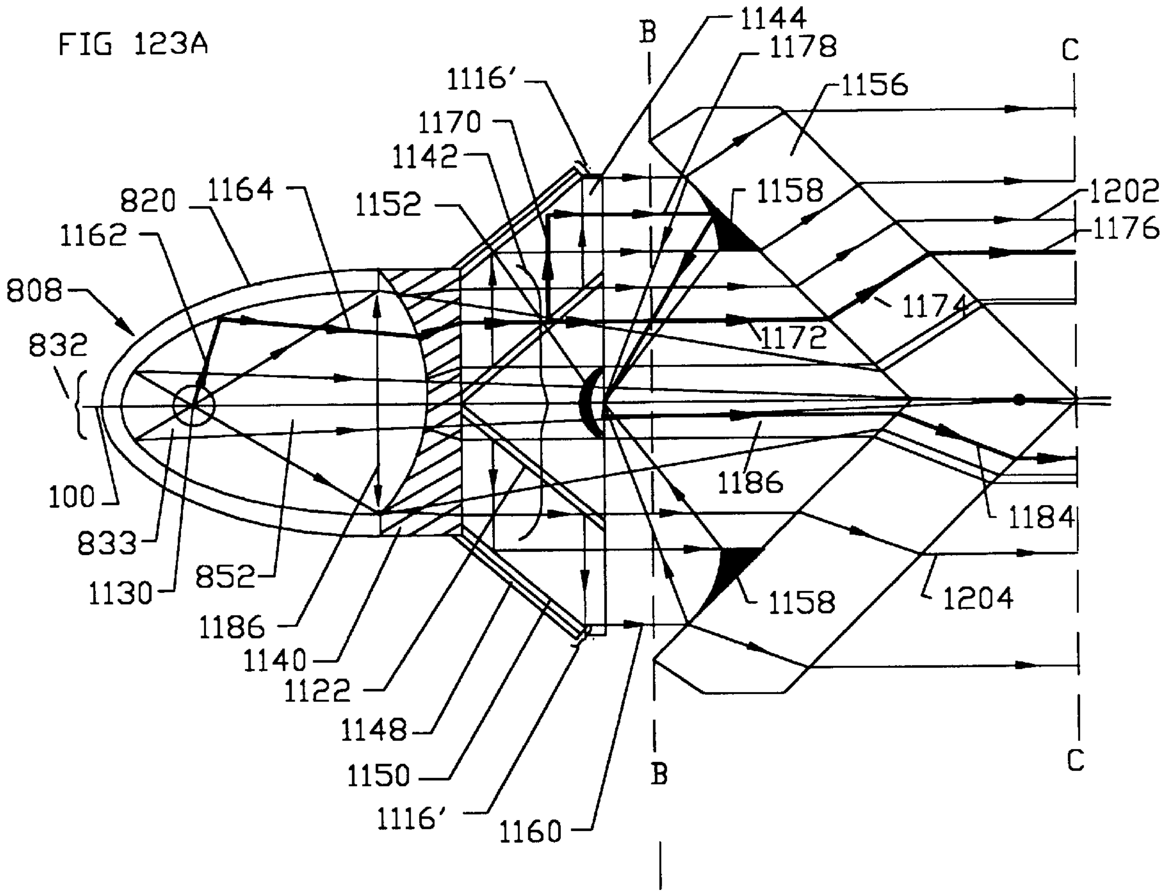
Figure 123B:
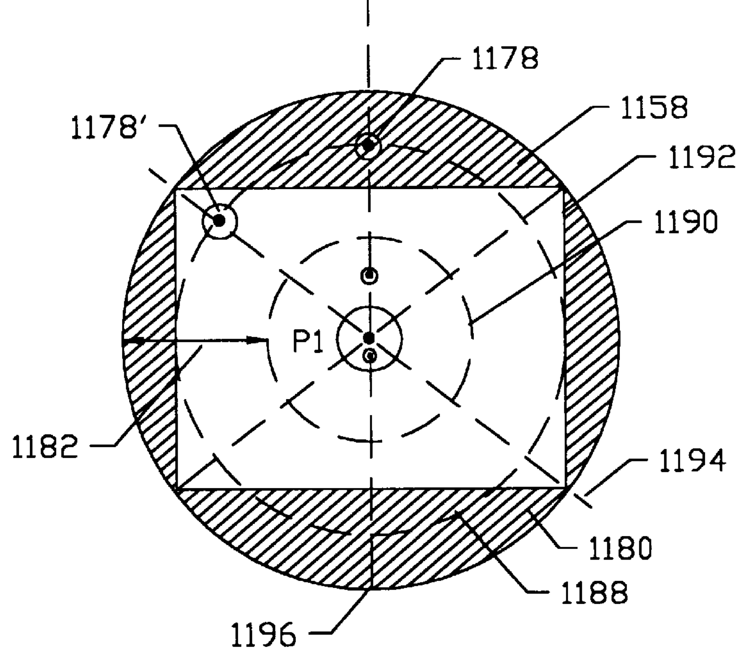
Figure 124:
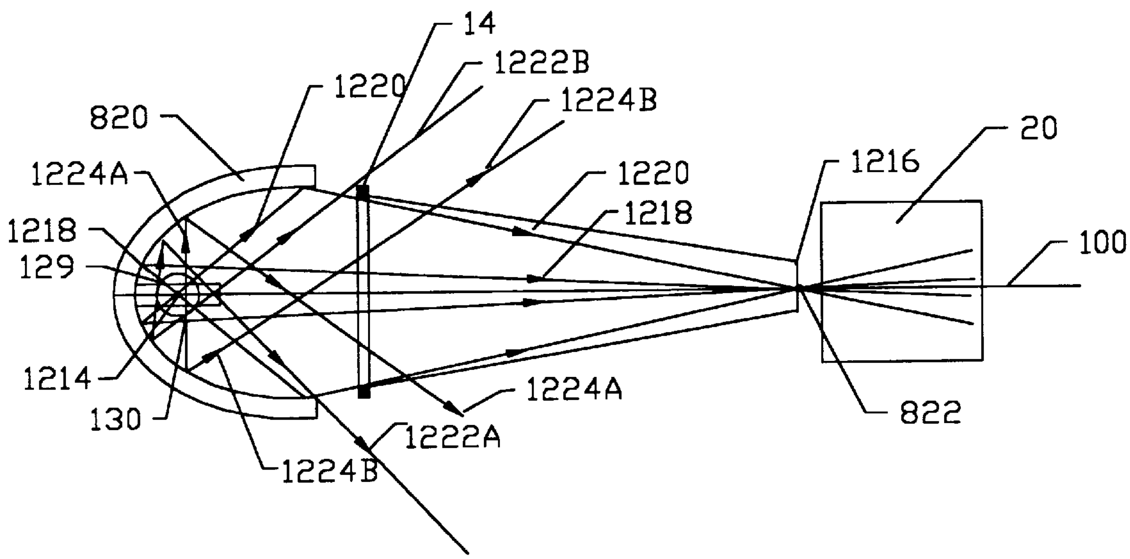
Figure 125:
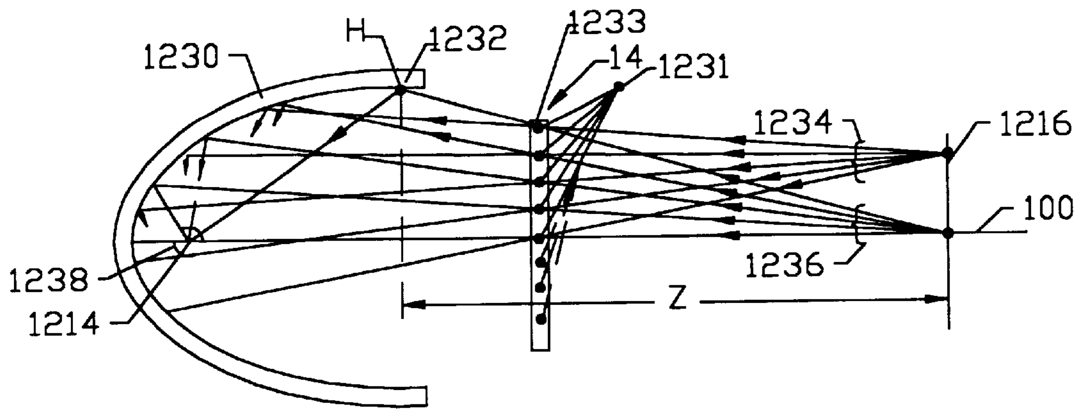
Figure 126A:
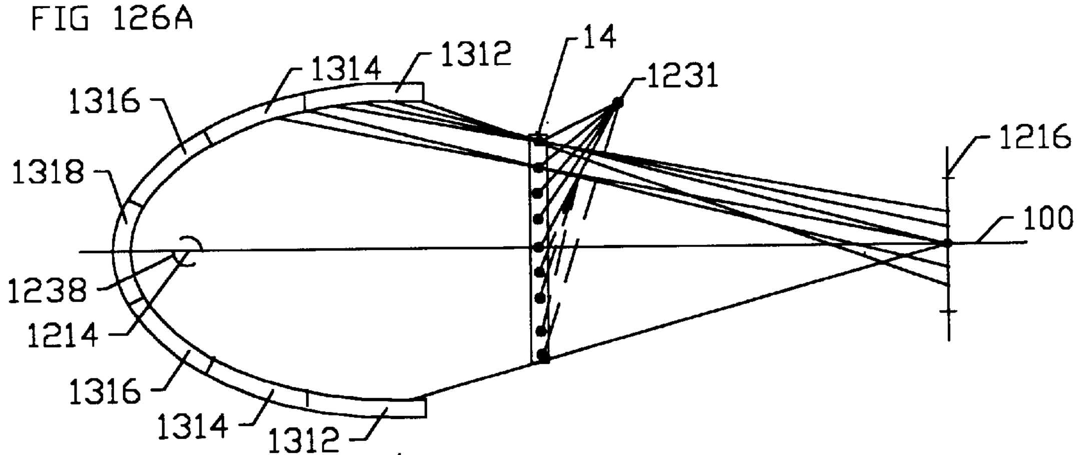
Figure 126B:
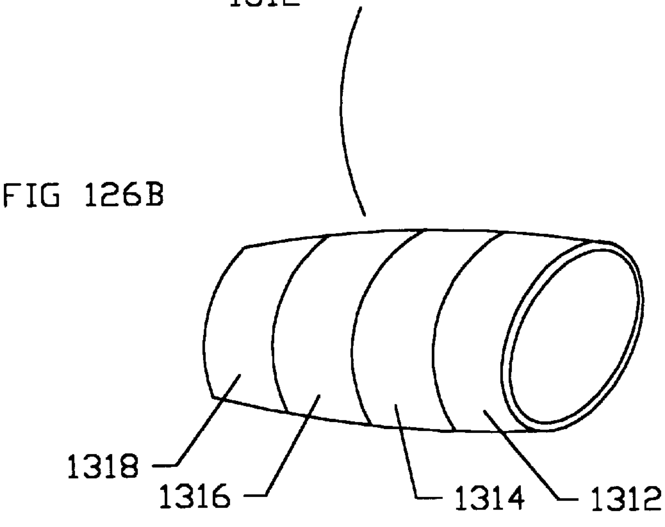
Figure 126:
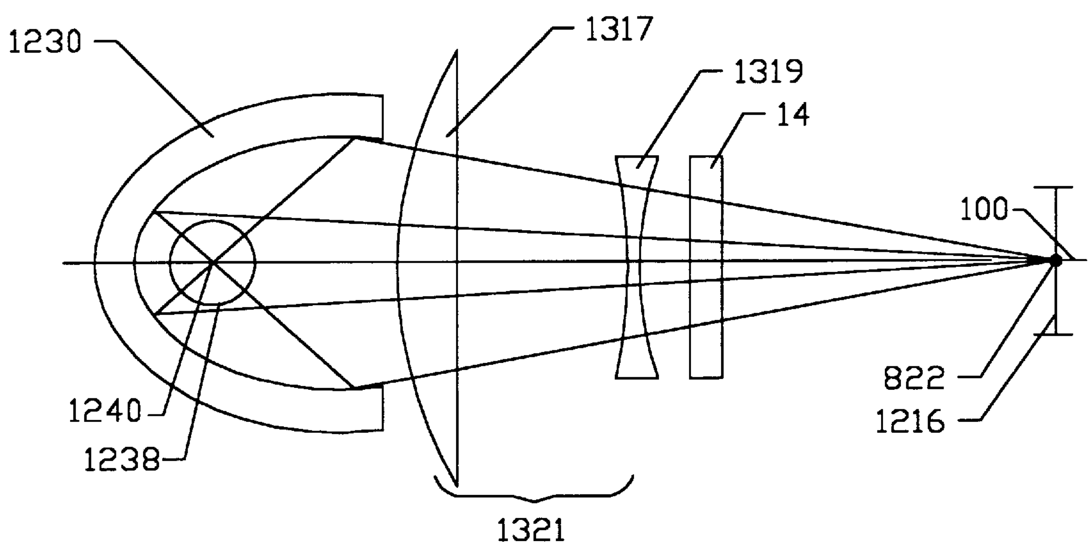
Figure 127:
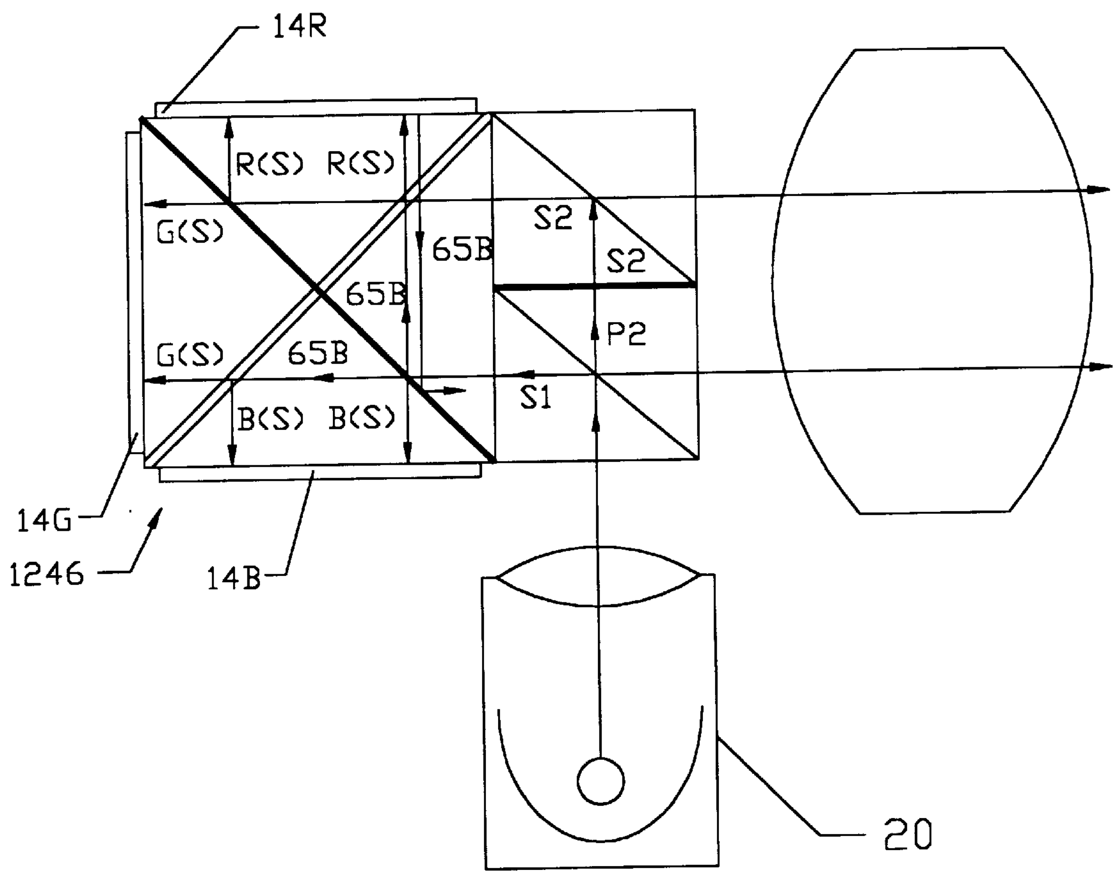
Figure 128:
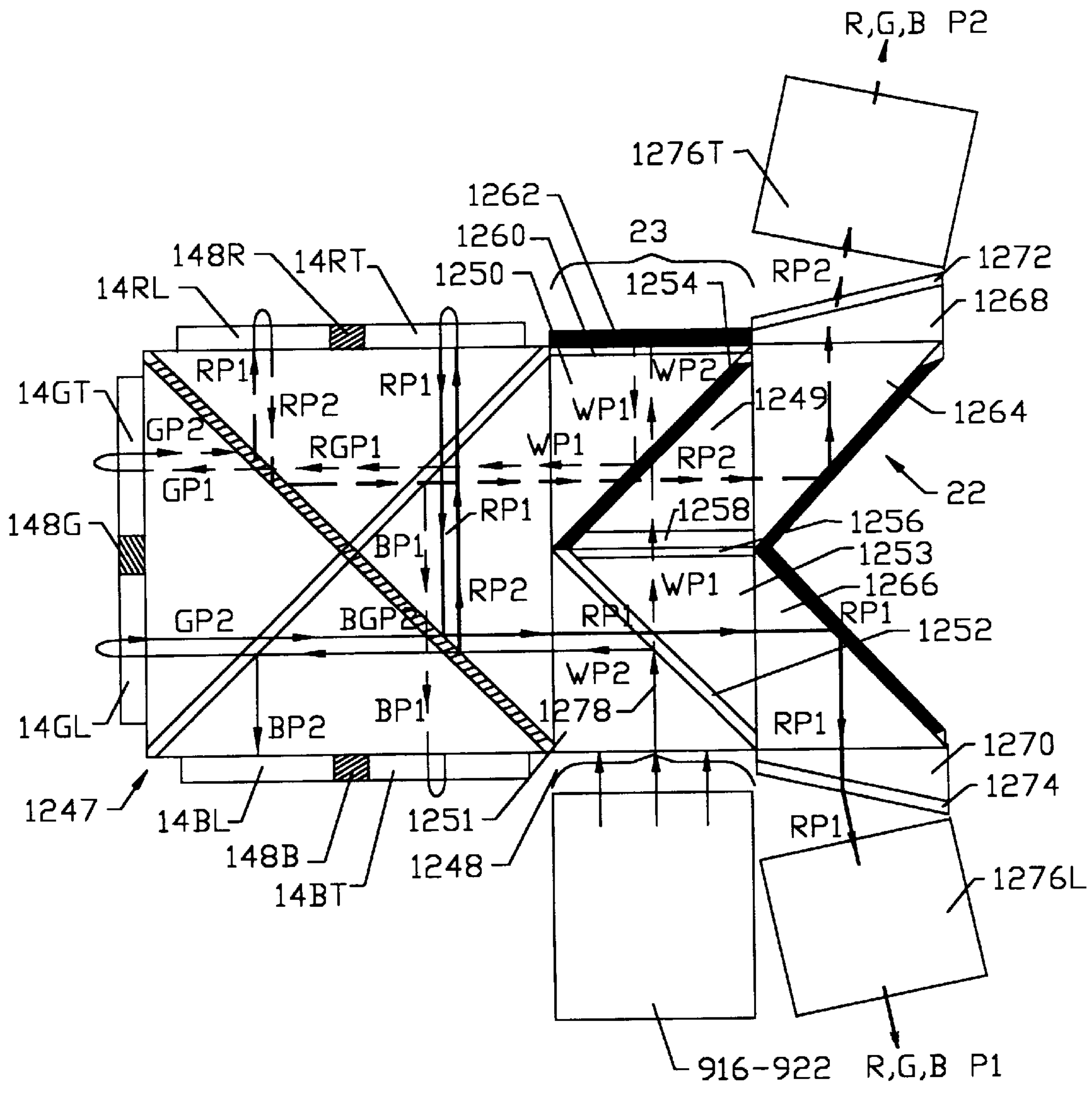
Figure 129:
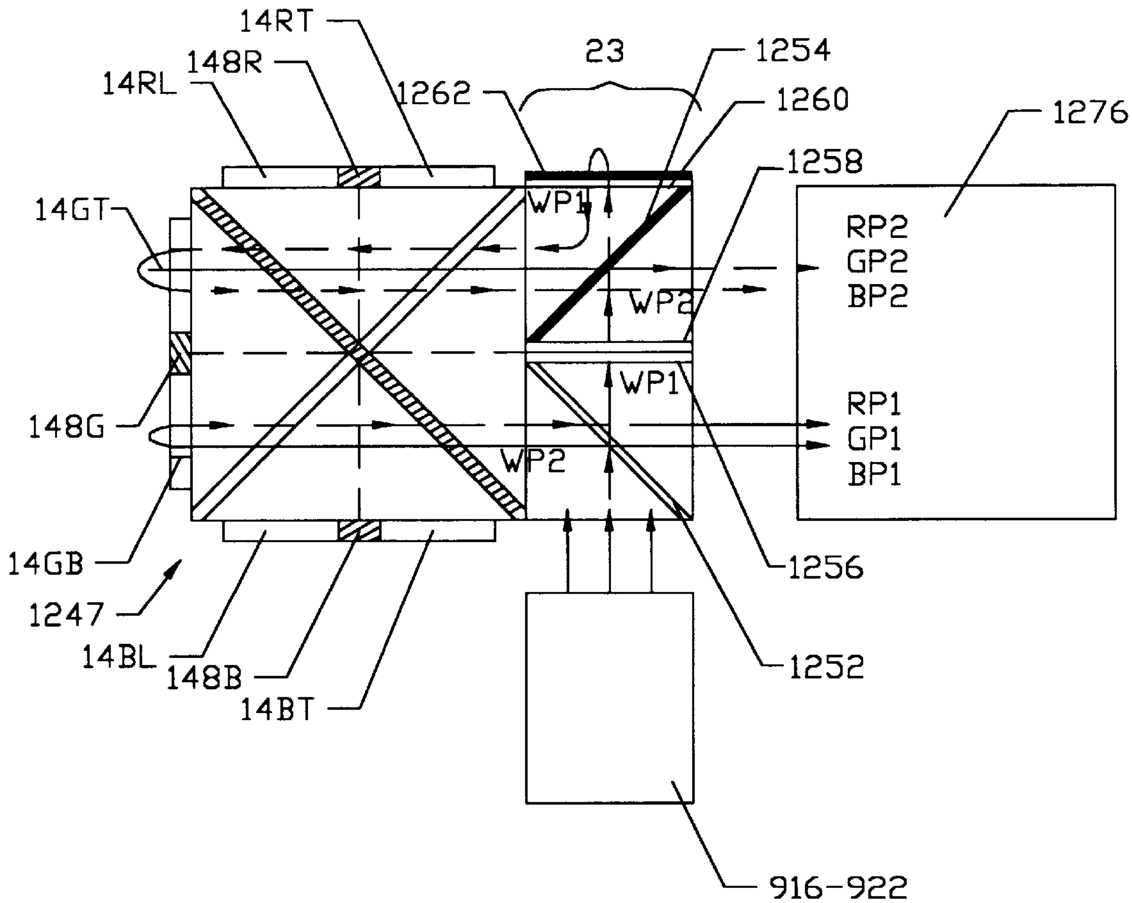
Figure 130:
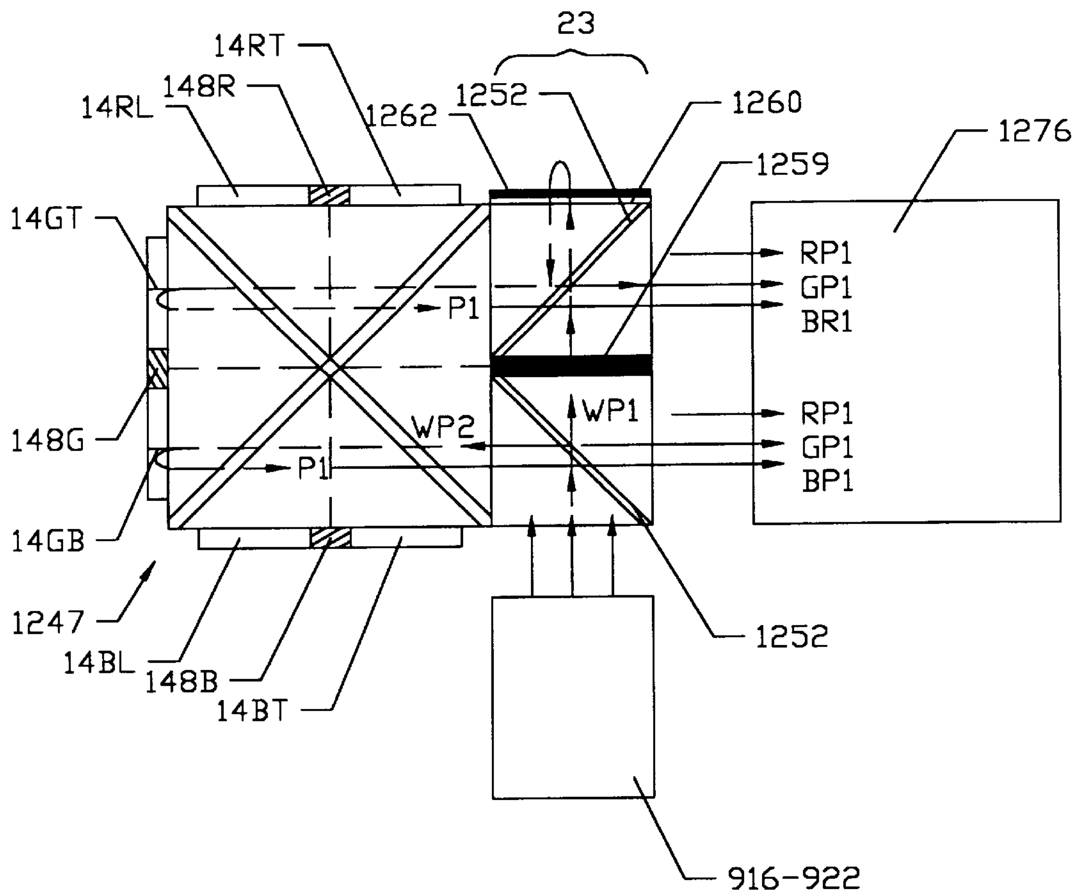
Figure 131:
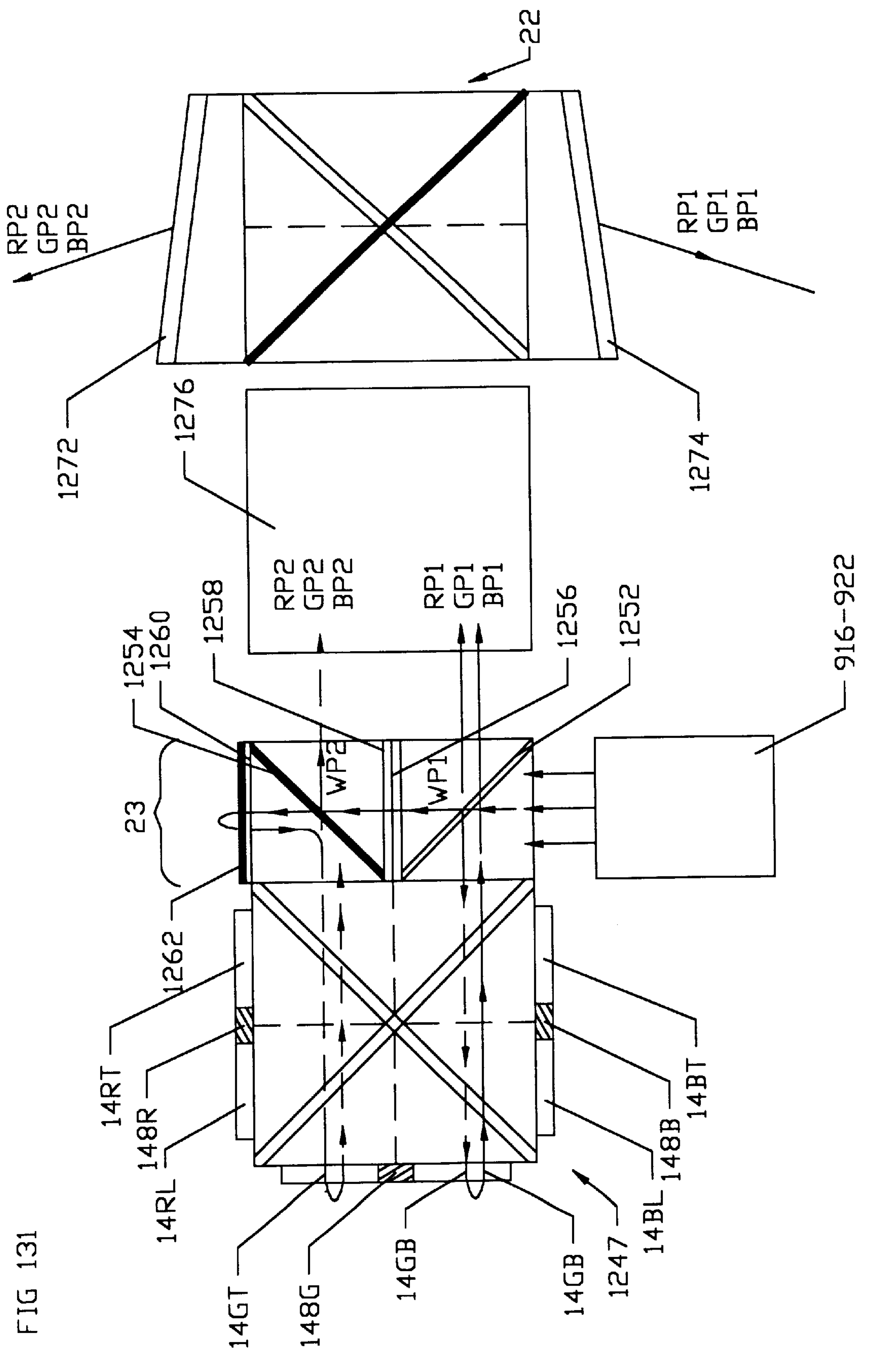
Figure 132:
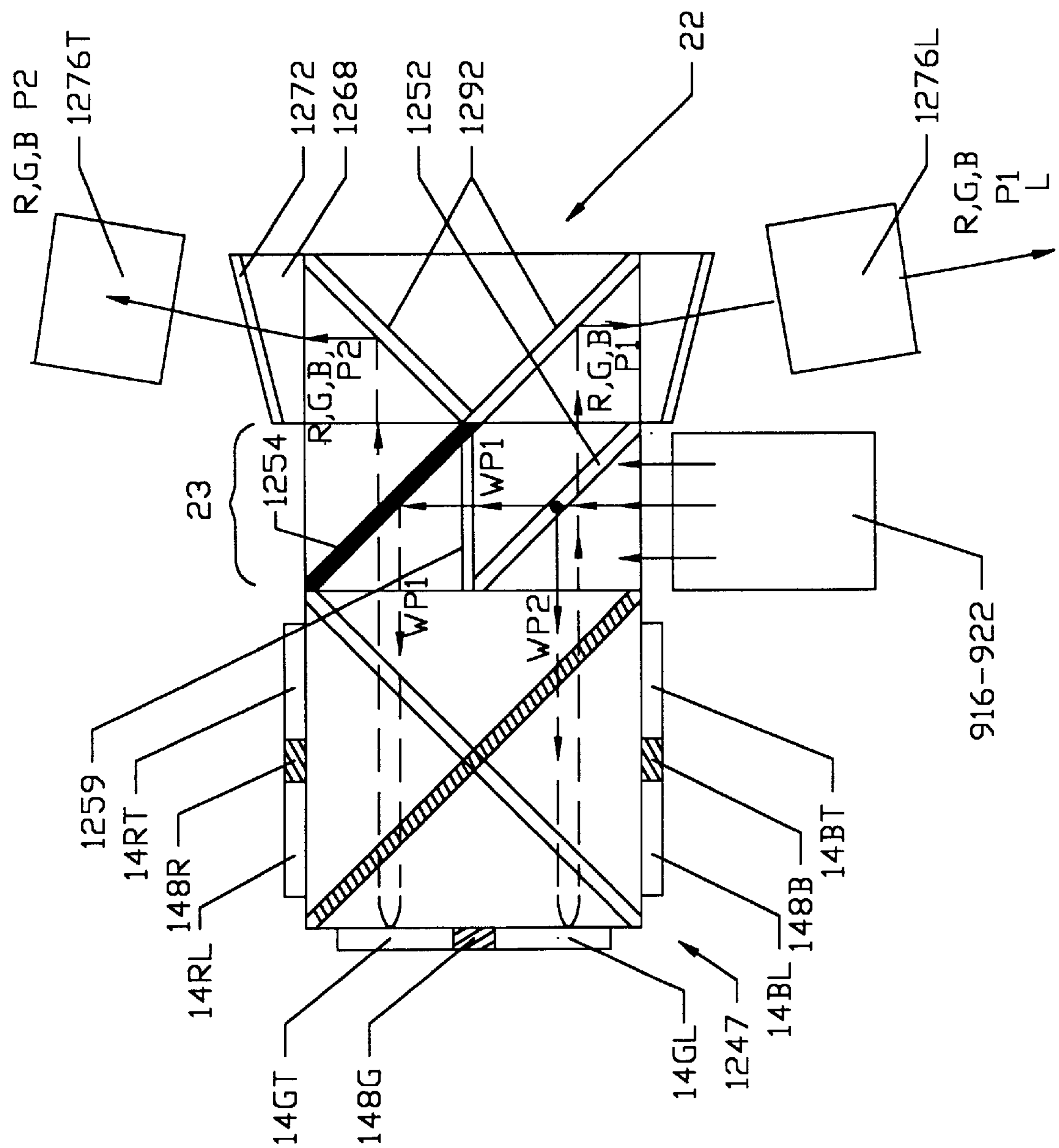
Figure 133:
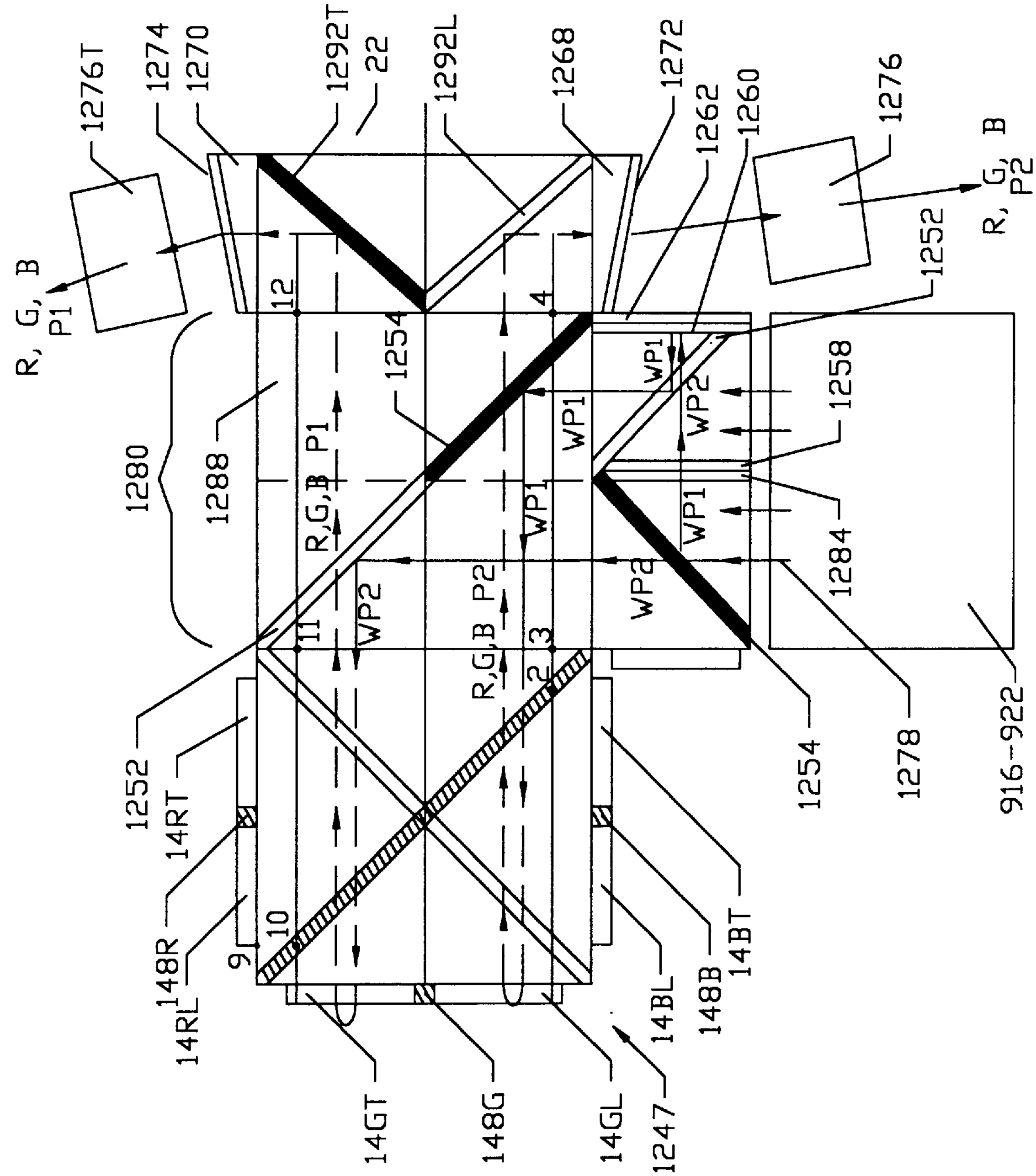

FIG. 121A shows a system longitudinal cross-sectional view of a polarized light source variation on the converging light source of FIG. 92 with selectively-reflecting conic polarizing element and toric polarization-converting hyperboloidal converging reflector; FIG. 121B shows a cross-section along B—B of the output beam of FIG. 121A and FIG. 121C shows a perspective view of the system of FIG. 121A;

FIG. 122 shows a co-axial variation on the embodiment of FIG. 121 for the collimated light source of FIG. 88;

FIG. 123A shows a light source system using the converging source of FIG. 92, a negative lens, and the co-axial polarizer of FIG. 122 with a variation on the beam-shape transformation method of FIG. 112, FIG. 123B shows the transverse beam cross-section taken along B—B in-between the reciprocating mirrors of FIG. 123A and FIG. 123C shows the transverse output beam cross-section taken along C—C of the system of FIG. 123A;

FIG. 124 shows a cross-sectional view of the spatial relationship between the light source reflector of FIG. 92, an SLM and the entrance pupil of the associated projection lens;

FIG. 125 shows a reverse ray-trace method for optimizing the shape of a conicoidal light source reflector of FIG. 124 with ray paths from pupil plane, through an SLM, off a single element reflecting surface and to a light source target zone;

FIG. 126A shows a variation on the method of FIG. 125 for multiple toric reflector segments, FIG. 126B shows a perspective view of the multiple toric reflector portion in FIG. 126A and FIG. 126C shows a Galilean telescope lens system added to the system of FIG. 126A;

FIG. 127 shows a prior art LCD color-splitting cube used with prior art polarizing beam-splitter;

FIG. 128 shows the cross-sectional view of a split-image embodiment of an LCD color-splitting cube with a polarization-selective split-image coupler and output beam-splitter for separate projection lenses;

FIG. 129 shows a variation on the embodiment of FIG. 128 for a single projection lens;

FIG. 130 shows a variation on the embodiment of FIG. 128 for a single projection lens and output polarization;

FIG. 131 shows a variation on the embodiment of FIG. 128 with a post-projection lens beam-splitter;

FIG. 132 shows a variation on the embodiment of FIG. 128 using the alternative polarization-selective split-image coupler;

FIG. 133 is a variation on the embodiment of FIG. 132 using separate polarization-selective coupling and polarizing methods.

Figure 13:
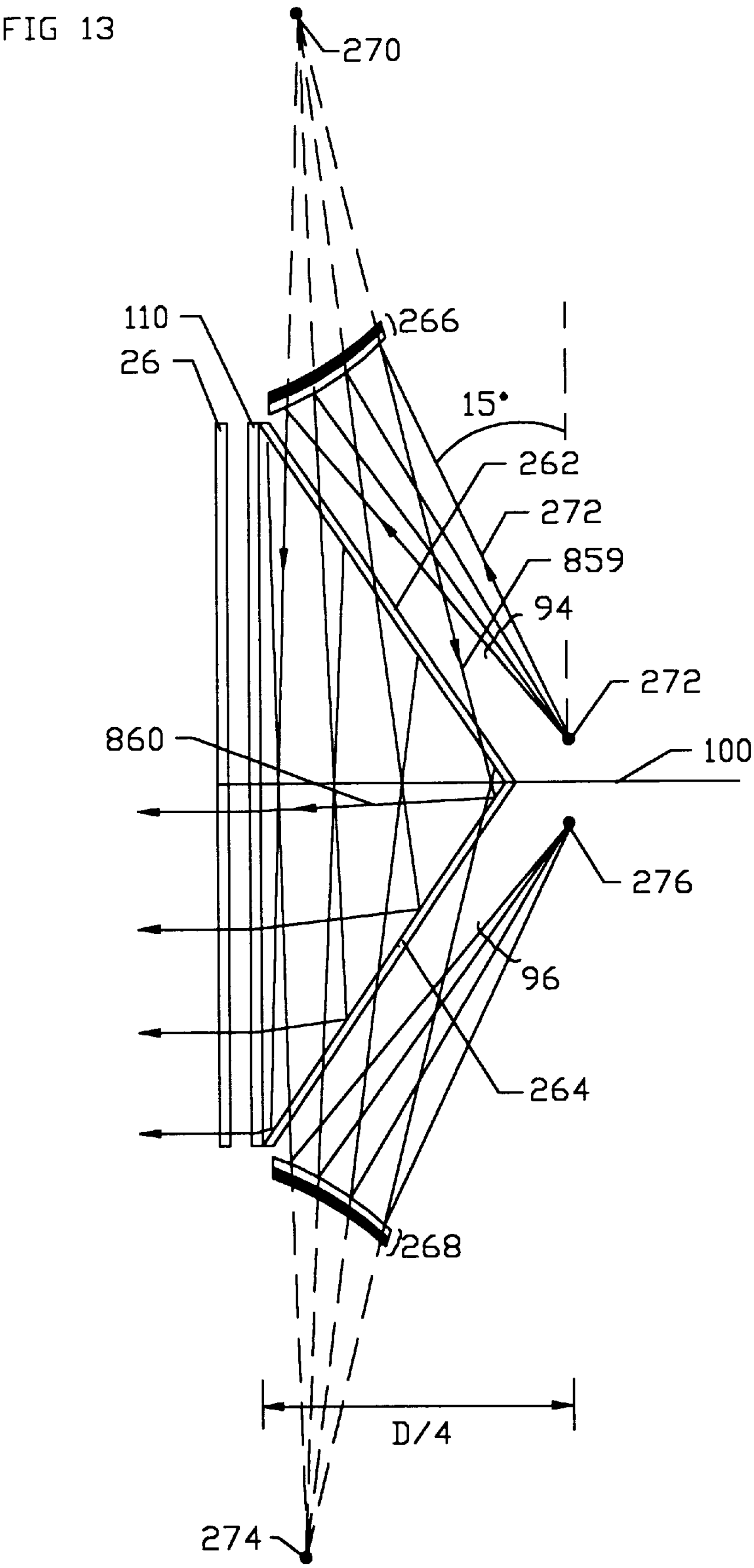
FIG. 13 illustrates a variation on the embodiment of FIG. 11 using a curved and tilted set of re-directing mirrors.
Figure 134:
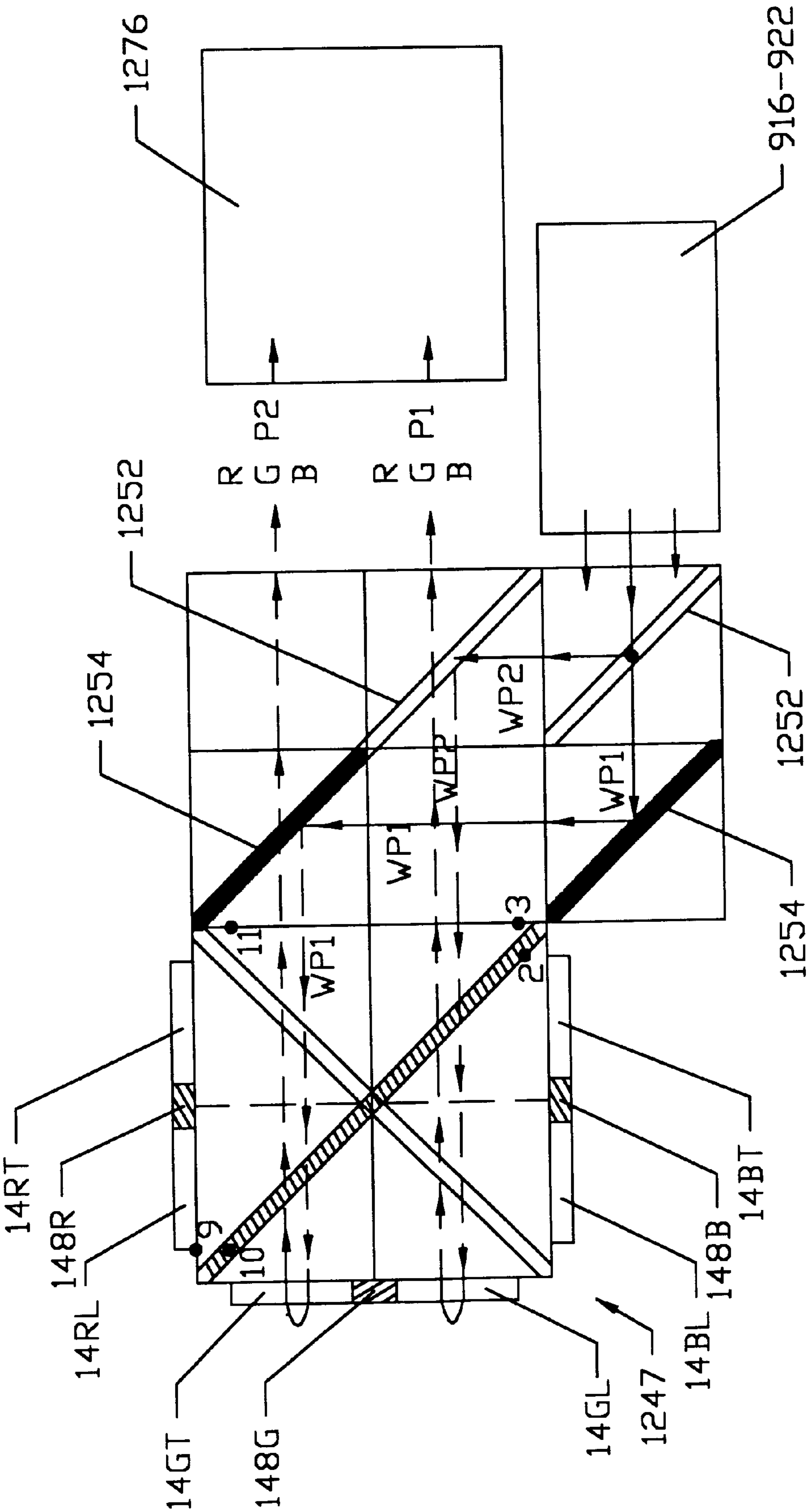
Figure 135:
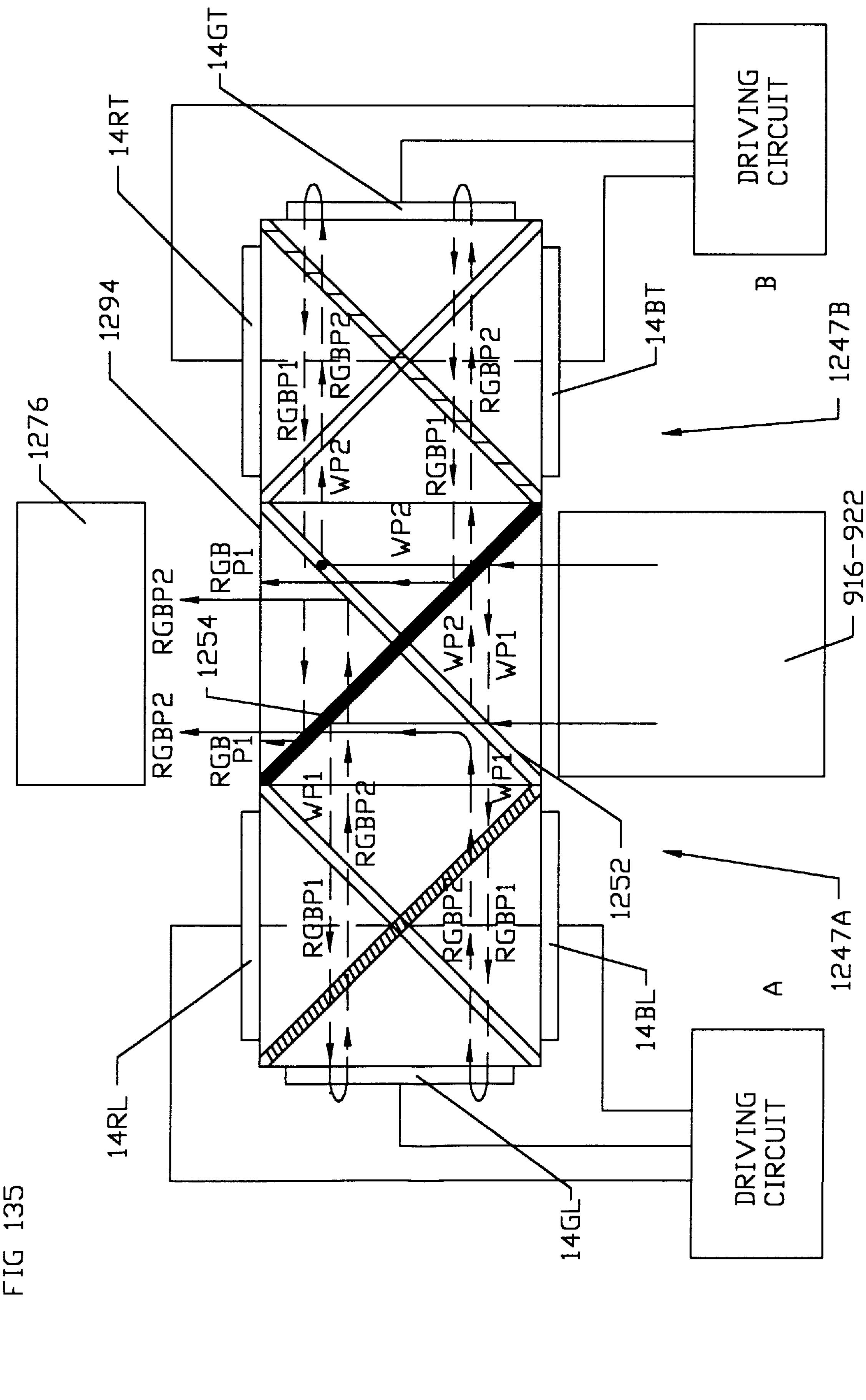
Figure 136:
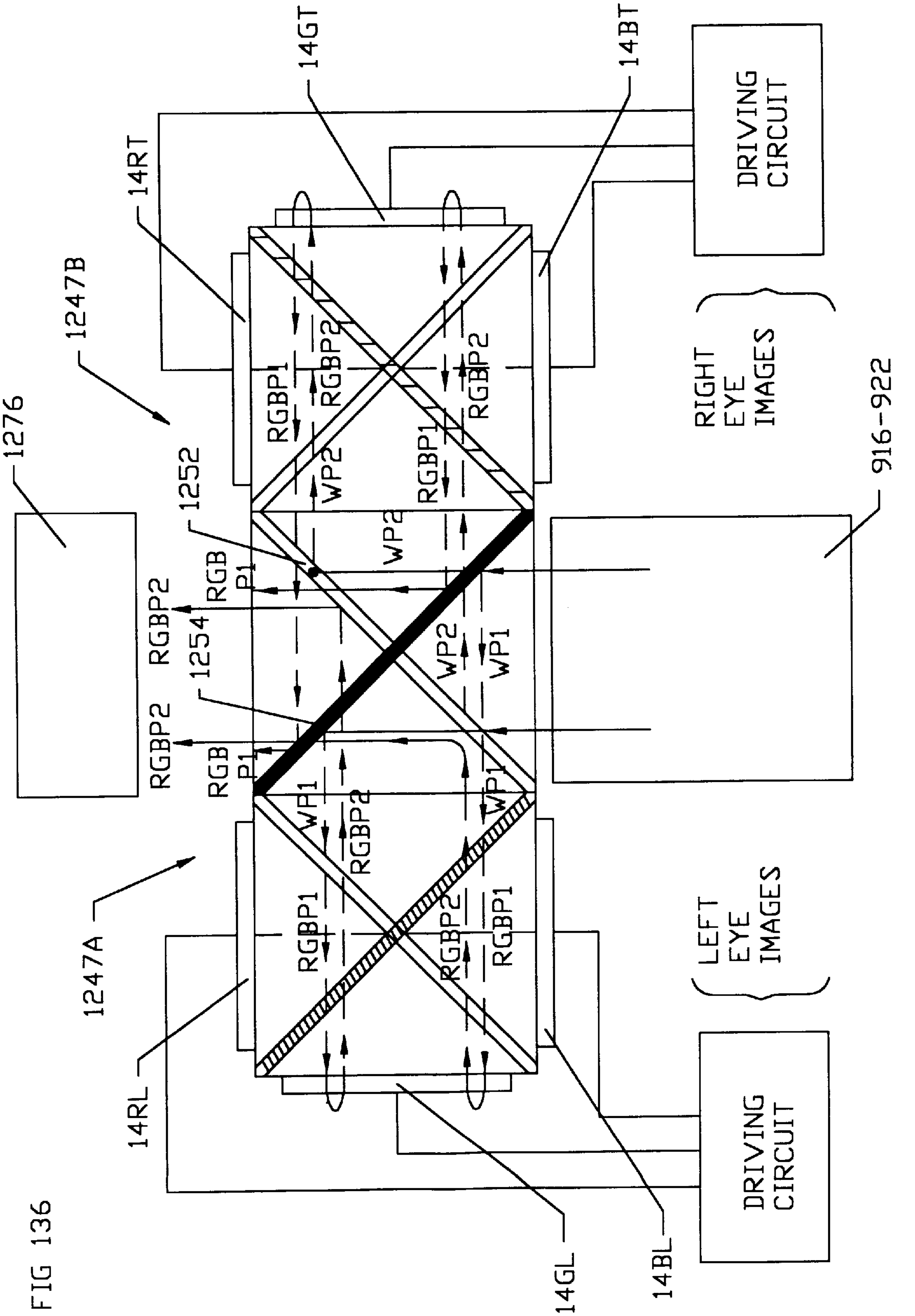
Figure 137:
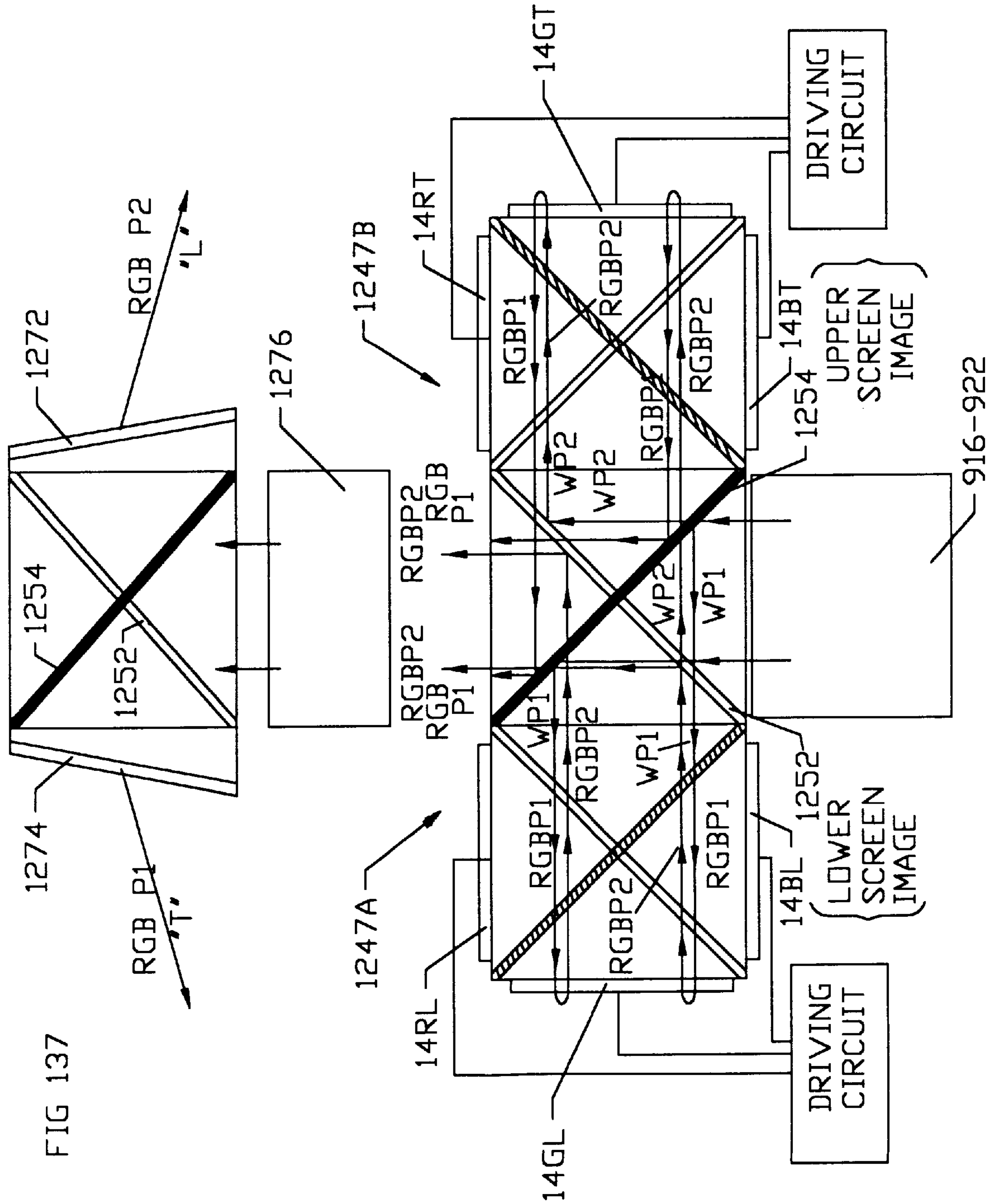
Figure 138:
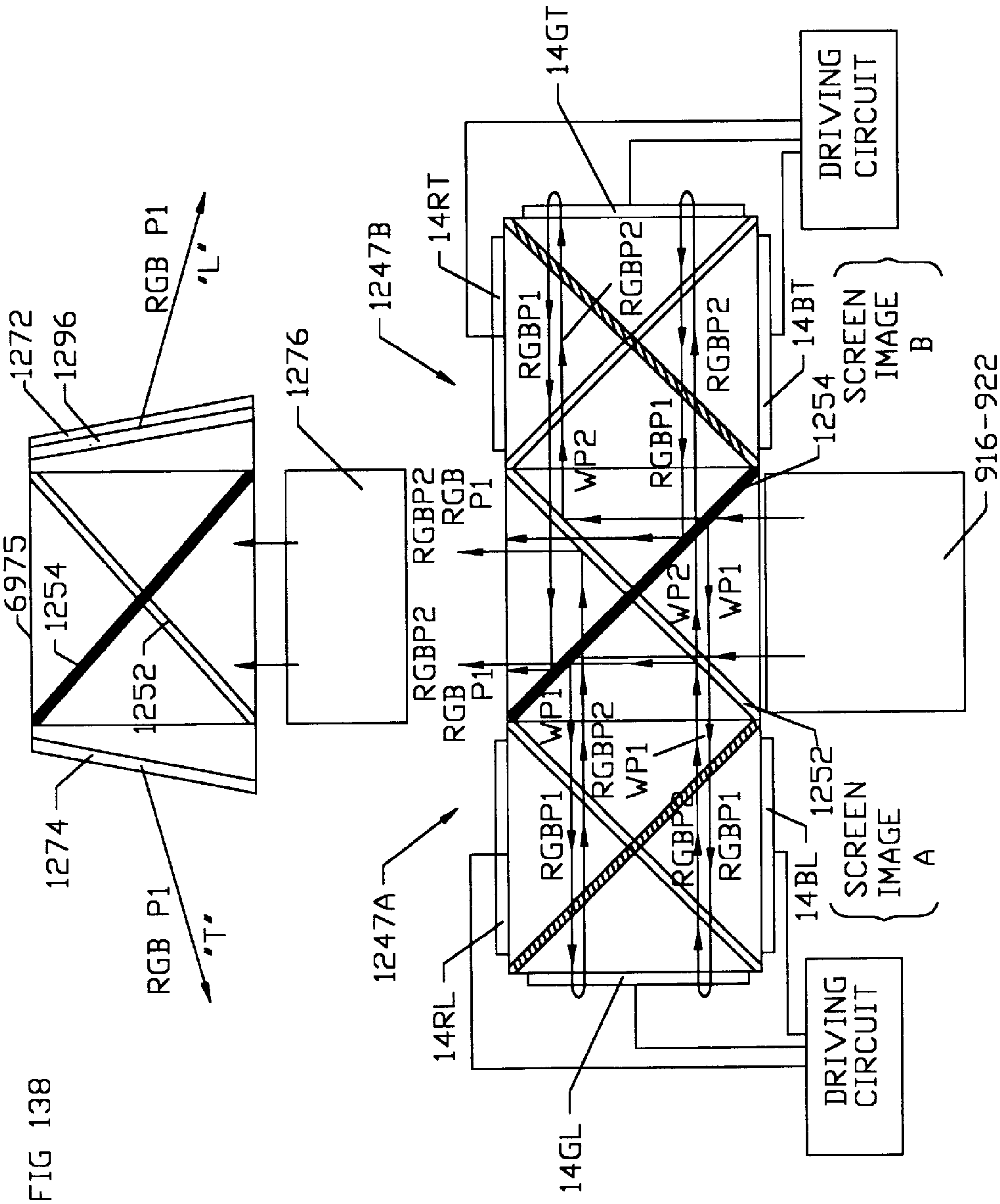
Figure 139:
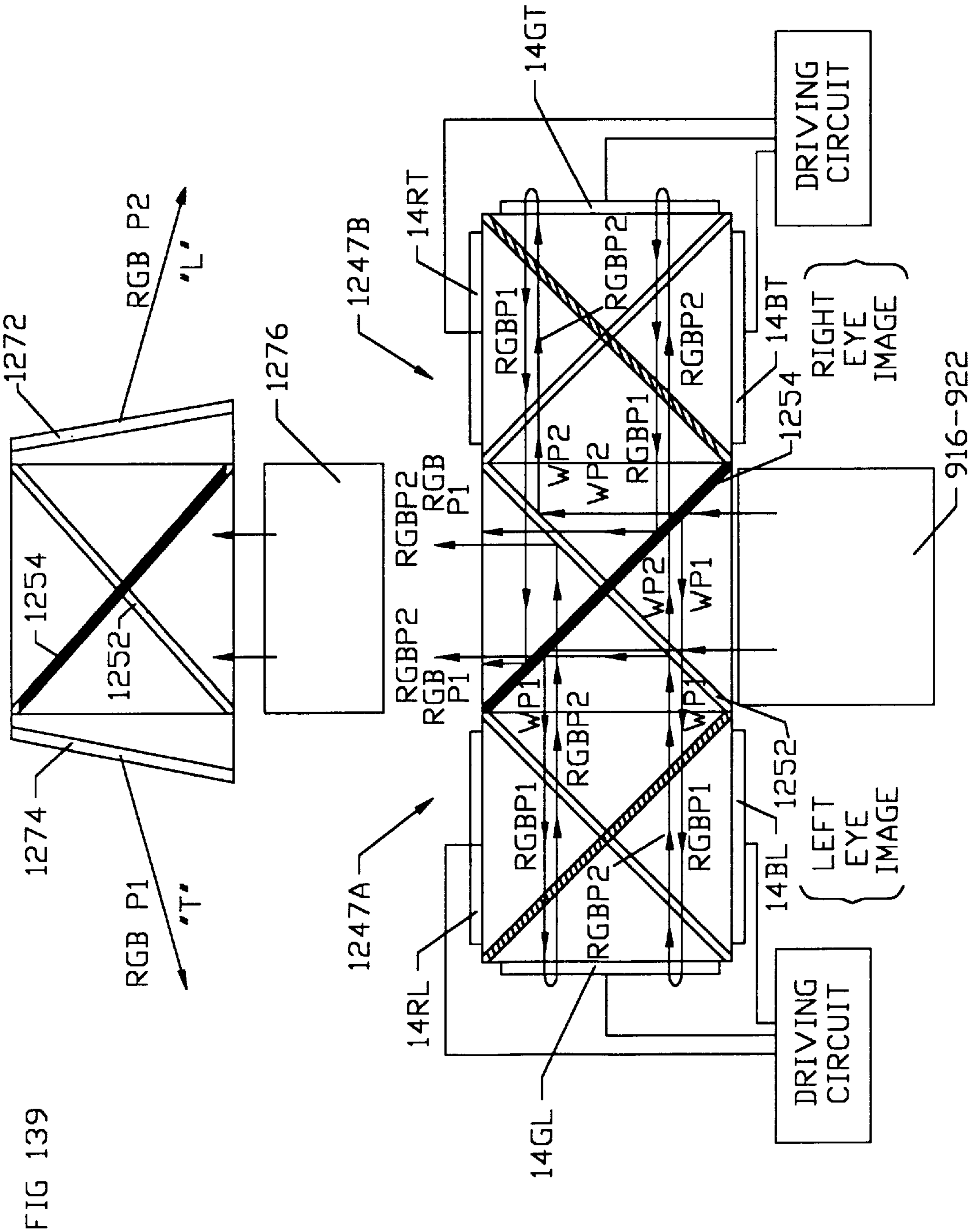
Figure 140:
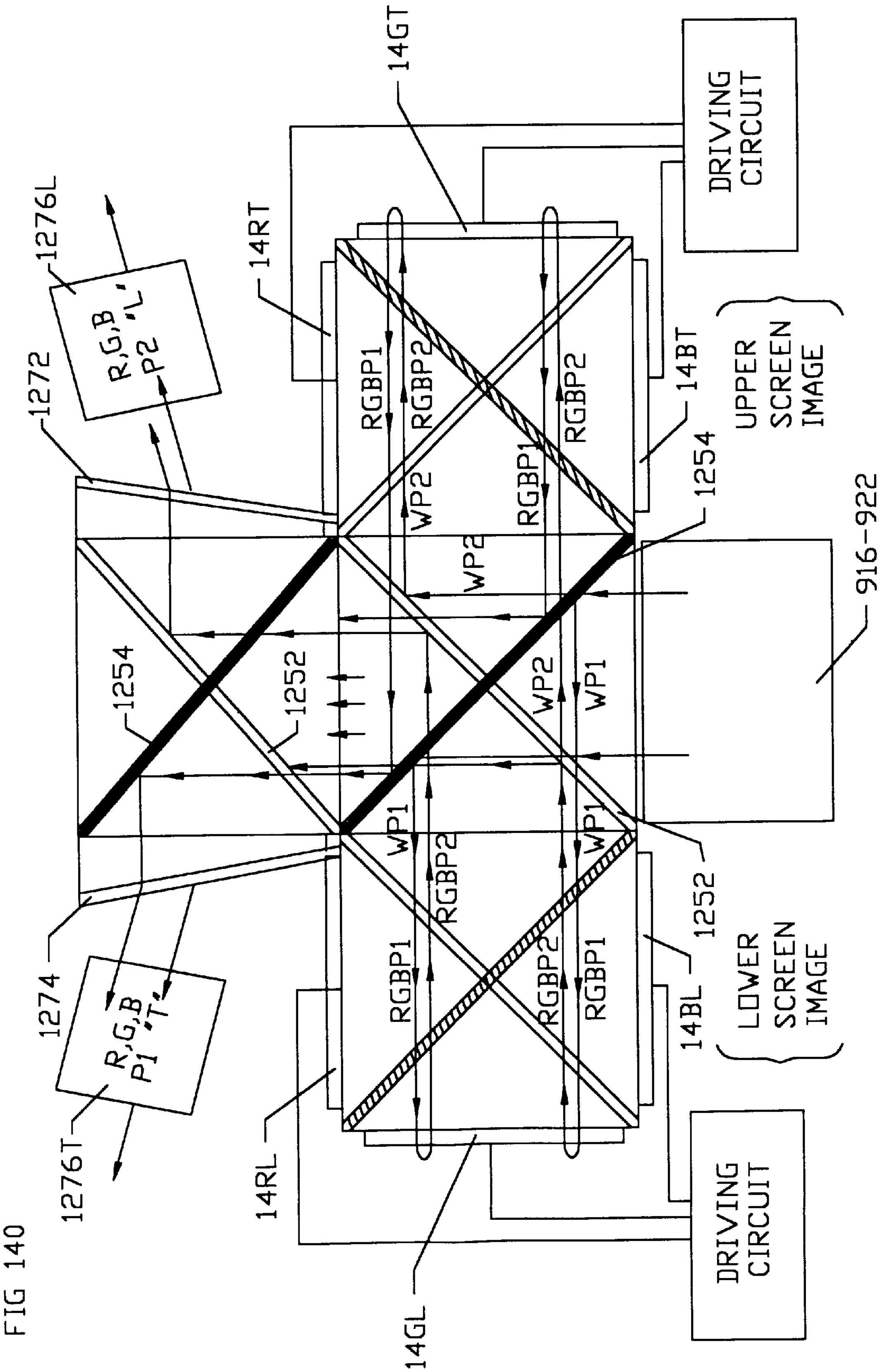
Figure 141:
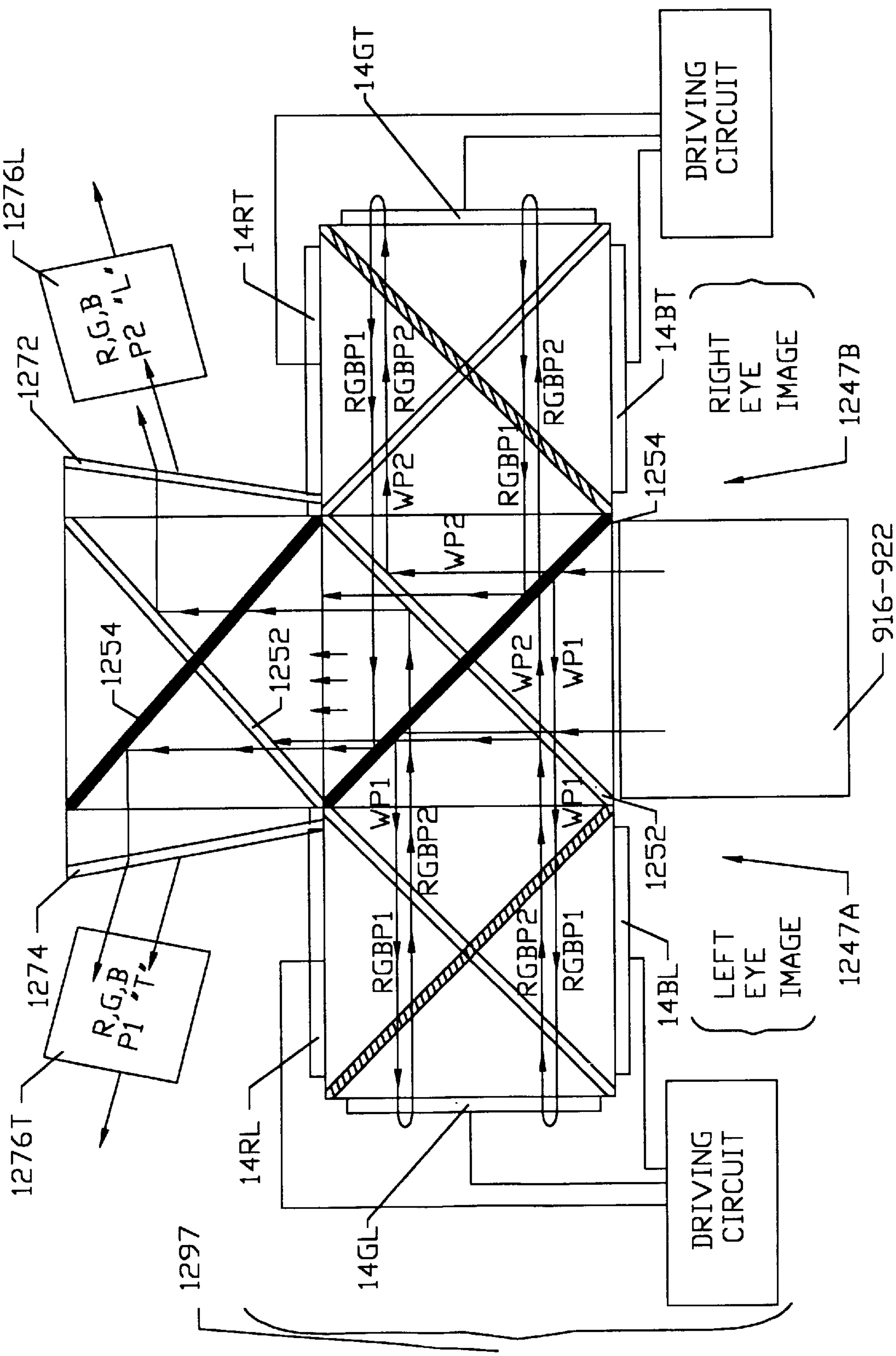
Figure 142:
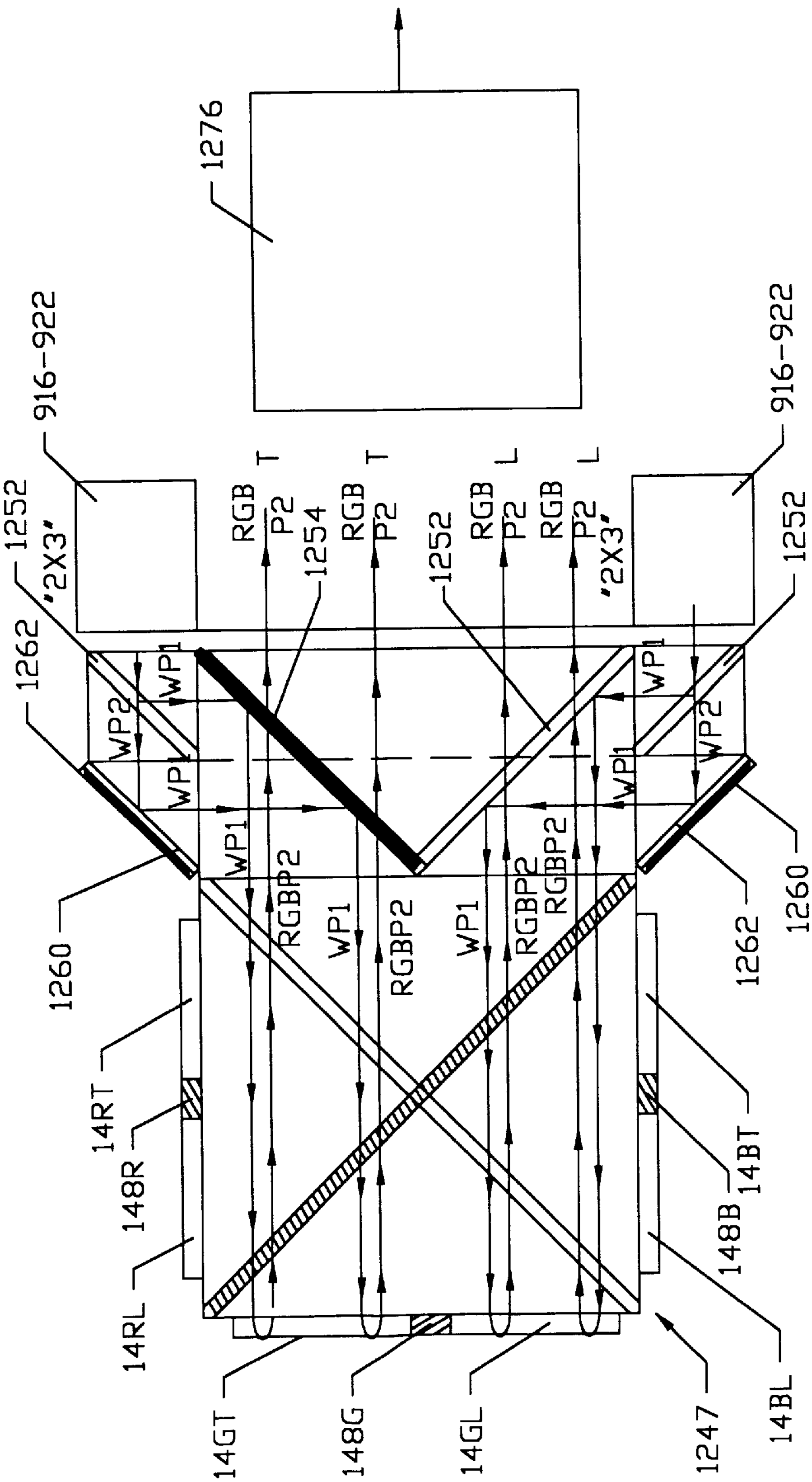
Figure 143:
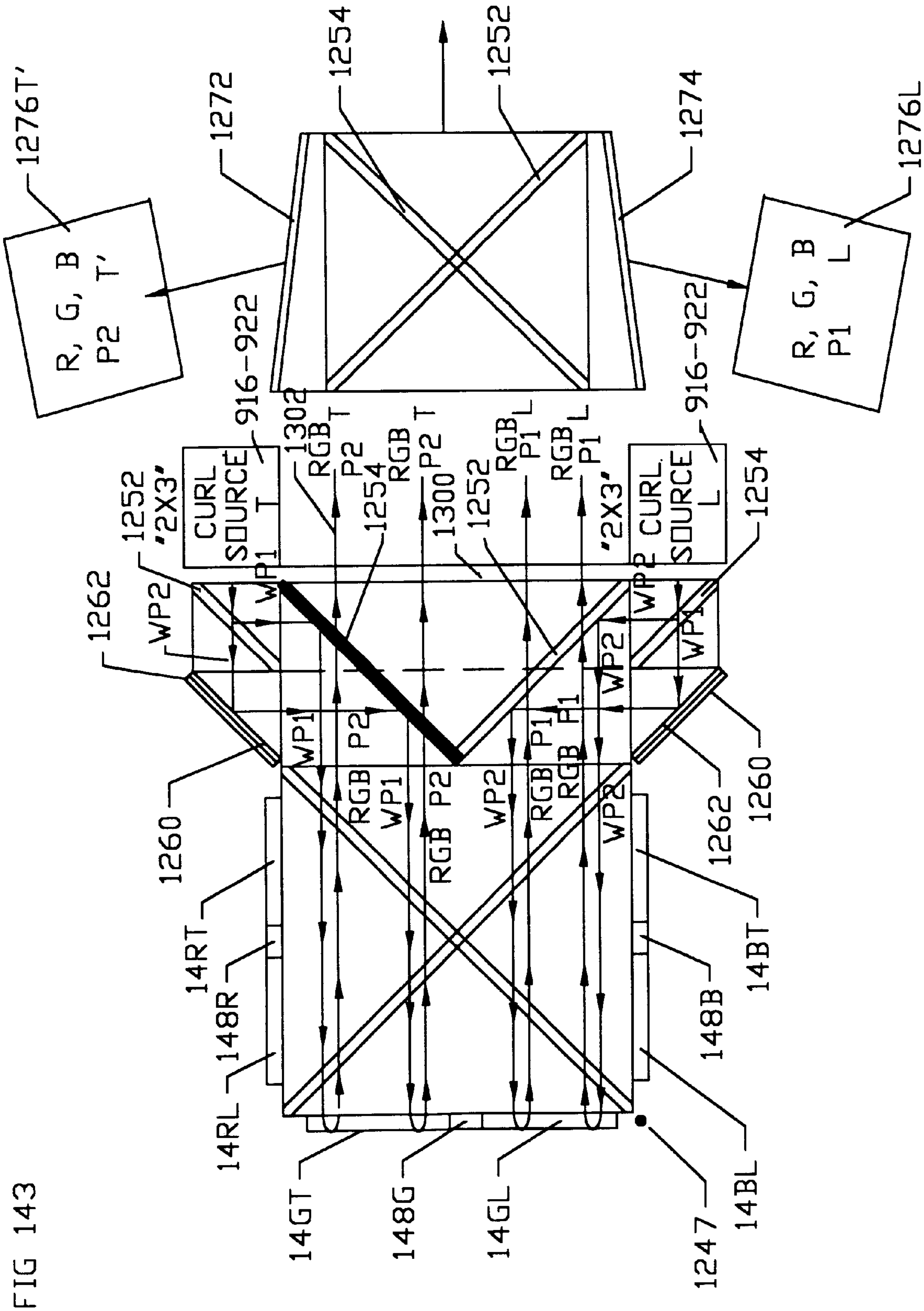
Figure 144:
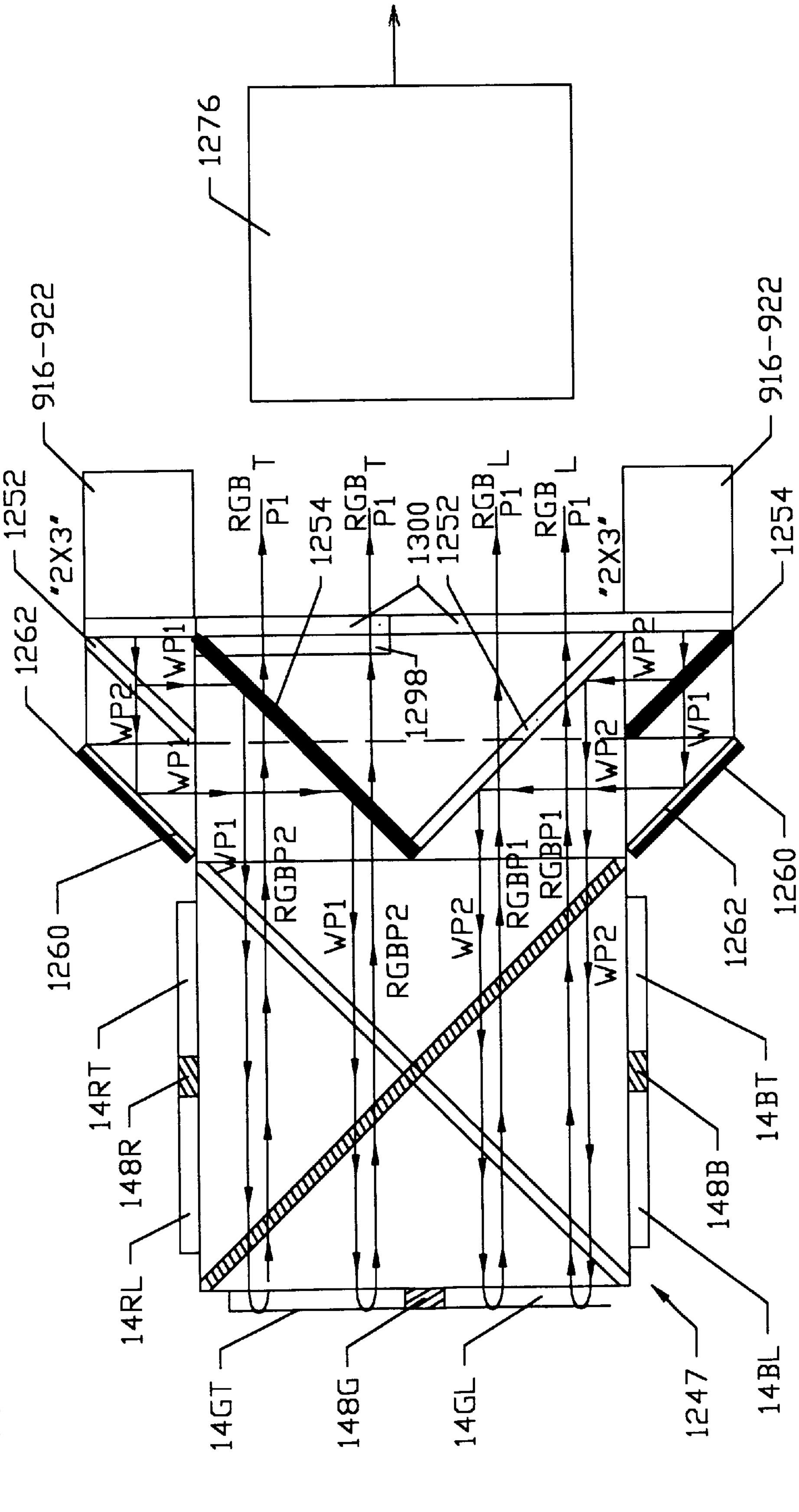
Figure 145:
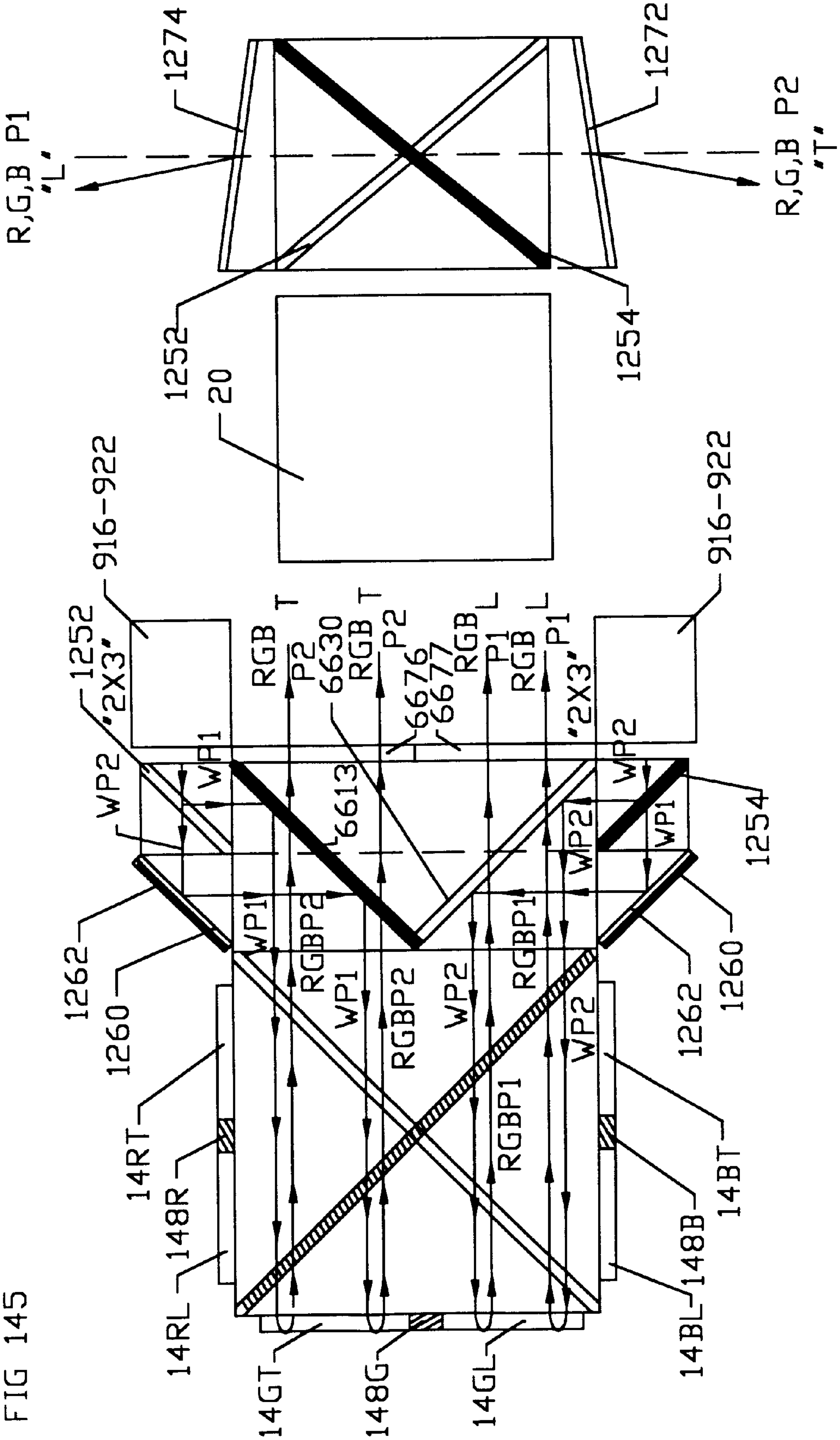
Figure 146:
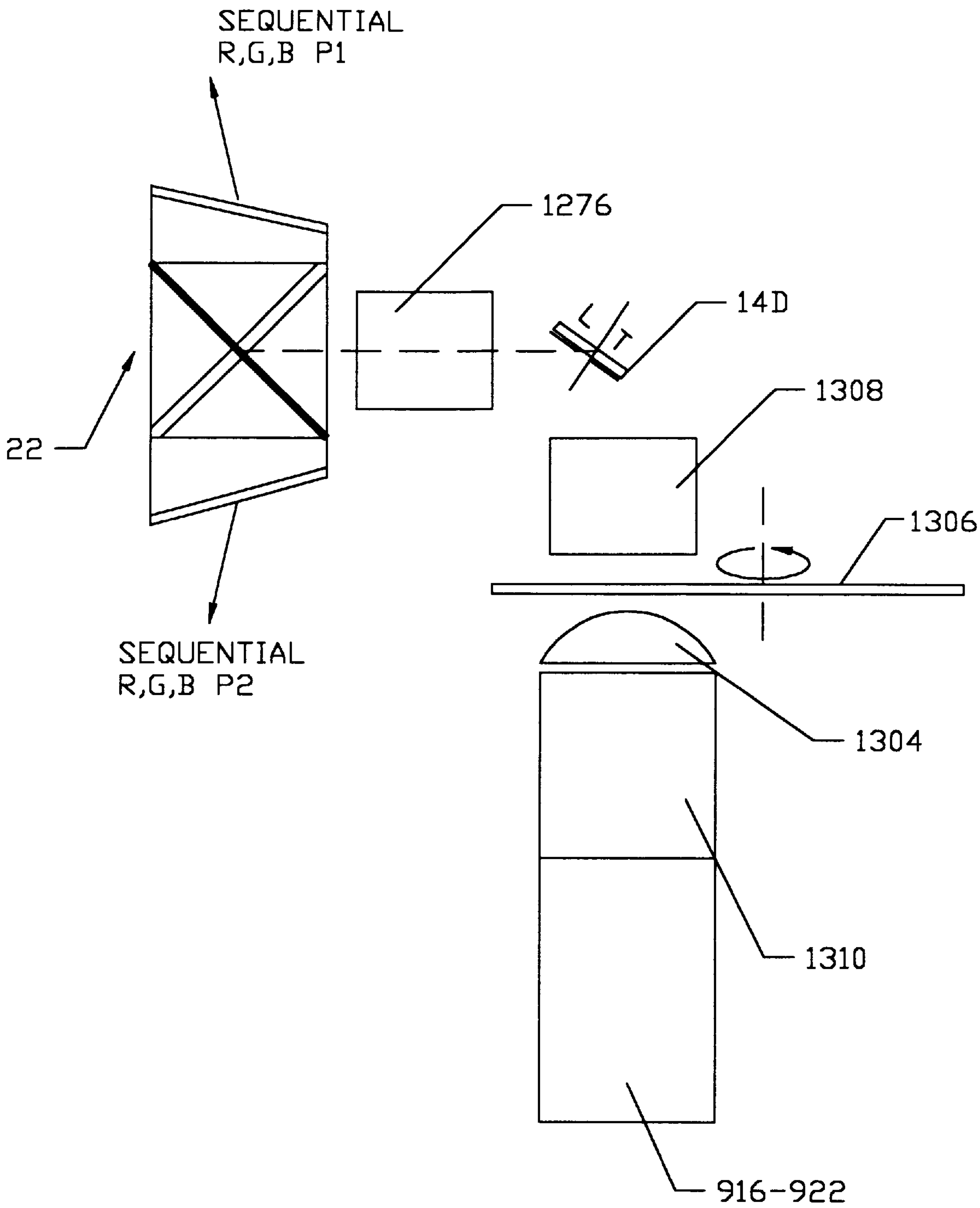
Figure 147:
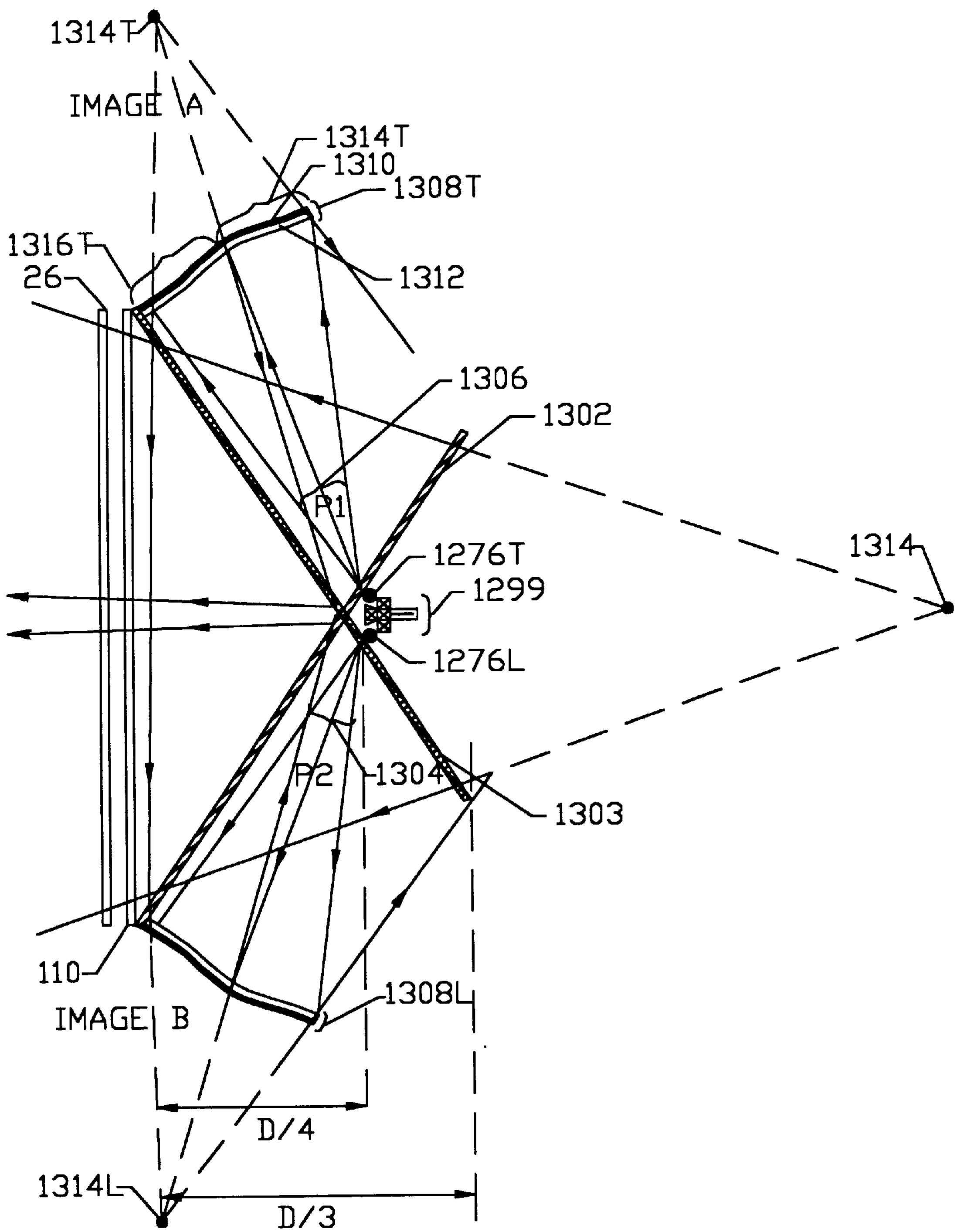

FIG. 134 shows a variation on the embodiment of FIG. 133 using an alternative polarizing method and a single projection lens;

FIG. 135 shows a single projection lens variation on the embodiment of FIG. 128 using two cross-firing LCD color-splitting cubes and integral polarization-selective and polarizing coupler, FIG. 136 shows a variation on the embodiment of FIG. 135 for three-dimensional image projection suitable for use with conventional folded-optic rear-projection systems and conventional front projection systems;

FIG. 137 shows a variation on the embodiment of FIG. 135 for resolution-doubling split-image projection;

FIG. 138 shows a variation on the embodiment of FIG. 137 for image comparison and correlation applications;

FIG. 139 shows a variation on the embodiment of FIG. 137 for three-dimensional image projection using post-projection lens beam-splitting and split-image folded-optic projection systems;

FIG. 140 shows a variation on the embodiment of FIG. 139 for resolution-doubling split-image projection using two projection lenses;

FIG. 141 shows a variation on the embodiment of FIG. 140 for three-dimensional image projection using split-image, two-polarization folded-optic projection system and two projection lenses;

FIG. 142 shows a variation on the embodiment of FIG. 128 using two light sources and a single projection lens;

FIG. 143 shows a variation on the embodiment of FIG. 142 for two projection lenses;

FIG. 144 shows a variation on the embodiment of FIG. 142 for single polarization split-image folded-optic projection systems;

FIG. 145 shows variation on the embodiment of FIG. 144 for orthogonal polarization split-image projection systems;

FIG. 146 shows an orthogonal polarization split-image method for the digital micromirror device (DMD); and FIG. 147 shows a variation on the split-image projection system embodiment of FIG. 13 for use with three-dimensional image viewing via the embodiment of FIG. 141.

DETAILED DESCRIPTION OF PREFERRED EMBODIMENTS

An optical system constructed in accordance with one form of the invention is indicated generally in FIG. 1A–C and 2 which include a side elevation, front elevation and top elevation. The optical system 10 embodies a structure and method which uses various optical elements disposed in a compact geometry and manipulates light to generate an image output on an output projection screen 26 The system 10 includes a light source 12 (see FIG. 3) which illuminates a spatial light modulator ("SLM") 14, such as a conventional liquid crystal display ("LCD") imaging device or digital mirror modulator ("DMD"). The system can also be used with passive image sources such as photographic transparencies and microfilm. The LCD form of the SLM 14 can be transmissive or reflective. The SLM 14 (LCD or DMD) shown in FIGS. 1A, 1C, 2 and 3 is connected to an appropriate SLM driving circuit 19, consisting of control electronics 21 and image processing electronics 11, buffered by an associated format memory 9 needed to produce a high quality black-and-white or color image (data stream), as shown schematically in FIG. 1D. Electronic video image signals 17 can include, for example, signals from laser disk players, conventional analog television, DSS satellite television, digital video disk players, video cassette recorders, personal computers and photo-cd players. The signals 17 are applied to the electronic pixel addressing structure of the SLM 14 by means of an electronic interface 15 that connects to the image processing electronics 11 and the image format memory 9 as shown. For example, when one SLM 14 is used for each color component (red, green, blue) as in FIG. 1A and FIG. 3, and/or in situations when multiple images are applied, the image processing electronics 11 sorts and directs image information to the correct circuit memory 9 for each SLM 14. The SLM 14 can include corrective refractive lens elements, such as convex refractive lens 16 or concave refractive lens 18 as each member of a lens pair bracketing the input and output sides of the SLM 14 or each member located in between the light source 12 and the SLM 14, forming an approximate telescopic unit. A pair of lens locations is shown as dotted lines in FIG. 2. Another pair of lens locations is shown as dotted lines in FIG. 3. These lenses 16 and 18 can improve efficiency and image contrast under selected optical conditions. In order to secure optimum performance of a total projection system, as will be developed later, the light source 12 can involve converging or diverging rays, rather than the nearly collimated rays preferred by the SLM 14. For this reason, a first lens element 18 can be added to the light source at the first location before the SLM 14 where more nearly collimated light is desired. Then the second lens element 16 can be added at that point after the SLM 14 where collimated light is no longer preferred. In cases where it is acceptable to use a "telecentric" form of a projection lens 20, the use of the second lens 16 is not required. In cases where the use of a "telecentric" form of a lens is not acceptable, and a conventional form of the projection lens 20 is preferable, the second lens 16 provides the proper optical power to locate the conventional projection lens' entrance pupil. In the case of the conventional projection lens rays joining a point on the SLM 14 to the center of the lens pupil make a non-zero angle with the lens axis and are typically converging towards the lens pupil. A conventional "telecentric" lens is one in which these rays can all be parallel to the lens axis. In cases where the properties of the light source 12 have been modified, as by the use of aspheric contour terms that will be introduced hereinafter, either or both of these bracketing lens elements can also be rendered with aspherizing contours to correctly direct the associated rays through the optical system 10. One lens pair that is particularly useful is the position and negative lens combination that forms an approximate telescopic unit and placed between the light source 12 and the SLM 14, as will be developed hereinafter, so the angular ray distribution about the principal rays can be more tightly controlled.

Figure 1A:
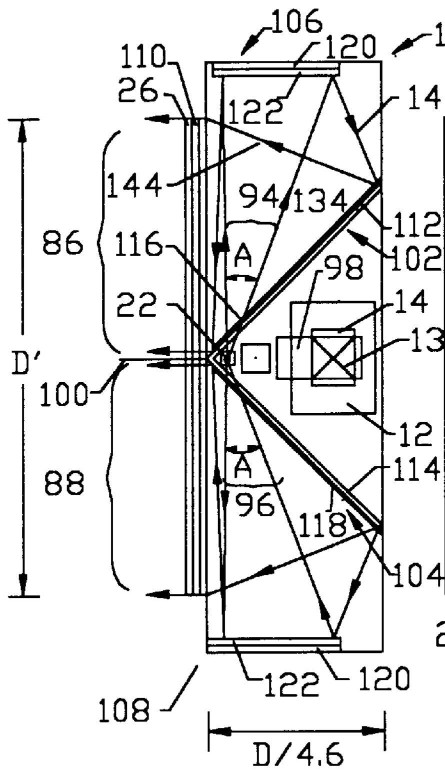
FIG. 1A illustrates a side view of a polarization-selective, split-image folded-optic rear-projection system with plane reflectors.
Figure 2:
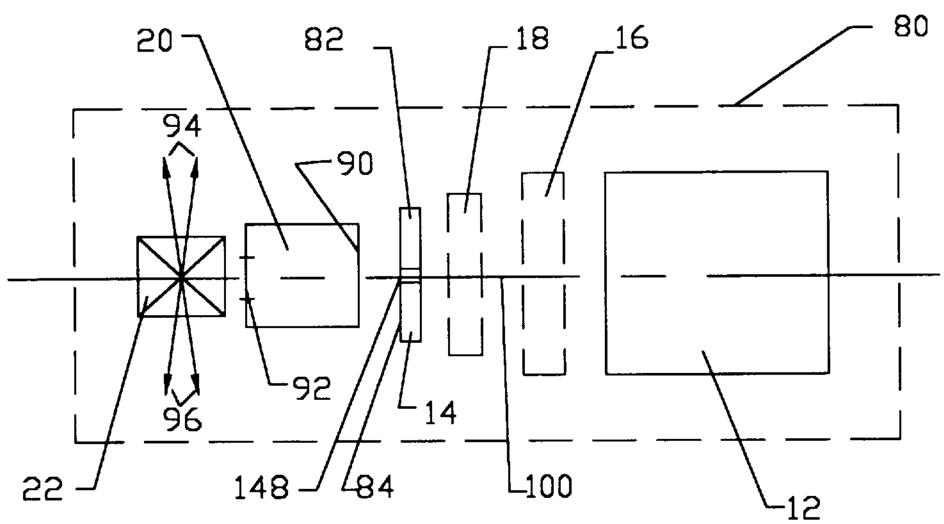
FIG. 2 shows a generalized image forming system with light source, SLM, projection lens and beam-splitter.
Figure 3:
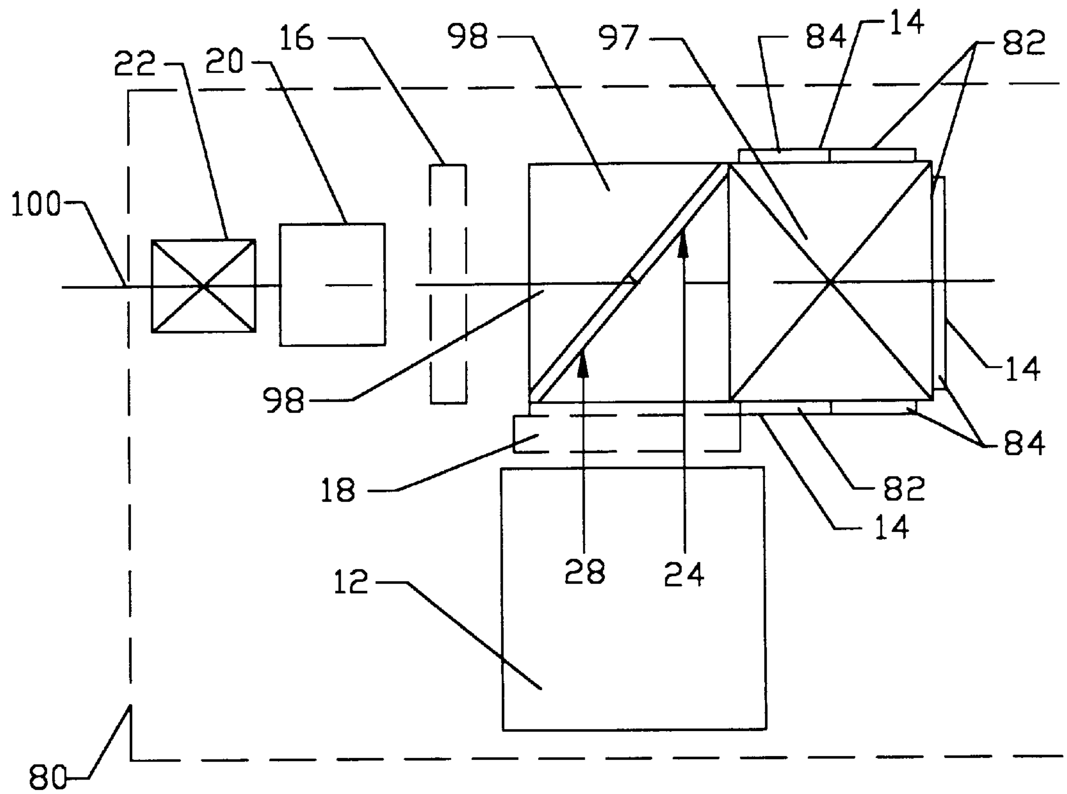
FIG. 3 illustrates a color image forming system with light source, polarization coupler, tri-color LCD filtering system, projection lens and beam-splitter.

As shown in FIGS. 2 and 3, the optical system 10 includes the projection lens 20 and a beam splitter 22 which routes upper rays 24 having passed through one portion of the image of the SLM 14 to an upper image portion 86 of a projection screen 26, and lower rays 28 having passed through the corresponding region of the image of the SLM 14 to a lower image portion 88 of the projection screen 26. This arrangement results in the original and complete image being reconstructed in perfect organization and focus over the projection screen 26. The optical system 10 includes a split-image beam forming system 80 (hereinafter "split image system") shown in FIG. 2. The split image system 80 includes, for example, a transmissive form of the SLM 14, with an upper image region 82 and lower image region 84. Polarized upper rays 24 and orthogonally polarized lower rays 28 are input to entrance pupil 90 and exit pupil 92 of the projection lens 20. The beam splitter 22 outputs orthogonally-polarized upper and lower beams 94 and 96 to the upper and lower image portions 86 and 88 of the optical system 10. The split image system 80 is shown in greater detail in FIG. 3. In this case, the light source 12 is attached to a polarization selective light source coupler 98 containing an upper and lower diagonal region which allows the light source 12 to be mounted orthogonally to optic axis 100 (side-mounted). The light source 12 is arranged to provide the appropriately polarized upper rays 24 and lower rays 28 for the upper and lower image regions 82 and 84 of the SLM 14. The resulting upper and lower output beams 94 and 96 (see FIG. 1A) can be either linearly polarized TE and TM, right and left hand circularly polarized (RHCP and LHCP) or other available combination which would function in the illustrated manner. A three color split-image form of the SLM 14 includes a conventional sub-assembly 97, containing one split-image form of the SLM 14 for each of the well known color components, namely, red 82R/84R, green 82G/84G and blue 82G/84G light images, and the associated color-splitting means. It is the systematic relationship, however, between the split-image form of the SLMs 14, the beam splitter 22 and the wide band polarization-dependent nature of the various reflecting elements of the optical system 10 which provide important advantages.

As shown in FIGS. 1A and 2, the beam splitter 22 is configured to process the selectively polarized upper and lower light rays 24 and 28 passing through the image of the SLM 14, such that the upper image region 82 and lower image region 84 of the SLM 14 are recognized and sorted by their associated orthogonal polarization states for the input upper and lower light rays 24 and 28. The upper polarized beam 94 and the lower polarized beam 96 are output and their respective paths through the illustrated optical system 10 depend on and are controlled by the respective orthogonal polarizations. The polarization state given to each of the upper and lower polarized beams 94 and 96 allows their respective transmission through upper and lower polarization selective reflectors 102 and 104 (see FIG. 1A). The continuations of these transmitted forms of the upper and lower polarized beams 94 and 96 are polarization converted and redirected by upper mirror converter 106 and lower converter mirror 108, and back towards the selective reflectors 102 and 104. The beams 94 and 96, which have been orthogonally converted by the upper and lower mirrors 106 and 108, and returned back to the selective reflectors 102 and 104, are redirected towards a Fresnel lens 110 and then output for viewing on the projection screen 26.

In the most preferred embodiment, therefore, the upper and lower halves of the optical system 10 form two identical and symmetric sections. In the example shown in FIG. 1A, the upper and lower converter mirrors 106 and 108 in combination with the upper and lower selective reflectors 102 and 104 are used in each section to apply the respective image portions onto the projection screen 26.

In a particular form of the embodiment of FIG. 1A, the polarization selective reflectors 102 and 104 are each tilted at about 42.5 degree angles with respect to the optic axis 100, and contact, or nearly contact, the rear of the Fresnel lens 110. The polarization selective mirrors 102 and 104 are preferably each composed of a rigid and optically transparent substrate material 112 and 114, respectively, such as an acrylic or polycarbonate in a coated (or laminated) form. A preferentially-oriented layer 116 on the reflector 102 and a layer 118 on the reflector 104 can both be a wide band selectively reflecting material, such as a well known Minnesota Mining and Manufacturing Company "Reflective Polarizer", or the well known Merck Ltd.'s cholesteric liquid crystal reflective polarizer "Transmax". Such wide band reflective polarizers efficiently transmit (and reflect) orthogonal polarization states over a wide range of angles and wavelengths. For the linearly polarized embodiment of FIG. 1A, the oriented layer 118 is preferably the 3M material pre-aligned with the beam splitter 22 to transmit light of polarization state P1 and to reflect light of the orthogonal polarization state P2; the oriented layer 116 is preferably the 3M Reflective Polarizer pre-aligned with the beam splitter 22 to transmit light of polarization state P2 and to reflect the light of orthogonal polarization state P1. This 3M material is an organic dielectric multi-layer stack which reflects and transmits with nearly equal efficiency over a very wide band of incident angles and wavelengths. The subject invention can also be practiced using orthogonal circular polarization states and using the wide band Merck material described above. The well known, more classical inorganic dielectric multi-layer materials perform functionally the same way, but are tuned to a single wavelength, and operate efficiently only over a relatively narrow range of angles. As such, the use of conventional materials is not generally as preferred in forms of the optical system 10 which require the display of white light and the ability to handle with equal efficiency a diversity of angular directions for light.

In the embodiment of FIG. 1A, the corresponding upper and lower converter mirrors 106 and 108, each referenced to the back of the Fresnel lens 110, are aligned parallel with the optic axis 100, above and below by a distance equal to D/2.78. (Note: D is the diagonal of the projection screen 26, and D' is the height of the projection screen 26 so that D'=(3/5)D for the standard 4:3 TV aspect ratio.) In the construction of these embodiments, there are many combinations of mirror heights above the optic axis 100 and source locations that provide the correct output angles to the Fresnel lens 110. Additional criteria for the preferred location involve making sure that the optical path length of the ray directed to the center of the projection screen 26 divided by the cosine of the angular range equals (or nearly equals) the optical path length of the uppermost ray. Moreover, rays from the top, middle, and bottom of the exit pupil 92 of the projection lens 20, through the beam-splitter 22, should arrive at the projection screen 26 at the same (or substantially the same) physical point. The embodiment conditions that best satisfies these aggregate conditions will be preferred for highest projected image quality (focus) on the projection screen 26 without correction or compensation accessories. Embodiments that fail these conditions by large amounts will result in blur circles on the projection screen 26 exceeding the resolution as defined by the magnified pixel element size on the screen and will generally be impractical. The example of FIG. 1A is within the preferred range, but not necessarily the optimum condition. Other examples, failing these criteria can be corrected by the use of additional elements and brought within the range of preference. Each of the upper mirrors 106 and 108 preferably also contains two layers, one a wide band mirror layer 120 (typically a metal or metal-like film that changes the handedness of circularly polarized light, from right hand circular to left hand circular, or vice versa) and another, a wide band polarization converting layer 122, preferably a wide band quarter-wave retardation film. A preferred wide band polarization converting material is wide band retardation film manufactured by, for example, Nitto Denko Corporation, Japan, which supplies essentially the same phase retardations at any wavelength between about 400 nm and 700 nm. Conventional retardation materials designed for a particular center wavelength exhibit progressively larger retardation errors the further the operating wavelength differs from the center wavelength in either direction.

Figure 4A:
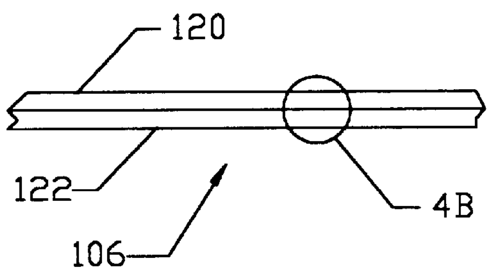
FIG. 4A shows a conventional polarization conversion metal-retardation film bi-layer and FIG. 4B shows further detail of the associated polarization conversion mechanism in FIG. 4A.
Figure 4B:
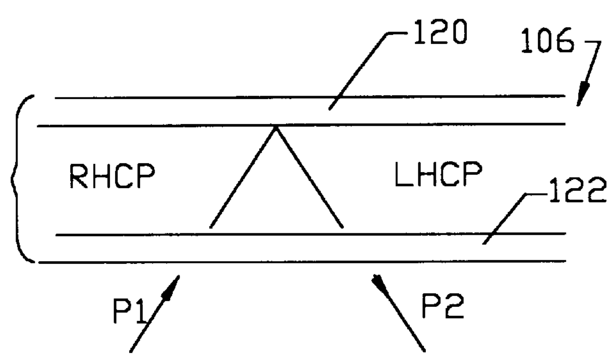

In the illustrated embodiment of FIG. 1A, each of the upper mirrors 106 and 108 preferably also contains two layers, one a wide band mirror layer 120 (typically a metal or metal-like film that changes the handedness of circularly polarized light, from right hand circular to left hand circular, or vice versa) and another, a wide band polarization converting layer 122, preferably a wide band quarter-wave retardation film (see FIGS. 4A and 4B). Conventional retardation materials designed for a particular center wavelength exhibit progressively larger retardation errors the further the operating wavelength differs from the center wavelength in either direction.

Figure 1B:
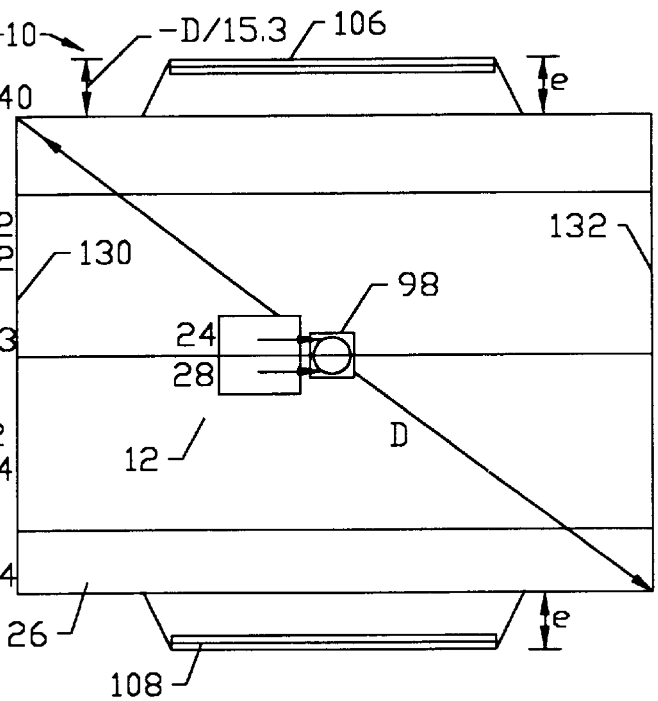
FIG. 1B is a front view of the system in FIG. 1A.
Figure 1C:
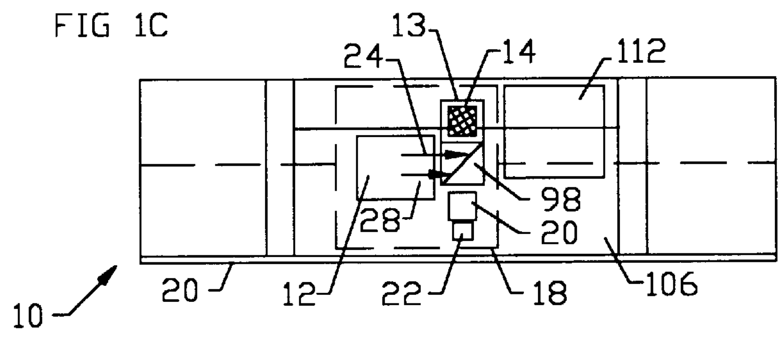
FIG. 1C is a top view of the system in FIG. 1A
Figure 1D:
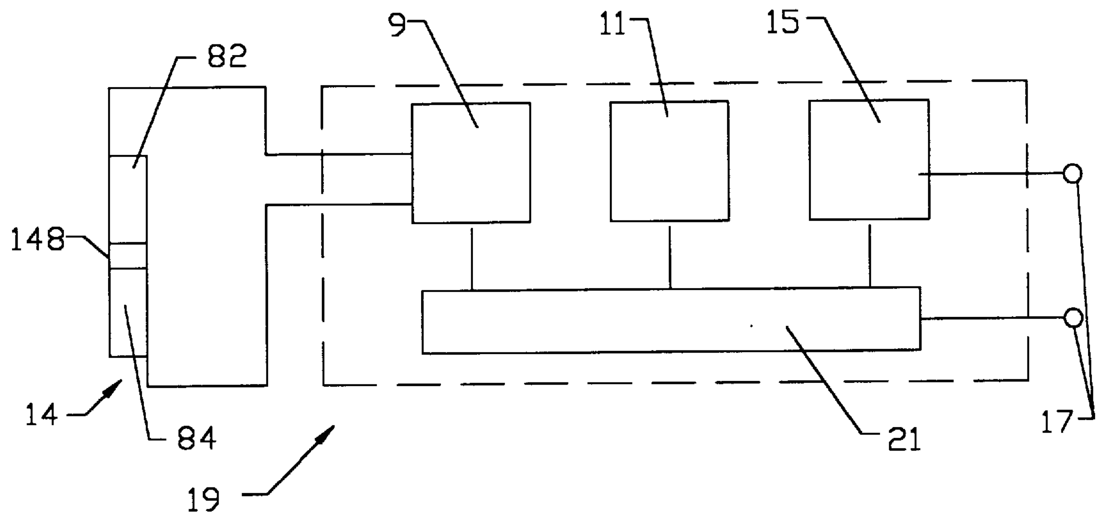
FIG. 1D is a schematic representation of the spatial light modulator, electronic driving circuitry for video images.

The beam splitter 22 in FIG. 1A is preferably placed along the optic axis 100 in the vertex formed by the upper and lower selective reflectors 102 and 104, nominally a distance D/30 from the back surface of the Fresnel lens 110. Again, as described hereinbefore, there are many combinations of source and mirror location which result in different D values. The projection screen 26 and the Fresnel lens 110 are positioned in a plane substantially perpendicular to the optic axis 100 and are almost in physical contact, contrary to the exaggerated view shown for clarity in the illustration of FIG. 1A. The projection lens 20 is assumed as f/2.5 with a 0.5" focal length set by the SLM's 14 presumed 0.7" diagonal aperture and the lens' +/−35 degree angular coverage and an entrance pupil of 5 mm. The corresponding angular extent of the upper and lower beams 94 and 96 is therefore 22.8 degrees in air for the side-view angle A of FIG. 1A, an angle of 29.2 degrees (not shown) which corresponds to the angular extent in the horizontal plane of FIG. 1B, and a angle of 35 degrees (not shown) in the plane of the diagonal D, as indicated in FIG. 1B.

Figure 5:
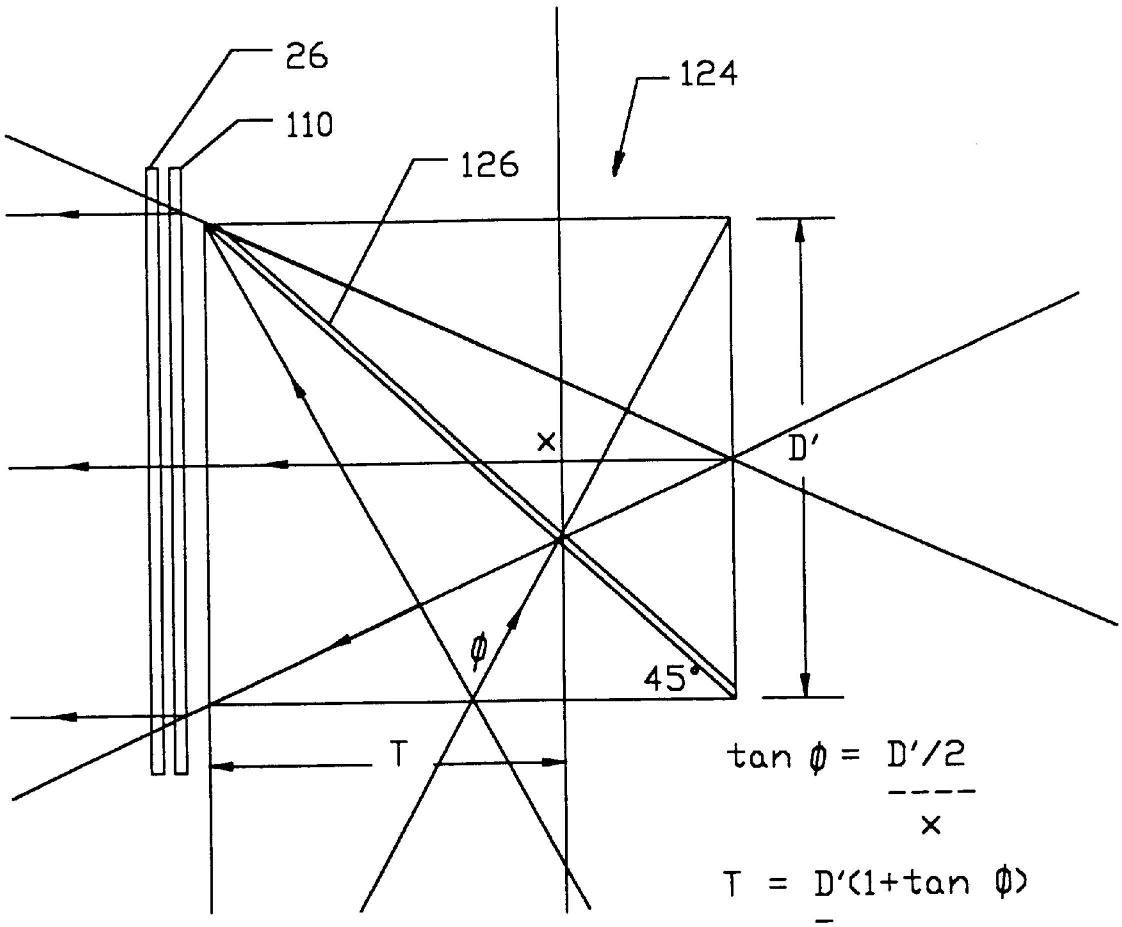
FIG. 5 illustrates the side sectional view of a prior art folded-optic rear-projection system.
Figure 6:
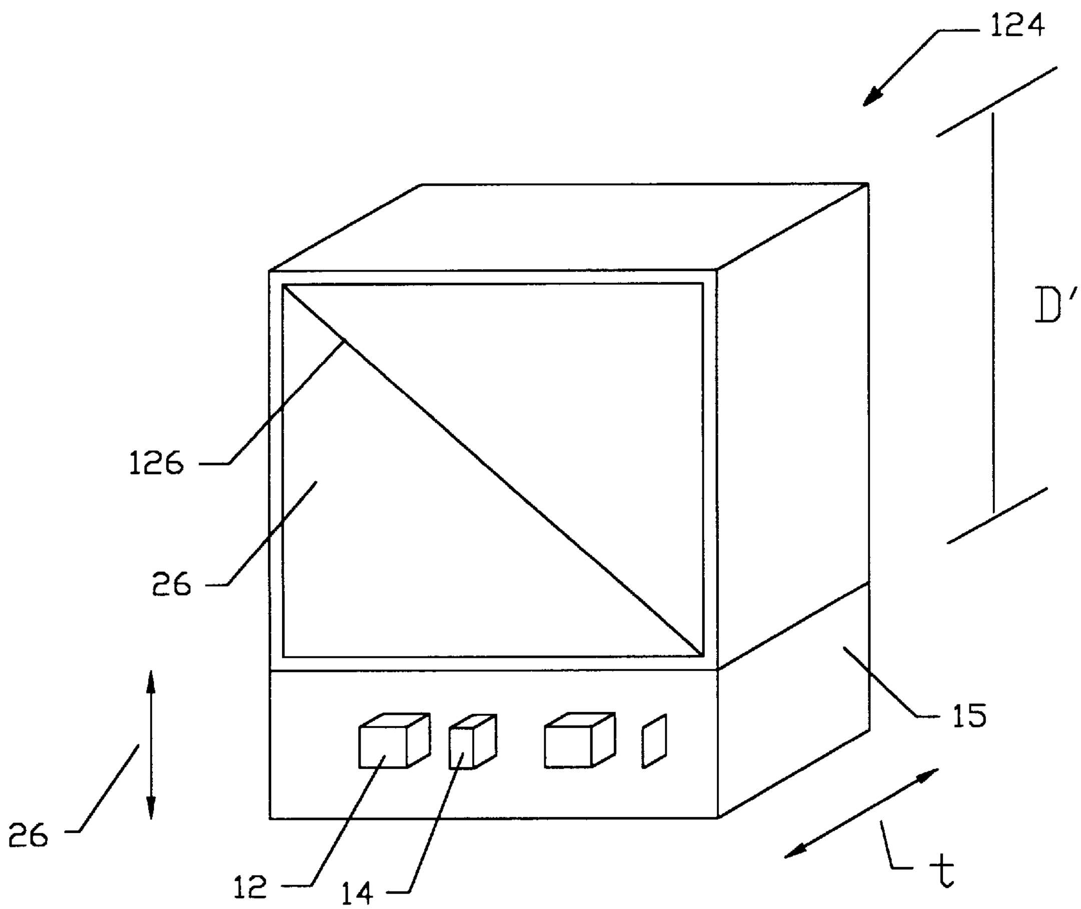
FIG. 6 illustrates a front perspective view of the prior art system of FIG. 5.

A conventional prior art system 124 shown in FIGS. 5 and 6 uses a 45 degree folded design for a mirror 126 and achieves a depth D/2.23 for a 52 degree full angle projection lens beam, where D is taken as the screen diagonal. The projected image is true to the original, which is to say there is neither any shape distortion known as "keystoning," or de-focusing. Keystone distortion occurs when the sides of the image are bent either in towards the center or out from the center, creating a shape reminiscent of an architectural keystone. When the projection lens 20 f/# is decreased so as to widen the projection angle to +/−35 degrees, cabinet depth, t, is reduced to D/2.4, also without keystoning. Steepening the folding mirror angle from 45 degrees to 60 degrees and keeping the 70 degree lens reduces cabinet depth, t, still further to D/3.3, but introduces a significant degree of keystone distortion. To date, the best commercially available rear projection cabinet depth, t, is about D/2.5 and requires space to store the illumination and basic image-forming components (the light source 12, the SLM 14, the projection lens 20 and the beam splitter 22) in a sub-cabinet 15 below the projection screen 26, as shown in FIG. 6. The minimum cabinet depths, t, for state-of-the-art, commercially available 50" diagonal rear-projection television systems are about 20", with sub-cabinet heights of about 12"–24".

The invention of FIG. 1A and its associated variations, on the other hand, achieves a depth, t, that for preferable arrangements and embodiments is between D/4.4 and D/4.8 (as in FIG. 1A, with no associated keystone distortion). The design as shown in FIG. 1A fits within D/4.6 using a tilt angle of 43 degrees to the optic axis 100. Other variations allowing a correctable amount of keystone and other distortions can be made to fit within a depth of D/4.8 or better. Such results can be obtained with only a partial folding-mirror cabinet extension, e, needed above and below (or equivalently to the left and right) of the projection screen 26. The image is projected flush to each of two opposing viewing edges 130 and 132, in FIG. 1A. Other variations on FIG. 1A, to be described hereinafter, require no cabinet extensions whatsoever and exhibit substantially borderless viewing on all four viewing screen sides, enabling their use in arrays.

A computer program (see Appendix 1: FOLD2) can be used to analyze all possible arrangements of reflecting elements for the embodiment of FIG. 1A, in terms of differences in optical path length, degree of keystone distortion and practicallity of projection lens and beam-splitter locations. The results of this program were then used to determine the minimum value of cabinet depth, t, for a practical design. While the use of this program can be helpful, proper variations on FIG. 1A can be readily designed manually using the principles described herein.

To further illustrate operation of the preferred embodiment of FIG. 1A, consider upper ray 134 from the upper beam 94 exiting the upper portion of the beam splitter 22 placed on the optic axis 100 just inside the apex formed by the reflectors 102 and 104. The polarization state, P1, of the upper ray 134 is established by the beam splitter 22. The upper ray 134 proceeds upwards at an inclination angle to the vertical that is approximately 30 degrees and passes through the polarization selective reflector 102, which is essentially transparent to light in the polarization state P1. As shown in detail in FIGS. 4A and 4B when the upper ray 134 reaches the upper converter mirror 106, it first passes through the transmissive converting layer 122 and is converted to right hand circular polarization (RHCP). The upper ray 134 then is reflected at the surface of reflective converter mirror layer 120, a process that changes the ray's direction and converts its state of polarization from RHCP to LHCP. The reflected upper ray 134 passes back through the transmissive converting layer 122, which converts its state of polarization to P2 as output upper ray 140, heading back towards polarization selective reflector 102, but displaced significantly to the right from its first point of entry. As shown in FIG. 1A on striking top layer 116 of the polarization selective reflector 102, the upper ray 140, now polarized as P2, is reflected as processed ray 144 heading left to right towards the top of the Fresnel lens 110 at approximately a 23 degree angle with the optic axis 100. When this ray 144 actually reaches the Fresnel lens 110, it is redirected along the optic axis 100 by Fresnel facets, so that the ray 144 reaches the projection screen 26 in sharp focus and is made parallel to the optic axis 100 and directed to the viewer.

In this manner, one half of the image is presented on the upper image portion 86 of the projection screen 26, and the other half of the image is presented on the lower image portion 88 of projection screen 26. The image portions 86 and 88 mesh together precisely on the projection screen 26 by virtue of a sharp vertex formed by the top surface layer 116 and the bottom surface layer 118 of the polarization selective reflectors 102 and 104 combined with the micro-alignment of the beam splitter 22 along the optic axis 100. Optionally, this can be accomplished by the micro-tilt of any one of the four major folding mirrors 102, 104, 106 and 108, so there is no visible separation line at the boundary between the upper and lower image portions . This adjustment becomes especially important if there is any deliberately formed gap or buffer zone 148 between the SLM image portions, as shown in FIG. 2. The primary methods for making the needed adjustment involves physically shifting the beam splitter 22 laterally along the optic axis 100, or by adding a slight tilt to the upper and/or lower folding elements (the upper and lower converting mirrors 106 and 108). Since these converter mirrors 106 and 108 are preferably horizontally aligned and mounted to the top (and bottom) of the cabinet, the use of set screws is particularly easy.

Should the embodiment of FIG. 1A result in inversion of the orientation of each image half of the SLM 14, so that they are applied to their respective halves of the projection screen 26, upside down, electronic correction means can be made in which the LCD or DMD form of the SLM 14 organizes the image pixels in a proper manner.

Figure 7:
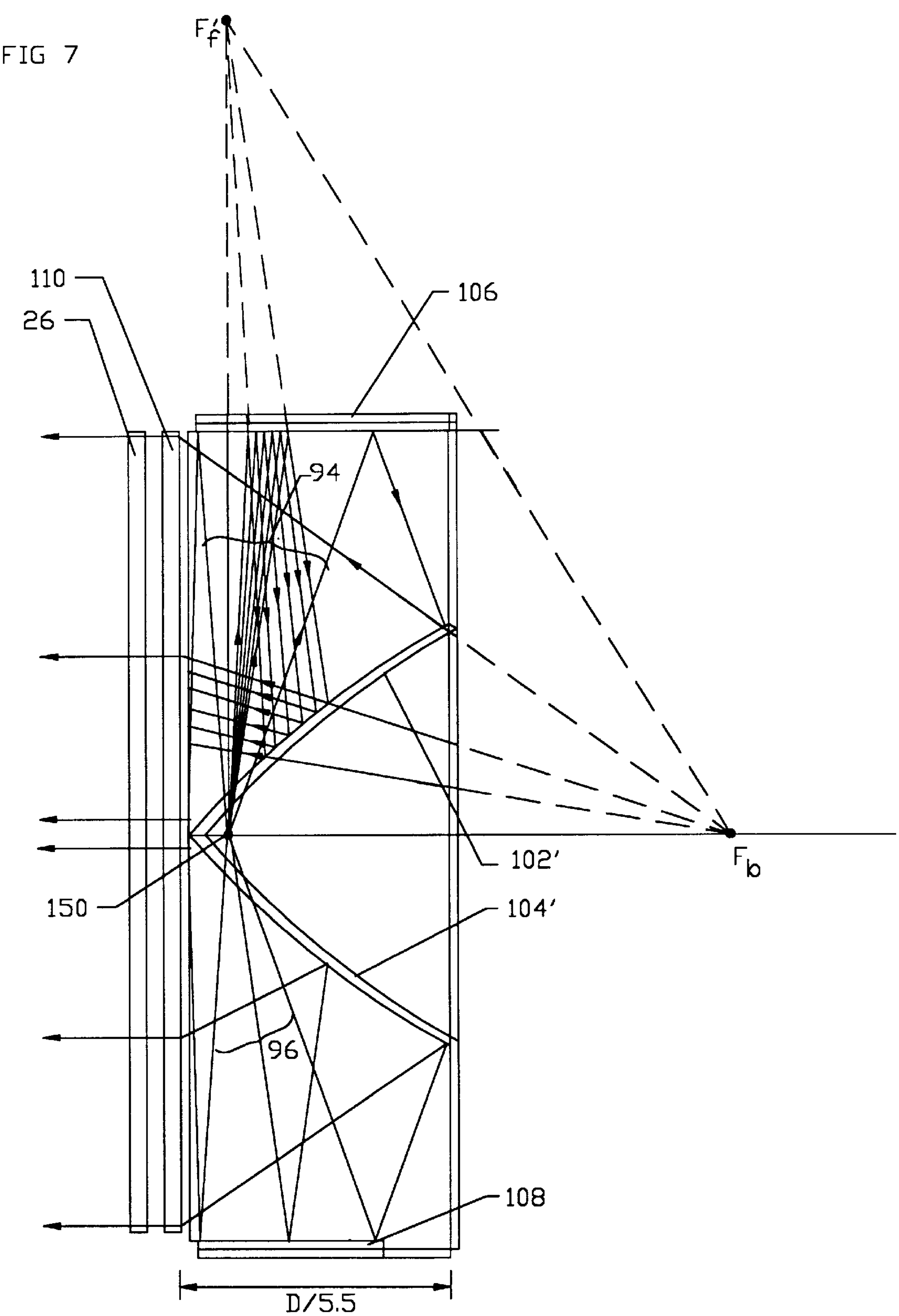
FIG. 7 illustrates a variation on the embodiment of FIG. 1A using a curved polarization-selective reflector.
Figure 8:
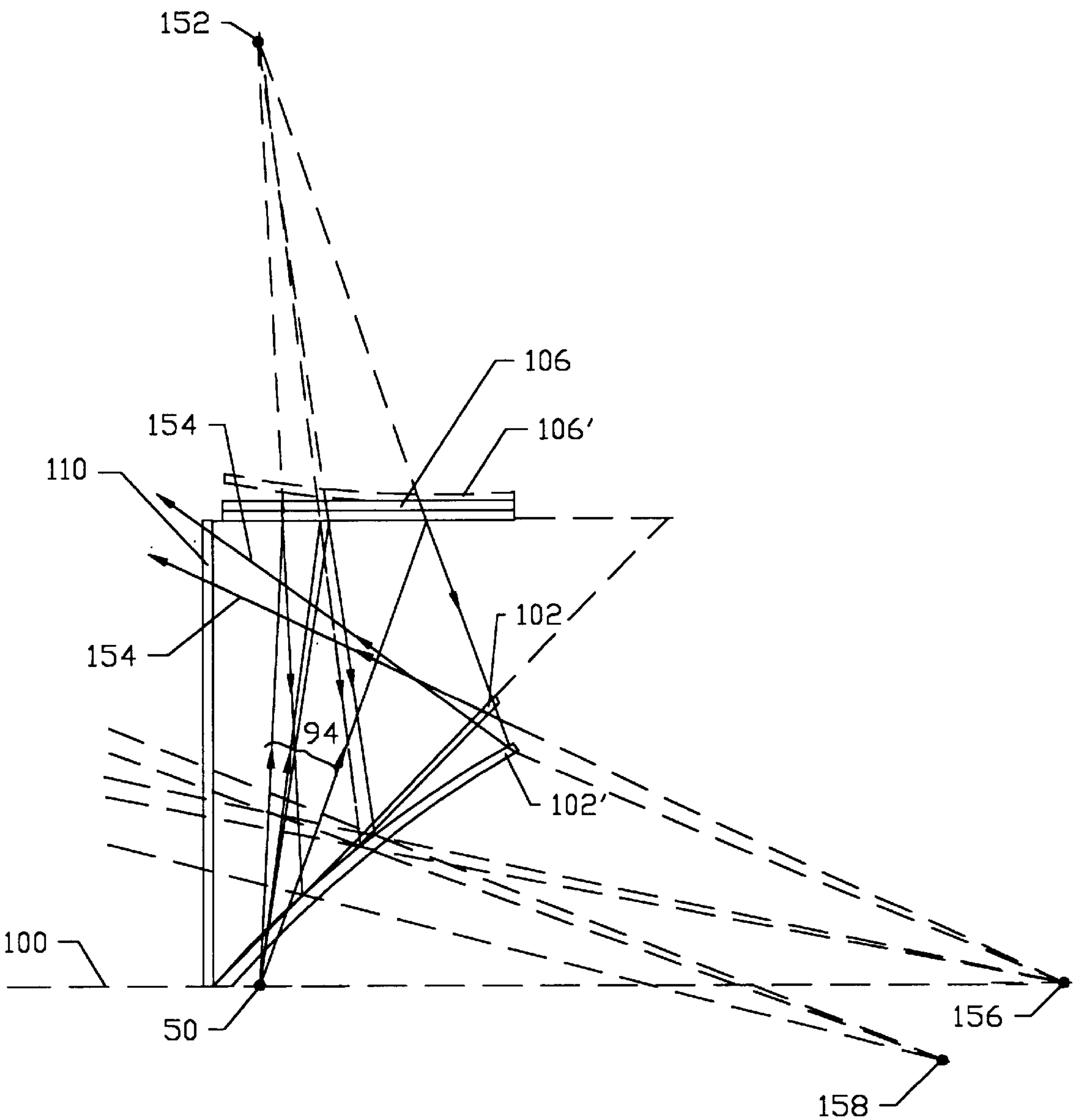
FIG. 8 illustrates reflector shape differences between the embodiments of FIG. 1A and FIG. 7.

In FIGS. 7 and 8 are illustrated another variation of the invention of FIG. 1A. In this embodiment the selective reflectors 102' and 104' are curved, rather than planar. The principal of this embodiment is illustrated in FIG. 8 by superimposing the rays and elements of the two approaches. As in FIG. 1A the upper polarized beam 94 is shown as emanating from point 150 on the optic axis 100 and reflecting back from the upper converter mirror 106 as if the light were actually emanating from virtual point 152 (see FIG. 8). Output ray 154 makes a 23 degree angle with the optic axis 100 after re-direction by the mirror 102 as if it had emanated from point 156. Had this ray 154 appeared to emanate from point 158, it would be ray 154' and its output angle would be 35 degrees; and the space between the top of the projector screen 26 and the mirror 106 would be illuminated fully. Achieving this change in behavior for the ray 154' is possible by giving the mirror 102' a hyperboloidal curvature as for the mirror 102 with one focus at the point 152 and the other at the point 158, rather than 156. The benefit of this variation is that it allows a more compact arrangement of the elements, fitting within a cabinet depth of D/5.4, rather than D/4.6. While no keystone distortion is involved in the altered design, the projection lens 20 is modified to operate under these conditions where there is a small difference in optical path length from the center of the projection screen 26 to the edge. Alternatively, aspherizing terms can be added to the hyperboloid surface function to compensate for the path length differences. Other related variations include the cases where the converter mirrors 106 and 108 can also be curved rather than planar, and where all the mirrors 102, 104, 106 and 108 are curved rather than planar. In these cases, mirror 106' shown in phantom (and its companion 108'; not shown) in FIG. 8 sloping upwards, and the mirrors 102' and 104' are sloping downwards from the planar mirror embodiment of FIG. 1A.

Figure 9:
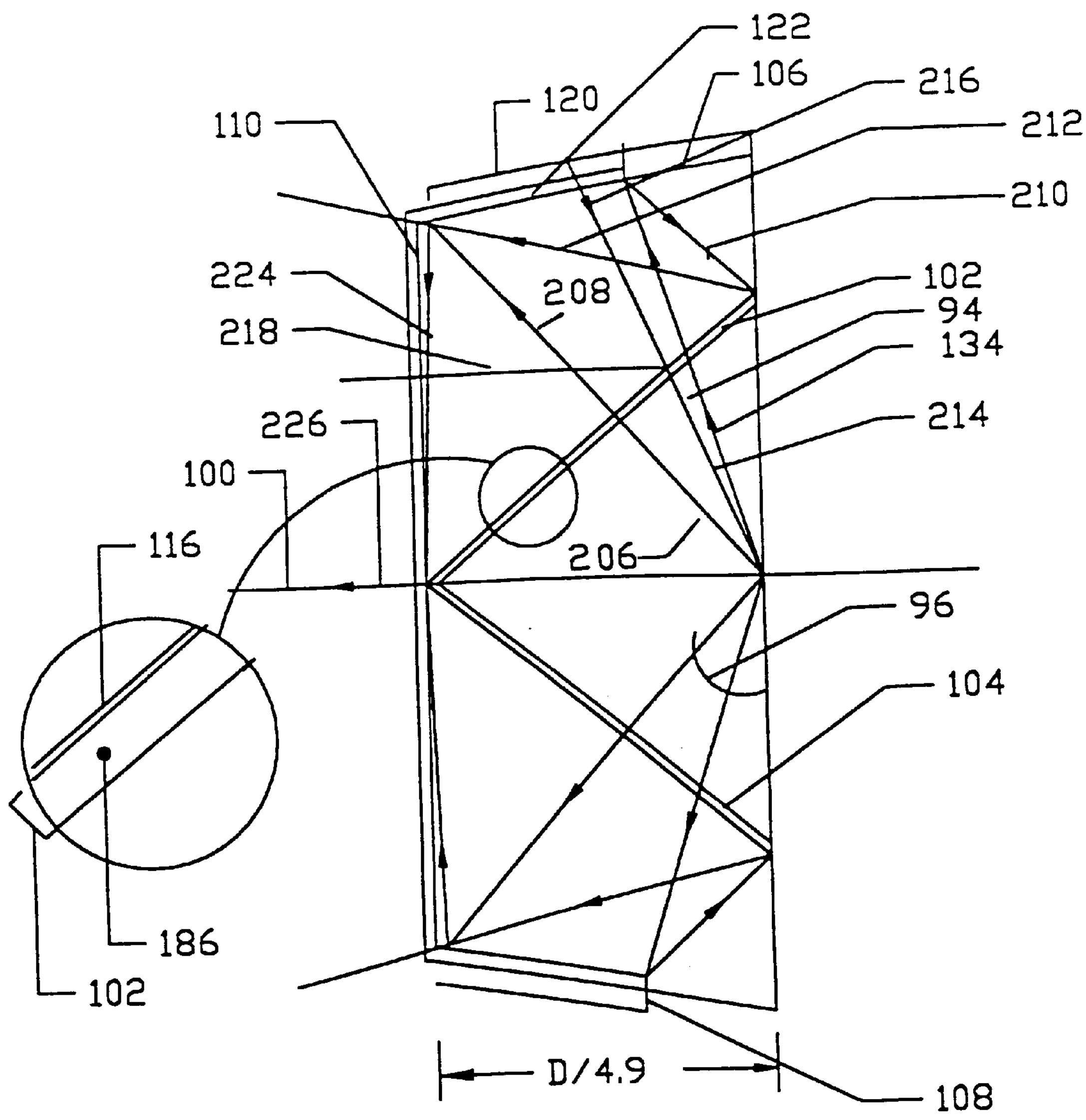
FIG. 9 illustrates a variation on the embodiment of FIG. 1A using tilted polarization-converting mirrors and an alternative lens placement and also shown is a magnified detail of an element of FIG. 9.

In a variation shown in FIG. 9, the upper converter mirror 106 and the lower converter mirror 108 are tilted and also the input beam locations are moved progressively back to the rear of the cabinet. This embodiment achieves a depth of D/4.9. The angle made by each of the selective reflector mirrors 102 and 104 with respect to the optic axis 100 is further increased from 42.5 degrees in the embodiment of FIG. 1A to 45 degrees in FIG. 9. In addition the tilt angle with respect to the horizontal of the converter mirrors 106 and 108 is 15 degrees.

Using the upper polarized beam 94 of polarization P1 as an example, consider in FIG. 9 the paths of illustrative ray 206 and the upper ray 134 in the upper beam 94. Each of these rays travel upward and passes through a transparent substrate 186 of the mirror 102 and its reflective top surface layer 116 (see magnified detail of FIG. 9) in sequence heading towards an upper converter mirror 106. On reaching the upper converter mirror 194, each of these rays 134 and 206 experience polarization conversion and redirection in the manner shown in FIG. 4B. Each of the rays 134 and 206 passes first through the quarter-wave transmission converting layer 122, preferably a wideband quarter-wave retardation film, and is efficiently converted to right hand circular polarization. Each of the rays 134 and 206 then strikes the surface of layer 120, whereupon they are converted to their orthogonal state of circular polarization, in this case left hand circular polarization, and is redirected downwards and back towards the upper selective reflector 102. So directed, each of the rays 134 and 206 then passes back through the transmission converter layer 122, and becomes polarized to P2, which is of orthogonal linear polarization to P1. These rays 134 and 206 now reflect from the selective reflecting layer 116 on the transmissive/reflective substrate 186, and are redirected to the left and towards the Fresnel lens 110 and the upper half of the projection screen 26. Therefore in more detail, the extreme upper ray 134 first passes through the upper selective reflector 116 as ray 208, re-strikes the reflector 116 as the orthogonally polarized ray 210, and is redirected as output ray 212 at an oblique angle to the optic axis 100 at the uppermost output point in the optical system 10. The Fresnel lens 110 in this region is designed to redirect the output ray 212 so it reaches the top of the projection screen 26, nominally parallel to the optic axis 100. A central ray 214 travels in a direction perpendicular to the plane of the upper converter mirror 106. As such, it is converted to polarization P2 as before, but reflected back on itself as ray 216 returning towards the layer 116 of the upper selective reflector 102. As in the previous manner, the ray 218 is selectively reflected at the layer 116, and redirected towards the central portion of the Fresnel lens 110, where its ray direction is made normal to the central portion of the projection screen 26. A second extreme ray 206 passes through the top surface layer 116 and its transmissive substrate 186 as ray 222, reaching the left-most edge of the upper converter mirror 106, whereupon it is converted and redirected, as above, as downward extreme ray 224. This downward extreme ray 224 strikes the left-most edge of the reflective layer 116, and is redirected perpendicularly to the Fresnel lens 110 as ray 226. This ray 226 represents the lowest pixel row in the upper image region 82, and is applied to the center of the projection screen 26.

Figure 10:
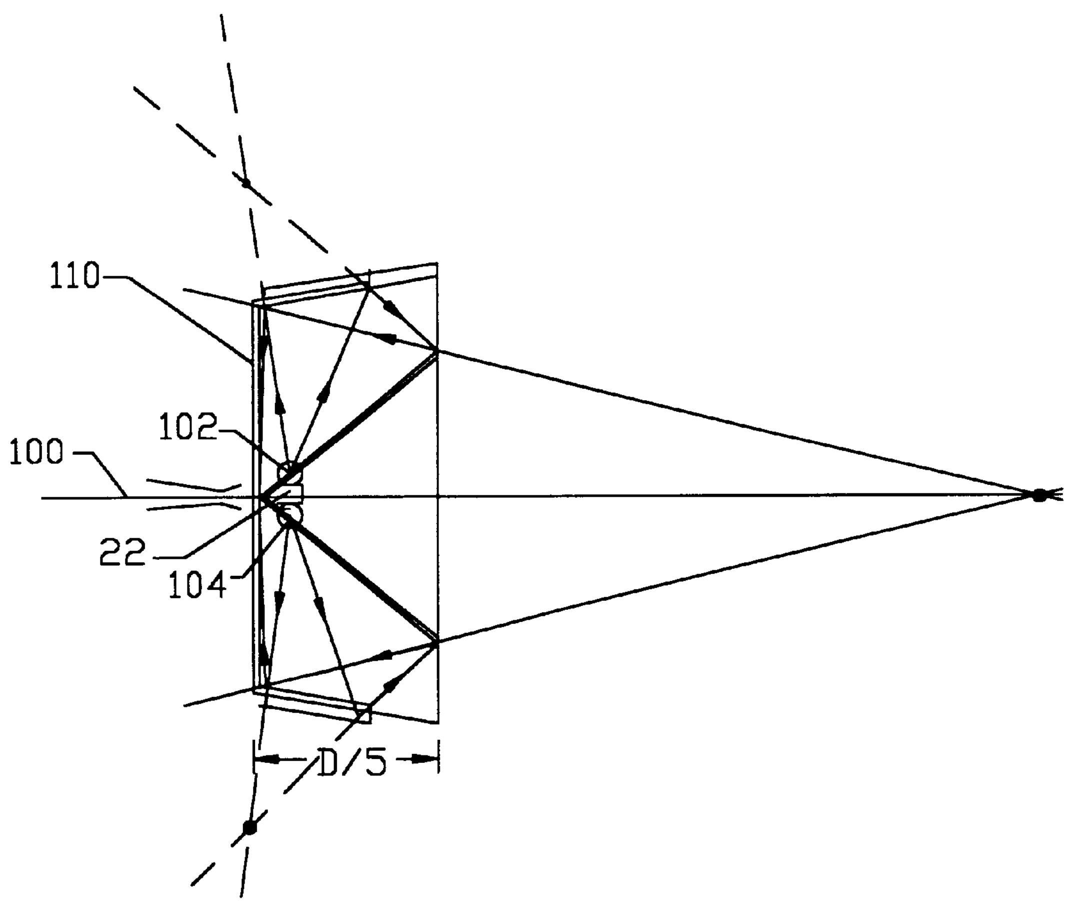
FIG. 10 illustrates a variation on the embodiment of FIG. 9, using tilted polarization-converting mirrors and another alternative lens placement.

Another related embodiment is illustrated in FIG. 10 for the case where the input beams are moved closer to the rear surface of their respective upper and lower selective reflectors 102 and 104, and the use of two separate projection lenses 20, one at an upper point 228 and another at a lower point 230. This embodiment includes locating the beam splitter 22 at the output side of the SLM 14 rather than at the output side of the projection lens 20 as was the case above. The advantage of this approach is an additional reduction in cabinet depth, t, to D/5.0.

The reductions in cabinet depth shown in FIGS. 7–10 are a direct consequence of the hyperbolically-curved reflecting elements. Industry-standard raytrace software program, ASAP, as supplied by Breault Research Organization, was used to develop scale-models for various designs. Hyperbolic curvatures were selected that the achieved the same proper output ray angles at the projection system 10 in FIG. 1A. For example, consider the case of the hyperboloidal selective reflector 102 in FIG. 7. One focus, $F_b$, was set back on the system's optic axis 100 a distance sufficient to create the maximum desired output angle for the rays at the top (and bottom) of the Fresnel lens 110, in this case 35 degrees. The other focus, $F_f$, was iteratively placed along a vertical line extending directly above the source point. The line connecting the two foci defines the axis of the hyperboloid. The actual height of focus $F_f$ was adjusted so that the output rays at the center of the Fresnel lens 110 arrived at normal (or near normal) incidence. For the example of FIG. 7, this hyperboloid has foci referenced to the system origin (at the vertex point of the two tilted selective reflectors 102 and 104) of (−D/2.6, 0) and (−D/42, D/1.67). Any equivalent commercial raytracing program, including Code VA and Super Oslo, can be used for the same purpose.

Figure 11:
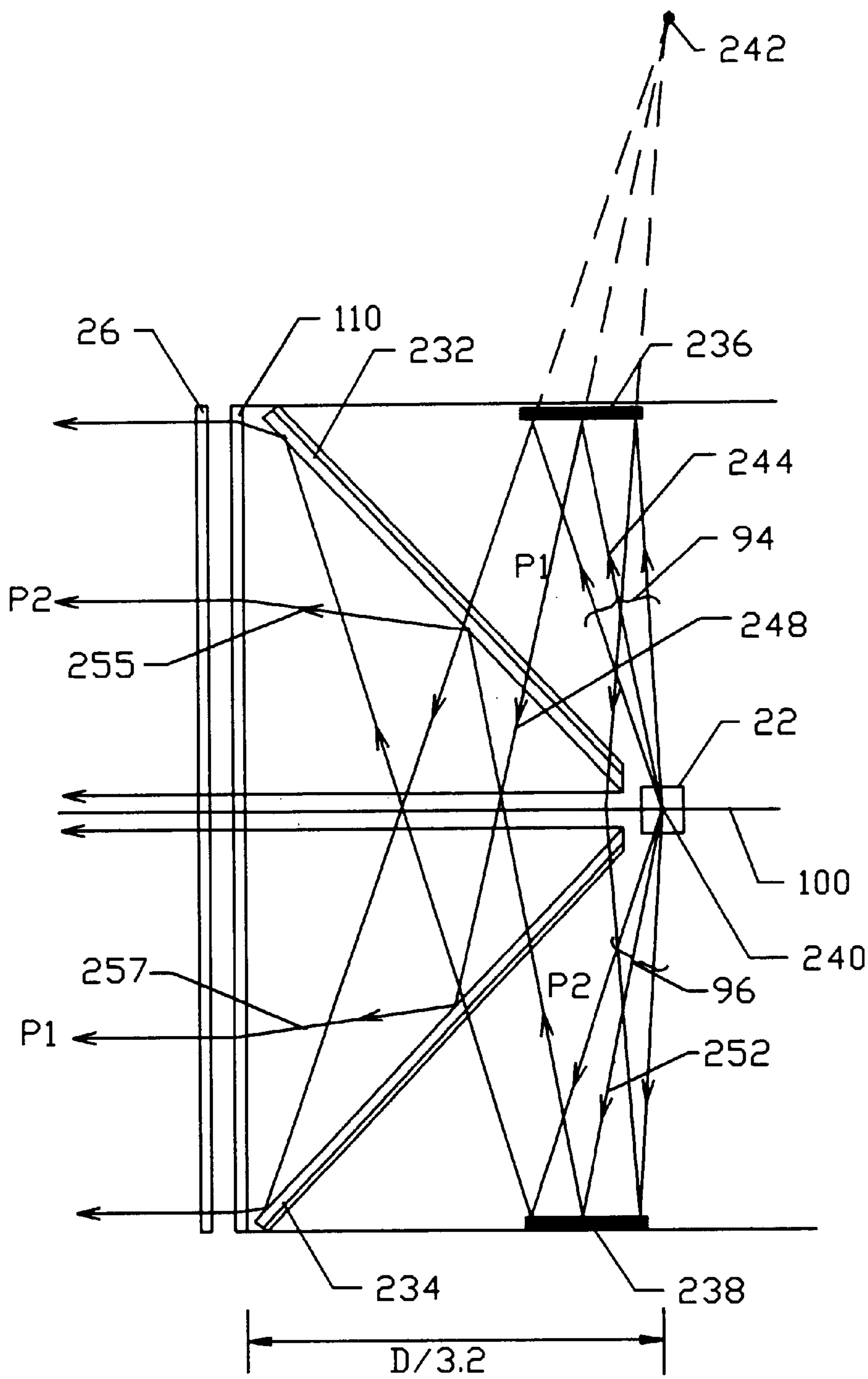
FIG. 11 illustrates another form of the folded-optic rear-projection system of FIG. 1A.

Another form of the invention is shown in FIG. 11, and this embodiment eliminates the need for the protruding extension zones, e, shown in FIG. 1B. In this embodiment, the symmetrically arranged upper and lower selective reflectors 232 and 234 are now tilted away from, rather than towards, the Fresnel lens 110, and upper converter mirror 236 and lower converter mirror 238 lie in the upper and lower horizontal planes as in FIG. 1A, as opposed to being tilted away from this plane, as in FIG. 9 and FIG. 10. The mirror 236 (and, by analogy, the mirror 238) serves as a mirror plane for a light source (not shown) on the optic axis 100 disposed at point 240 but located at virtual point 242. Instead of first passing through the polarization selective reflectors 102 and 104, this embodiment starts with the orthogonally polarized upper and lower beams 94 and 96 from the beam splitter 22 and first striking the upper and lower reflectors 236 and 238. These reflectors 236 and 238 redirect the beams 94 and 96 from their starting point on or near the optic axis 100. Once redirected, the beams 94 and 96 pass through the first selective reflector 102 or 104 encountered, and then are redirected towards the projection screen 26 by the appropriate selective reflector 232 or 234 encountered.

Consider the illustrative path of central ray 244 through the folded optical system 10 of FIG. 11. This ray 244 of polarization state P1 leaves the upper output face of the beam splitter 22 and is so directed towards the upper converter mirror 236 shown in FIG. 11. The ray 244 is then redirected by the mirror 236 and through the selective reflector 232 as ray 248 and is then reflected as ray 257 by the orthogonally-aligned reflector 234 towards the Fresnel lens 110. The Fresnel lens 110 acts upon all incident rays so they are parallel, or nearly parallel, to the optic axis 100. This process occurs symmetrically in reverse for lower ray 252 to output a ray 255. This arrangement applies the upper image to the lower portion of the projection screen 26 and the lower image to the upper portion of the projection screen 26. An image orientation correction can be made electronically within the SLM 14, as previously mentioned, so that this transform reconstructs a perfectly organized image. Clean-up filter devices, to be described hereinafter, can also be applied, for example, on the output faces of the beam splitter 22 of FIG. 11, or can be laminated to the upper and lower converter mirrors 236 and 238, or can be laminated to the upper and lower portions of either the projection screen 26 or the Fresnel lens 100.

Figure 12:
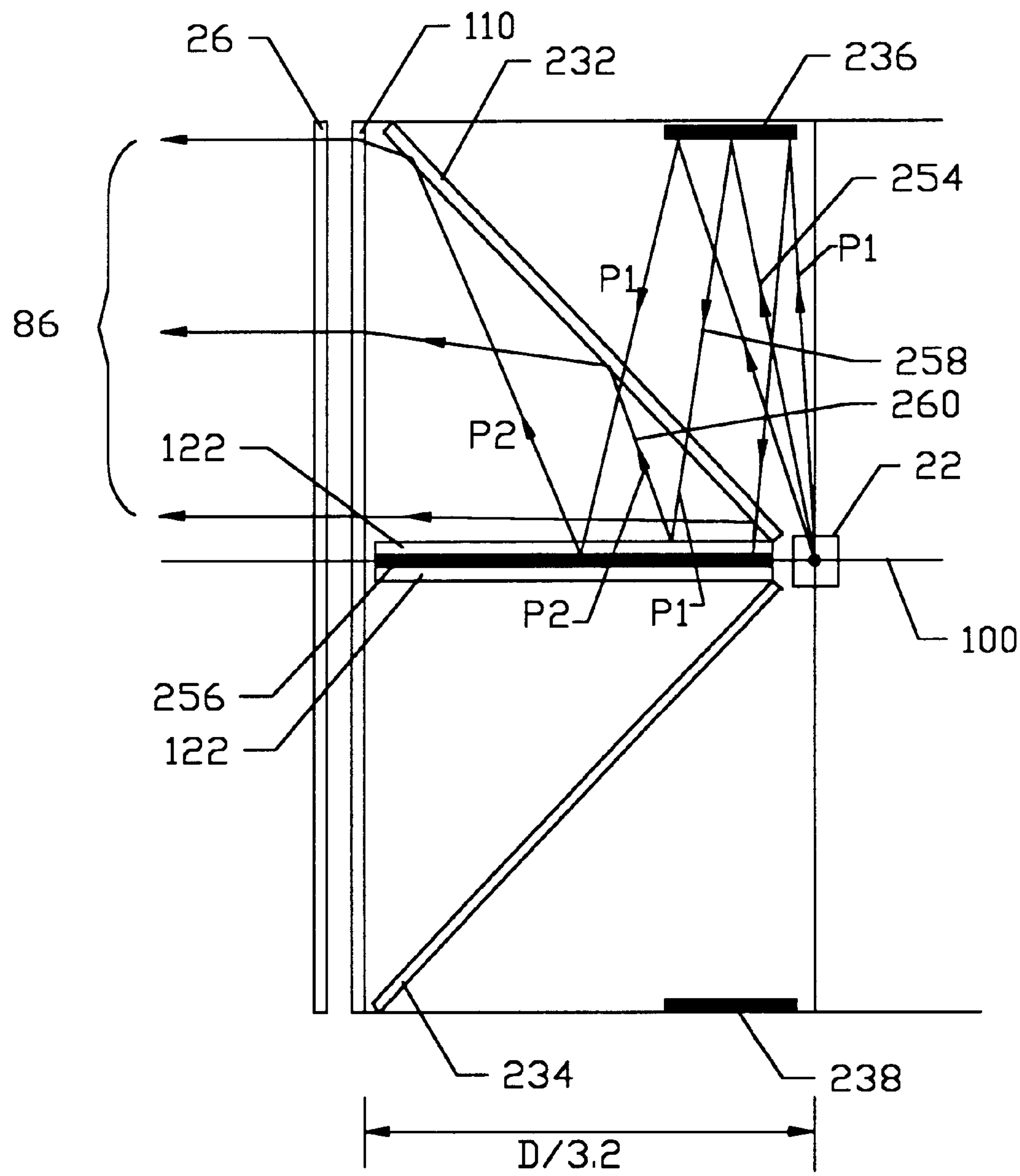
FIG. 12 illustrates another embodiment of the folded-optic rear-projection system of FIG. 11.

Another embodiment of the invention is shown in FIG. 12 that preserves the image orientation. In this case a thin two-sided, polarization-converting mirror plane is inserted on the optic axis 100, symmetrically in between the upper and lower portions of the optical system 10 of FIG. 11. Upper image rays 254 of polarization P1 output from the beam splitter 22 remain in the upper image region 86 of the optical system 10 and are applied to the upper portion of the projection screen 26. In one embodiment, a plane mirror 256 contains, on each top and bottom side, an outer layer of wide band polarization converting means, preferably a quarter-wave retardation film 122, like the wide band converter layer of FIGS. 4A and 4B. The upper image ray 254 leaves the upper portion of the beam splitter 22 in polarization state P1, is redirected downwards by the upper mirror 236 as ray 258, also in polarization state P1. This ray 258 is able to pass through the upper selective reflector 232 which passes P1 and reflects P2. When the ray 258 reaches the vicinity of the plane mirror 256, it first passes through the converter layer 122, whereupon it is converted to RHCP, reflected from the plane mirror 256 as LHCP, and output as ray 260 in polarization state P2 as before heading back towards the upper selective reflector 232. On reaching the reflector 232, the ray 260 now orthogonal in polarization to the previously transmitted ray 258, is redirected towards the Fresnel lens 110 and then the projection screen 26 as before. Alternatively, and with substantially the same effect, the retardation film 122 on the reflecting plane mirror 256 can be relocated on the bottom and top side, respectively, of the upper mirror 236 and lower mirror 238, respectively. In either case, light rays that have passed through the upper image region 82 of the SLM 14 are applied to the upper portion 86 of the projection screen 26, and light rays that have passed through the lower image region 84 of the SLM 14 are applied to the lower portion 88 of the projection screen 26.

In the embodiments of FIG. 11 and FIG. 12, as drawn, a cabinet thickness, t, is D/3.2, and neither requires keystone correction. Improved compactness can further be achieved by at least one (1) steepening the tilt angles of the upper and lower selective reflectors 232 and 234, and (2) shaping one or both of their reflecting surfaces of the reflectors 232 and 234, or (3) by shaping the upper and lower converter mirrors, 236 and 238.

One such variation on the embodiment and method of FIG. 11 and FIG. 12, using curved rather than plane redirecting mirrors, is shown in FIG. 13. In this embodiment symmetrically disposed, selective reflector elements 262 and 264 are tilted more steeply (35 degrees from the vertical) than in either FIG. 11 or FIG. 12 (47 degrees from the vertical), making for a correspondingly more compact arrangement. The horizontal, upper and lower mirrors 236 and 238 of the previous embodiments are thus replaced by curved reflectors 266 and 268. These reflectors 266 and 268 are preferably hyperboloidally shaped, with foci for both of the upper and lower curved reflectors 266 and 268 located at virtual source points 270 and 272, and points 274 and 276, respectively. The curved reflectors 266 and 268 are shaped to redirect all rays from source apertures whose centers are located at the points 272 and 276, as if the source aperture were really centered at the points 270 and 274, respectively. The further the virtual source points 270 and 274, are displaced from the optic axis 100, the steeper can be the tilt angle of the selective reflector elements 262 and 264. The cabinet depth, t, for the particular arrangement drawn is improved to D/4, and uses the less demanding 52 degree projection lens 20.

Figure 14A:
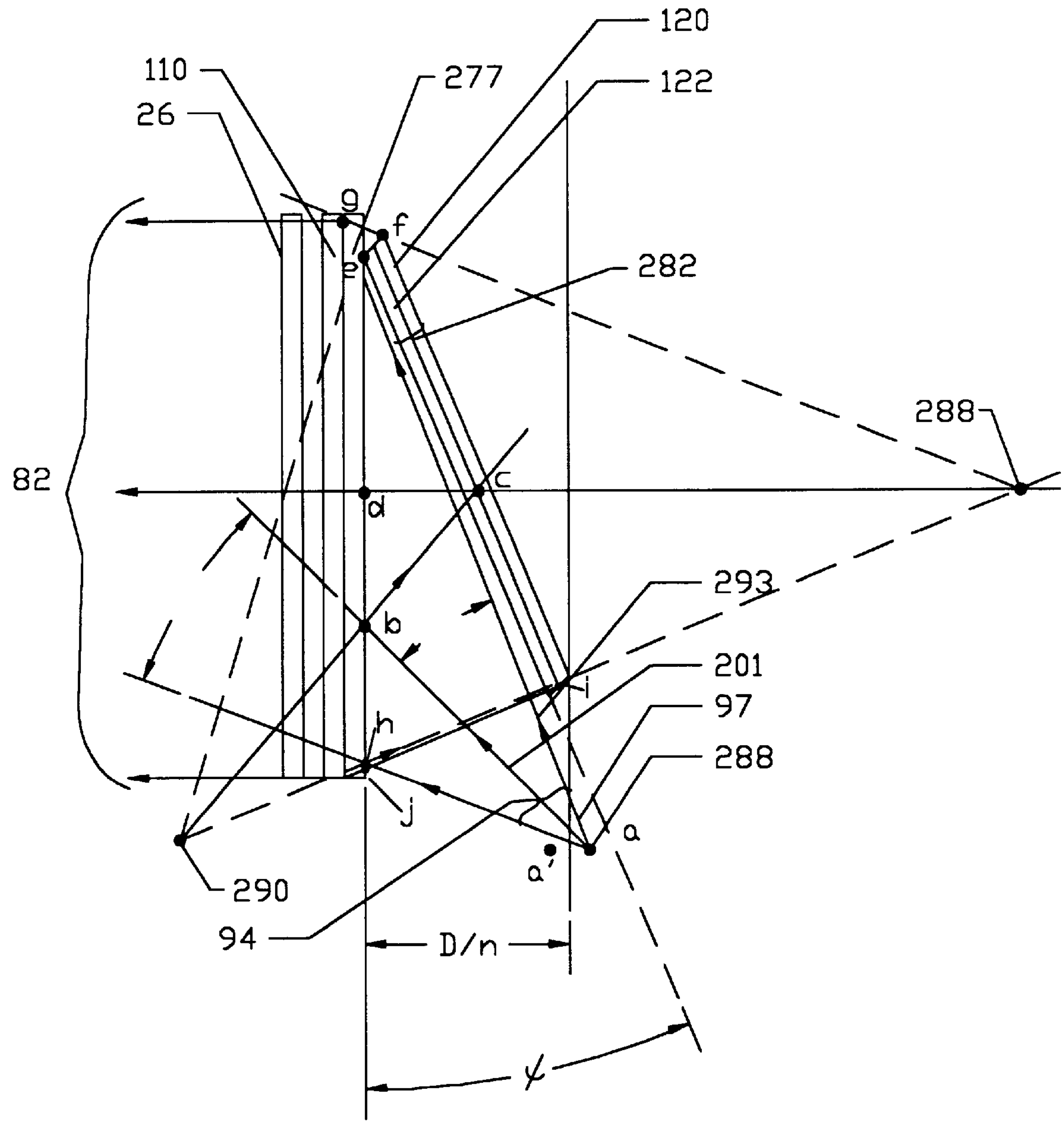
FIG. 14A shows a single-image beam variation on the embodiment of FIG. 1A using polarization-selective and converting bi-layer with linearly polarized input light and FIG. 14B shows a single-image beam variation on the embodiment of polarization-selective and converting bi-layer of FIG. 1A with circularly polarized input light.
Figure 14B:
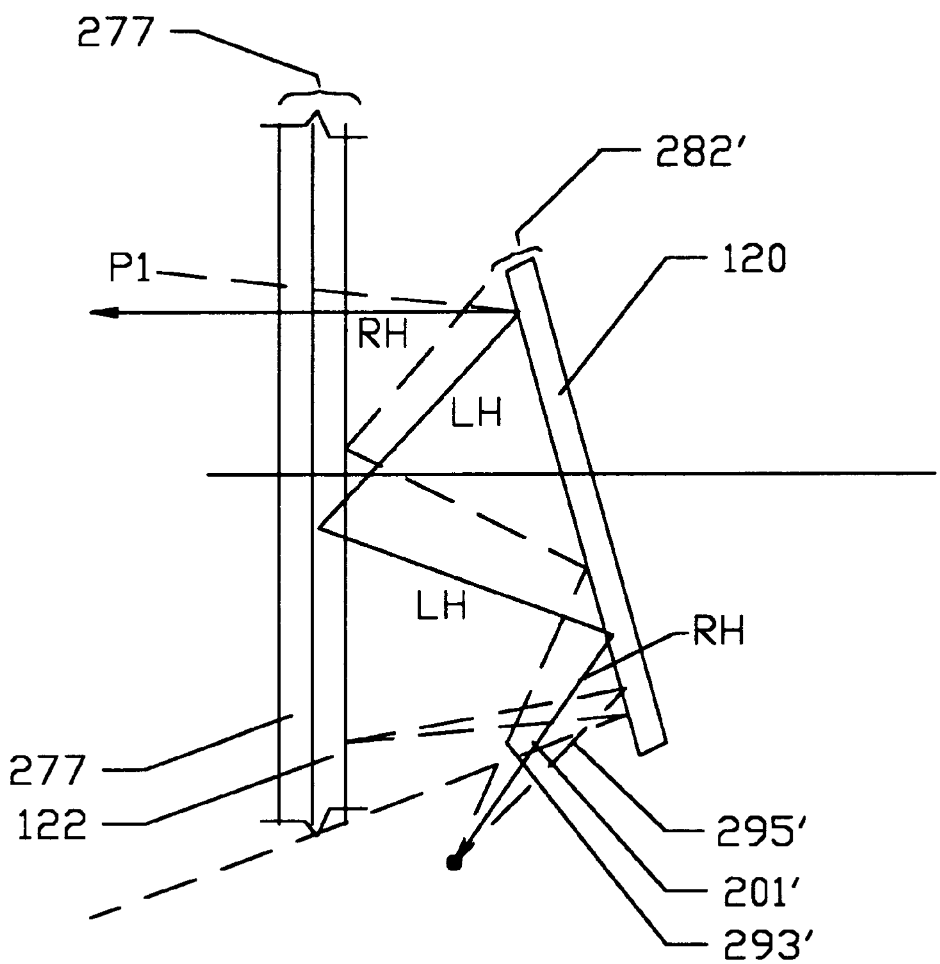
Figure 90:
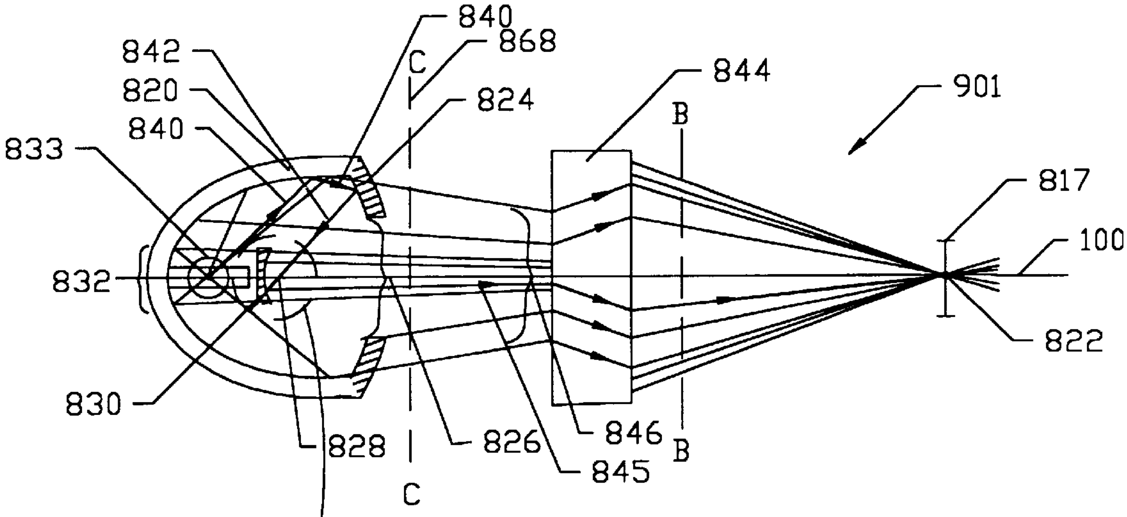
FIG. 90A is a cross-sectional view of a beam shape embodiment with reciprocating mirrors arrangement within a converging light source and beam-expander.
FIG. 90B is a cross-section of a beam profile along the line B—B in FIG. 90A.
FIG. 90C is a view along line C—C toward the arc source of FIG. 90A.
FIG. 90D is an alternative convex mirror for the embodiment of FIG. 90A.
Figure 90:
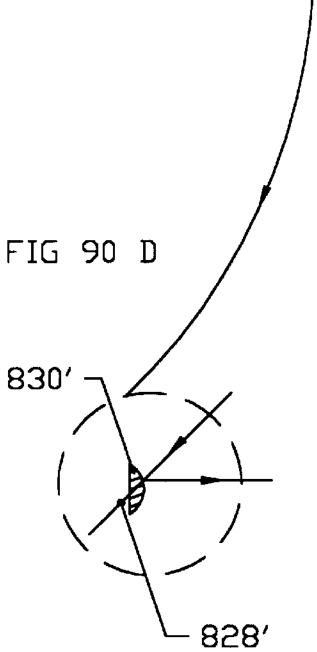
Figure 90:
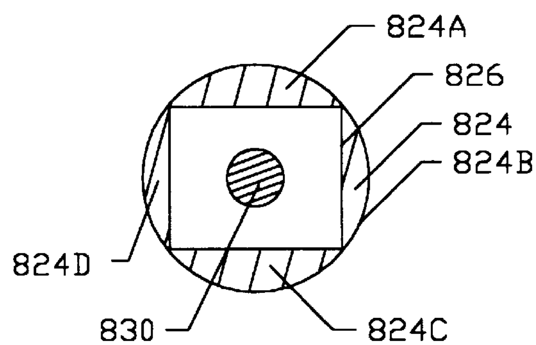
Figure 90:
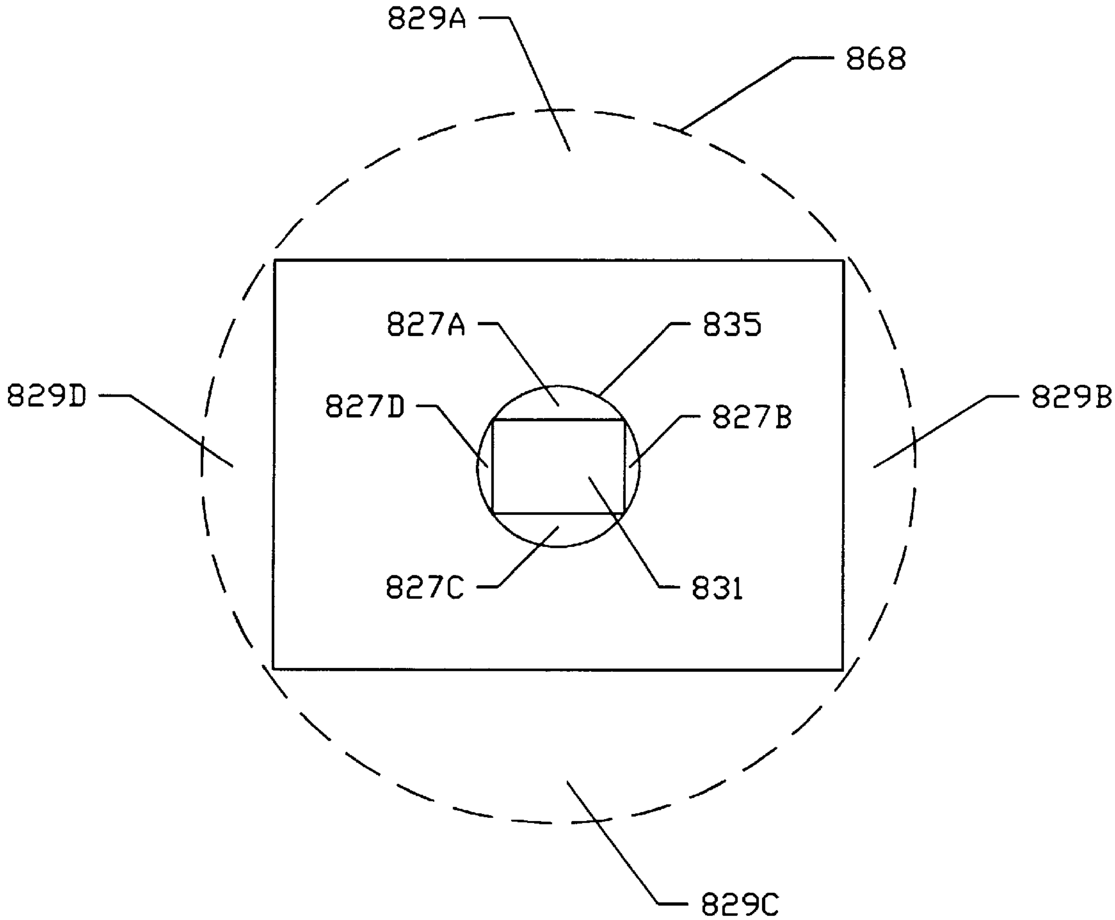

Yet another preferred embodiment of the above methods in FIG. 14A involves steepening the tilt angles of the polarization selective reflector 102 in FIG. 1A to 90 degrees, so as to form, instead, a vertical selective reflector 277 and then simultaneously re-positioning the corresponding polarization-converting folding mirror 282 so as to be tilted to the vertical back cabinet wall at an angle, ψ, so that the top edge of the mirror 282 moves closer to the projection screen 26. These elements can be arranged to fit within a cabinet depth, t, of D/n, where n is between 4.5 and 5.5. This embodiment achieves important advantages over conventional tilted-mirror folded-optic systems that have dealt with polarized light. The present embodiment, as in FIG. 1A, uses a more efficient polarizing beam splitter material, not in its conventional beam-splitting manner, but rather more efficiently as a selective transmitter (or reflector) arranged to transmit or reflect incident light depending on the linear or circular polarization state applied. Improved efficiency derives from this mode of operation and the fact that the transmissivity or reflectivity is constant (or nearly constant) over a wide range of angles and wavelengths by virtue of using the 3M and/or Merck materials described hereinbefore. The present embodiment also uses a two layer structure for the folding mirror 282 (the mirror layer 120 and the converting layer 122) to simultaneously convert polarization from one linear or circular polarization state to the orthogonal state, over a wide range of angles and wavelengths. In FIG. 14B is also shown another variation on the embodiment of FIG. 14A where central ray 201' first strikes folding mirror 282' rather than selective reflector 277, a two layer structure is used for the selective reflector 277' (the selective reflector 277 and the converting layer 122) and a single layer structure is used for the folding mirror 282' (polarization converting metal or metal-like mirror layer 120). Moreover, in this arrangement, the central input ray 201' is pre-converted as right-hand circular polarization. As such, in the embodiment of FIGS. 14A and 14B, substantially all light is either reflected or transmitted, and no additional mechanical devices are needed to deflect any appreciable portion of this light from passing through to the projection screen 26. In addition, principal ray 201 (201' in FIG. 14B) from the center of the image to be projected is arranged specifically by the relative angles between the reflector 277 (277' in FIG. 14B) and the folding mirror 282 (282' in FIG. 14B) and their corresponding slopes causing reflection, so that its folded path causes arrival of the principal ray 201 (201' in FIG. 14B) at normal (or nearly normal) incidence to the Fresnel lens 110 and the plane of the projection screen 26. Angular deviations of this ray 201 (201' in FIG. 14B) from normal cause, as previously discussed, a form of image distortion known as keystone distortion to be considered in more detail later. Moreover, the optical path lengths of extreme rays 293 and 295 in FIG. 14A (or 293' and 295' in FIG. 14B) are balanced with that of the central principal ray 201 (or 201 in FIG. 14B) according to the following equations:

for the upper portion 86 of projection screen 26, $$\frac{(ab+cb+cd)}{\cos\theta_2} = (ae+ef+fg)$$

for the lower portion 88 of projection screen 26, $$\frac{(ab+cb+cd)}{\cos\theta_3} = (ah+hi+ij)$$

Figure 73:
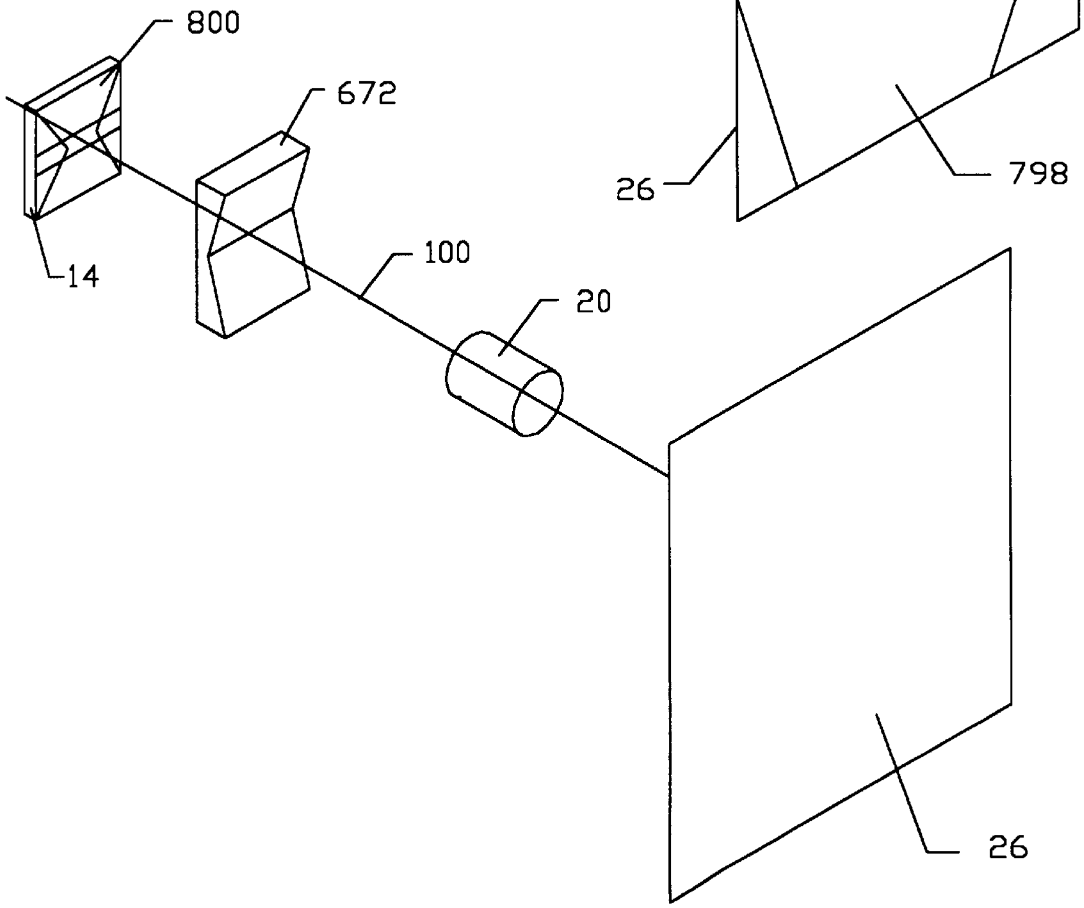
FIG. 73 shows perspective relationships of electronically-corrected keystone distortion in the projection system of FIG. 72.
Figure 74:
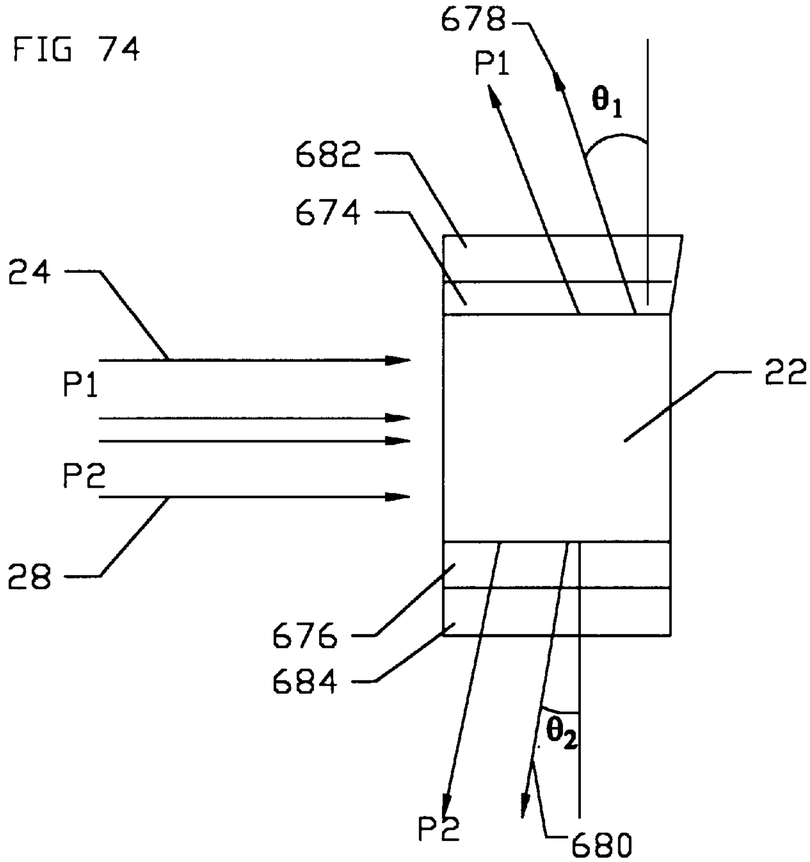
FIG. 74 shows a polarization beam-splitter for pre-polarized light including a director for split-image folded-optic projection systems.

Small differences between the left hand and right hand sides of these equalities are allowed provided they are properly compensated with appropriately disposed refractive elements. For example, see FIG. 73, and further details will be provided hereinafter. The same analysis is applicable to the alternative arrangement of FIG. 14B.

In the method of FIG. 14A (and 14B), the image source is virtually located at point 288, and sequentially folded first to virtual point 290 by the tilted folding mirror 282, then to virtual point 288 (also marked as a) by the vertical polarization selective reflecting plane 277, and then to real point 286 (also marked as a') by vertical folding mirror 283.

Figure 15:
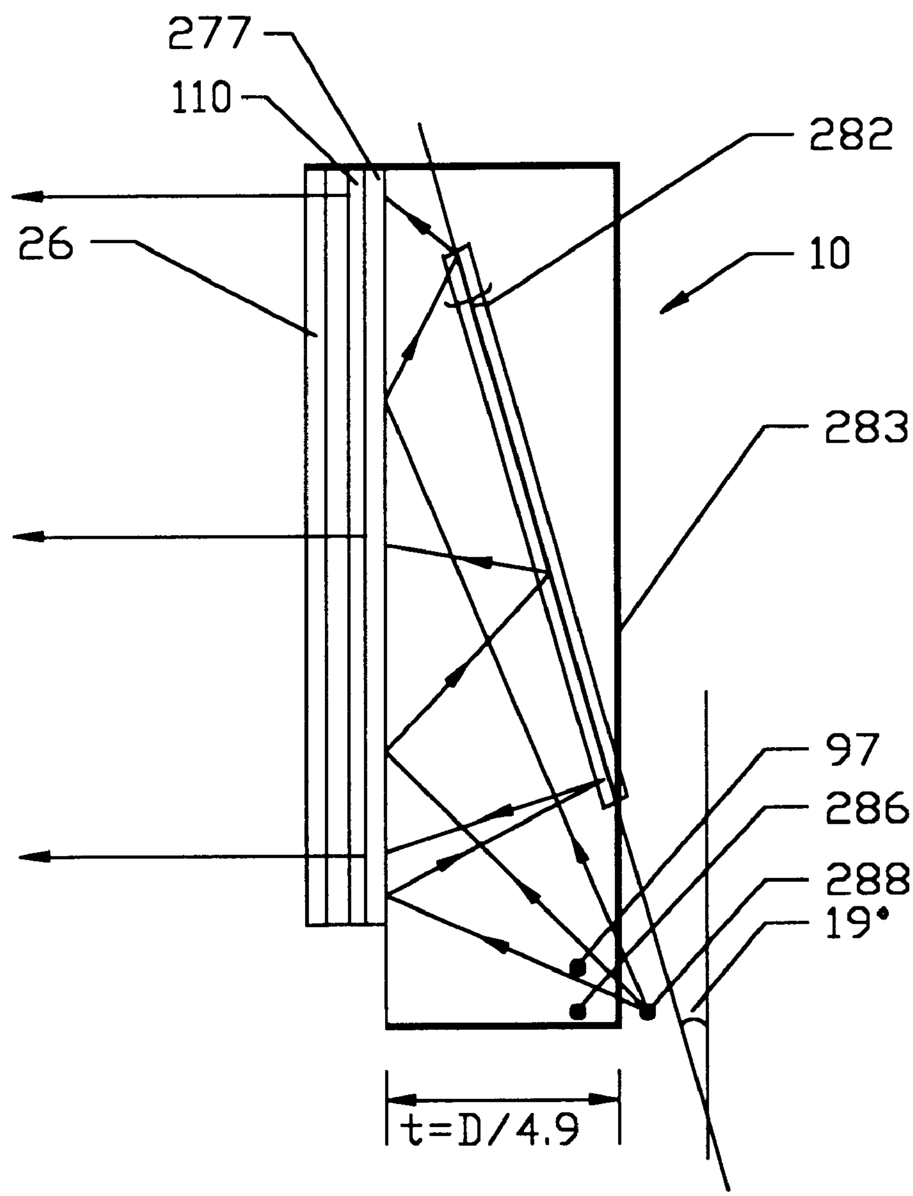
FIG. 15 shows a form of the embodiment of FIG. 14A using tilted polarization-converting mirror plane and a vertical source-folding mirror plane.

Another embodiment includes that of FIG. 15 which fits within a cabinet depth, t, of D/4.9. The plane folding mirror 282 used is tilted to the vertical by about 19 degrees. The same projection conditions are applied as in the embodiments above. In this case, the minimum possible under-cabinet depth, t, is about D/11. As before, the folding mirror 283 can be applied to reduce cabinet depth, t, by moving the source point from 286 to 288.

Figure 16:
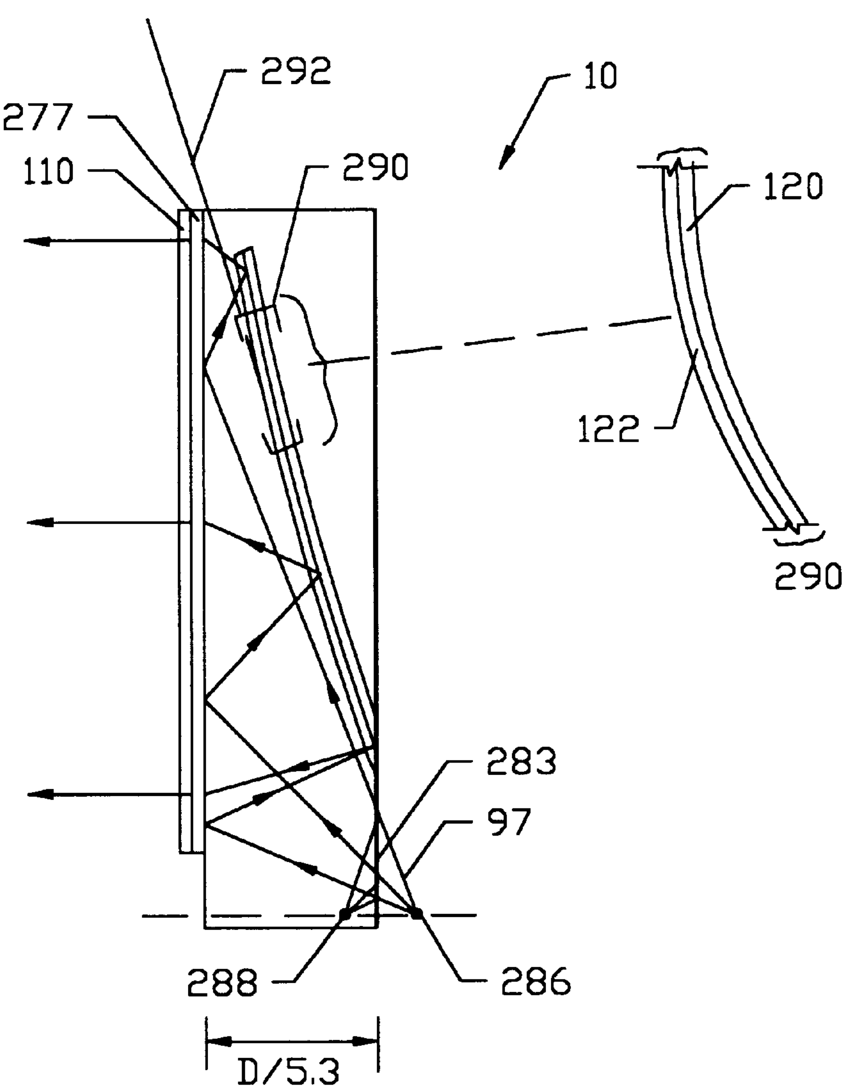
FIG. 16 illustrates a variation on the embodiments of FIG. 14 using a curved polarization-converting mirror also shown in magnified detail.

As shown in FIG. 16, an additional form of the system 10 in FIGS. 14 and 15 can use a slightly curved, rather than planar, polarization-converting reflector 290 with the slight curvature increasing compactness still further. The physical curvature is so slight that its presence is shown by comparison with line 292 drawn through the source point 286. The nature of the curvature is magnified and exaggerated in the detail of the reflector 290 shown to the right. In this example, a hyperboloidal function is used with its two foci (not shown) lying at points in front of (to the left of) and behind (to the right of) the curved reflector 290. This variation is analogous to that in FIG. 7 above. The particular arrangement of FIG. 16 also uses the folding mirror 283 to fit within a cabinet depth, t, of D/5.3.

The various embodiments of FIG. 15 are distinguished from the preceding forms in that the upper and lower input beams, such as 94 and 96, in the preceding figures are now combined into a single beam 97 and processed on their first encounter with the vertical selective reflector 277, by the action of reflection rather than by selective transmission. The central principal ray 201 in FIG. 14A represents the center of the image and is folded to the center of the projection screen 26. The lower extreme ray 295 of FIG. 14A corresponds to the bottom of the lower image portion 88. Together the bundle of angles between the principal ray 201 and the extreme ray 295 are equivalent to the lower beam 96 in FIG. 1A. Therefore, upper extreme ray 293 represents the top of the upper image portion 86. The bundle of angles between the upper extreme ray 293 and the central principal ray 201 is equivalent to the upper beam 94 in FIG. 1A. By so combining the upper and lower image beams 94 and 96 into being adjacent, nearly equivalent compactness can be achieved with the asymmetric form of the system 10 of FIG. 14. It is a consequence of this condensed condition, however, that the source aperture is located beneath, rather than behind, the final redirecting element. Precise imaging practice requires that output rays from the center of the image field must be made parallel to the optic axis 100, a condition that was satisfied in previous examples by effectively positioning the source point (e.g., the point 272 in FIG. 13) behind the operative final output reflector (e.g., the selective reflector element 264 in FIG. 13). In the adjacent beam embodiments of FIG. 14, a steeper and more compact folding mirror arrangement, the further below the optic axis 100 the source 12 should be offset (e.g., the source point 286 in FIG. 14).

In FIG. 14A, the principal ray 201 is arranged to strike the vertical selective reflector element 277 prior to striking the plane folding mirror 282. The reverse condition, in FIG. 14B, where the ray 201 is directed to strike these elements in reverse order, is also possible. Moreover, a preliminary folding mirror 283 can be added to the cabinet's back-plane, as previously indicated, to relocate the source point more compactly from a to a' or the point 288 to the point 286 in FIG. 15. The illustrative principal ray 201 in FIG. 14 is now redirected by the selective reflecting element 277 towards the folding mirror 282 as ray 296, and then converted and redirected by the action of the folding mirror 282 as output ray 298. For example, the right-hand polarized ray 201' in FIG. 14B can also be directed at first towards the tilted polarization (handedness) converting folding mirror 282' and redirected as a left-hand circularly polarized ray segment towards the selective reflector 277' (now comprising preferably the quarter-wave converting layer 122 and the polarization-selective reflector 277). The ray is reflected by the reflector 277' back towards the tilted mirror 282' in a state of left-hand circular polarization, which subsequently converts to right-hand circular polarization on re-direction at the mirror 282', and then is able to pass through the reflector 277' on its return. This reverse approach of FIG. 14B does not decrease cabinet depth more than FIG. 14A and requires somewhat more under-cabinet space than the arrangement of FIG. 14A.

Figure 17:
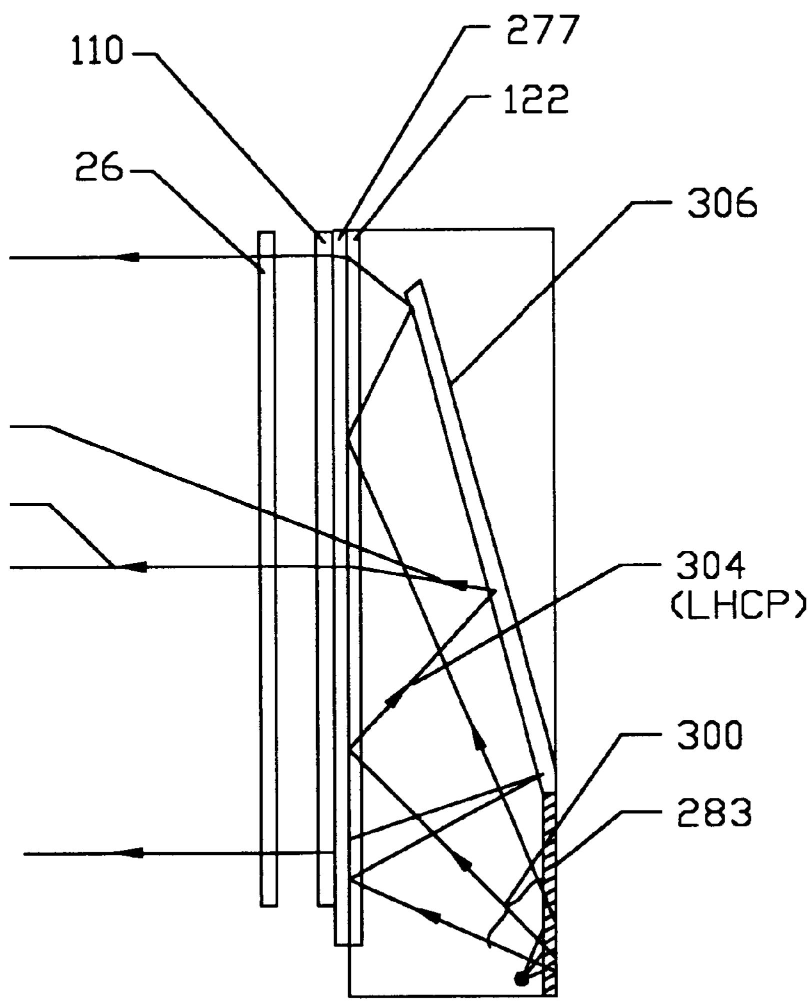
FIG. 17 illustrates a variation on FIG. 14A using left-hand circularly-polarized input light and a polarization-selective reflector designed for circular polarization.

The embodiments of FIGS. 14–16 assume a linearly polarized form of the principal ray 201. The same results are obtained, however, if the ray 201 is circularly polarized (i.e., LHCP source beam 300 as in FIG. 17 using the previously described 3M-type material as the selective reflector 277 and RHCP source beam 302 as in FIG. 18 using the previously described Merck-type material as the selective reflector 277). In FIG. 17, the converting layer 122 is moved from the left side surface of the folding mirror 282 to the right side surface of the vertical selective reflector 277. By this modification, the LHCP input ray 300 is converted to P2 by its passage through the quarter-wave converting layer 122 and thereby reflected by its initial contact with the 3M-type linear polarization selective reflector 277. Then, reflected ray 304 is redirected back through the converting layer 122 towards metal reflector 306 (such as a metal reflector like the layer 120 described hereinbefore) and returned to RHCP. After reflection at the metal reflector 306, return ray 308 is RHCP and becomes P1 on passage through the layer 122 at the selective reflector 277 and is then transmitted efficiently as ray 310.

Figure 18:
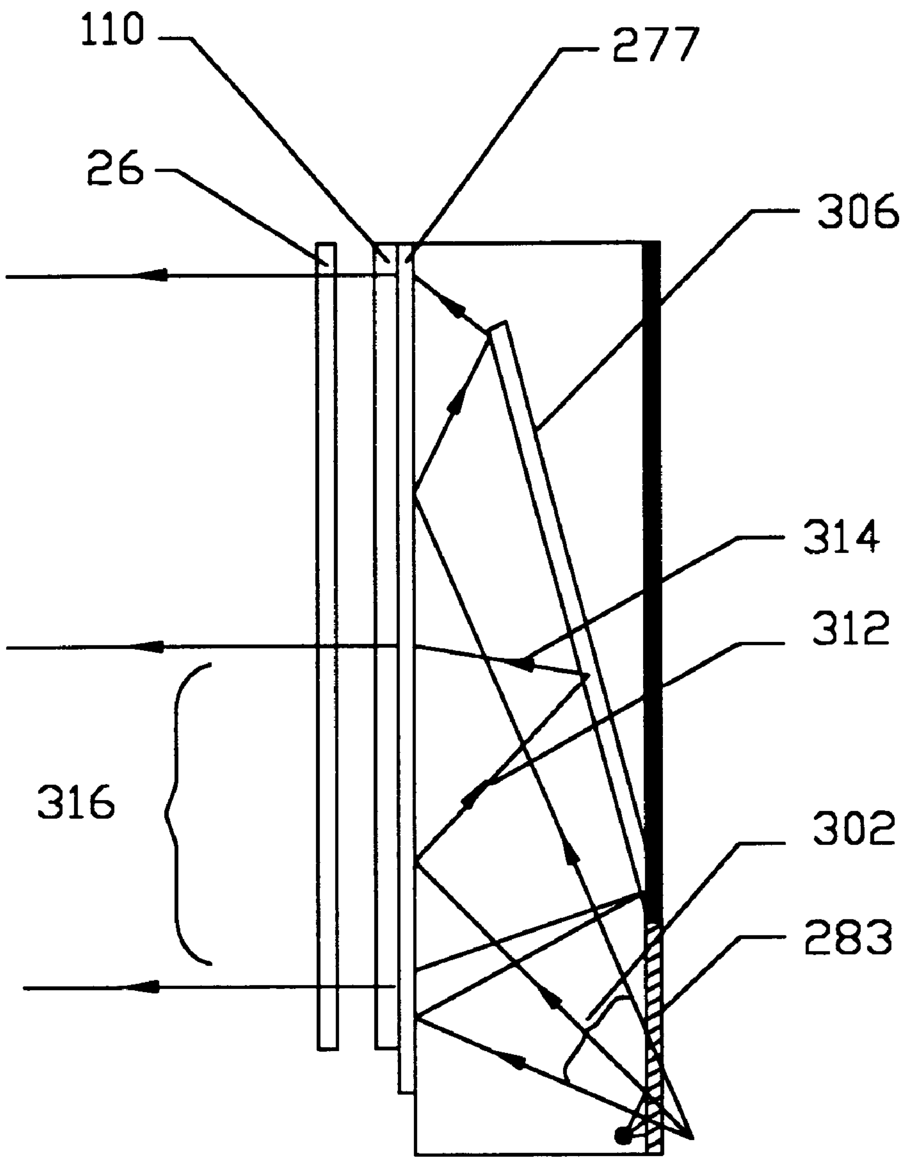
FIG. 18 illustrates a variation on FIG. 14A using right-hand circularly-polarized input light and a polarization-selective reflector designed for circular polarization.

Another embodiment is described in FIG. 18 using the Merck-type material as the selective reflector 277. In this case, no polarization converting means other than the tilted metal reflector 306 is utilized. The source RHCP ray 302 is reflected by the cholesteric (Merck-type) selectively reflector 277 and redirected as RHCP ray 312 to the metal reflector 306, whereupon it is converted to LHCP and redirected back towards selective reflector 277 as redirected LHCP ray 314. On reaching the reflector 277 the LHCP ray 314 is efficiently transmitted and output as ray 316.

Another computer program (see Appendix 2: FOLD) was developed to analyze in the same way as with FIG. 1A, the example of FIG. 14A (or B) to determine the optimum conditions for tilt angle, angular extent and practical position for the light source 12. The limiting depth, t, for this particular case is found to be D/5.19 for a tilt angle of 22 degrees and a 60 degree source; D/4.74 for a tilt angle of 18 degrees and a 52 degree source. The result illustrated in FIG. 15 allows a small amount of correctable keystone distortion.

Figure 19:
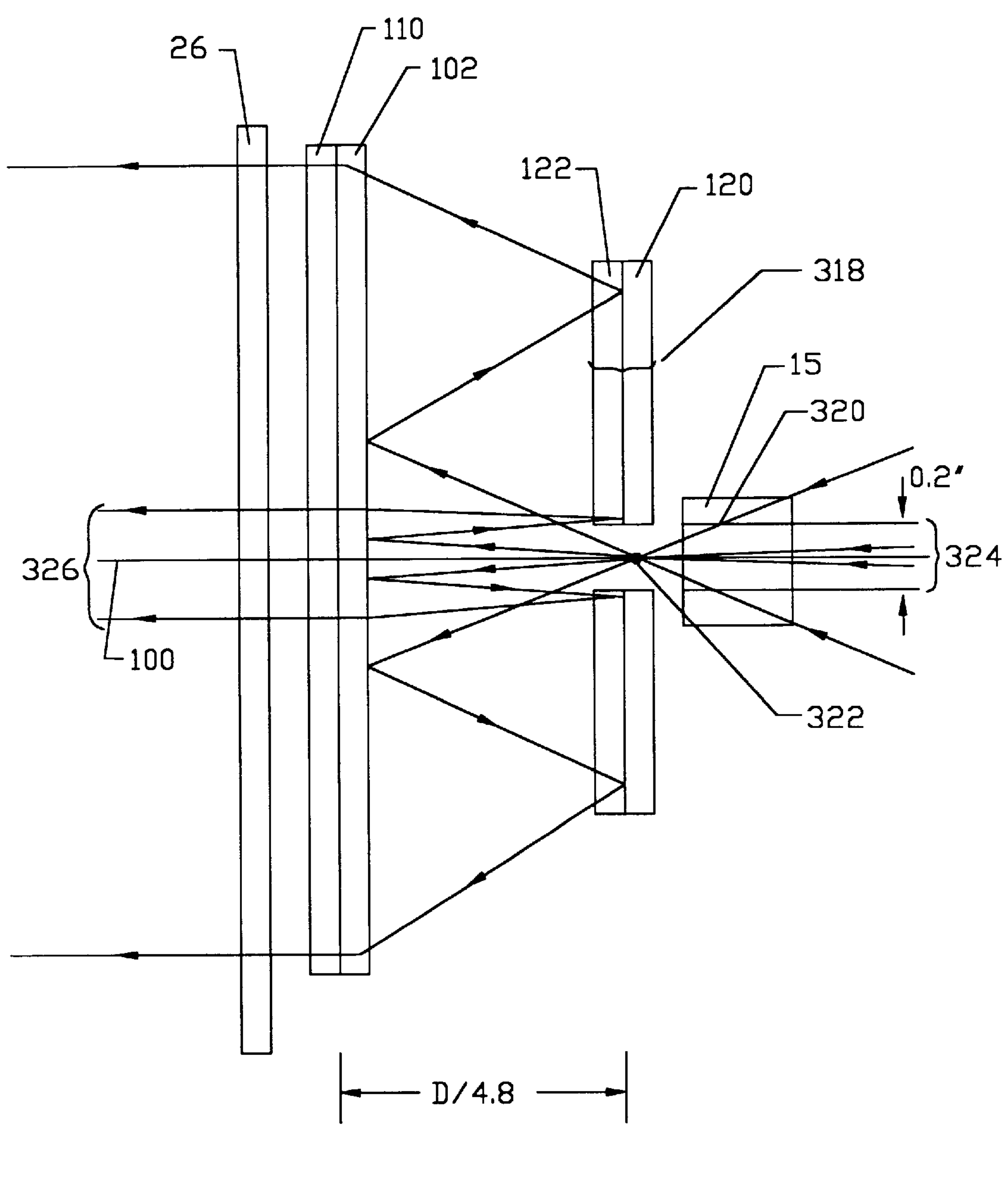
FIG. 19 illustrates a split-image variation on FIG. 14A using a vertical polarization-converting mirror with axial light inlet hole.

The embodiments of FIGS. 17 and 18 can be extended in FIG. 19 to the case where polarization selective reflector 102 and a non-selective reflecting mirror 318 are arranged in parallel with each other, and where source rays 320 enter the optical system 10 through a small physical hole 322 the size of the projection lens' exit pupil 324 (0.2" in the above examples) cut in the double-layer 318 including the mirror layer 120 and the wide band polarization converting layer 122. In this case, the cabinet depth, t, is D/4.8 for the +/−35 degree projection lens 20 considered above. There are two performance issues associated with preferred embodiments based on this approach wherein (1) the low-angle image source rays 320 are prevented from escaping back out through the physical hole 322 upon retro-reflection from the selective reflector 102, and (2) the absence of image information within a hole projection region 326 on the projection screen 26 preferably is corrected.

Figure 20:
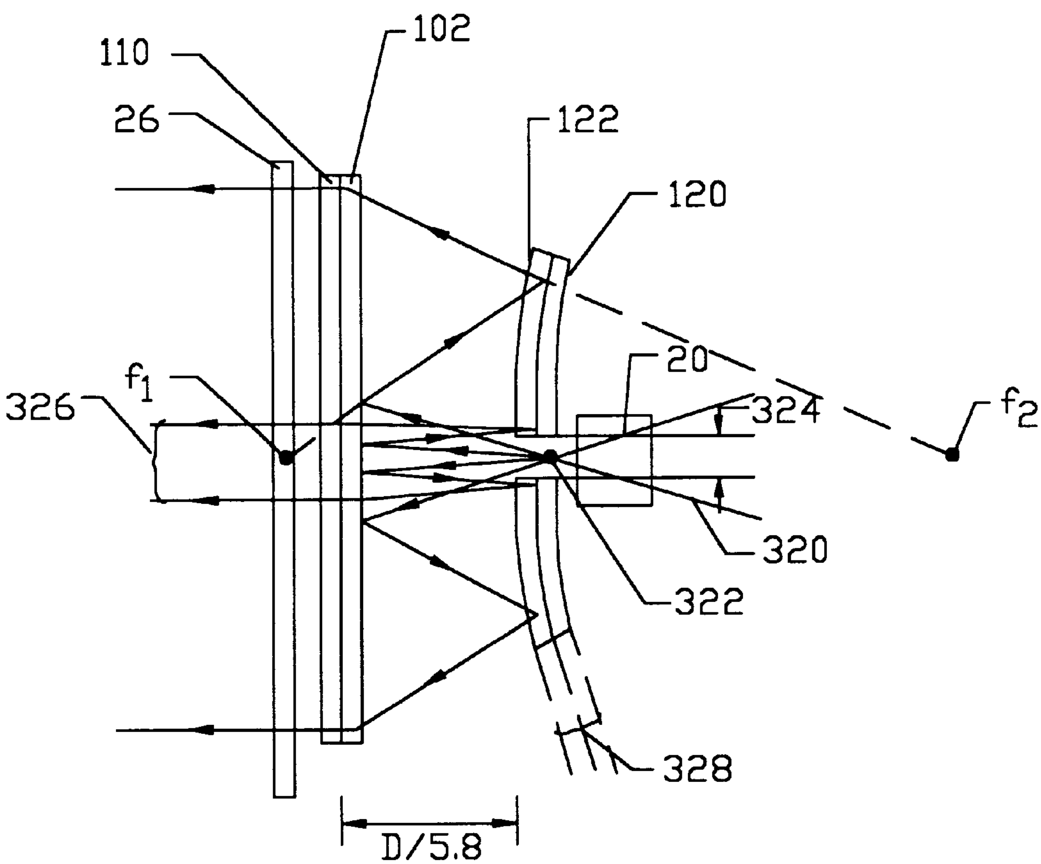
FIG. 20 illustrates a variation on FIG. 19 using a curved polarization converting mirror with axial inlet hole.

Still further improvement is possible by adding optical power to the back-reflecting plane preferably in the form of a convex hyperboloidal curvature reflector 328 (composed of the mirror and converting layers 120 and 122), as shown by way of cross-section in FIG. 20. The maximum practical compactness in this case is a cabinet thickness, t, of D/5.8, when the edge or extreme rays are 37 degrees from horizontal at the rear of the Fresnel lens 110. Somewhat less improvement is possible when using a hyperbolic cylindrical curvature rather than the rotationally symmetric system. In either case, the cabinet-depth is determined by a scale-model made using a commercial raytrace program such as mentioned hereinbefore. The set of hyperboloidal foci in the example of FIG. 20 are F1 at—D/4.86 and F2 at D/2.81. The embodiments based on FIG. 19 are distinguished by the fact that input source rays, such as those bound by the ray 320, enter the optical system 10 through the physical hole 322 formed in the otherwise opaque reflector 328. The embodiments of FIG. 1A and FIG. 14 each allowed input light to be transmitted through the selective mirror layer (102 in FIG. 1A and reflector 277 in FIG. 14) only after an initial blockage by that selective mirror layer due to the light being in a reflecting rather than transmitting polarization state. The embodiments of FIG. 14 allowed input source rays (i.e., the ray 293 in FIG. 14) to enter the optical system 10 from beneath the various reflector (the reflector 277 and the folding mirror 282).

One consequence of inputting the bundle of source rays bounded by the edge rays 320 through the physical hole 322 is that some image information can be lost by inadvertent low-angle return-reflections that pass back through the physical hole 322. Minimizing such losses implies making the hole 322 as small as possible, and/or developing other means of assuring that no important image information can be sacrificed in this way. The minimum hole diameter corresponds to that of the exit aperture of the projection lens 20 which in the previous examples has been 0.2". One other consequence of passing the image source rays bundle through the hole 322 is that without some means of compensation or correction, the hole 322 is likely to appear on the projection screen 26 as an absence of image information.

Figure 21:
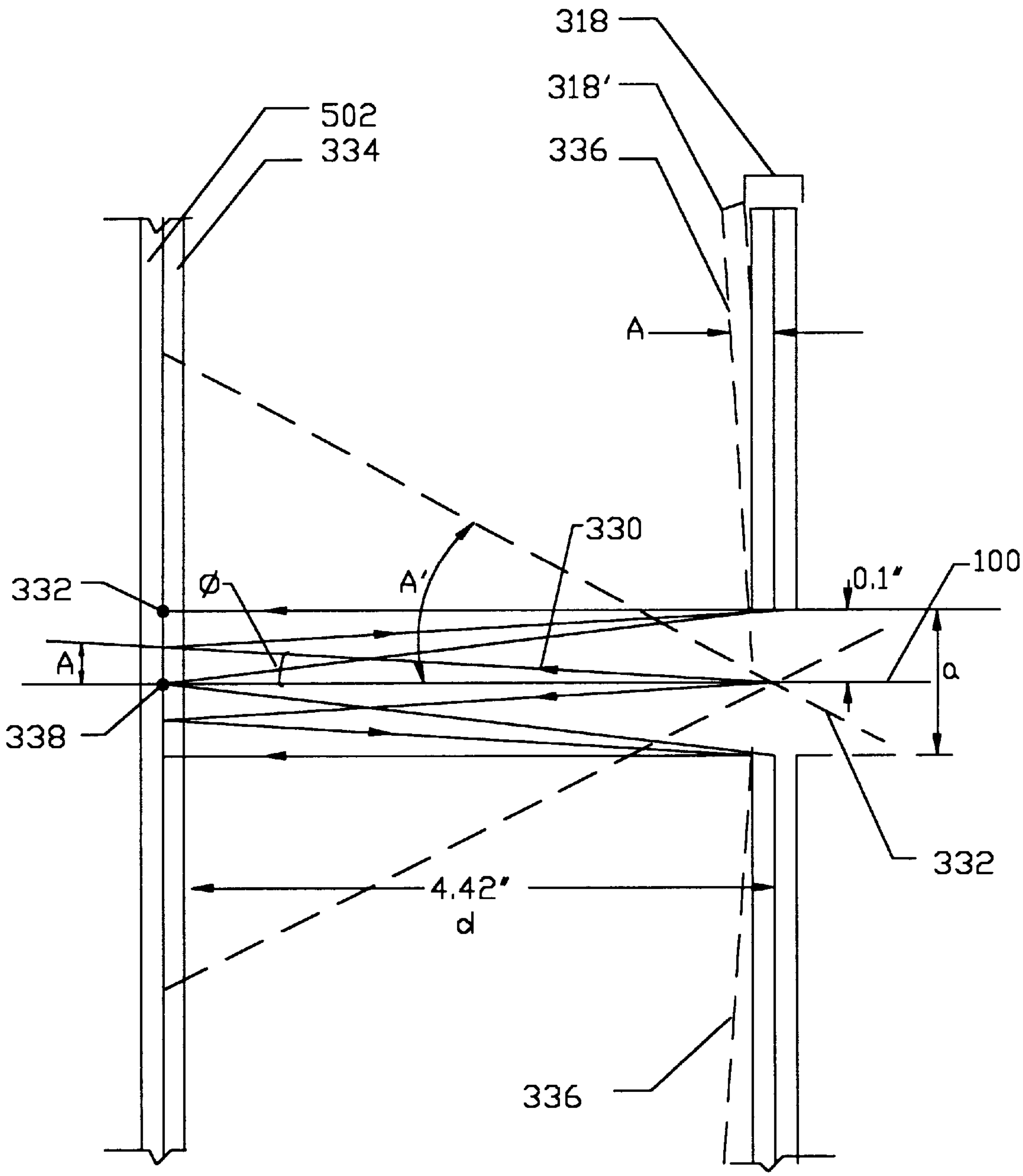
FIG. 21 shows the side view of a tilt-angle variation of FIG. 19 to eliminate visual artifacts.
Figure 22A:
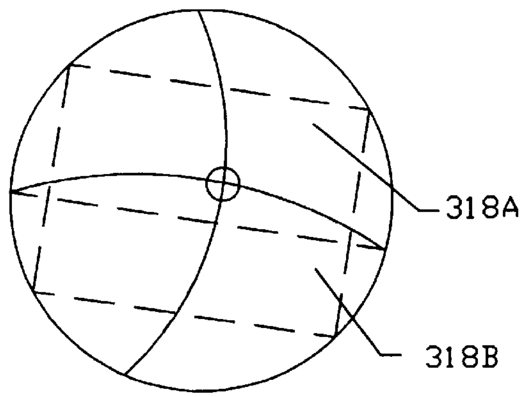
FIG. 22A shows a front view and FIG. 22B a side view of a three-dimensionally shaped polarization-converting mirror with ogive correction.
Figure 22B:
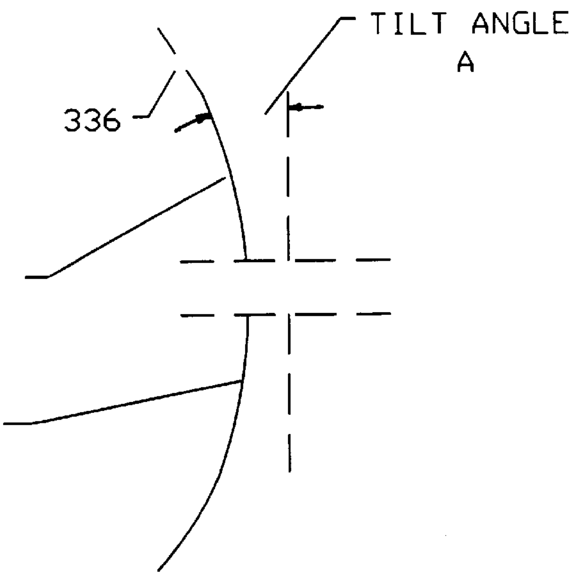
Figure 23:
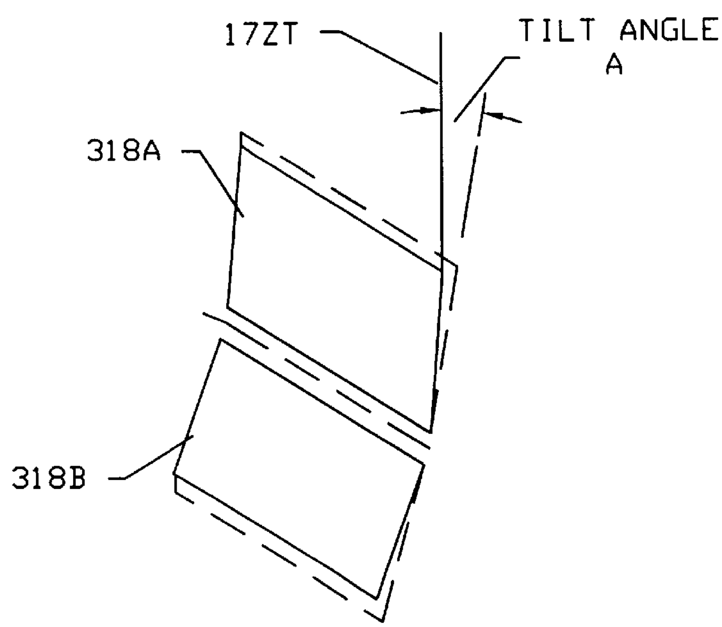
FIG. 23 shows hinged upper and lower polarization-converting mirror planes.

One method and system for preventing loss of the low angle image source rays back through the rectangular physical hole 322 is by prearranging that no image information is contained within ray angles small enough to escape, or that only “black rays” (no rays with any image information) are contained in such escape angles. The limiting ray angles for this method are shown in FIG. 21 for the illustrative case when D is 20". The half-angle, A, within which there must be no image information, or only so-called “black rays”, is 0.57 degrees, or [ARCTAN a/D] where the parameter “a” is the diameter of the proj ection lens exit pupil. Accordingly, one can construct the central SLM 14, buffer zone 148 analogous to that arranged in FIG. 2. This buffer zone 148 assures that any low-angle rays that do escape back through the physical hole 322 do so without sacrificing any valuable image content. This buffer zone 148 can either be formed as a circular (or rectangular) central region or it can be arranged as a stripe separating the upper and lower image portions 86 and 88. The reason for the original buffer zone 148 of FIG. 2 was to avoid cross-contamination of rays from the upper and lower image portions 86 and 88 of the SLM 14 being misplaced on the projection screen 26. The same approach is extendible to the embodiment of FIG. 20, by programming those specifically illuminated pixels within this range, for example, the central +/−0.57 degrees of light from the light source 12, to contain no image information other than blocking the transmission of light, and then to transform the location of image pixels so that when an optical means is subsequently applied to collapse the hole projection region 326 (see FIG. 20) at the projection screen 26, a perfectly arranged and uniform rectangular image results.

In more general terms, the embodiment of FIG. 21 can be described analytically in terms of the pupil diameter, the screen diagonal, D, a projection lens half angle (as in the above examples) of 35 degrees, a half angle of A for the first image-light-containing principal ray 330 closest to the optic axis 100, and a separation distance, d, from the hole 322 to output plane. On its first encounter with the projection screen 26 hence point 332, the diameter of the ray bundle is 2a/3. If the black area on the projection screen 26 is chosen with diameter A, then:

$$\tan A = \frac{5a}{6d}$$

the principal ray 330 directed along angle A meets reflecting surface 334 at a height 2(d) tan A or 5a/3 with an upward slope of A. If the principal ray 330 is to become the ray arriving at the center of the projection screen 26, its upward angle A is to be converted to a downward angle 5a/3d. This condition can be achieved by tilting the mirror 318 along line 336 which is inclined to the vertical by 0.5(A+5a/3d). For small angles, tan A=A (in radians) therefore the tilt angle is 1.25(a/d). For the case of a 50" screen diagonal and a 0.2" pupil diameter and a projection half angle of 35 degrees, d is 11.9" and the tilt angle is 1.2 degrees.

If the opaque area on the projection screen 26 is a circular disk, then the tilt angle given corresponds to reflecting mirror 318 being formed as a very shallow cone, rather than the flat plane of FIGS. 20 and 21. If the opaque area is a narrow strip, then the tilt angle A, given above is applied to the upper half 318A and lower half 318B of the mirror 318, as in FIGS. 22 and 23, respectively.

One approach for collapsing this dark projection region 326 created on the projection screen 26 is by means of a beam displacement method. One means of beam displacement is to tilt or otherwise shape (as above) the non-selective reflecting mirror 318 in FIG. 21 so that, for example, its new reflecting surface 318' deflects the ideal principal ray 330 from the normal target point 332 to deflected target point 338 on the optic axis 100.

In another form of the invention one can collapse the dark projection region 326 (see FIG. 19) by covering the physical hole 322 with a polarization selective reflecting material, and arrange elements so that any returning rays will fail the protective material's condition for escape via transmission back through the hole 322. Doing so, however, requires an efficient means for converting the polarization state of returning rays with respect to their incoming state, in the same manner as was accomplished in FIGS. 4A and 4B. A preferred arrangement to accomplish this is shown schematically in FIG. 24 for a single input ray 340 exiting the projection lens 20. For the preferred process to operate efficiently, a polarization converting layer 342 must act to prevent incoming ray 344 from passing through selective reflecting layer 346, while still converting returning ray 348 to the polarization state that will reflect from a selective reflecting window layer 350 covering hole diameter 352. Consequently, the returning ray 348 is substantially in the orthogonal state to the ray 344. One way this can be accomplished is by using the polarization converting layer 342 which changes the polarization of the incoming ray 344 upon passing therethrough, and then advancing it (rather than reversing it) in polarization state upon passing back out through the converting layer 342. Symmetry arguments generally mitigate against such behavior in linear crystalline material. Certain nonlinear or resonant materials are known to show such cumulative bi-directional effects, e.g., gain in a laser media, and would be expected to accumulate phase change bi-directionally as well. Nonlinear and resonant effects are, however, typically very wavelength sensitive, which is not a preferred characteristic for the present image display applications.

Figure 24:
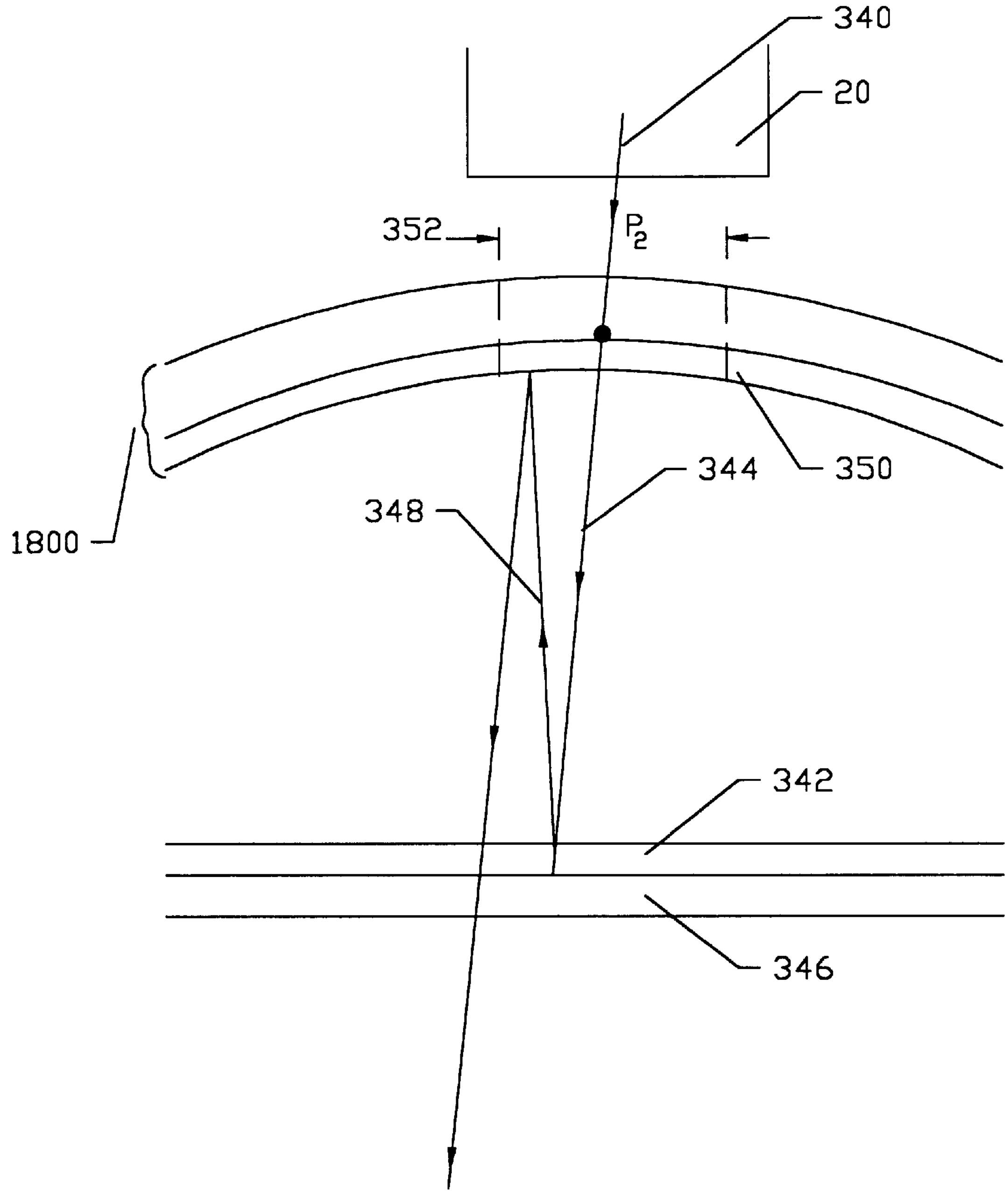
FIG. 24 shows the side view of an optical arrangement for eliminating visual artifacts caused by the inlet hole in embodiments of FIGS. 19–21.
Figure 25A:
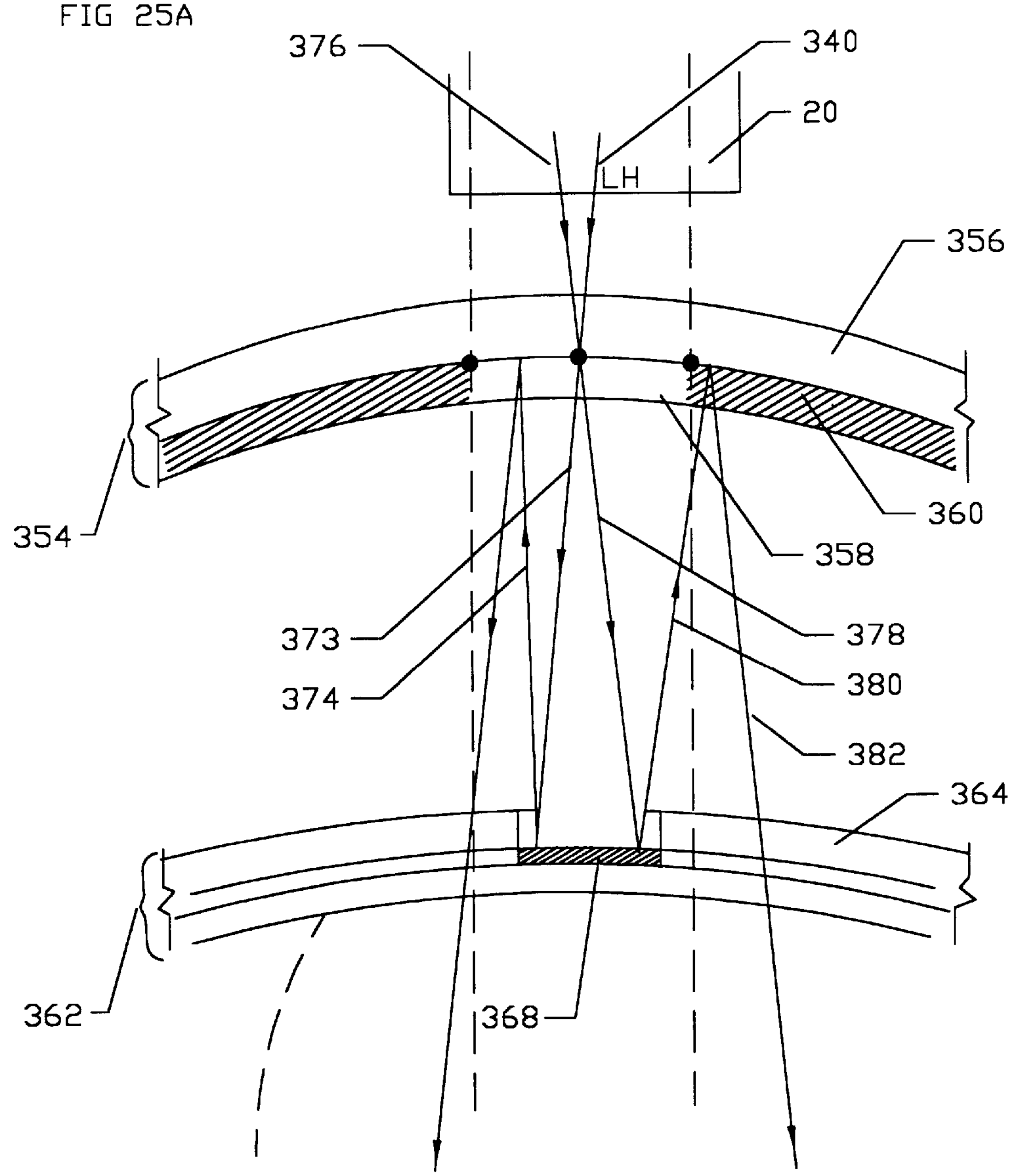
FIG. 25A shows another system for eliminating visual artifacts using a polarization-selective window for an inlet hole and a reciprocating metal reflector and FIG. 25B shows an alternative structure for the reciprocating output reflector as a partial, removed section.
Figure 25B:
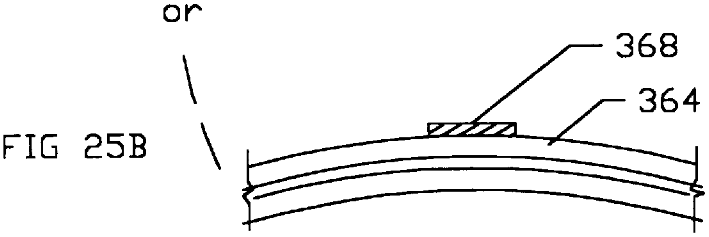

In another embodiment shown in FIG. 25 the same functional result can be achieved as described for FIG. 24 but without need for such a non-standard polarization converting means as the layer 342. A reflector 354 closest to the projection lens 20 includes a transparent substrate 356, a window layer 358 of diameter equal to the projection lens exit pupil is centered on the optic axis 100, and a polarization-selective material that passes LHCP state input ray, such as the input ray 340, and reflects all rays of the orthogonal polarization state RHCP. This polarization selective material is laminated or attached to transparent substrate 356, and also included is a metal or metal-like polarization-changing, reflecting annulus 360 such as wide band mirror layer 120 used in FIG. 1A and FIG. 4A, with a hole of diameter, a, also centered on the optic axis 100. A reciprocating output reflector 362 includes an outer quarter-wave retardation film layer 364, with a hole 366 of diameter a/2, centered on the optic axis 100, a metal or metal-like polarization changing reflecting layer 368 of diameter a/2, also centered on the optic axis 100, a polarization-selective layer 370 arranged to reflect P2 and pass P1, and a transparent substrate 372. The LHCP input ray 340 passes through the window layer 358 as LHCP ray 373, which on retro-reflection at base reflecting layer 368, converts to RHCP ray 374. The polarization-selective window layer 358 (such as the Merck material) thus splits unpolarized and polarized light into (1) a reflected beam of the RHCP ray 374 and (2) an equally intense beam of the transmitted LHCP ray 373. Further, when the embodiment is provided with RHCP input, pure reflection of the RHCP input occurs. When wider angle input ray 376 passes through the window layer 358 as ray 378, this ray's trajectory just misses the base reflecting layer 368 and passes through layer 364, converting from LHCP to P2 at polarization selective reflecting layer 370, reflecting backwards and converting back to LHCP during the return path through the layer 364, and emerging as LHCP ray 380. When the LHCP 380 strikes the reflector 354, it just misses the window layer 358 and reflects off the polarization reflecting annulus 360 as RHCP ray 382. When the RHCP ray 382 passes through the layer 364 and converts from RHCP to P1, it passes through the polarization selective reflecting layer 370 as an output ray.

While the invention of FIG. 25 prevents reflected rays from returning to the projection lens 20, the method leaves a dark spot or gap 384 in the center of the projected image of diameter a (0.1" in the above examples). Eliminating the spot's visibility requires an efficient and reasonably thin means for displacing all output rays on the periphery of this dark spot 384 towards the image center on the optic axis 100. The maximum displacement for any ray, in this example, is 0.05" or 1.27 mm.

Figure 26:
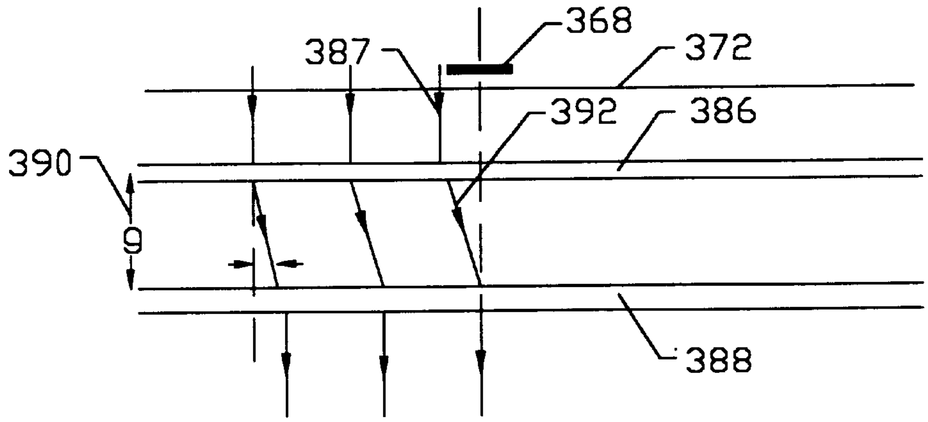
FIG. 26 shows a generalized beam-displacement method for hiding a metal reflector.
Figure 27:
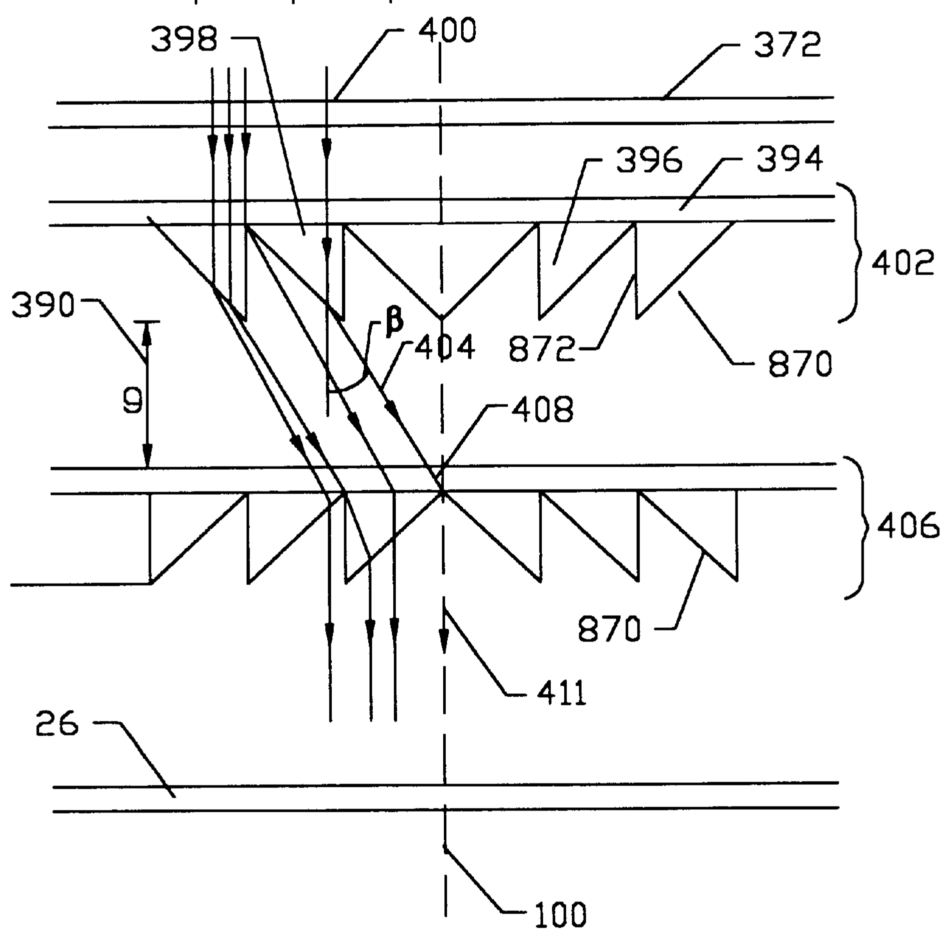
FIG. 27 shows a prismatic beam-displacement arrangement for hiding a metal reflector.

In an embodiment shown in FIG. 26 beam displacement is performed wherein two angle transforming films 386 and 388 are separated by either an air or dielectric gap 390. The first film 386 transforms input light 387 into a fixed oblique angle that traverses the gap 390 at an angle directed towards the optic axis 100. The second film 388, preferably a reciprocal of the first, reverses the process, and converts output ray 392 to that of its original inclination. The gap 390 needed between the two angle-changing films 386 and 388, for an angular change of $\Psi$ degrees (referenced to air or dielectric as appropriate) and a displacement of a/2, is a/2tan $\Psi$. It follows that the same method can be applied as a beam expander just by reversing the direction of input. One possible embodiment is shown in FIG. 27, for the case of two prismatic films 394 and 396. This is illustrated for a case where the same basic prisms 398 are used in each of the two prismatic films 394 and 396, but there are many other embodiments, depending on the application, where prism design (angle and spacing) can be varied. One reason for varying the prism angle is to vary the amount of beam displacement, as for example, from outer edge of the projected image to inner core, and another reason is to prevent Moire interferences. When identical forms of the base prisms 398 are used, the associated beam displacement effected causes the outer edges of the projected image to shrink inside the outer edge of the primary conicoid, thereby eliminating the possibility of achieving a truly "borderless" image on the projection screen 26. The diagonal of the projected image is less than the diagonal of the primary conicoid by twice the displacement applied. Varying the beam displacement linearly from zero displacement at the outer edge, to the maximum displacement at the inner edge, maintains the full image edge-to-edge across the projection screen 26. Any associated image distortion can be compensated for electronically.

Figure 28:
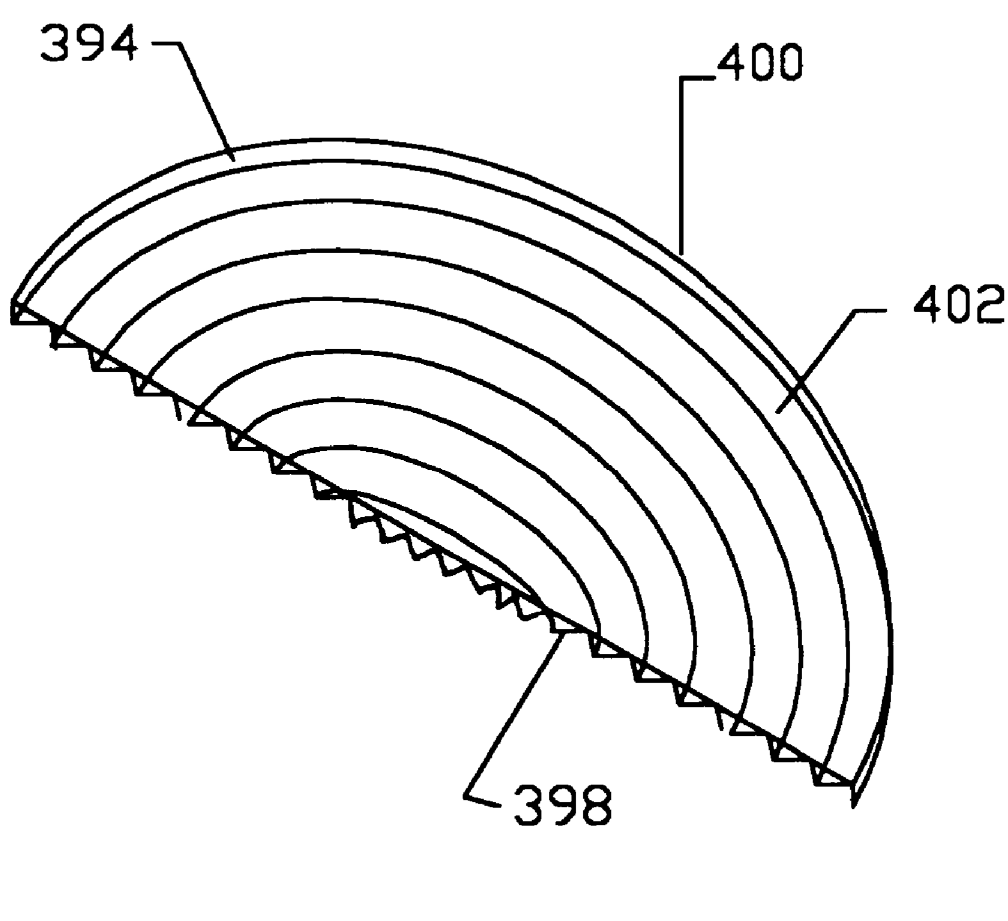
FIG. 28 shows a perspective illustration of a prismatic beam-displacer element.

In the present case, prism angle, $\alpha$, is 30 degrees, and while this method works in some applications for linear prism arrays (grooved films), the present application to projection display images with a circular buffer zone assumes that the groove profiles shown represent a two-dimensional cut through an element with grooved rings, as shown in FIG. 28. Input light, as represented by input ray 400, preferably applied at normal or near normal incidence, refracts through first film element 402, passing sequentially through its substrate or the base prismatic film 394, and into the base prism 398 itself (also see FIG. 27). The prisms 398 are preferably right angle prisms as shown. The input ray 400 exits from the prism's hypotenuse face into air as transmitted ray 404 at an oblique angle β to optic axis 100, that in this case is 18.6 degrees. For a 1.25 mm displacement, the gap thickness, g, in air is about 3.6 mm, which is not at all unreasonable. The transmitted ray 404 refracts into the base prismatic film 394 of second film element 406 as ray 408, propagates through prism and exits through the prism's hypotenuse face into air as output ray 411 at an angle arranged to be at normal or near normal incidence. This assembly can be located, as shown, just after the reflector 354 of FIG. 25 behind the projection screen 26. In principal the Fresnel lens 110, if necessary, can be placed either before the first film element 404 or immediately after the second film element 406. The operative criteria is that the ray passing through the center of the image at the SLM 14 and projected by the projection lens 20 preferably arrives at the projection screen 26 heading along the optic axis 100 and such that its path length from SLM 14 to the projection screen 26 matches the focal length of the projection lens 20.

The length of the base prism 398 is typically 30 to 50 microns, so Moire-type interferences with the system's Fresnel lens 110 can be suppressed. As Moire interferences (visible fringes) are possible by competitions between the first and second film elements 402 and 406, it can be necessary either to vary the prism lengths randomly within each of the film elements 402 and/or 406, or to choose two sufficiently different prism spacings.

Volume holographic films, such as those manufactured by Polaroid Corporation, diffractive (or binary) optic elements, surface diffraction gratings and gradient index films are among the other mechanisms for angle changing that can each be arranged to work in substantially the same manner as shown in FIG. 26. Moreover, it is possible to combine two or more different types of angle-changing elements.

Figure 29:
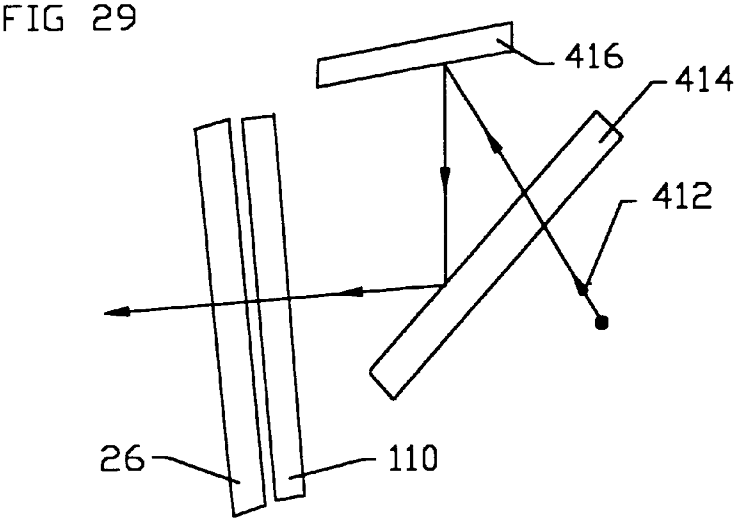
FIG. 29 shows a ray-path sequence of a folded-optic mirror systems such as in FIG. 1A.
Figure 30:
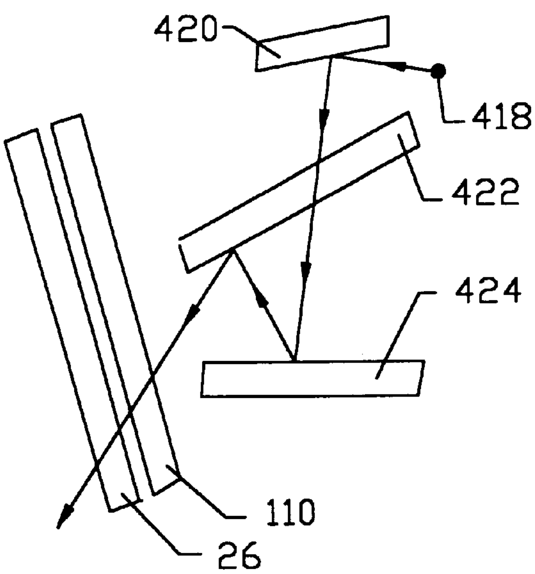
FIG. 30 shows another ray path sequence as in FIG. 29 for systems of the type shown in FIGS. 22–24.
Figure 31:
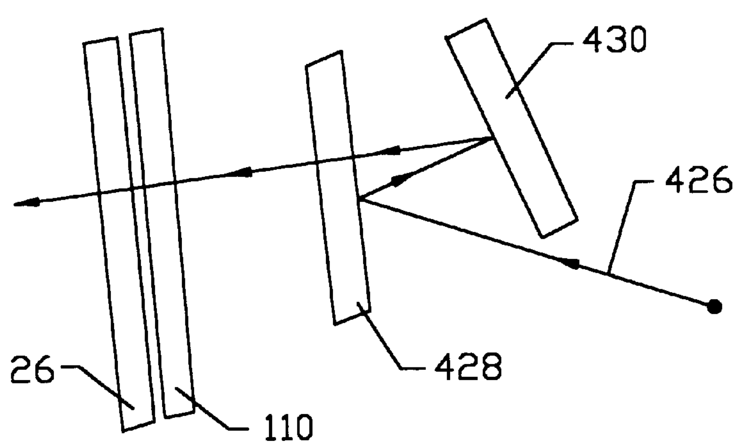
FIG. 31 shows another ray path sequence as in FIG. 29 for systems of the type shown in FIG. 14.

In generalized form, the polarization-dependent folded projection screen system inventions, such as for example as shown in FIGS. 1A, 7–10 and 11–28, each consist of a prepolarized source 12 (or sources), a wide band polarization-selective reflector, a wide band polarization-converting reflector, the Fresnel lens 110 and the projection screen 26, as shown in FIGS. 29–31. In the form of the invention shown in FIG. 1A and FIG. 7–10, prepolarized source rays 412 as shown in FIG. 29 are selectively transmitted through selective reflector 414, are processed and returned by a converting reflector 416 and then are selectively reflected towards the Fresnel lens 110 and the projection screen 26. In the form of the inventions of FIGS. 11 and 12, the prepolarized source rays 418 strike a re-directing reflector 420, are directed through a first selective reflector 422 to a polarization-converting reflective element 424, and returned to the first selective reflector 422 to be selectively reflected towards the Fresnel lens 110 and the screen 26, as in FIG. 30. The form of the invention of FIG. 13 is also represented by FIG. 30, with the exception after the rays pass through the first selective reflector 422 and they strike a second selective reflector instead of the re-directing reflector 420, and are otherwise re-directed towards the Fresnel lens 110 and the screen 26. In the manner of the inventions of FIGS. 14–20, for the embodiment of FIG. 31 pre-polarized source rays 426 strike and are redirected by a selective reflector 428 towards another converting reflector 430, and then redirected back through the selective reflector 428 towards the Fresnel lens 110 and the screen 26. In each form, any of the reflecting elements can be given optical power by virtue of their surface shape or by the incorporation of shaped refractive components, or both.

Figure 32:
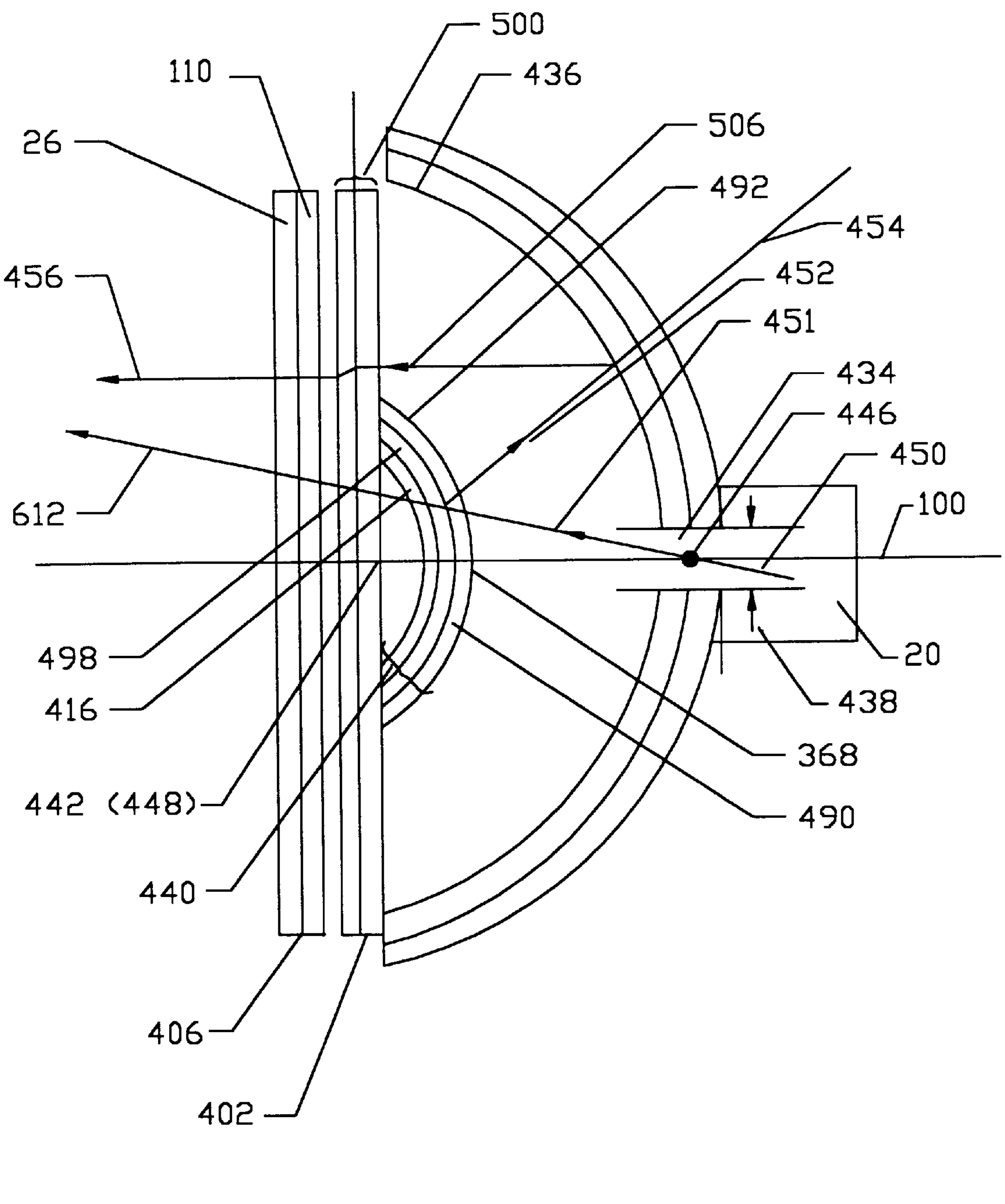
FIG. 32 shows a cross sectional view of a conicoidal variation on the embodiment of FIG. 19.
Figure 33:
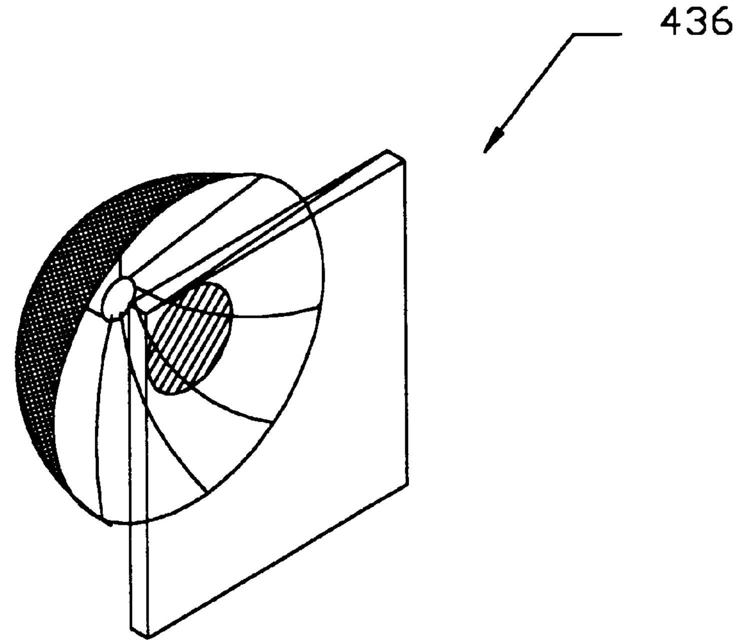
FIG. 33 is a three-dimensional perspective front view of the system of FIG. 32.
Figure 34:
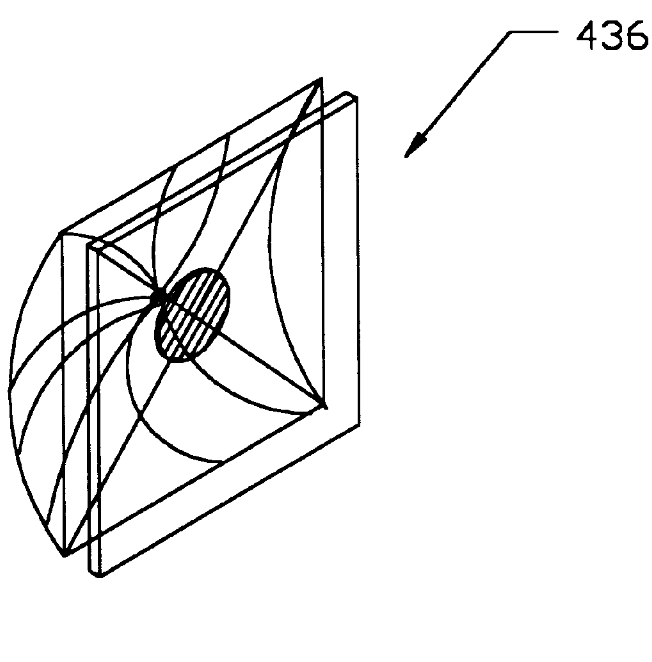
FIG. 34 is a three dimensional perspective front view of the system of FIG. 32 truncated for rectangular viewing.

There is one particular embodiment of polarization-selective, image-folding system embodiments when the method of optical power becomes particularly important. This class, illustrated in cross-section in FIG. 32, is an improvement or extension on the inventions of FIGS. 14–20 and their generalized form of FIG. 31 and can include the methods of FIGS. 21–24. The coaxially curved and preferably rotationally-symmetric reflecting elements of FIG. 32 are further illustrated in three dimensions in FIG. 33 for a circular output, and in FIG. 34 as truncated for the standard 4:3 viewing aspect ratio common to U.S. television. In this variation, considering the profile of FIG. 32, pre-polarized light such as ray 450 from the projection lens 20 is directed through a small physical hole, or window 434, as in FIGS. 24 and 25 in a curved, (rather than flat), polarization converting and reflecting element 436. As before, the window 434 is sized to match the diameter of projection lens exit pupil 438. The curved polarization converting element 436 is formed symmetrically about the optic axis 100 (and axis of symmetry for this embodiment) in the shape of a primary conicoid, which faces the convex surface of a smaller coaxially aligned secondary conicoid 440. The primary conicoid shape of the converting element 436 is preferably a paraboloid (or a hyperboloid) whose front focus 442 resides on (or near) the back surface of the projection screen 26 and whose vertex point 446 resides on the center of the projection lens exit pupil 438. The secondary conicoid 440 is preferably a hyperboloid (or an oblate ellipsoid), one focal point of which resides on the primary conicoid front focus 442, and the other focal point which resides on the primary conicoid's vertex point 448 or 442. The secondary conicoid is composed of the same elements previously described in FIG. 25, sequentially from the right to left in the figures, an opaque reflector element 368, a properly oriented polarization-converting layer 490, a properly oriented polarization-selective reflecting layer 498, and a transparent support substrate 416. The axis of symmetry common to the two coaxial conicoids is the system's optic axis 100. Incoming light rays 450 pass through the primary conicoid, polarization converting element 436, strike the secondary conicoid 440, and are reflected back either by the opaque reflector 368, or by the action of the polarization-selective layer 498, towards the interior or concave surface of the metalized interior surface layer of the converting element 436, whereupon they are reflected back towards the secondary conicoid 440, and outwards to the projection screen 26. This reciprocating design operates as if input rays 451 striking the secondary conicoid 440 actually emanated from the common focal point (the front focus 442). Reflected ray 452 is directed along path 454, a line connecting the common focal point (the first focus 442) with the point on the secondary conicoid 440 where the input ray 451 is reflected. Because of this, these reflected rays 452 are subsequently redirected by the primary conicoid polarization converting element 436 in a predictable manner. For example, when the converting element 436 is a paraboloid, output rays 456 exit in the well-collimated manner characteristic of a paraboloid.

Figure 35:
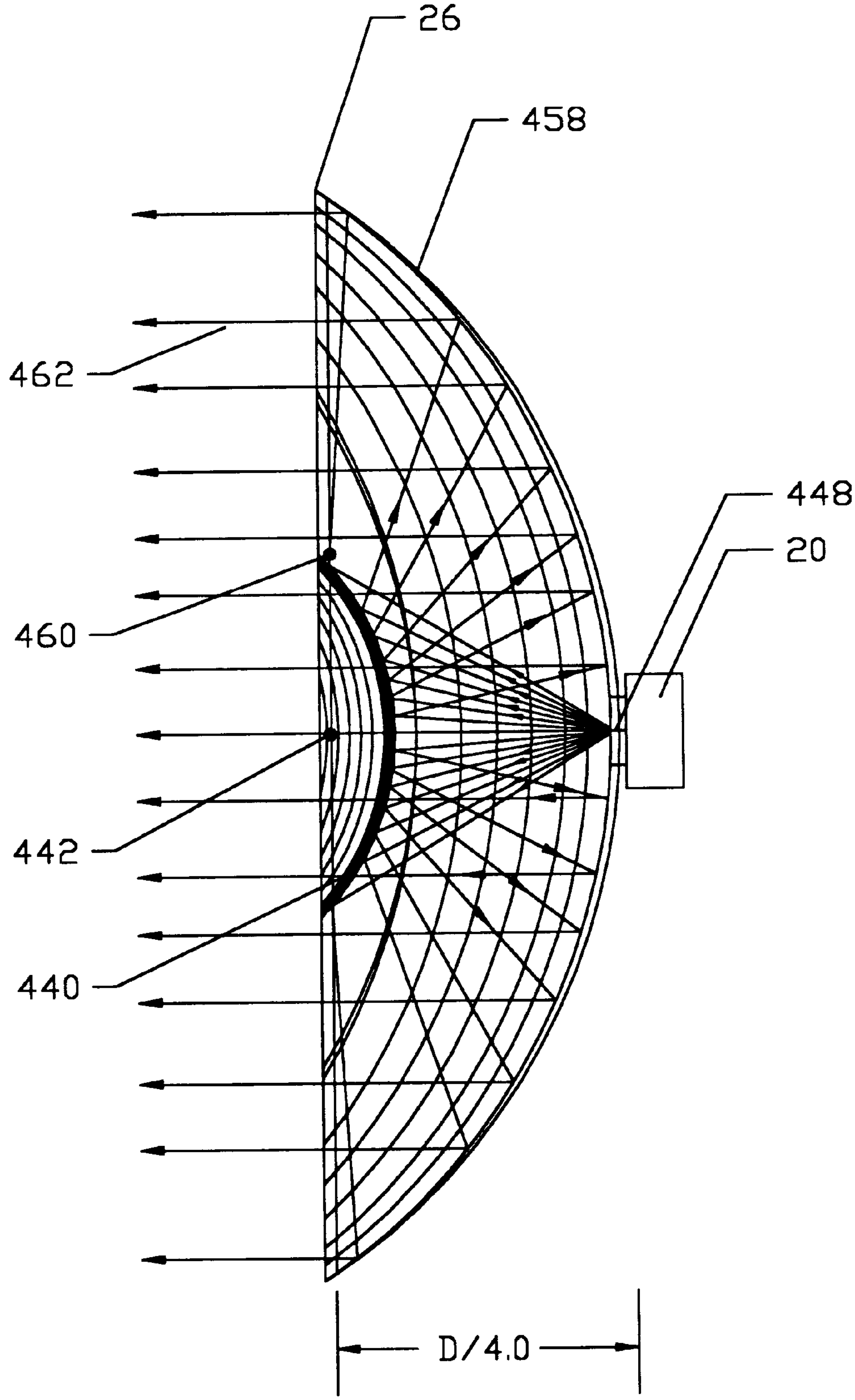
FIG. 35 Illustrates a variation on the embodiment of FIG. 32.

A preferred form of the above described conicoidal structure is shown in FIG. 35 for a simple paraboloid (i.e., a primary conicoid 458) of diameter D with the vertex point 448 and whose focal point (the front focus 442) is at D/4 from the system origin which ordinarily is the parabaloidal vertex point. A simple hyperboloid (the secondary conicoid 440) has its front focus 442 at D/4, having a point 460 on its reflecting surface with coordinates (D/3.465, D/4) each referenced to the system origin. In this case, collimated output rays 462 are delivered across the entire output aperture of diameter D, and the limiting cabinet depth, t, is D/4. This configuration, which produces collimated light, eliminates the need for the corrective Fresnel lens 110, and can be placed in contact with the projection lens 20. The source rays are input through a physical hole (such as the hole 322 in FIG. 20) and some rays are lost by low angle return reflections, the presence of the hole 322 will cause a dark spot on the projection screen 26 at its center. This dark spot can be collapsed by adding the first and second film elements 402 and 406 described in FIG. 27.

Figure 37:
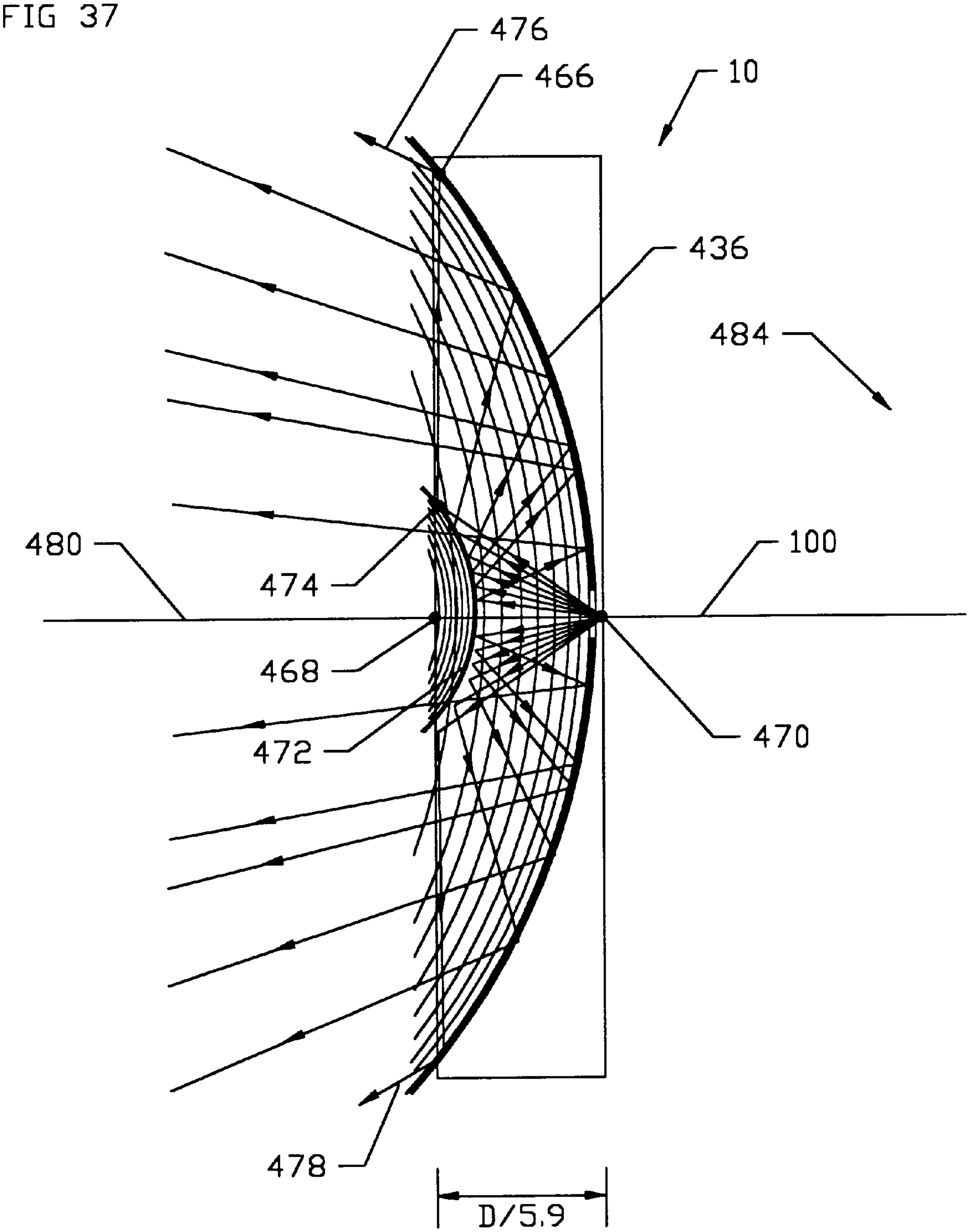
FIG. 37 illustrates a variation of the embodiment of FIG. 35 arranged for diverging output light and Fresnel lens correction.

Another preferred embodiment is shown in FIG. 37 having two coaxial hyperboloids, a primary polarization converting element 436 (consistent with FIG. 38) having a surface point 466 at (D/4, D) and foci at coordinate point 468 (D/4, 0) and point 470 (minus D, 0), and a smaller hyperboloid secondary element 472 having a surface point at (D/4, D/3.47) and foci at the coordinate point 468 (D/4, 0) and the point 470 (0, 0). In this case, the system's +/−35 degree extreme rays 476 and 478 are arranged to exit the optical system 10 at 35 degrees, whereas central rays 480 exit parallel or nearly-parallel to the optic axis 100. In this case, output rays 482 appear to emanate from the primary polarization converting element 464 at rear focus 484 on the optic axis 100 at point minus D. Because of this divergence, the Fresnel lens 110 is needed to apply directional correction. This variation increases compactness by nearly 50% over the embodiment of FIG. 32, with a resulting cabinet depth, t, of D/5.9.

Figure 38:
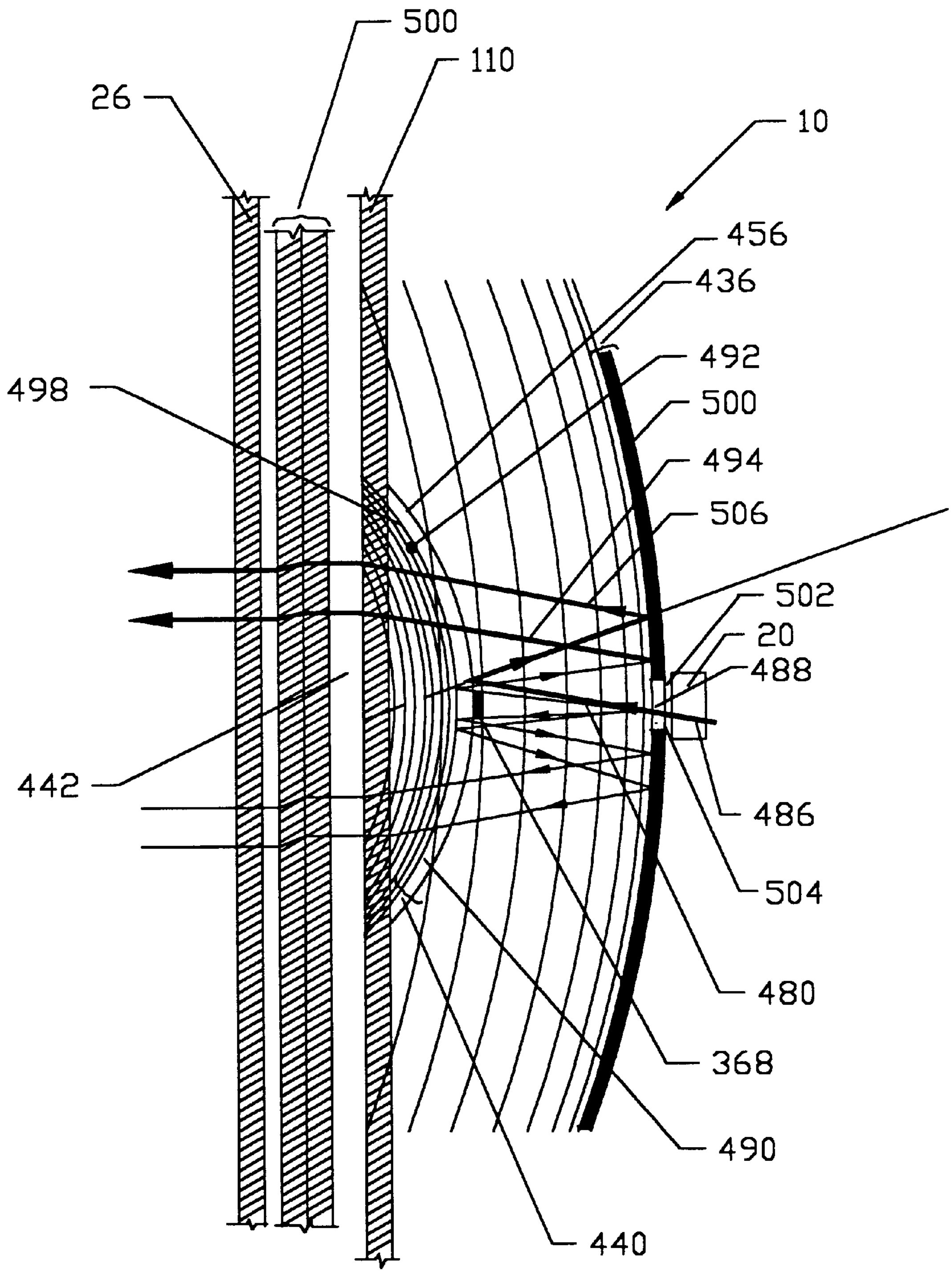
FIG. 38 illustrates a magnified view of the cross-sectional behavior of the embodiment of FIG. 37 showing its hole-eliminating features.

A magnified view of the previous example is given in FIG. 38, to further illustrate the behavior of low angle rays. The ray behaviors in FIG. 38 are substantially the same as in FIGS. 20–27, except for the effect of curved rather than planar reflecting elements. In one variation, all input rays 486 exiting the projection lens 20 are left hand circularly polarized (LHCP). In the nomenclature of FIG. 32, one of the central rays 480 passes through window 488 heading right to left towards the smaller secondary element 440. On reaching this secondary element 440, the input ray 480 passes through converter layer 490, and converts the light from LHCP to linear polarization P2. Linearly polarized, the input ray 480B is reflected by selective-reflecting layer 492 back through the converting layer 490, emerging in the direction of the curved polarization converting element 436 as LHCP ray 494. When the LHCP ray 494 strikes front surface layer 496 of the converting element 436, it is converted from LHCP to RHCP and redirected back towards the secondary conicoid 440 as the LHCP ray 494. On reaching the secondary conicoid 440, the LHCP ray 494 passes through the converting layer 490, becomes linearly polarized as P1, and transmits efficiently through selective reflecting layer 498 as the output ray 456.

In one of several possible arrangements of output elements, the direction of the output ray 456 in FIG. 38 is first corrected by its passage through the Fresnel lens 110 and then by passage through a beam displacing element 500 (such as has been described in FIGS. 26 and 27) prior to final passage through the projection screen 26. The beam displacing element 500 displaces the output ray 456 a predesigned amount towards the optic axis 100, effectively filling in the region containing no image information. Alternatively, the effect of the displacing element 500 can be effectuated if either by making a tilt correction to the polarization converting element 436, as if hinged or pivoted at a point, such as at point 502 or point 504, or by an ogive correction (described hereinafter) to the converting element 436. The difference between these latter two beam displacement methods is that hinging or pivoting is applied to the upper half and lower half of the conicoidal polarization converting element 436, as in FIGS. 33, 34 and 38. Ogiving is a tilt performed in a profile plane that is then revolved about the axis of symmetry so it has effect in all other such profile planes. An ogive surface is one which is generated by the rotation about an axis of symmetrical curves lying in a plane so that when segments of the curves that are above and below the axis intersect on the axis the tangents to the curves at that point make a non-zero angle with each other. The name is derived from the architectural description of a particular type of cathedral arch.

In the hinging method all rays above a horizontal stripe of the buffer zone 148 formed by and on the SLM 14, are each diverted upwards or downwards from their otherwise ideal directions by the deliberate angle of tilt of the polarization converting element 436. Accordingly, all rays from the lower-most edge of the upper image portion 86 arrive at the center of the image plane on the back surface of the projection screen 26, tilted downwards; and those rays from the corresponding upper-most edge of the lower image portion 88, arrive tilted upwards. Despite such slight angular changes at the projection screen 26, a complete image is reconstructed on the projection screen 26, with no evidence of the once empty "black" stripe between upper and lower image portions 86 and 88. The ogiving effect operates the same way, except that the region of black rays (the buffer zone 148) on the SLM 14 is made circular about the SLM's center, rather than a horizontal band.

In either case, all light such as rays 506 in FIG. 38 will deviate from their preferred directions by the angle of tilt. The only practical consequence of this correction is a slight image shape-error known as keystoning. One method of effecting a keystone correction involves compensating for the tilting (or ogiving) of the polarization converting element 436 by deliberately reprogramming the electronic image pixel locations in the SLM 14, to anticipate not only the "black" pixel locations, but also the predictable spatial effect of keystone distortion. In this latter method, instead of arranging the image pixels in a standard rectangular array, the pixels are arranged in the reverse keystone of the distortion anticipated, so that when the actual distortion occurs, the "distorted" output image at the projection screen 26 will be a rectangle of the correct aspect ratio rather than a keystone figure.

Figure 36:
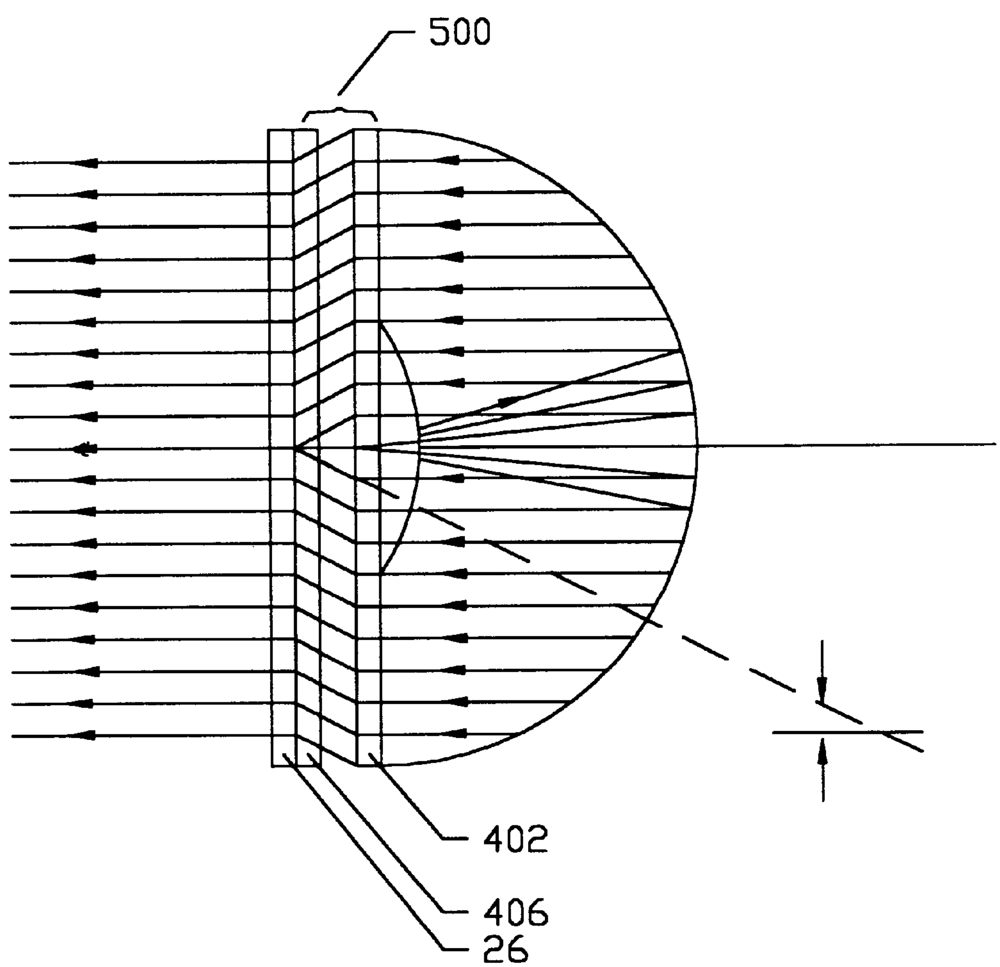
FIG. 36 illustrates a variation of the embodiment of FIG. 32 using beam-displacement elements and hole-elimination features.

With the primary conicoidal converting and re-directing element 436 and the secondary conicoidal polarization converting and selecting conicoid element 440 of FIG. 38 taken as, for example, the paraboloidal primary conicoid 458 and the hyperboloid secondary conicoid 440, as in FIG. 35, the beam displacement method of FIGS. 26 and 27 is applicable without a separate Fresnel lens element 110, as in FIG. 36. The method of FIGS. 26 and 27 can be thought of, in this case, as the use of two reciprocating Fresnel lenses so disposed as to effect the described beam displacement. When the primary converting element 436 and the secondary conicoid element 472 are both hyperboloids, however, as in the example of FIGS. 37 and 38, some additional means such as the Fresnel lens 110 should be applied first, to "pre-collimate" the divergent rays prior to their use with the beam displacing element 500. Fresnel lens correction is also indicated in this case, in conjunction with either the methods of hinging/pivoting or ogiving.

The shape of the primary polarization converting element 436 and the secondary conicoid 440, whether paraboloid or hyperboloid, can be further modified by (1) incorporating aspherizing terms in the shape (2) splitting the shape into toric sections, each optimized with respect to conicoidal polynomial coefficients, and (3) by having a radially varying curvature. A variety of other useful forms and variations, including the incorporation of refractive elements, will be described hereinafter.

Figure 39:
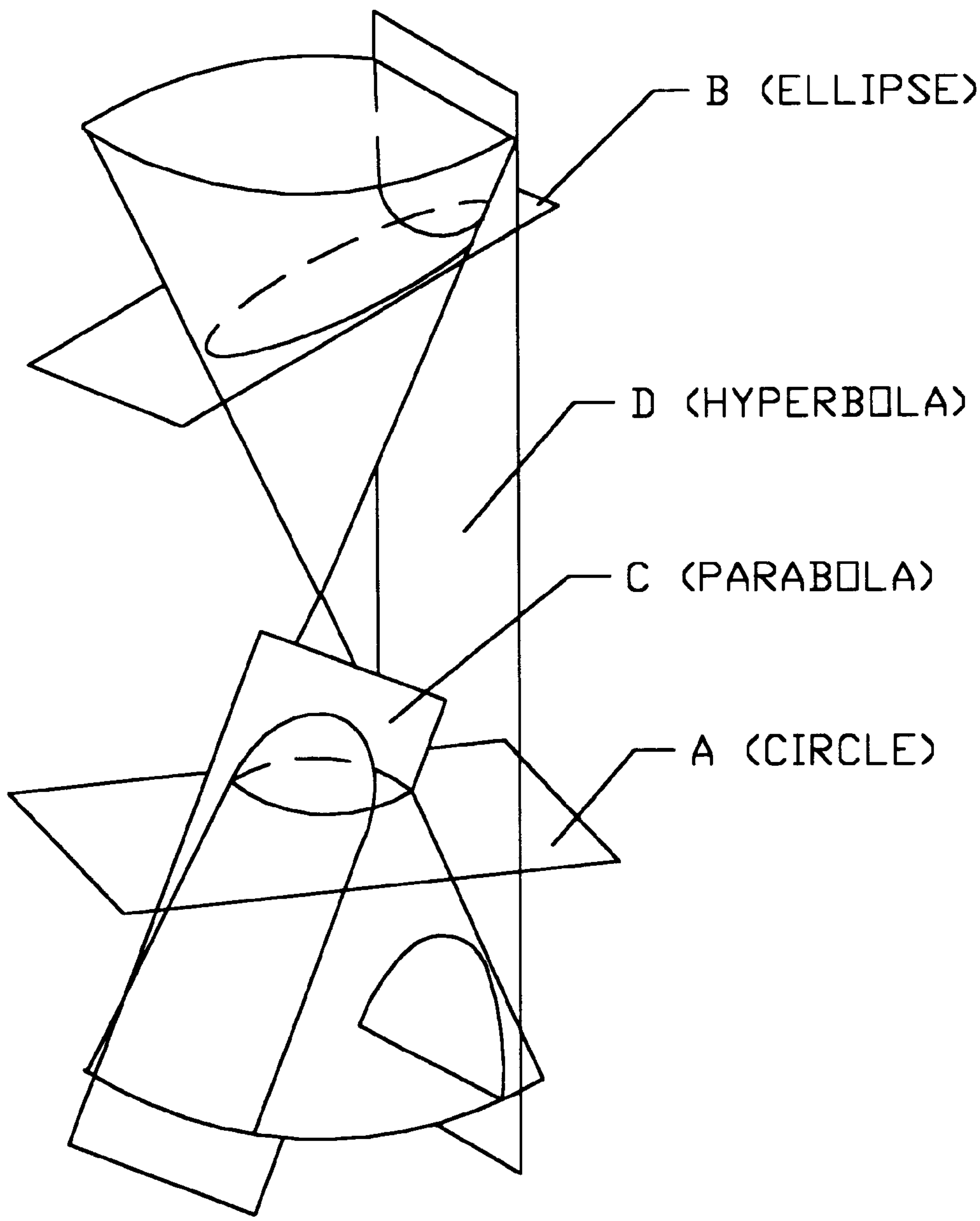
FIG. 39 illustrates the conic origin of conicoidal forms.
Figure 40:
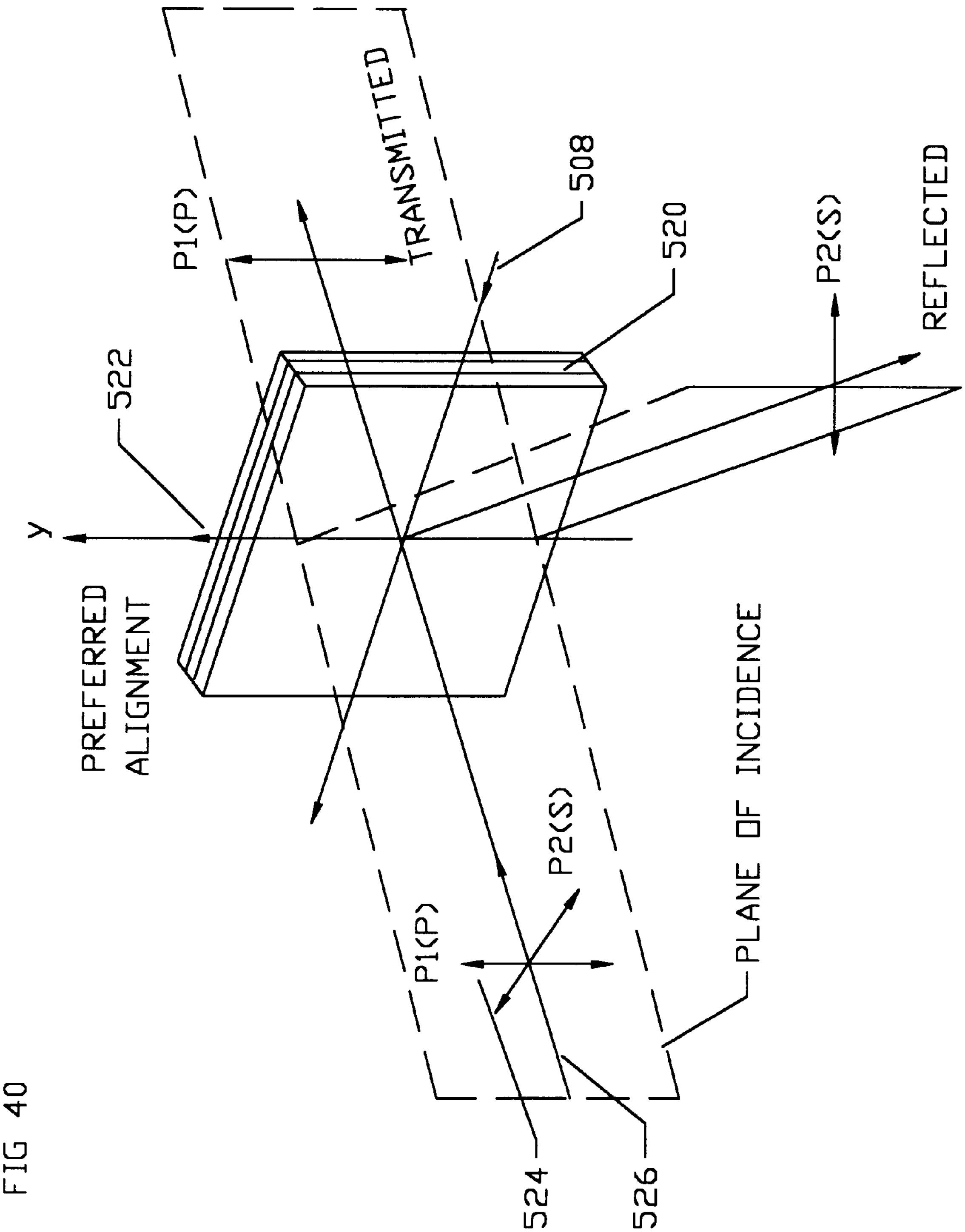
FIG. 40 illustrates a perspective view of optical behavior of a 3M-type linear polarization-selective reflector film layer.

The terminology "conicoid" optical element derives from the various plane sections that can be made in a three-dimensional cone, as shown in FIG. 39. The two dimensional boundary functions so formed by the intersection planes are symmetric polynomials and, when rotated about their axis of symmetry, form the associated conicoids. Plane A in FIG. 39 generates a circle, which when rotated produces a sphere or spheroid. Cut in half, this element is a hemisphere, and when rotated is a hemispheroid. Plane B in FIG. 39 cuts through the cone at an angle and forms two parabola sections, either of which when rotated becomes a paraboloid. The size of the paraboloid depends on the location of the cut. Other plane intersections, such as C in FIG. 39 and D in FIG. 39, form families of ellipses (ellipsoids) and hyperbolae (hyperboloids), each of whose eccentricity (shape anisotropy) depends on the cut angle. A conicoid is represented mathematically as a polynomial function in z and radial dimension H(x,y) as:

$$z = \frac{cH^2}{(1+q)} + aH^4 + bH^6 + cH^8 + dH^{10}$$

where $q^2=1-(K+1)\rho^2$, $H^2$, $H^2=x^2+y^2$ and a, b, c and d are the aspherizing terms.

When k=0 the function returns a spheroid. When k is negative between 0 and minus 1, the function creates an ellipsoid; between minus 1 and infinity, a hyperboloid. When k=minus 1, the function creates a paraboloid. When k is positive and greater than 0, the function creates an oblate spheroid.

The principal advantage of using reciprocating conicoid's over the reciprocating planes of FIGS. 19 and 20 is cabinet compactness. The reciprocating hyperboloids of FIG. 37 fit within a cabinet depth, t, of D/5.9, whereas the shallowest cabinet depth, t, possible with reciprocating planes is D/4.8 for parallel planes and D/5 for tilted planes. Only when some optical power (e.g. reflector curvature) was added as in FIG. 20 can this level of depth reduction be approached. Applied to the example of a 50" screen diagonal, cabinet depth, t, can be reduced by as much as 2.5" to 8.5" using optical power, as opposed to 10"–11" when not.

Figure 41:
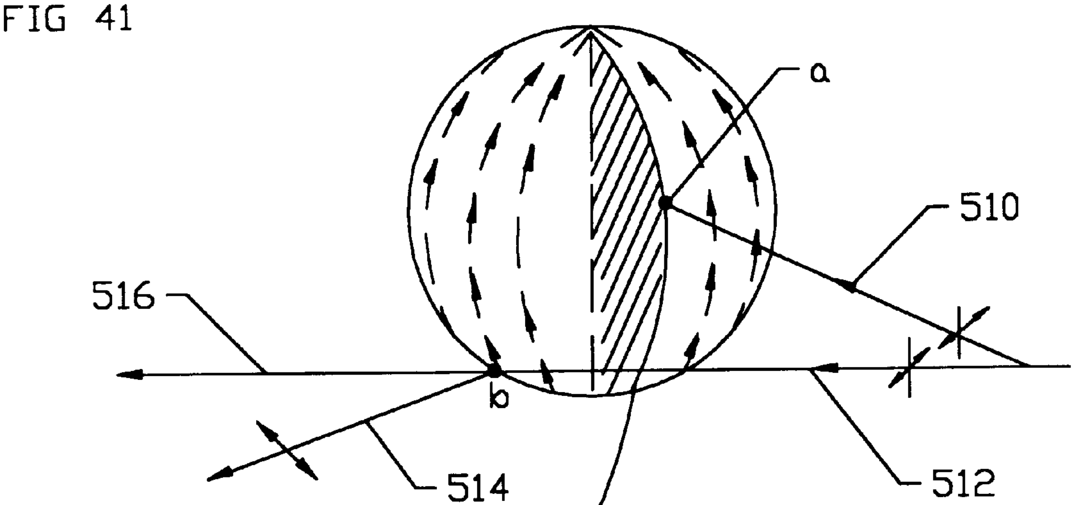
FIG. 41 shows a perspective view of the ray alignment implications of FIG. 40 with preferred polarization orientations mapped onto a curved surface.
Figure 42:
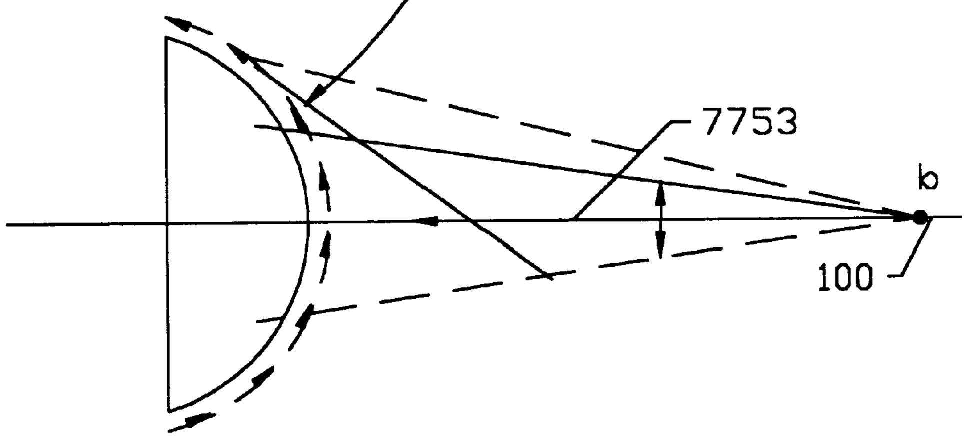
FIG. 42 shows a partial cross-sectional view of FIG. 41 ray alignment with curved reflector surface.
Figure 43:
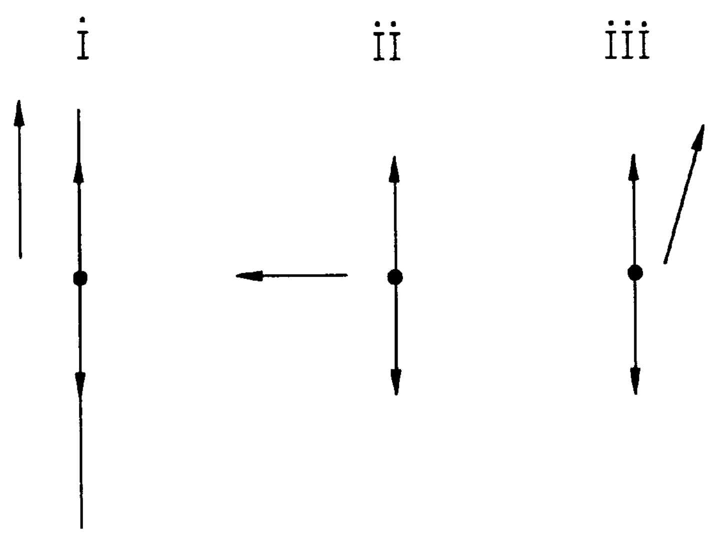
FIG. 43 shows various ray-film alignment situations for FIG. 41: i. parallel, ii. orthogonal and iii. oblique.

In the preferred embodiment shown in FIG. 32 one can apply the above reciprocating conicoid method efficiently and without visible image ghosting or intensity non-uniformity by requiring that the polarization-selective reflecting layer 498 and polarization-converting layer 492 be attached in a particular way to the curved surface of the secondary conicoid 440. This attachment should maintain proper alignment between the preferred orientations in the two layers 498 and 490 and the direction of polarization for the light rays. Since the input light rays 451 are preferably circularly polarized (LHCP), only the orientation of the selective polarizer is of concern. This polarized material (such as the 3M product referenced hereinbefore) is produced in flat sheets having a preferred orientation or direction that should be held parallel to the direction of light polarization for maximum transmission, and perpendicular to it for maximum reflectivity, as shown, for example, in FIG. 40, which depicts a typical sheet of such film. This can be at normal incidence as shown, or the reflecting layer 498 can be rotated about axis 508. When the alignment between the layer 498 and the light is not perfect, as might be the case when a flat film is made to conform to a curved surface, both transmitted and reflected beam components are introduced, as shown in FIG. 41. The problem is not due to the cylindrical curvature, as shown in FIG. 42, but rather the deformation of the preferred directions when a flat sheet is mapped onto a spherical curve, as illustrated in FIG. 41 for P2 (s-polarized) rays 510 in perfect alignment and a similar ray 512 which is mis-aligned. The implication of this behavior is that for the incoming ray 512 in FIG. 41, rather than being substantially redirected as s-polarized ray 514, some unwanted light rays 516 will be transmitted in polarization state P1 and P2. These light rays 516 will be misplaced spatially within the image, and a ghost image will result. The steeper curvature of the secondary conicoid 440, the more pronounced this effect will become nearer to its edges.

Since the selective reflecting layer 498 is made in flat sheets, their adaptation to curved surfaces needs to be done carefully. If cut and laminated to conform to the curved surface, it is possible that the film's orientation vector will point differently in different regions of the curved surface, as shown in FIG. 41. The cross-sectional cut made on the optic axis 100 (see FIG. 42) shows that all alignment vectors are well-aligned with the light's polarization vector, for every angle of incidence within the cross-sectional plane. Incident rays heading towards the rim regions of the curved surface, however, such as point b in FIG. 41, can be mis-aligned with the film's direction vector.

Figure 44:
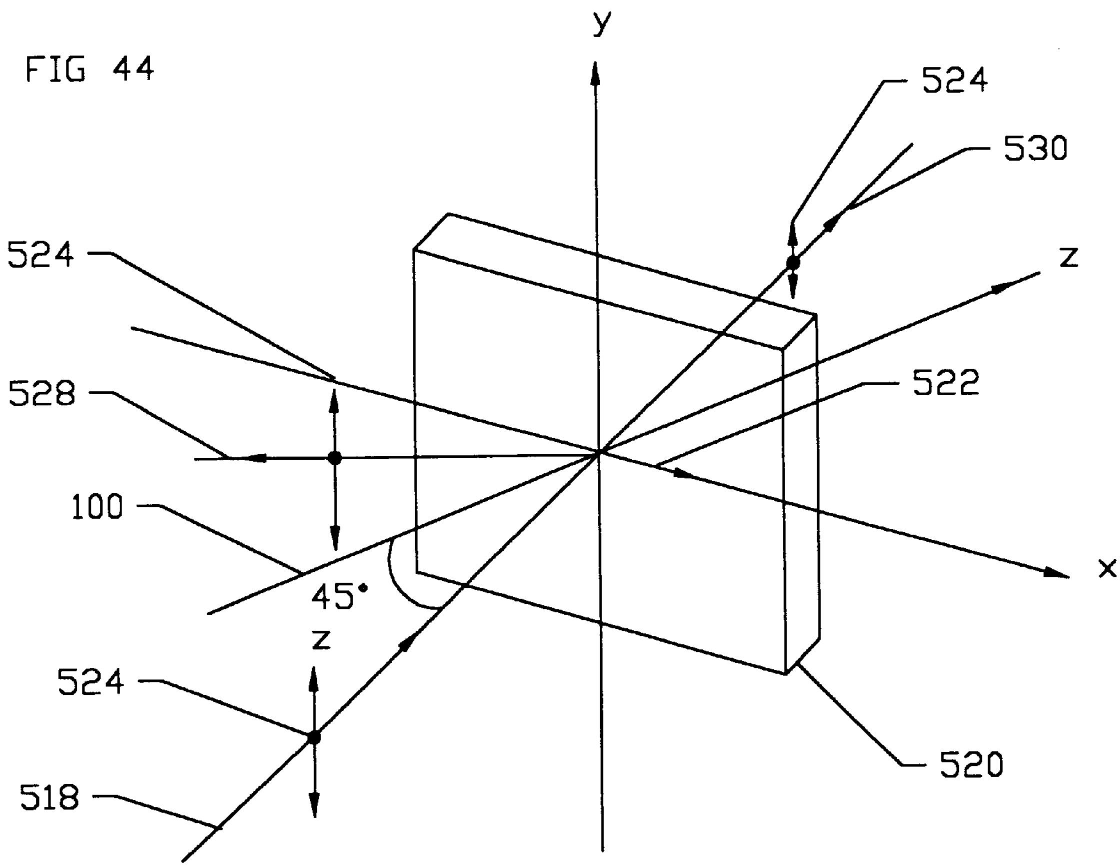
FIG. 44 shows reflected and transmitted ray splittings for obliquely incident ray of polarization orthogonal to film of FIG. 40.
Figure 45:
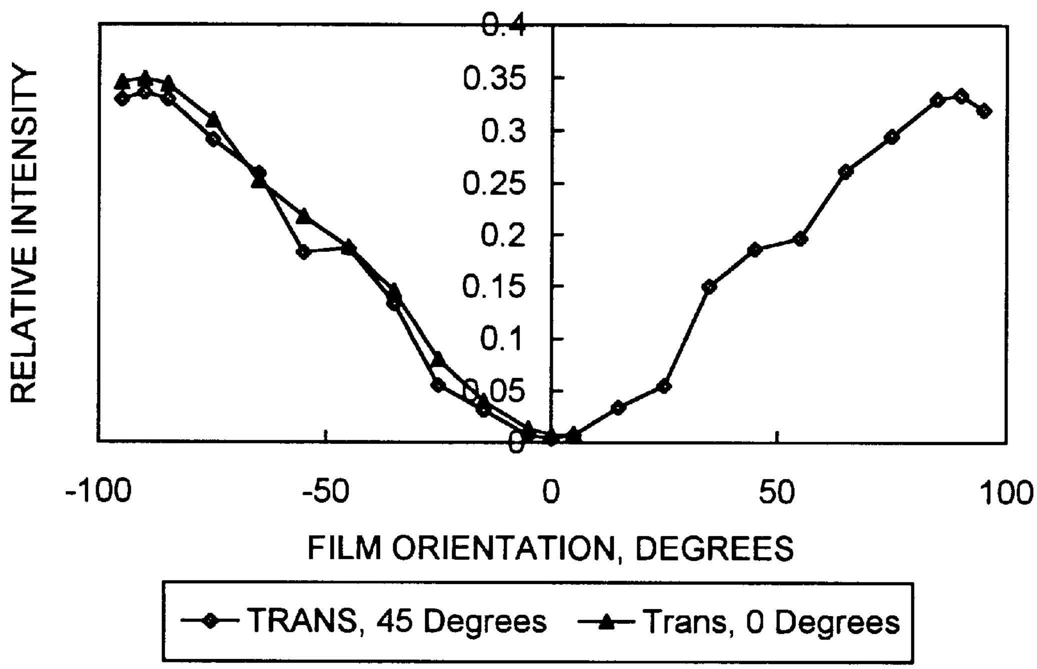
FIG. 45 shows experimentally determined reflectance and transmission data as a function of ray-film alignment angle for 0 and 45 degree angles of incidence.

Referring to the relationships shown in FIG. 44, the reflection and transmission properties of the 3M-type selective reflector film 520 are described in FIG. 45, for measurements made with a polarized HeNe laser. Curve A in FIG. 45 refers to the reflected ray 528 in FIG. 44 for the case when the angle of incidence of ray 518 is 45 degrees. Curve B refers to the transmitted ray 530 in FIG. 44 for the same angle of incidence. Curve C, however, refers to the transmitted ray 530 for the case where the incident light is normal to the film plane. Incident light 518 is taken to be in the x-z plane and impinging on the film's x-y plane initially at a 45 degree angle. The direction of polarization is shown in FIG. 44 as being 524 for each of the incident 518, reflected 528 and transmitted 530 ray components. Light intensity (reflected or transmitted) was obtained as a function of the angle made between a preferred orientation direction vector 522 of the film 520 in FIG. 40 and the x axis. The film orientation shown in FIG. 44 is 0 degrees. Polarization direction vector 524 is maintained parallel to the y axis. The film orientation angles are changed by rotation about optic axis 100, also the z axis. FIG. 45 shows that when the film orientation vector 522 in FIG. 44 and the polarization direction vector 524 also in FIG. 44 are orthogonal (film orientation 0 degrees), essentially all the incident light ray 518 is reflected as ray 528, less any absorption and scattering losses in the film 520, as in Curve A. Also shown in FIG. 45, for the same orientation, practically no incident light is transmitted as ray 530 during this condition as in Curve B. FIG. 45 shows only a minor change in transmission when the incidence angle, previously 45 degrees, is reduced to normal incidence or 0 degrees. Polarization measurements were also made to verify the polarization state, and no polarization conversion was observed. Therefore, the reflected light and transmitted light polarizations were identical to the incident polarization.

The experimental data of FIG. 45 shows that while film orientation is an important factor over large orientation changes, the performance is relatively insensitive to moderate orientation changes over at least the range designated as 471. The data associated with 0 degrees is one example. There is no measurable performance change within a 10 degree mis-alignment, and less than 10% undesired transmission within a 20 degree mis-alignment. Thus, provided the secondary conicoid 472 (the hyperboloid) as shown in FIG. 37 is not made too deep, it is possible to cut a flat sheet of material so that it will conform to the curved surface, both with a minimum number of boundaries or seams and with orientational mis-alignments held within this range.

Figures 46, 47:
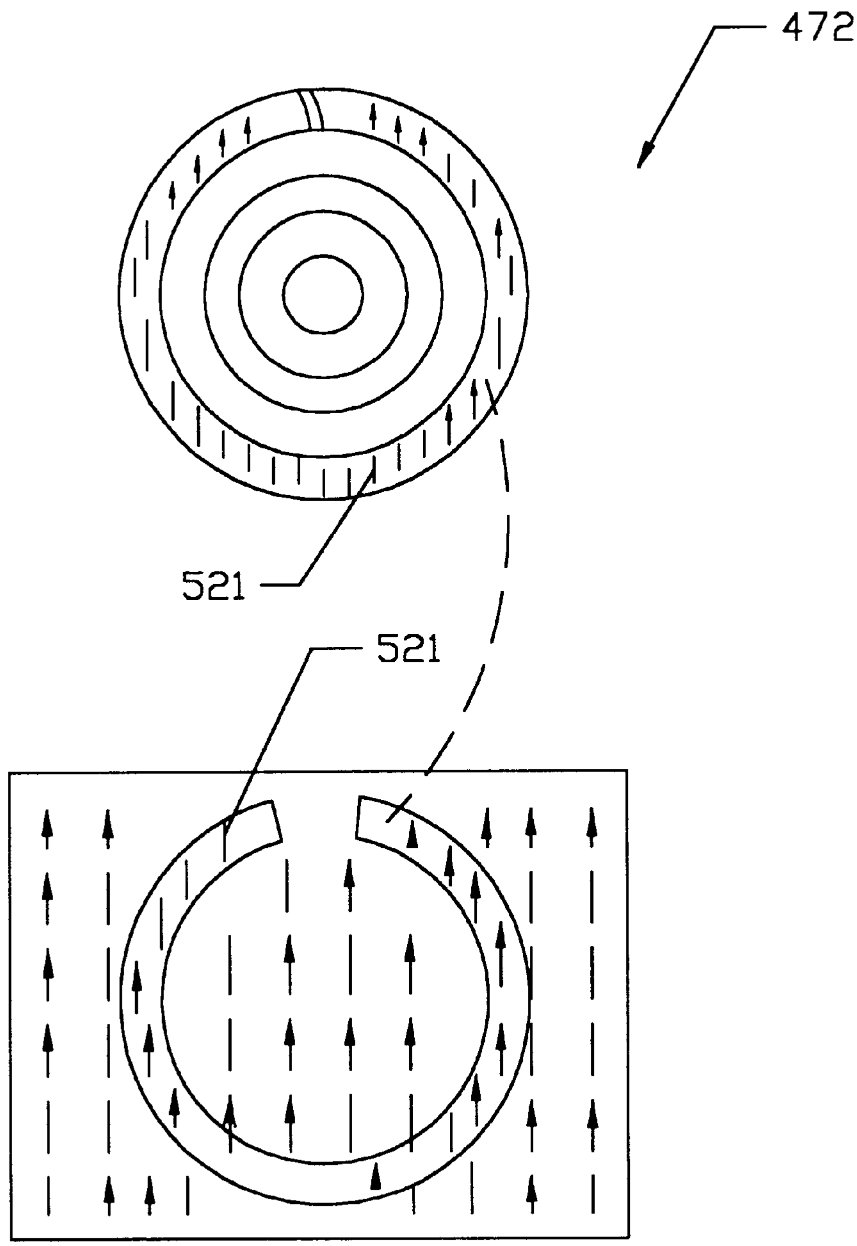
FIG. 46 shows the placement of pre-cut preferred-orientation film rings on a circumferentially-faceted secondary conicoid.
FIG. 47 shows the method of pre-cutting circumferential ring-sections of the film used in FIG. 46.
Figure 48:
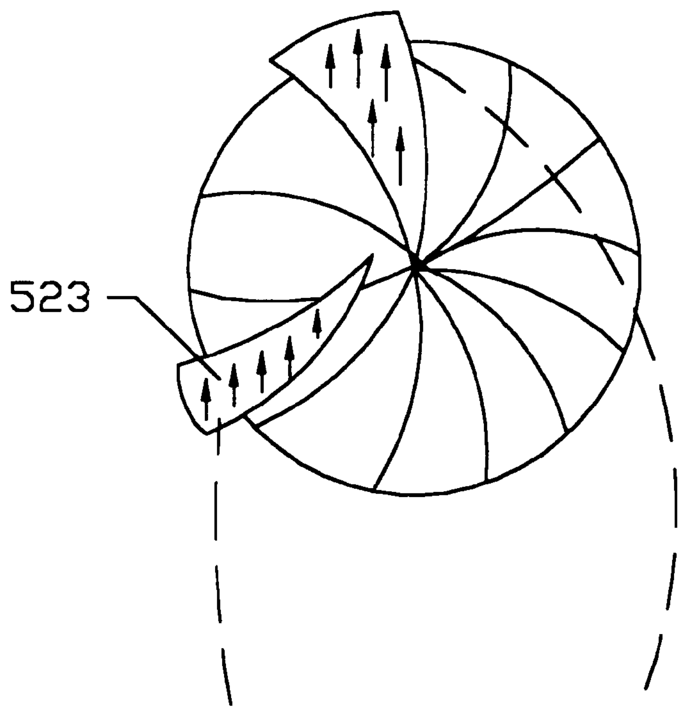
FIG. 48 shows a radially-faceted variation on FIG. 46.

One way to accomplish this preferred alignment between the polarization of the incoming light rays and the 3M-type film 520 applied to this type of slowly or weakly curving surface is to form the secondary conicoid 472 as a series of segments that can be, for example, circumferential rings 521 or radial facets 523 as shown in FIGS. 46-7 and 48-9 respectively, and then apply the properly oriented and cut film pieces 521 or 523 conforming to each region, as demonstrated in FIGS. 46 and 48. If the curvature in any given region is arranged to be slight, the initially flat though compliant plastic film pieces can be made to conform to the curvature without significant shape error, either by adhesive strength alone or with the slight additional stretching deformation that would be applied to the film substrate with the combination of heat and pressure, as in a die-press. Performance irregularities at the film boundaries can be minimized by precise cutting as with a steel-ruled (zero-clearance) die cut, and a mechanically-precise application fixture.

Since the Merck-type circular polarization selective reflecting material described hereinbefore, is not sensitive to such in-plane angular orientations, its use on the secondary conicoid 440 as the reflecting element 498, as in FIG. 32, can be preferable to the 3M-type material. In this case however, a half-wave rather than quarter-wave retardation film is used for the polarization converting layer 490 as in FIG. 32.

Using the Merck-Type selective-reflecting material 498 in place of the 3M-type, as in FIG. 32 for example, the incoming LHCP ray 451 will convert to RHCP on passing through half-wave converting layer 490, and as such would be reflected by the Merck-type material. After a second pass through the half-wave polarization converting layer 490, the ray 494 would emerge as LHCP, which would convert to RHCP as before, on reflection at the polarization converting element 436 in FIG. 32. Whenever this LHCP ray 494 is redirected back to the secondary conicoid element 440, it will be transmitted rather than be reflected by the selective reflecting layer 498, because the incoming RHCP ray will be converted to the transmissive LHCP state by passage through the half-wave layer 490.

Figure 50:
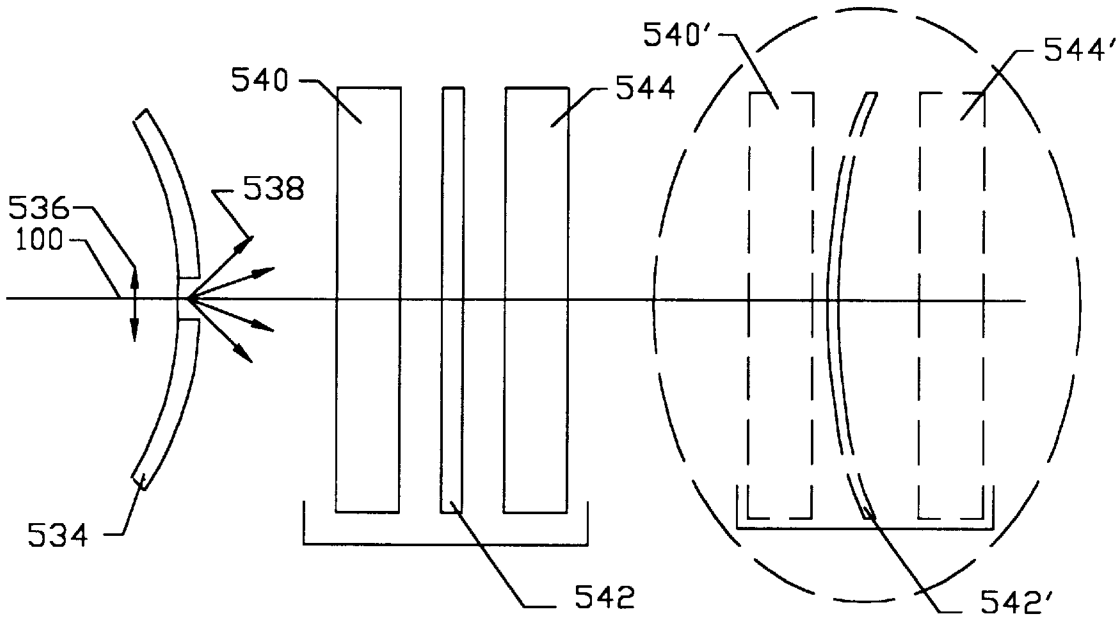
FIG. 50 shows a cross sectional view of a variation on the embodiments of FIGS. 32–38 using refractive elements polarization converting and selecting layers arranged as plane surfaces and also shown in phantom is an alternative portion for converting and selecting polarization.
Figure 51:
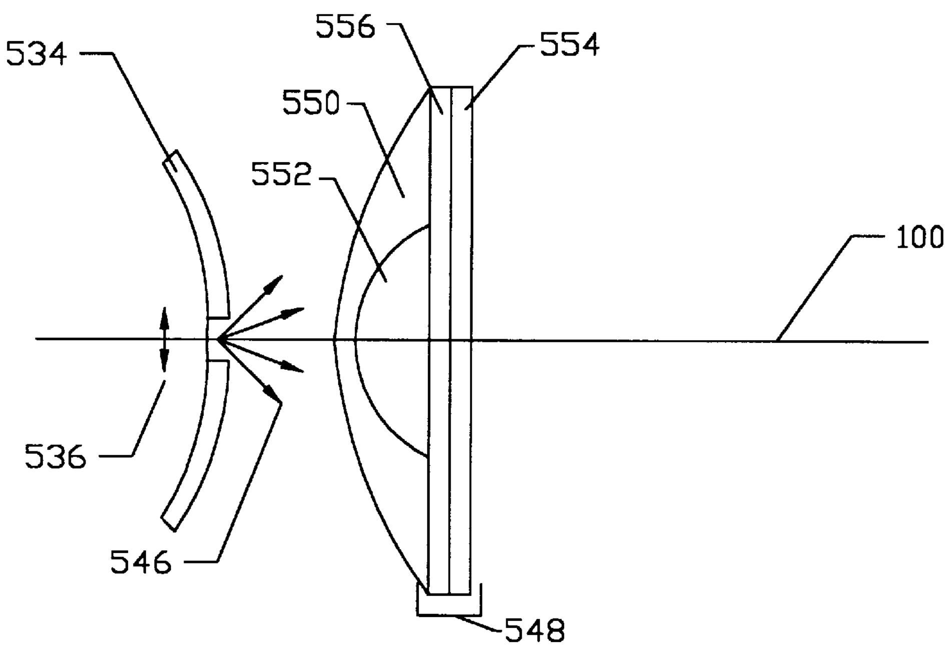
FIG. 51 shows another form of the embodiment of FIG. 50 using a curved reflector, composite positive and negative lens with flat polarization converting and selective reflecting plane.
Figure 52:
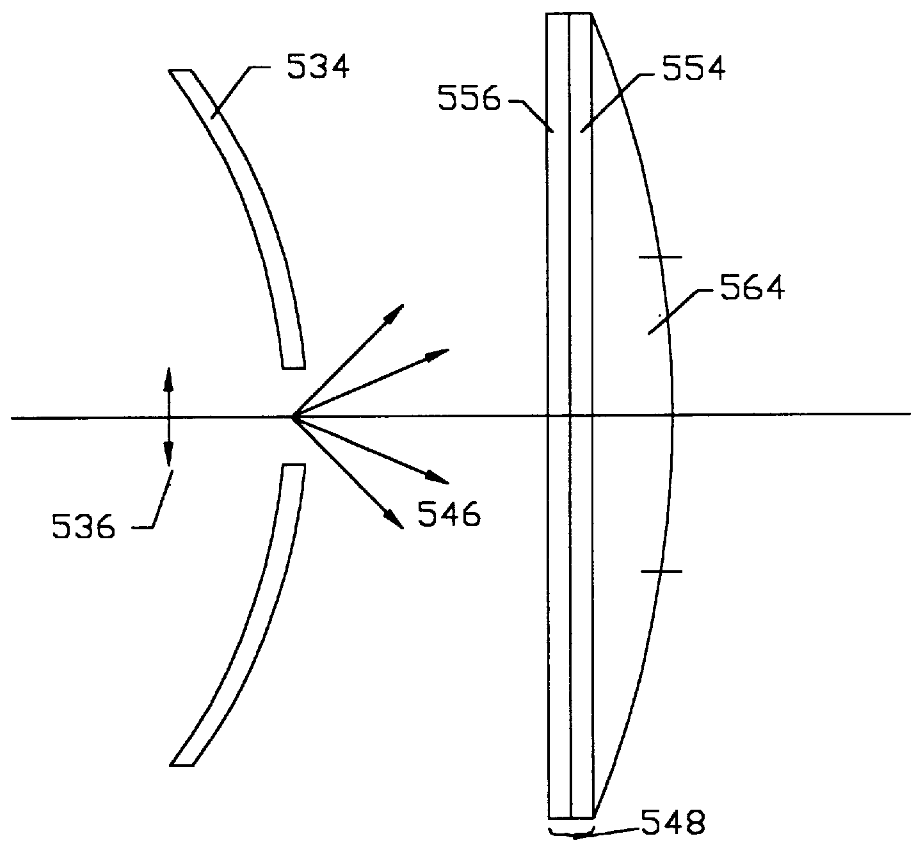
FIG. 52 shows another embodiment as in FIG. 50 using a curved reflector, flat polarization converting and selective reflecting plane with truncated plano-convex lens element.
Figure 53:
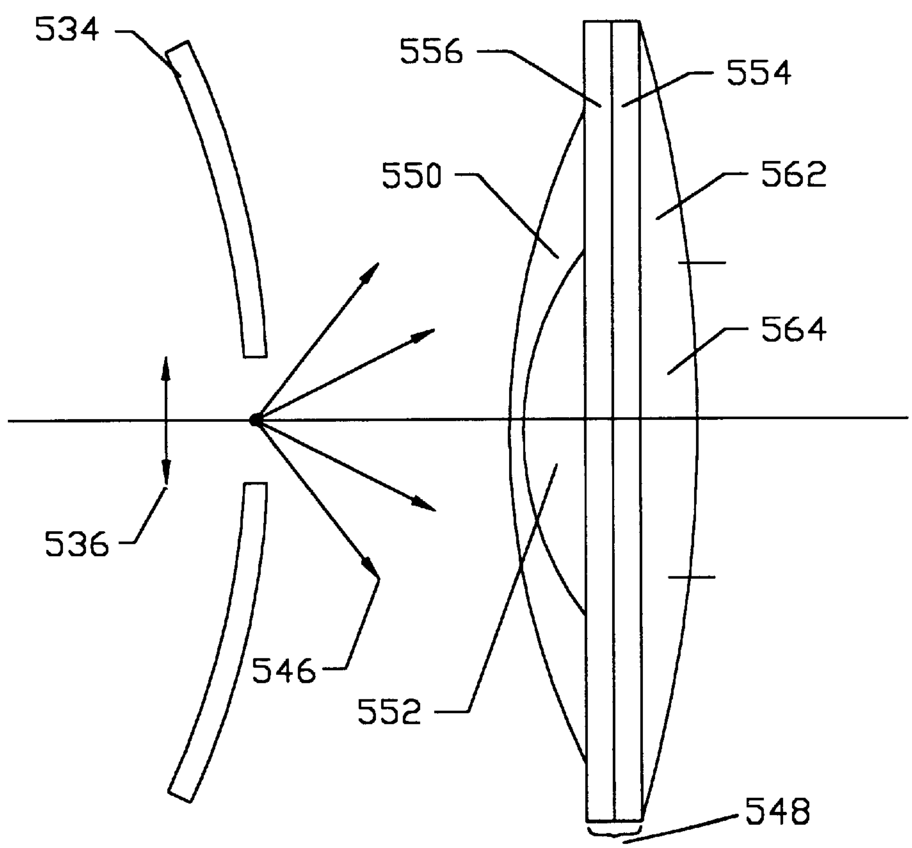
FIG. 53 shows a variation on the embodiment of FIGS. 51 and 52.

A most preferred way to assure perfect alignment between the light ray's plane of polarization and either 3M-type or Merck-type polarization selective reflecting material is to degenerate the conicoidal reflectors of FIGS. 32–38 to a curved form of the primary (polarization converting and reflecting) element 436 and a reciprocating secondary reflector element composed of a flat (or weakly curved, or a composite of flat and weakly curved) polarization-selective reflecting plane that is combined with an associated refractive element that applies the additional amount of optical power needed. This approach avoids the need for the complicated film orientation and attachment processes described above. The basic concept is illustrated in FIG. 50 for a concavely-shaped primary reflector 534, which can also include provisions for polarization conversion as above, a light inlet hole 536 corresponding to the pupil diameter, a pre-polarized light source 538 supplying either linear or circular polarization, a first refractive element 540, a flat selective reflecting plane 542 and a front refractive element 544. As shown in phantom in FIG. 50, the embodiments of elements 540, 542 and 544 can be replaced by elements 540', a weakly-curved 542', and element 544'. There are three basic forms of this variation for plane selective reflectors 554 as shown in FIG. 51–53: a curved primary conicoid converting element 534 and a composite secondary element 548 composed of (i) a composite lens 550 with air-gap 552, a polarization selective reflector 554, a quarter-wave converting element 556 and a circularly polarized image source 546 (FIG. 51); (ii) the polarization selective reflector 554, the quarter-wave converting element 556, a composite lens 562 (with weak center section 564), and the circularly polarized light source 546 (FIG. 52), and (iii) the composite lens 550, the polarization selective reflector 554 and converting element 556 and the composite lens 562 (FIG. 53). Many other related variations are possible when the polarization selective reflector 554 is deliberately curved over its entire surface, or only in certain sections. In these cases, the power of the refractive elements can be weakened proportionally. Moreover, the curvature of the element 554 can be used as a correction on the design of the composite refractive elements.

Figure 54:
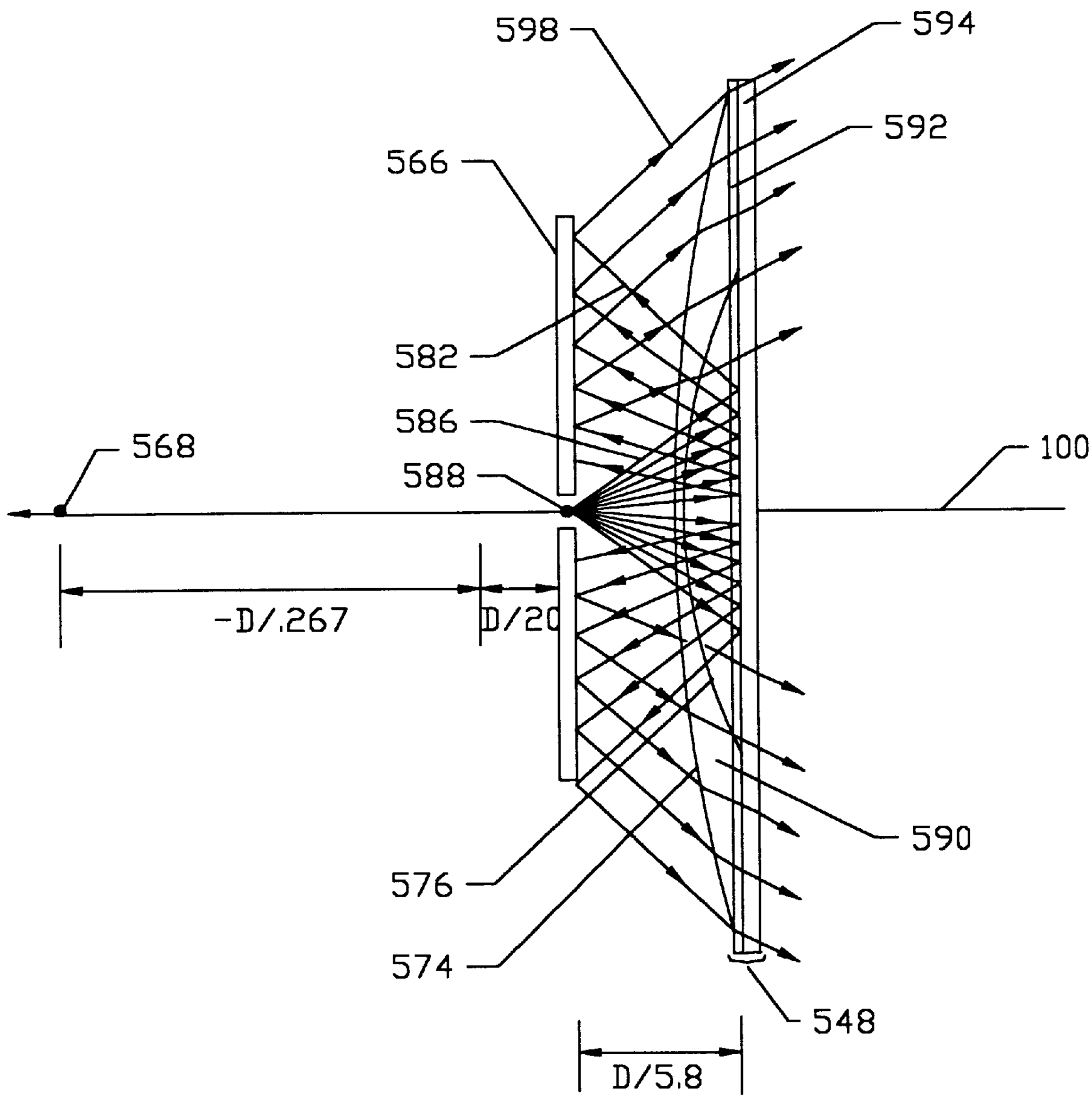
FIG. 54 shows an example form of the embodiment of FIG. 51.

In the illustrative design of FIG. 54, primary conicoid 566 is analogous to the structure in FIG. 32, except it is now a very shallow and mildly convex paraboloid surface with a focal point 568 shown and vertex 570 on the optic axis 100 at minus D/0.267 and D/20, respectively. A reciprocating secondary reflector element 572 is a composite of a positive lens 574 and a negative lens 576, shown appearing net negative for the central portion of incoming angular rays and its retro-reflected components, and net positive for the higher angle retro-reflected components. The outer surface of this composite lens 574, 576 is, for example, a hyperboloid with foci at coordinate points (D/4, 0) and (0, 0) and point (D/5, D/2) on the surface. The interior (negative) portion of the composite lens 612, 614 is, for example, also a hyperboloid with foci at coordinate points (D/5, 0) and (D/20, 0) and point (D/4, D/2.5) on the surface. In addition, proper adjustment of the aspherizing terms of one or more of these conicoidal surfaces is conducted so that the conditions for sharpest focus are achieved at the projection screen 26. As one example, adding aspherizing terms to the hyperboloidal surface function of the interior portion of the lens 576 described above can be accomplished so that the effect of those terms is to change the slope of trailing portion 578 of the function more significantly than interior portion 580. By this means, higher angle ray trajectories, such as trajectories 582, will be affected differently than lower angle ray trajectories 584 which will be more heavily influenced by the interior portion 580. This adjustment compensates for the fact that lower angle ray trajectories make three passes through the interior portion 580 of the negative lens 576, whereas the higher angle trajectories 582 make only two passes versus three passes. Because of the finite range of angles around each principal ray, the sharp transition between the net negative lens portion and the net positive lens portion can result in a blurred image for the corresponding radial transition region, which might appear as a thin ring visible to the viewer on the projection screen 26. This thin ring corresponds to the angular width of the negativeto-positive lens transition region. Accordingly, and as one means of avoiding this potential artifact, the associated transition region can be significantly reduced by applying the same closure techniques developed earlier for the elimination of the central hole, see FIGS. 21–28. These closure techniques involved the electronic programming of the SLM 14 so as to relocate any image information within the affected spatial range elsewhere within the SLM's active region, and arranging all image pixels so that a complete and well organized image results upon the closure of the affected or "black-ray" spatial regions. Previously, such a region corresponded to the in-coming beam's central core. Adding an additional region, such as the composite lens' transition ring, can be implemented at the same time. The Fresnel-like prismatic beam displacement method of FIGS. 26–28 used to close the beam's interior core can be used equally successufully to close a radial ring Illustrative LHCP ray 586 in FIG. 54 passes right to left through the pupil-sized window 588 in the primary conicoid 566 heading towards the positive lens 574. Upon arriving at the lens 574, the ray 586 refracts just slightly through refractive media 590, then refracts downward and out through the surface of the negative lens 576 upwards into air, while heading obliquely towards a sequential polarization converting layer 592 and selective reflecting layer 594 of planar element 596. The LHCP ray 586 thus converts to P2 on passing through a quarter-wave form of the polarization converting layer 592, reflects off the plane surface of an underlying 3M-type of the selective reflecting layer 594 and then back through the converting layer 592 towards the negative lens 576 and positive lens 574 and the interior reflecting surface of the primary conicoid 566 as the higher angle trajectory LHCP ray 582. On striking the primary conicoid element 566, the LHCP ray 582 converts to RHCP and heads back towards the composite secondary (the secondary reflector element 599) as ray 598. After its composite refraction, the ray 598 converts to P1, and then passes outwards, obliquely, through the selectively reflecting layer 594 and encounters the same set of sequential output elements applicable to the invention of FIGS. 37 and 38. Moreover, the beam displacement methods, hinging and ogiving, described above, can be applied equally effectively.

Not only does this arrangement simplify the use of 3M-type of reflecting film, but it does so without any compromise in cabinet compactness, all elements fitting within a cabinet depth D/5.8. Although the secondary conicoid in this variation seems to extend over the entire output aperture, it does not eliminate the possiblity of the ring-like boundary edge discussed above, and the methods described above can be used to remove visible artifacts.

Figure 55:
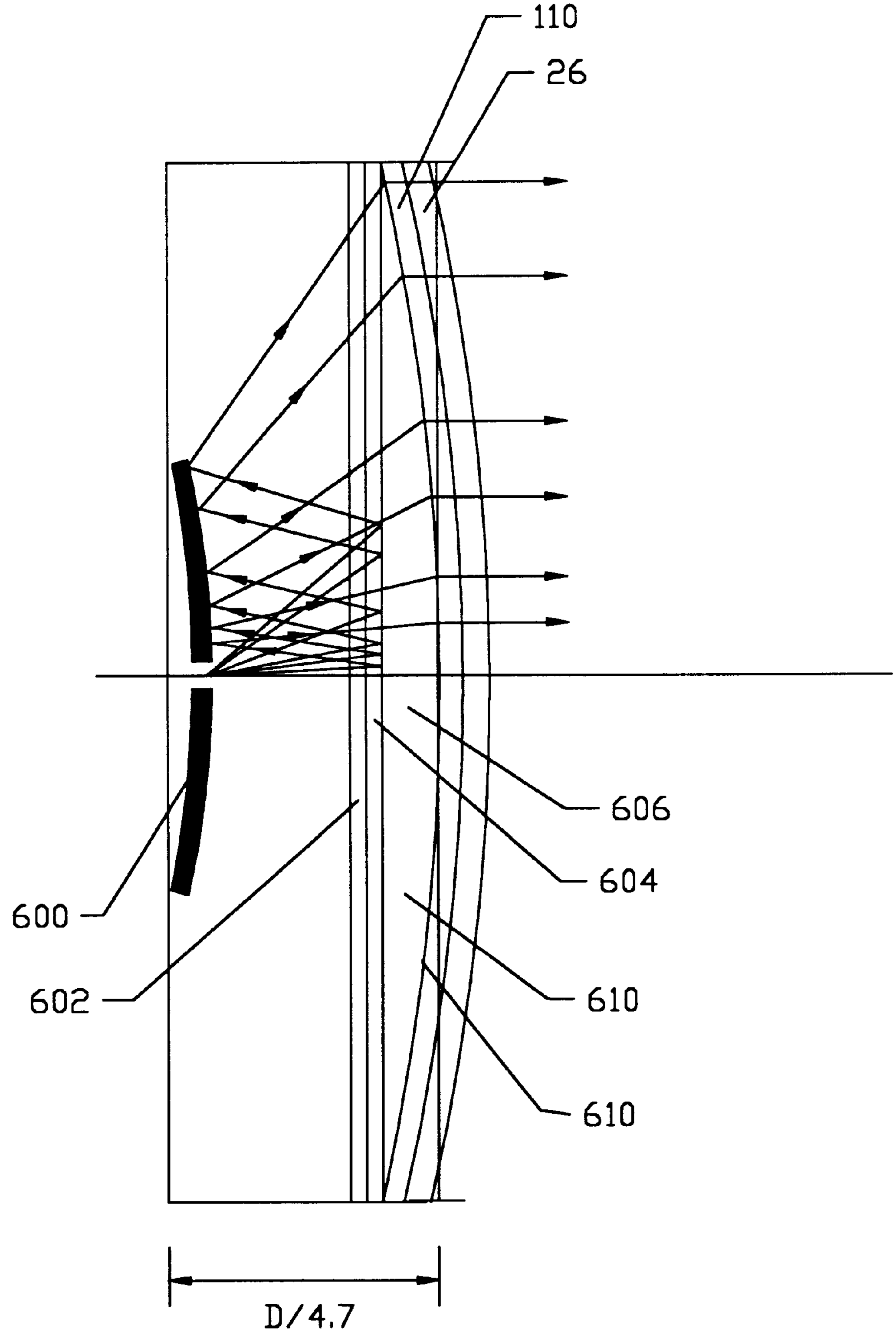
FIG. 55 shows another example form of the embodiment of FIG. 52.

One other example of the refractive variation is illustrated in FIG. 55. In this case, a more severely convex paraboloidal primary reflector 600 is combined with a polarization-converting layer 602 and 3M-type polarization-selective reflecting plane layer 604 mated with a truncated plano-convex positive lens 606 having a hyperboloidal refracting surface 608. In this case, the negative power is generated by the parabola, and neutralized at the outer portions of the system by the annular positive lens 610 formed by truncating a plano-convex lens. The effect is a diverging set of output rays that must be managed in the manner of FIG. 37. This arrangement fits within a cabinet depth, t, of D/4.7 which is not quite as compact as the example of FIG. 50 but can be easily implemented. Moreover, as the secondary reflector elements of this method contain no interior boundary region of the type involved in FIG. 50, no electronic and beam-displacement correction techniques are used, other than those related to correcting for the input beam's interior hole. Yet, preferable designs can apply asphersing terms to the surface of the positive lens 610, as well as to the primary reflector 600, so as to produce the most uniform output beam cross-section possible. Tailoring the conicoidal asphierizing terms provides an additional degree of freedom to correct for non-uniformities.

The diverging set of output rays from the positive lens 610 are converged towards the optic axis 100 by the Fresnel lens 110 as before. This lens 610 can be planar, as in all previous applications, or curved, to follow the mild curvature of the plano-convex lens, preserving space and the boarderless output projection desired. In addition, the hole-hiding method of FIG. 24 is applicable in this case as well, with the requisite beam displacement achieved through tilting or ogiving the primary reflector 600, as before, or by inserting a beam displacer between the Fresnel lens 110 and the projection screen 26.

Preferable embodiments of each image folding optical system 10 described above, depend on utilizing the reliable performance of the wide band polarization-selective reflecting film materials. Reliable performance, in turn, depends on two critical polarization-selective film characteristics: (1) the ability of the film to block even trace leakage of the reflected polarization state from the transmitted beam's orthogonal polarization, and vice versa, and (2) polarization selectivity at oblique versus normal angles of incidence. In either case, however, our main concern reduces to dealing with whether any fraction of light that should be blocked from transmission, such as, for example in FIG. 32, the ray 451, actually penetrates through as premature output rays 612, and otherwise shows up as part of what would be seen as a ghost image. The extent to which leakage is a factor was evaluated by making actual transmission and reflectivity measurements with developmental-stage samples of the previously described 3M-type material using a polarized HeNe laser. It was found that when aligned for maximum reflectivity, it is possible that as much as 10% of the reflected light can leak through as transmitted output. Moreover, the percentage leakage is greatest at lower angles of incidence and is reduced at higher or more grazing angles of incidence.

Figure 57:
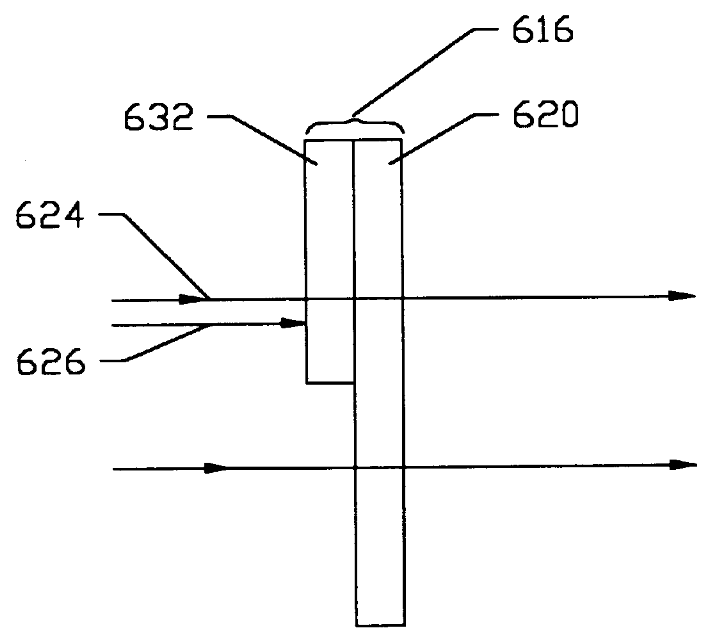
FIG. 57 shows a system like FIG. 56 but with split converting film and continuous polarizer.

There is, however, a relatively straightforward polarization-selective means for blocking leakage light from reaching the projection screen 26 and creating unacceptable image anomalies. As shown in FIG. 57 a special clean-up filter element 614 can be added to the optical system 10 at any beam location after the polarization-selective reflector that is prone to leakage, so as to block (reflect or absorb) the leaking polarization state before it contaminates the preferred image on the projection screen 26. In FIG. 55, the diverging set of output rays from the positive lens 610 are converged towards the optic axis 100 by the Fresnel lens 110 as before. This positive lens 610 can be planar, as in all previous applications, or curved, to follow the mild curvature of the plano-convex lens, preserving space and the borderless output projection desired. In addition, the hole-hiding method of FIG. 24 is applicable in this case as well, with the requisite beam displacement achieved through tilting or ogiving the element 600 as described before, or by inserting a beam displacer in-between the Fresnel lens 110 and the projection screen 26.

Figure 56:
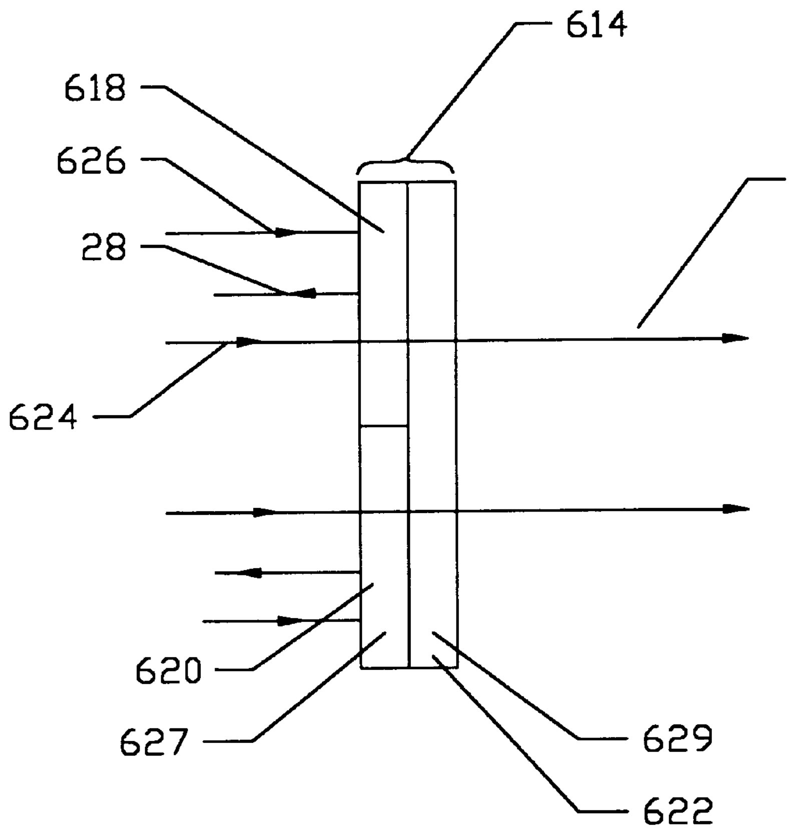
FIG. 56 shows a polarization filtration element for split-image projection system with split polarizer and continuous substrate.

Consequently, in order to block leakage light, one can arrange a polarizer film element in the output beam path such that it is always crossed at 90 degrees with the undesired beam polarization. Two example designs for accomplishing this are illustrated in FIGS. 56 and 57. The choice of system location for such design elements depends on the system embodiment, and whether the embodiment is of the split-image or single-image format. For purposes of illustration of the basic concept of the embodiments, the clean-up filter element 614 or second filter element 616 is presumed to be located just to the left or right of the projection screen 26, as in the split image system example of FIG. 1A.

In the split-image methods, for example, of FIGS. 1A, and 7–13, the filter element 614 in FIG. 56 is composed of two sections of polarizer materials 618 and 620, each made of either wide band reflective polarizer such as the 3M-type film, or preferably, any one of the highly-transparent and discriminating industry-standard absorbing polarizer films used commonly in flat-panel LCD displays (such as the NPF series manufactured by Nitto Denko). These two sections are precisely cut and laminated to a continuous section of transparent substrate film 622, with the substrate film 622 facing the projection screen 26. Absorptive polarizers are generally preferred over reflective ones for the polarizer section materials 618 and 620, as absorption effectively extinguishes the unwanted rays, whereas on reflection, the unwanted rays can introduce preferentially concentrated regions of background light that might reduce system contrast and uniformity. Light rays incident on the polarizer section materials 618 and 620, each come from either the upper half of the optical system 10, or the lower half, and as such have specifically preferred polarization states. Upper half light rays, such as rays 624, have already passed through the upper half of the image of the SLM 14, and are preferably of polarization state P1. Consequently, the clean-up polarizer section material 618, is oriented to maximize the transmission of P1 while minimizing the transmission of P2 (either by reflectance or absorption). In this manner, and self-consistent with the earlier descriptions, the polarizer section material 618 also could be a reflective polarizer material. The polarizer section material 618 could preferably be an absorptive polarizer aligned properly to pass P1. So, any orthogonally polarized P2 rays, such as rays 626, that have either been misdirected by the optical 10 system or that appear intrinsically as leakage through a reflective polarizer, regardless of the reason, and inadvertently strike the polarizer section material 618, would either be reflected as ray 628 or absorbed within the polarizer section material 618, but not transmitted to the projection screen 26. Moreover the depth of rejection can be significant. Absorptive polarizers are far more discriminating than the 3M-type reflective polarizers. As a lower bound, however, we can assume that there has been 10% leakage, and it is being blocked by an appropriately leaky crossed polarizer. In this case, the leakage level would drop from 10% to 1%. Using a high-quality absorption polarizer, such as those used in conventional flat-panel LCD displays, the comparable leakage level is so much lower that if used instead, the projection screen 26 contamination level would drop to a level that is negligible in even the most demanding viewing situations. Similarly, the polarizer section material 620 would be made to reject misdirected rays of polarization P1. Standard anti-reflection coatings can be applied to input surfaces 627 and output surface 629, to reduce Fresnel losses from rays such as the rays 624 and 626. Since this cleaning filter element 614 can be positioned either in front of or behind the Fresnel lens 110, an embodiment can involve laminating substrate output surface 629 directly to the back surface of the Fresnel lens 110, thereby eliminating the possibility of Fresnel losses at that interface.

Another embodiment of the clean up filter element 614 of FIG. 56 is shown in FIG. 57, as second filter element 616 in which a single section of the polarizer covers both the upper and lower portions of the element 616, and is used as the substrate layer. Proper polarization-selective blockage is provided by applying a half-wave converting element 632 over one half of the aperture. One preferable form of the half-wave polarization-converting element 632 is a wide-band, half-wave retardation film, as described above. In this case, the polarizer material 620 has been aligned to pass polarization P2 and reflect/absorb polarization P1, and the converting element 632 has been aligned so that polarization P1 is converted to polarization P2. Accordingly, the upper half ray 624 in polarization state P1 is converted to P2 on passing through the converting element 632, and then passes through the polarizer material 620. Note that the converting element 632 has been applied only over the top half of the polarizer material 620. Any misdirected light of polarization P2, such as the ray 626, however, falling on the upper half of the second filter element 616, is converted to polarization P1 on its passage through the converting element 632, and is therefore blocked by the polarizer material 620. The same clean-up methods can also be applied to orthogonal states of circularly polarized light. For example, one continuous quarter-wave polarization-conversion layer could be added to the input surface 627 of the design in FIG. 56. Adding such a layer would convert any state of circular polarization to its corresponding state of linear polarization by virtue of applying a quarter-wave of phase retardation. Once so converted, the clean up filter 614 performs otherwise as already described hereinbefore.

The embodiment of FIG. 57 can also be modified for circular input polarizations as well, by adding a continuous sheet of quarter-wave conversion material in between the element 632 and the polarizer material 620. In this case, the upper ray 624 is right hand circularly polarized in FIG. 57, and becomes LHCP on passing through the converting element 63, and then sequentially becomes polarization P2 after passing through the inserted quarter-wave layer. Converted to P2, the ray 624 is able to pass through the polarizer material 620 as it was for the case of linearly polarized light.

The projection screen 26 example of FIGS. 56 and 57, while the safest location choice for such protection, is perhaps the least efficient choice for such a protection device. Such a location requires the largest area coverage and a single device split into two precise sections, and thus can be costly to manufacture. In the case of the optical systems 10 of FIGS. 1A, and 7–13, these embodiments preferably use the location of FIGS. 56 and 57. The optical systems 10 of FIGS. 32–38 offer the ability to reduce the filter area, as the clean-up filter 614 preferably is on the output side of only the secondary conicoid (440 in FIG. 38).

In another form of the split-image projection system inventions of FIGS. 1A, and 7–13, additional elements can be provided to assure that only light representative of the upper image region 82 of the SLM 14 in FIG. 1A, reaches the upper image portion 86 of the projection screen 26, and correspondingly, that only light representative of the lower image region 84 of the SLM 14 in FIG. 1A, reaches the lower image portion 88 of the projection screen 26. Any trace rays passing through the lower image region 84 of the SLM 14 that become part of the upper beam 94, or any trace rays passing through the upper image region 82 of the SLM 14 that become part of the lower beam 96, are misdirected and will cause undesirable false images to appear on the projection screen 26. It is therefore desirable to remove all traces of such unwanted polarization from the final image. In addition to the general clean-up filter method described in FIGS. 56 and 57 above, the buffer zone 148 of FIG. 2 is created deliberately within the image of the SLM 14 using the electronic preprogramming methods that follow in order to separate the upper image portion 86 from the lower image portion 88 in an unambiguous manner. It is most likely that some of the rays passing through an infinitesimal boundary region would be misdirected. Rays passing through this small but fmite buffer zone 148, however, will deliberately not be applied to the projection screen 26 by the optical system 10, in FIG. 1A. The system 10 will realign the upper and lower image portions 86 and 88 as if the buffer zone 148 did not exist.

In another aspect of the invention, the physical arrangement and electronic programming of the SLM 14 can be advantageous. One preferred manipulation of the SLM 14 relates to the polarization-selective split-image methods of the inventions of FIGS. 1A, and 7–13. In these cases, orthogonal states of prepolarized light pass through the upper and lower image regions 82 and 84 of the SLM 14, as in FIG. 1A. When the SLM 14 is not polarization sensitive, such as is the case with a Digital Micromirror Device (DMD) or with a polymer dispersed liquid crystal (PDLC) device, no special physical precaution is needed. When the SLM 14 is polarization dependent, such as is the case with conventional liquid crystal devices (LCDs), some minor modification is desirable to assure compatibility.

Figure 58:
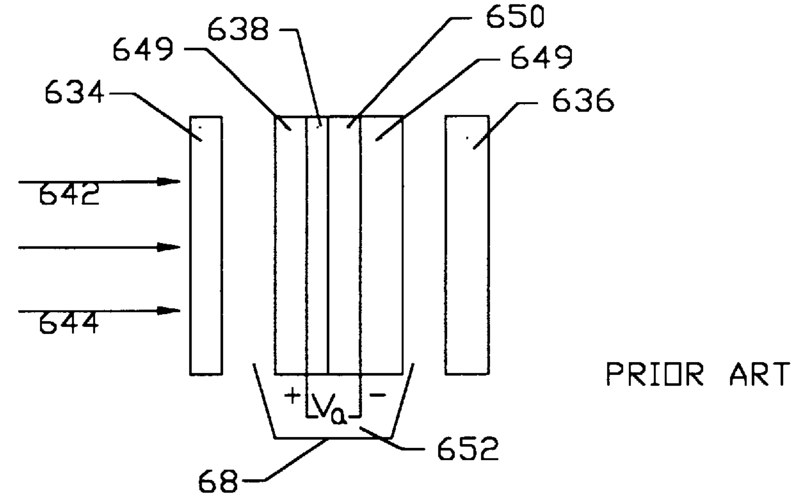
FIG. 58 illustrates a conventional LCD structure cross-section.
Figure 59:
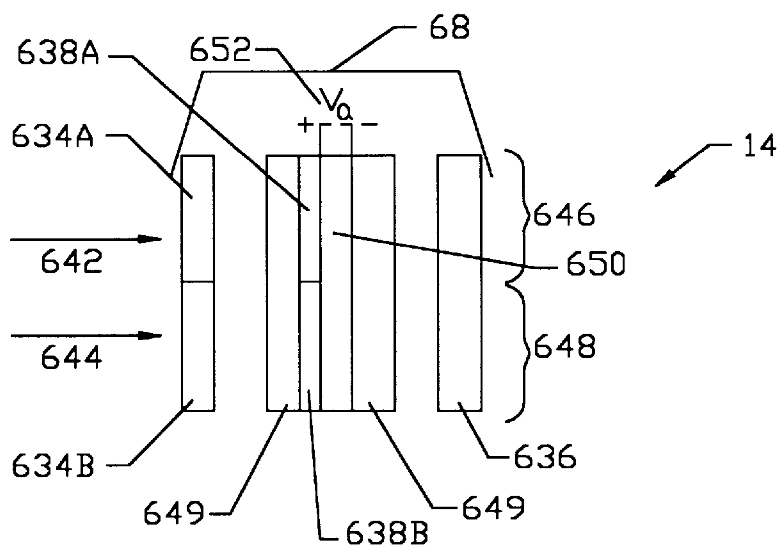
FIG. 59 illustrates split-image form of FIG. 58 with split input polarizer and split alignment layer.

Ordinarily, as shown in FIG. 58, input polarizer 634 of an LCD form of the SLM 14 assures that only light of one preferred polarization state passes through the LCD. Bright LCD pixels are then defined by the LCD's action on the light allowing it to pass through an output polarizer (or analyzer portion) 636 of the LCD 14. Dark LCD pixels are then defined by the LCD's action on the light, preventing it from passing through the output polarizer 636 of the LCD. The LCD form of the SLM 14 also contains an internal alignment layer 638 located on one of the LCD's two glass plates 649 that has been preconditioned (mechanically) so as to exhibit a preferred alignment direction for the liquid crystal layer that is related to the orientation of the LCD's input polarizer 634. This preferred alignment is equivalent to establishing a preferred direction of the plane of input polarization. When input rays 642 and 644 from the light source 12 are differentially polarized as in FIG. 62, a conventionally prepared LCD used with this input light could be optimally aligned internally only in one region. As shown in FIG. 59, to avoid such a mismatch, the LCD 14 can be pre-aligned differently in each of its upper region 646 and lower region 648. Since the LCD's alignment layer 638 is processed automatically during manufacture, and the development of micro-alignments (multidomains) have become routine, developing two orthogonally aligned LCD regions, such as the regions 646 and 648, is not a difficult requirement. Moreover, any LCD whose alignment direction is at 45 degrees to the plane of input polarization can be made to operate optimally with two regions of orthogonal input polarization.

Figure 60:
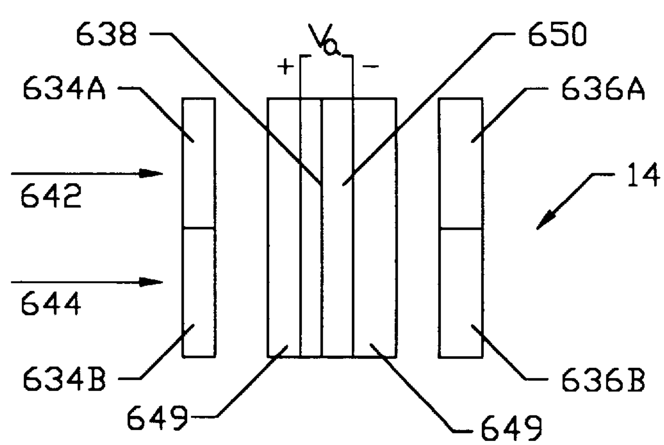
FIG. 60 shows another form of FIG. 59 with split input and output polarizers.
Figure 61:
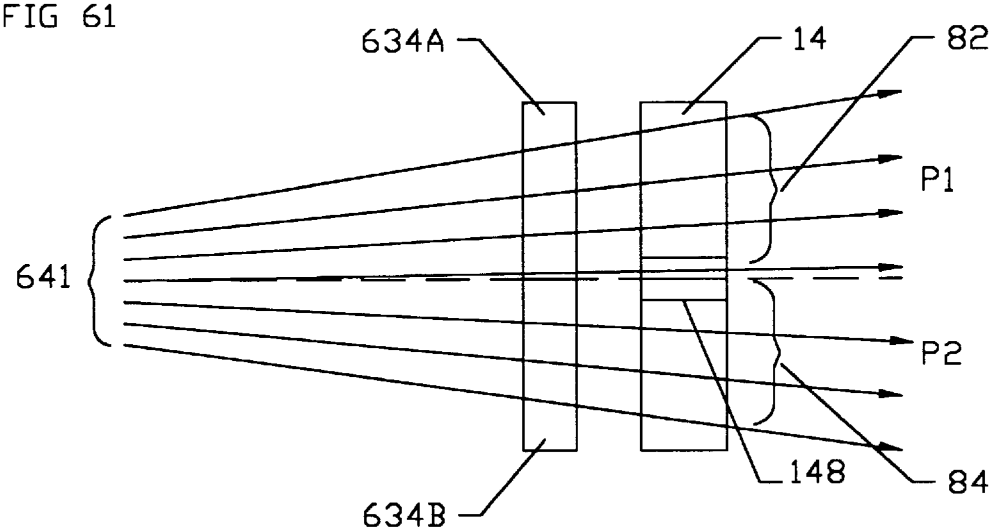
FIG. 61 shows a cross-sectional view of the pre-polarization of unpolarized input light for a split-image LCD with a buffer zone.
Figure 62:
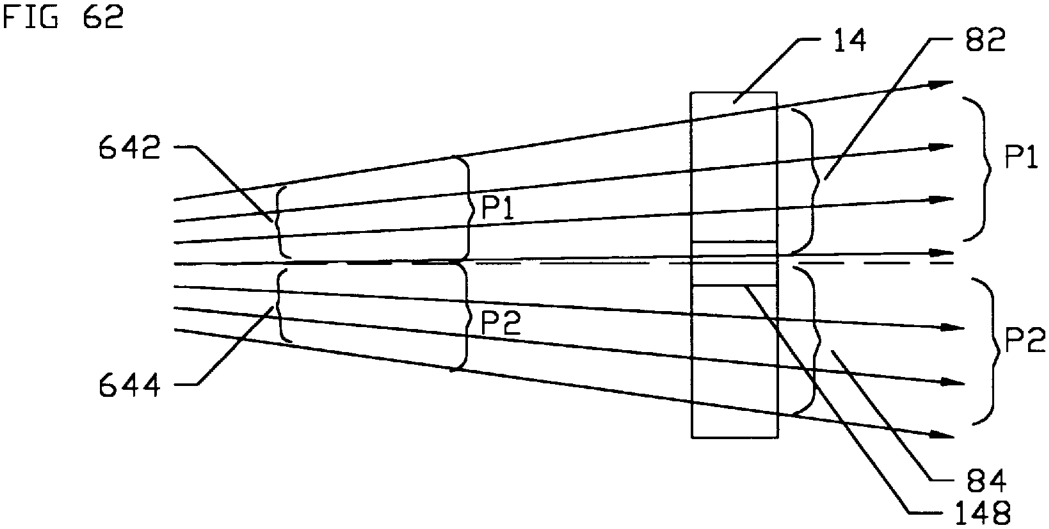
FIG. 62 shows the cross-sectional view of orthogonally-polarized input light used with a split-image LCD with buffer zone.
Figure 63:
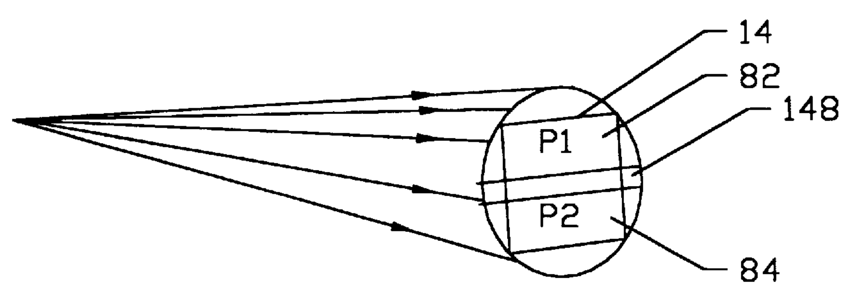
FIG. 63 shows a perspective view of the spatial overlap between a circular input beam and the rectangular aperture of the split image LCD systems of FIGS. 61-62.
Figure 64:
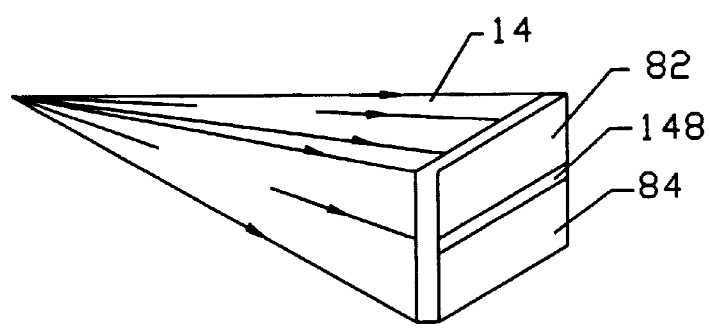
FIG. 64 shows a perspective view of the spatial overlap between the rectangular illumination beam and rectangular split-image LCD.
Figure 65:
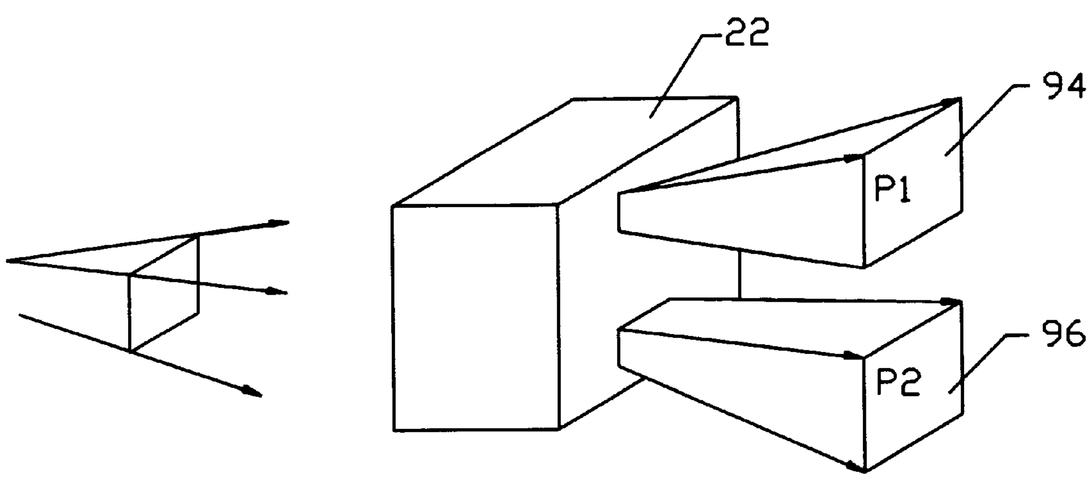
FIG. 65 shows a perspective view of a split-image LCD's rectangular output beam and polarization-sensitive beam-splitting.

Whether the LCD's input light 641 is unpolarized, as in FIG. 61 by input polarizing elements 634A and 634B or is pre-arranged to be in two orthogonal states 642 and 644, as in FIG. 62, an attached input polarizer 634 is preferably used. If the input polarizer is not needed to polarize input light as in FIG. 62, then it can be added to assure that no pre-polarized input light of the wrong polarization state is able to leak through, contaminating otherwise purely polarized light. For the embodiment of FIG. 61 and 62, this input polarizer 634 cannot be applied across the whole LCD aperture, as is conventionally done, but rather it is preferably applied as two separate and orthogonally-aligned input polarizer layers 634A and 634B. These polarizing elements 634A and 634B are applied across the LCD's input aperture as done in FIG. 59, 60 and 61. Steps must be taken, as previously discussed depending on the type of the LCD 14, so that, despite the bifurcated input polarization, the LCD 14 properly displays a consistent output image. FIG. 61 presumes the unpolarized light 641 of circular cross-section becomes polarized by the action of the bifurcated LCD input polarizers of FIGS. 59, 60 or 61. FIG. 62 also presumes a circular input beam, but one that has been pre-polarized, the upper half in polarization state P1 and the lower half in the orthogonal state P2. The overlap of this circular beam cross-section with the rectangular LCD (or SLM) 14 is shown in FIG. 63. When the pre-polarized input beam is arranged to have a rectangular cross-section, as in FIG. 64, the overlap with the LCD (or SLM) 14 is much improved. The polarized output beam of FIG. 64 is then processed by the action of the polarizing beam-splitter 22, as in FIG. 65, which properly sorts the orthogonal polarization states into the two separate output beams 94 and 96, one corrsponding to light that was passed through the LCD's (or SLM's) upper region 82, and another corresponding to the LCD's (or SLM's) lower image region 84.

One common type of LCD layer 650 (see FIG. 58), can be a super twisted nematic (STN), which is normally birefringent in the absence of an applied voltage 652, Va, applied across any or all pixels. When this sufficient voltage 652 is applied, the birefringence (present where an electric field associated with the voltage exists) drops to zero. The LCD's internal alignment layer 638 (see FIG. 58) is formed so that the intrinsic birefringence is aligned properly with the plane of input light polarization such that, for example, the upper image light ray 642 passing through the upper half of the LCD 14 (on passing through the LCD layer 650), undergoes one half-wave (90 degrees) phase retardation. The associated rotation of the plane of polarization for the light ray 642 causes, for example, complete blockage by the LCD's output polarizer 636, and the alignment, in this case, is made orthogonal to that of the input polarizer 634. As such, those pixels that do not receive this applied voltage will appear black; and those pixels that do receive the voltage will appear white (or take on the color of any included color filter). The reverse operation is also possible. In the illustrative case, the orthogonally polarized lower image input ray 644 will not give the same result, unless either the LCD's alignment layer 638 is bifurcated, as described above, and aligned so that the LCD's birefringence in the lower half of the device is aligned properly for the orthogonally polarized light. Alternatively, as seen in FIG. 60 the LCD's output polarizer 636 is bifurcated, and the lower half 636B is rotated with respect to the upper half 701A by the proper amount to cause the same degree of light blockage in the lower half of the device as in the upper half of the LCD 14. The LCD 14 can also be of the active-matrix or TFT type, where the LCD layer 650 is normally transparent with no phase retardation or optical activity occurring in the absence of the applied voltage 652 (see FIG. 58). The plane of input polarization rotates with the application of the voltage 652 by 90 degrees, and a similar situation exists with that of the LCD layer 650.

The level of the voltage 652, $V_a$, applied to each of the pixels making up the LCD's image determines whether the pixel appears colored (i.e., white, red, blue, green) or black, by determining the level of light intensity or brightness measured when considering light from each individual pixel. In most cases, one LCD is used for each of the three primary colors. In some cases, a single LCD has colored sub-pixels.

Figure 66:
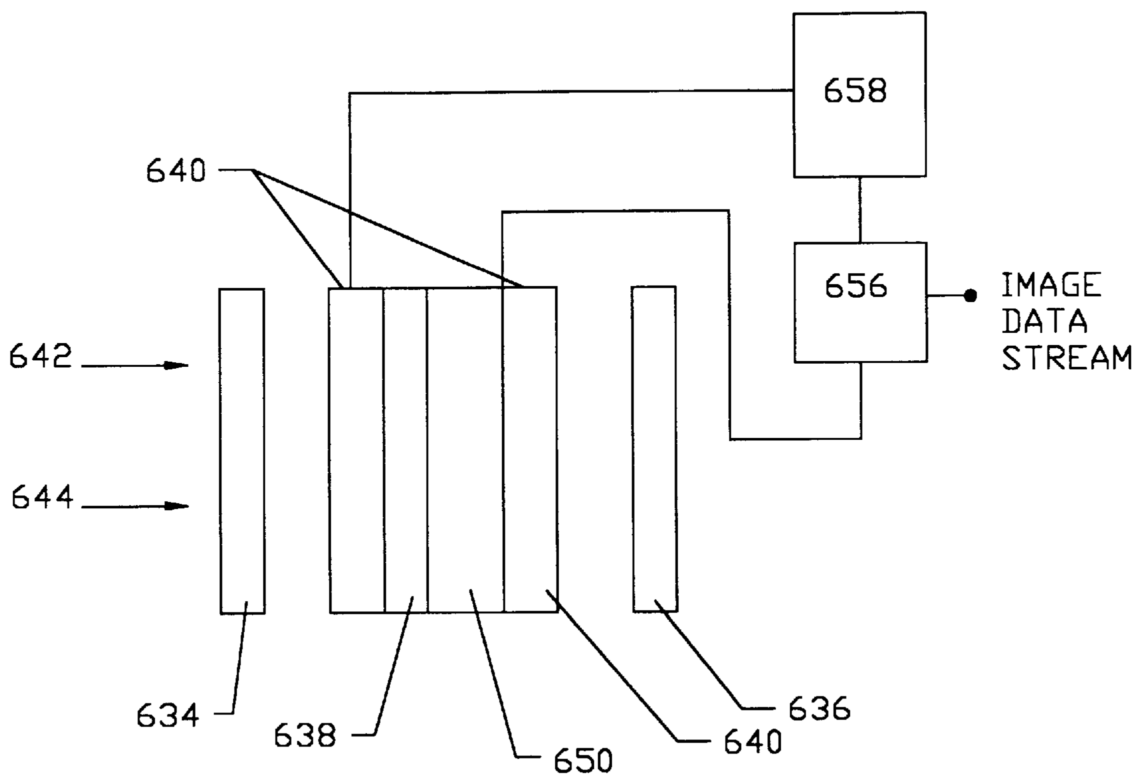
FIG. 66 shows electronic programming of an image data stream with LCD (and other SLMs)

In either case, whether output light from any particular pixel reaches the projection screen 26, depends on the applied voltage 652 to that pixel. Voltage is conventionally applied to the STN type of the LCD layer 650 by a method known as passive matrix addressing through a grid of electrode bars on the inside of each of the glass plates 640 (for example, see FIGS. 59 and 60). These plates 640 apply an electric field to any LCD pixel via the voltages at the crossings of the two orthogonal electrode grids, powered by active electronic devices (chips) located on the periphery of the LCD's aperture, one per pixel column and one per pixel row. Voltage is conventionally applied to these TFT LCD form of the SLM 14 by using the same type chip-driven row and column electrode bars, except the final applied voltage on each pixel is set by means of an active electronic device (thin film transistor or TFT) located within each and every pixel, and formed on the inside of one of the glass plates 640. Interconnection is made to each TFT using the row and column electrode grid and common (ground) plane located on the inside of the opposing glass plate 640. The incoming image data stream can be thought of as a de-multiplexed or sequential stream, where, for example, 8 bit data defines the intensity of each pixel in the image. This image data is re-multiplexed by the LCD addressing format. The input data is fed to the chip series (row and column) that holds enough data for one image frame. Each column and row chip emanates respective voltage waveforms that are timed properly so that the row and column waveforms interact in such a way that determines how much voltage is applied at each pixel location, whether directly to the LCD 14 or first to control a semiconductor switching device located on or within the pixel. The waveforms are stored in a look-up table in a controlling semiconductor device or chip. The desired voltage state for every image pixel location on the LCD 14 is temporarily stored in the short-term memory provided by each row and column device. When every pixel has been addressed in this manner, one image field has been properly established; and the process is repeated in a synchronous manner. For video applications, such a field is established on the order of once every 1/60th of a second. One video field involves about 500,000 bytes (0.5 MB) of memory for SVGA image resolution, and as much as about 1,500,000 bytes (1.5 MB) for the highest image resolutions currently envisioned. To process 500 MB of data in 1/60th of a second requires a processing speed of 30 MHz; 1.5 MB a processing speed of 90 MHz. Accordingly, it is not difficult to devote a single data processor or content addressable memory device, each including just enough local memory to store a fixed data transformation algorithm, for the purpose of adjusting the incoming values of an image data stream. In this manner, rather than having to physically rotate the LCD's output polarizer 636 to accommodate the orthogonally polarized light in the lower portion of the LCD 14, we can instead produce the same "rotation" effect electronically, as is schematically represented in FIG. 66. The LCD 14 of FIG. 58 is addressed by processing the demultiplexed or sequential image pixel data stream associated with the lower image light 644 sequentially with a semiconductor processing device 656 shown in FIG. 66. This processing device 656 contains the permanent data transformation algorithmused, and the device drivers for each of the LCD's pixel rows and columns 658, to address each pixel in the otherwise ordinary manner. The processing device 656 would make no correction to any pixel located in the upper half of the LCD image, but would adjust every voltage applied to pixels in the well-organized data stream known to be located in the lower half of the LCD 14 and do so in accordance with the predicted behavior of orthogonally oriented input light. There are at least two ways this bit stream processing can be done. The processing device 656, including some memory and a hardware multiplier, is preprogrammed so that the voltage multipliers required for the transformation are stored in memory. The hardware multiplier is then synchronized with the pixel stream so that every incoming pixel voltage is correctly multiplied by its corresponding transformation value flowing from memory. Yet another way to make this transformation is to use content addressable memory or a memory map. A counter is initiated when the image pixel stream starts flowing, assigning each pixel location and intensity to a corresponding memory location. When this data flows into the address port of memory, what flows out will be properly transformed. In either case, handling SVGA images in this way requires a 30 Mhz processor and 0.5 MB of memory—both reasonable possibilities given today's state of semiconductor processor technology. As one example of this electronic transformation approach, consider the case when a completely white (or bright) field is desired in both the upper and lower LCD regions. As has been common practice, no voltage would be applied to any TFT pixel, whether in the upper region or lower region, and the maximum amount of light transmission would result everywhere over the aperture. When the lower portion of the LCD 14 is fed with input light that is orthogonally polarized with respect to the upper region input rays 642, the light output from the lower region of the LCD 14 would not be maximally transmitted, but would instead be blocked by the output polarizer 636, which was prealigned to transmit the orthogonally polarized light. To remedy this, the processing device 656 would be programmed to transform each of the lower pixel's voltage from zero to the voltage required for a phase shift of 90 degrees. Given a phase shift of 90 degrees, the lower region input rays 644 would have a plane of polarization which would become parallel to the upper region input rays 642 and would therefore pass through the LCD's output polarizer 636. Such voltage corrections can be achieved on a pixel-by-pixel basis for all other values of the lower region's input voltage between zero and the value necessary for 90 degrees of phase shift.

The same pixel processing methods can be applied, for any form of the SLM 14, to create the deliberate buffer zone 148 between the upper and lower regions 82 and 84 in FIG. 2 and, for example, FIGS. 61–65 or the so-called region 326 of "black rays" associated with the embodiment of FIG. 20. Despite the conventionally contiguous input data stream for the lower image input rays 644, where one voltage state exists for every pixel in every row in the image frame, the processing device 656 is preprogrammed to fill the predetermined number of pixel rows corresponding to the upper image region followed by a preset number of dummy voltages corresponding to the present number of pixels representing the preset number of buffer rows prior to sending the pixel voltages corresponding to the lower portion of the image. The increased number of pixels used can be accommodated either by reducing the image's vertical resolution by the width of the buffer zone 148, or by increasing the number of addressable pixels in the SLM 14. As an example, suppose the image data is to be in SVGA format (800×600), the SLM's active region has a 0.7" diagonal, and the desired buffer zone 148 only compromises 2.5% of the active region's area. The maximum size of each pixel in this case is 17.78 microns square, and the 2.5% buffer zone 148 therefore is 15 rows high by 800 columns wide. Accordingly, the 800 column wide upper image region would be made to occupy the first 300 rows, starting at the top of the SLM 14, followed by the fifteen row buffer zone 148, and finally the remaining 300 rows of the lower image region. For this configuration, the total SLM active area would need to be enlarged to 800×615, either by keeping the same 17.78 micron pixel size and expanding the SLM's diagonal, or by reducing the pixel size. (Note: As the DMD form of the SLM 14 has a fixed pixel size, and video display resolution standards exist, the preferred way of accommodating the increased number of pixels in the buffer zone 148 is to increase the total number of pixels available.)

Such SLM programming techniques can also be extended to provide a means of electronic image alignment fine-tuning on the projection screen 26. We indicated hereinbefore that the invention of FIG. 1A is preferably carried out to form a seamless re-splicing of the upper and lower image portions at the projection screen 26. Without being able to adjust the relative locations of the different portions of the split image on the projection screen 26, the viewer might notice a dividing line between the upper image portion 86 and the lower image portion 88 in, for example, FIG. 1A. Conventional methods can be introduced to avoid this potential defect in the image, including preferably adjusting the physical alignment or tilt of the folding mirror 106 used in the invention of FIG. 1A. In combination with such methods, the SLM 14 can be programmed to allow for a final "electronic" correction, applied after the best possible mechanical alignment. This can be accomplished by enlarging or decreasing the width of the buffer zone 148 by one (or possibly two) row of pixels.

Figure 67:
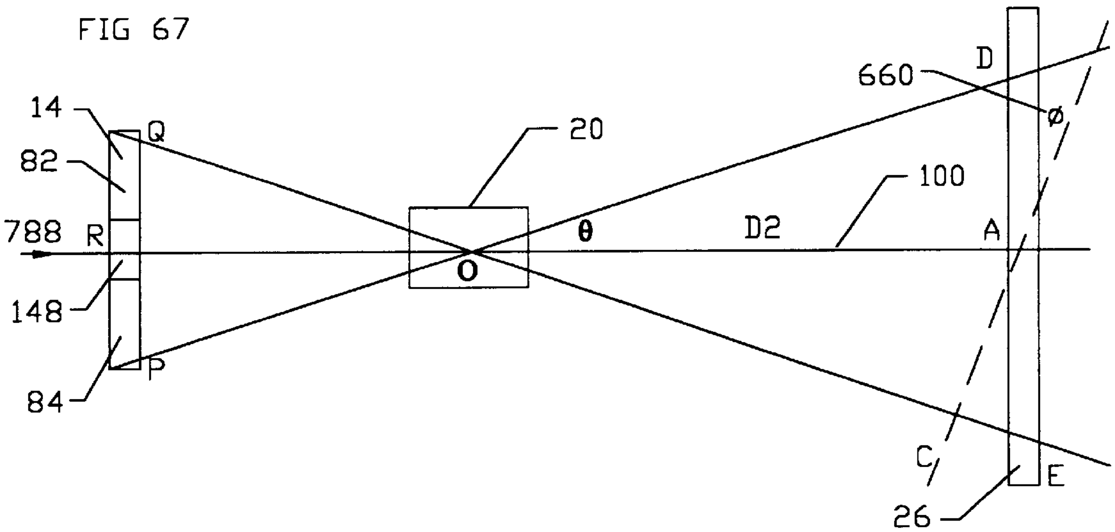
FIG. 67 shows the mechanism and corrections of keystone image distortions.
Figure 68:
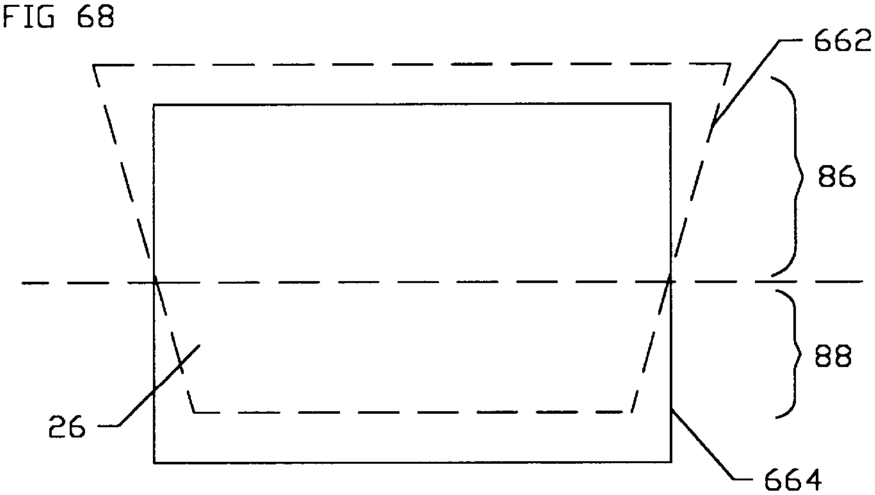
FIG. 68 shows the appearance of keystone distortion.
Figure 69:
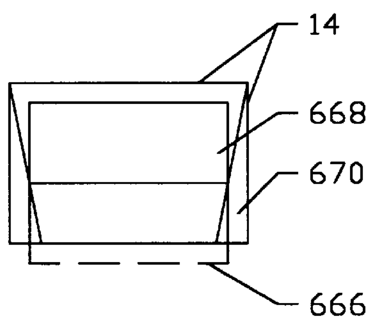
FIG. 69 shows electronic correction for keystone distortion.
Figure 71:
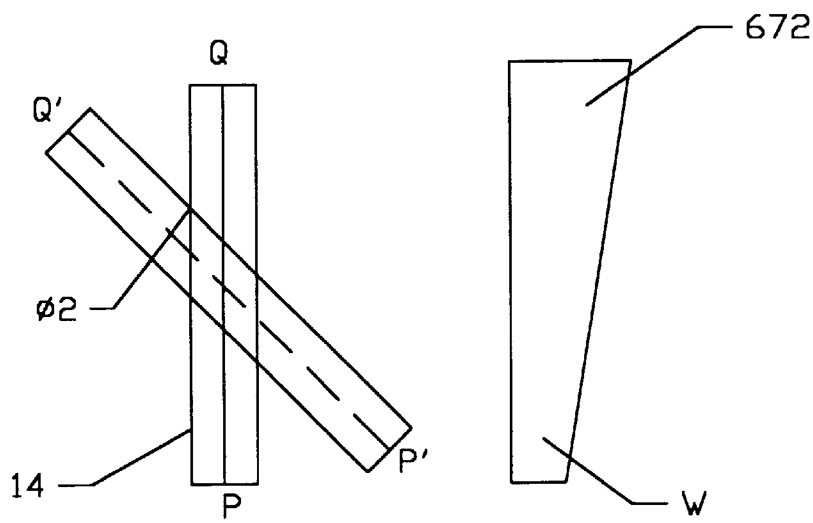
FIG. 71 shows image tilt path length correction with a refractive wedge.
Figure 72:
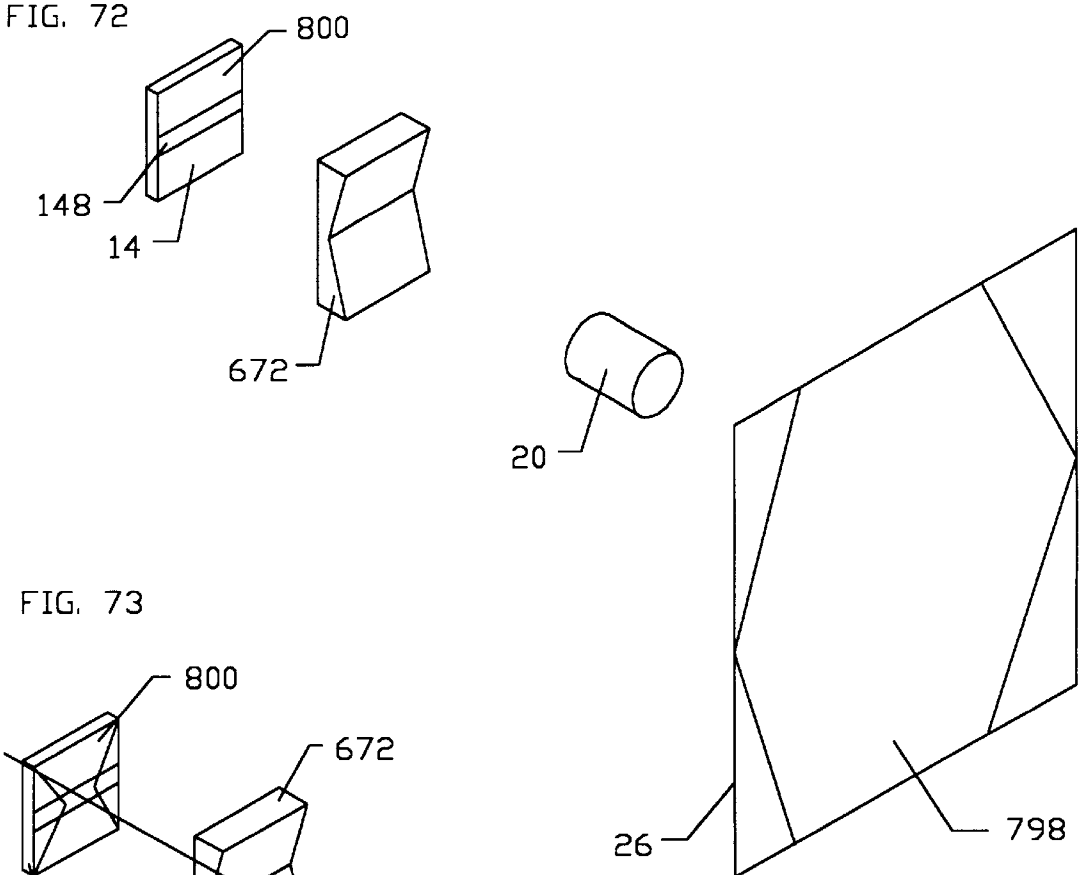
FIG. 72 shows perspective relationships of keystone-distorted projection system with optical path length correction.

Yet another way in which such SLM programming techniques can be extended is to provide a fixed electronic means that corrects for intrinsic image shape distortions such as keystoning. Discussed hereinbefore, keystoning is the image shape distortion that occurs when a central ray 788 in FIG. 67 defining the center of the projected image is not maintained perpendicular to the projection screen 26 and arrives at the focal plane (the projection screen 26) at an oblique angle to the optic axis 100. The basic relationships associated with this effect are shown in FIG. 67, and the manifestations with regard to image shape in FIGS. 68 and 69. In addition to shape distortion, the tilt of the image plane both lengthens or shortens the optical path between the image plane and the projection lens, which so introduces focusing errors. Calculations for tilt angles 660 in FIG. 67 of up to 15 degrees from the optic axis 100 indicate only small amounts of shape and path length distortions that can be easily corrected, as will be shown. The larger this angle, the greater the distortions and the larger the need for correction. Correction preferably involves both an electronic means for anticipating the effect of the shape distortion that the system will produce and an optical means for compensating for associated optical path length differences that defocus the otherwise distorted image shape. The basic corrective method of electronic programming therefore anticipates the amount of keystoning that any of the above physical projection systems have been constrained to develop, and then arranges the spatial location of the image pixels in a structure corresponding to the reverse of this image shape deformation. Suppose, as one example, that distorted image 662 shown in FIG. 68 is the anticipated output for an originally rectangular image 664 that would otherwise have filled the projection screen 26. The original image, rather than being programmed as a fully populated rectangular grid of pixel locations, the SLM 14 would be enlarged, and the pixels arranged as shown in FIG. 69. Rectangle 666 corresponds to the originally rectangular active image region, rectangle 664 corresponds to a new SLM active region, rectangle 668, to the new active image pixels, and region 670 to inactive or dark image pixels. In addition to the electronic programming means which compensates for the shape deformation, one of two associated optical compensation is desirable to adjust for the differences in optical path length caused by the tilted image plane, and the defocusing of the image brought about by such path length differences.The defocusing error associated with the oblique tilt angle 660, $\phi$ in FIG. 67, can be compensated, either by tilting both the SLM 14 and the projection screen 26, as shown schematically in FIG. 70, or, preferably, by using the simple refractive correction plate (wedge) 672 shown for the upper half of the SLM image in of FIG. 71. The refractive wedge plate 672 operates as shown first conceptually in FIG. 71 and then optically as in FIG. 85, to move the focusing point D of rays 803 and 806 from the upper image, to point E. The wedge thickness T in FIG. 85 corresponds to a portion of the complete wedge 672 as shown in FIG. 71. The complete correction method is shown schematically in FIG. 72 and 73 for application with and without, respectively, the corresponding electronic SLM programming for reversing the shape deformation.

In the optical system 10 of, for example, FIGS. 1A, 7–13, 20, 21, 32–38, and 54, particular attention has been paid to all three important aspects of the projected image, namely the image shape, the sharpness of the image and the directionality of the light emerging from the projection screen 26. The problems of image shape and the steps taken to correct the shape have been introduced in terms of the image shape distortion known as keystoning. The image sharpness and steps taken to ensure that a satisfactory level of sharpness is achieved have been discussed in terms of optical path length. The directionality of the emerging light at the projection screen 26 is controlled by the use of a Fresnel lens 110.

These issues can be described on a more mathematical basis using the spatial relationships defined in FIG. 67. PRQ represents the area to be projected, the SLM 14, such as an LCD or a DMD, or even a sheet of microfilm, a photographic slide or a transparency. The center of the projection lens 20 is taken at point O, and the normal position of the projection screen 26 on which the projected image is to be formed is along DAE. With the projection screen 26 in the position shown by DAE, the shape of the rectangular image is correct. In this situation, a square in the plane QRP is reproduced as a square in the plane DAE. If, however, the projection screen 26 is tilted through an angle $\phi$, then the image on the projection screen 26 has the form shown in FIGS. 67 and 68. In FIG. 67 the following relationships apply:

$AB=S1$ $AC=S2$ $AD=AE=S$ $RO=D1$ $OA=D2$ $S=(D2)\tan(\theta)$ $S1=(D2)\sin(\theta)/\cos(\theta+\phi)$ $S1=(D2)\tan(\theta)/[\cos(f)-(\sin(f)\tan(q))]$ $AD=S=(D2)\tan(\theta)$ $S1/S=1.0/[\cos(\phi)-(\sin(\phi)\tan(\theta))]$ $S2/S=1.0/[\cos(\phi)+(\sin(\phi)\tan(\theta))]$ The fact that S1/S is greater than unity is responsible for the elongation of the upper image portion 86 of the projected area shown in FIG. 68. Correspondingly, the fact that (S2)/S is less than unity gives rise to the compression of the lower image portion 88 of the projected image. The horizontal elongation of the upper image portion 86 of the projected image is also due to the fact that (S1)/S is greater then unity, while the horizontal shortening in the lower image portion 88 is due to the fact that (S2)/S is less than unity. The effect of these factors is that the shape of the projected image, shown by dotted lines 662 in FIG. 68, has the form of the keystone in an architectural arch. Methods for correcting this distortion have been already set forth above.

In all the folded-optic projection system examples, including those that follow, the projection lens 20 is assumed to have a +/−35 degree angular range, θ, which in the vertical (4:3 TV screen) profile, such as that of FIG. 1A, reduces to +/−22.8 degrees, and will be used hereafter. In this instance, the implications for several values of the distortion angle, ϕ, are:

ϕ=5 degrees; S1/S=1.038; S2/S=0.965

ϕ=10 degrees; S1/S=1.080; S2/S=0.931

ϕ32 15 degrees; S1/S=1.127; S2/S=0.899

The lateral (or horizontal) magnifications, M1 for the upper image portion 86, and M2 for the lower image portion 86, take the form:

M1=1.0/(1.0−tan (ϕ)tan (θ))

M2=1.0/1.0+tan (ϕ)tan (θ))

ϕ=5 degrees; M1=1.038; M2=0.965

ϕ=10 degrees; M1=1.080; M2=0.931

ϕ=15 degrees; M1=1.127; M2=0.899

These values provide the information needed to predict the shapes of the projected image in every situation.

As introduced above, electronic methods are applied to correct for image shape deformations. Corresponding optical methods have been applied to restore sharp focus, and will be considered mathematically below. In addition, when dealing with the raster scan of an SLM (LCD or DMD) 14, the packing density of the raster lines becomes important, and must also be considered in designing a high-quality projection system.

Figure 70:
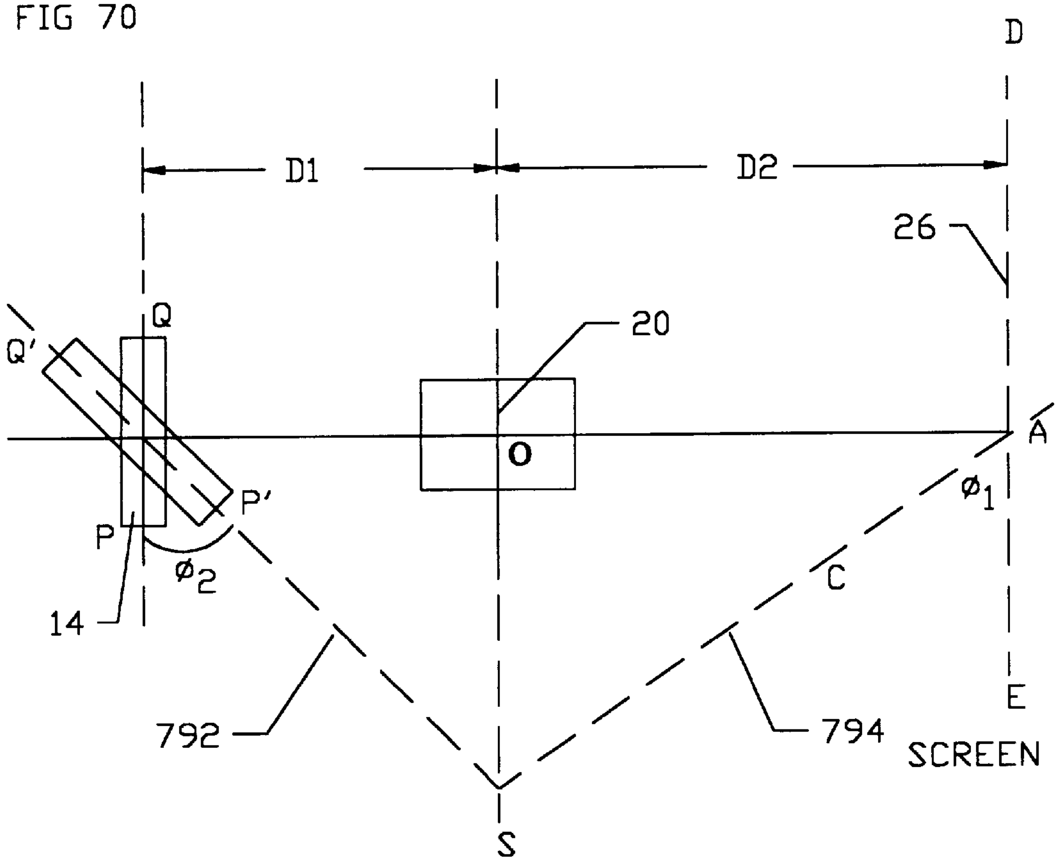
FIG. 70 shows an image tilt method of distortion correction.

The restoration of sharp focus can be established, as shown schematically in FIG. 70. The requirement is that the plane of the SLM 14, such as an LCD or DMD, also is tilted as shown, so that the continuation of the planes of object 792 and image 794 intersect on a line S through the center of the projection lens 20. If the magnification produced by the projection lens 20 is M, and if the respective plane tilt angles are $\phi_1$ and $\phi_2$, then:

$\tan(\phi_1)=(M)\tan(\phi_2)$

The magnifications contemplated in this embodiment are of the order of 50× to 70×, so that the tilt of the object plane is quite small. This opens up the possibility of establishing a sharp focus by using the (wedge-shaped) refractive correction wedge 672 as shown in FIG. 71. The local thickness W of the wedge 672 is given by the equation (for small angles of $\phi_2$) by:

$W=\phi_2 n/(n-1)$ where n is the refractive index of the glass or plastic used in the wedge 672.

We must also assure that there is a proper packing density of raster lines, PD1, for the upper image portion 86 of the projected image, PD2 for the lower image portion 88 of the projection screen 26, and PD, the packing density in the center of the projected image. Accordingly, $PD1/PD=\cos(\phi)/[\cos(\phi)-\sin(\phi)\tan(\theta)]^2$ $PD2/PD=\cos(\phi)/[\cos(\phi)+\sin(\phi)\tan(\theta)]^2$ Whenever PD1/PD is greater than unity, the raster line images will be broadened out in the upper image portion 86, and narrowed in the lower image portion 88. In developing the preferred embodiments of the inventions where a correctable amount of keystone distortion has been allowed (i.e., with ϕ up to 15 degrees), care should be taken to include both of these factors into account.)

Figure 84:
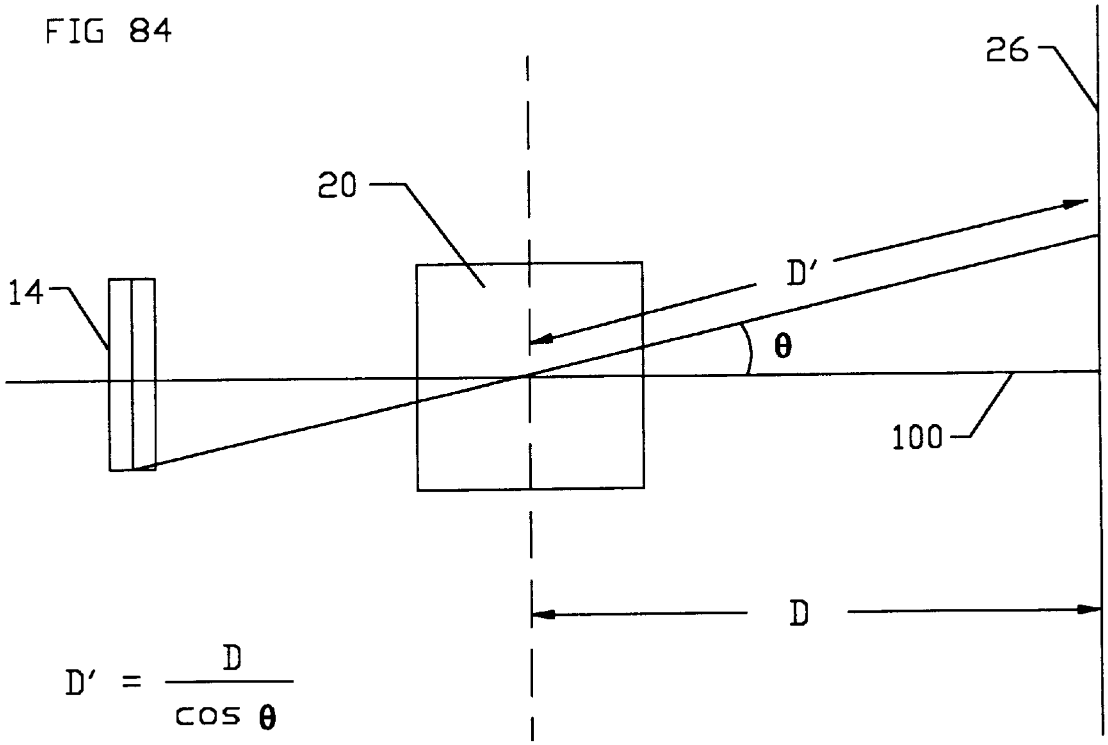
FIG. 84 illustrates optical path length relationships in a projection system.

The desired optical path length, D', as shown in FIG. 84, from the projection lens 20, for a point on the projection screen 26 reached by a ray making an angle θ with the lens optic axis 100 (see FIG. 84) is equal to D/cos (θ). This relationship applies to all the compact folded-optic projection systems 10, such as for example FIGS. 1A, 7–13, 20, 21, 32–38 and 54, where the most preferred goal is typically to devise systems which will have optical path lengths according to this formula. In some embodiments of this invention, however, it is desirable to depart slightly from this specification of the optical path length. One example is when we choose to accept and then correct for a small amount of the keystone distortion as above. In this case, when small amount of keystone distortion is permitted, it is to be corrected by the above methods, maintaining image sharpness by tilting the SLM 14 object plane, or preferably by the use of the weak refractive compensating wedge 672, as in FIGS. 72 and 73.

If the optical system 10 is producing an image magnification M from the SLM 14 to the projection screen 26, and if the optical path length involved as measured between the projection lens 20 and the projection screen 26 shows an error in optical path length, S, this translates into a focusing error of $S/M^2$ in the plane of the SLM 14. Sharp focus would be re-established, however, if those rays emanating from any region on the SLM 14 were made to pass through an appropriate thickness of refracting material, e.g. the refractive wedge 672 of FIGS. 71–74 and 85. If the path length is to be decreased by S, then the additional thickness preferred of this refractive material is $S/M^2$. If, on the other hand, the path length is to be increased by S, then the thickness of the refractive material would have to be reduced by $S/M^2$ in the relevant areas. This effect on light rays in the region of the SLM 14 is shown in FIGS. 71–74 and 85. The effect on light rays in the region of the projection lens 20 is increased by a factor of $M^3$ over that in the region of the SLM 14.

Some rays emanating from any given microscopic region on the SLM 14 and traveling through the correcting wedge 672, are made to travel incrementally longer optical paths than they otherwise would in air, and others are made to travel incrementally shorter optical paths than they otherwise would in air, the result being that when all rays pass through the folded-optic projection system 10 as above, they arrive at the projection screen 26 within the smallest possible circle. If the area on the SLM 14 is equivalent to a pixel element, the area on the projection screen 26 formed by the projection of rays from this pixel must not exceed half the magnification of this pixel on the projection screen 26.

Figure 85:
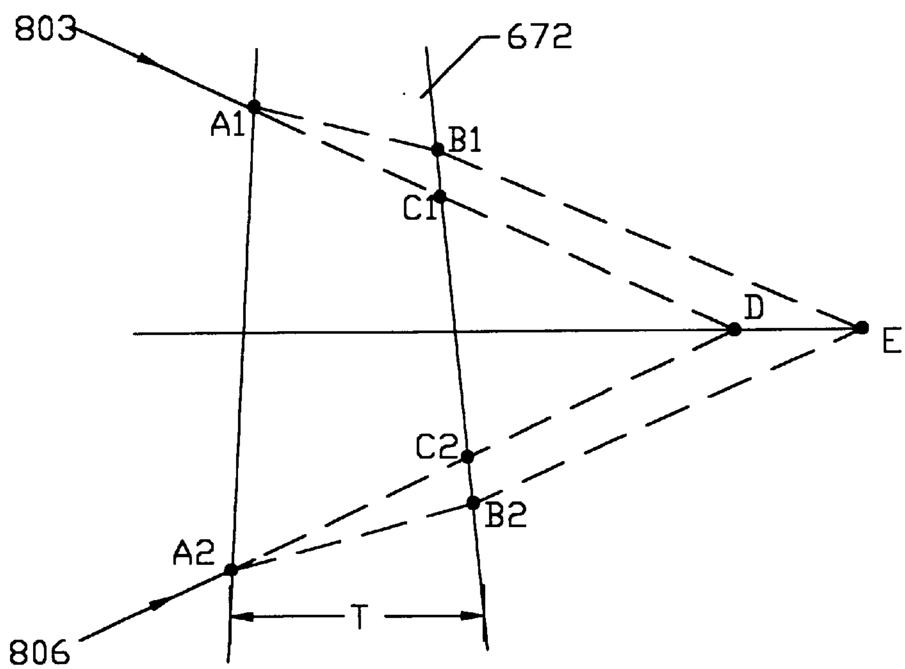
FIG. 85 illustrates the use of a refractive element as an optical path length correction means in a projection system.

This mechanism can be seen in FIG. 85 wherein rays 803 and 806 are directed along the paths A1-C1-D and A2-C2-D respectively in the absence of a glass sheet are displaced to A1-B1-E and A2-B2-E by refraction at the glass or plastic layer interfaces. The image formed by the incoming ray 803 and the ray 806, such as those shown, is displaced from D to E. If the glass or plastic layer index is n, and if the thickness is T, then the distance DE is equal to T(n−1)/n. If the optical path error is a function of the image position on the projection screen 26, then the thickness correction at the plane of the SLM 14 (or other image source) has to be adjusted on the wedge 672 near this plane. In order to reduce any optical aberrations, this correcting material should be placed as close as possible to the SLM 14 plane. In the absence of such correction, a point on the projection screen 26 corresponds to a circular area (a “blur circle”) on the SLM 14 plane. If the lens has an f/# N, then the diameter DM of this circular path is given by the formula:

$$DM=S/((M^2)(N))$$

In a specific example, S=5, M=50 and N=2.5, and this gives a value for DM of 0.0008 inches (20 microns). This is compared with the actual pixel size involved with the SLM 14 that is used. A typical value for the pixel size for an LCD form of the SLM 14 is about 18 microns×18 microns. For a DMD form of the SLM 14, the corresponding size is 16 microns×16 microns, with a 1 micron spacing between elements. In order that information is not lost on the projection screen 26, the diameter of the blur circle on the LCD (or DMD) 14 should preferably not be greater than one half of the pixel size. This shows the need to keep the optical path very close to the value predicted by the formula, or failing that, to take corrective measures at or very near to the plane of the LCD or DMD 14. If these conditions are not considered, projected images will not be optimal.

Figure 75:
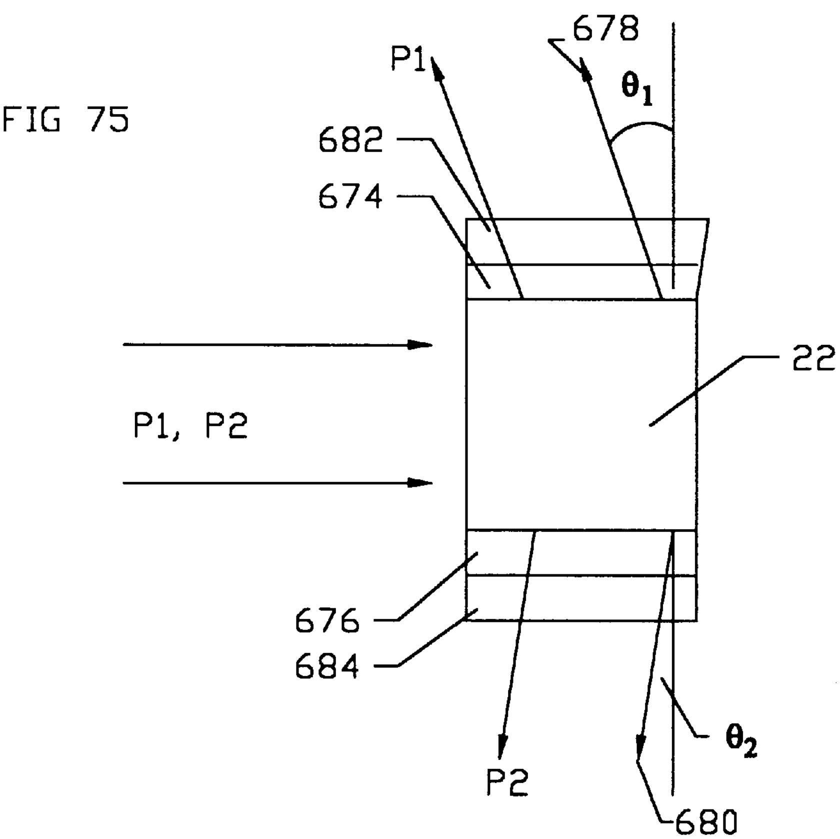
FIG. 75 shows a polarization beam-splitter including beam director architecture for unpolarized light.

The split-image projection system embodiments of FIGS. 1A and 7–13 each require the beam splitter 22 efficiently divides the orthogonally pre-polarized upper polarized beam 94 and lower polarized beam 96, respectively, passing through the upper and lower image regions 82 and 84 of the SLM 14 into two separate beams, one directed ultimately upwards toward the upper image portion 86 of the optical system 10 and the other directed downward toward the lower image portion 88 of the optical system 10 for cases where the pre-polarized light 24 and 28 comes directly from the output of an SLM 14 (see FIG. 74) or from the output of the projection lens 20 imaging the SLM 14 as shown in FIG. 75. Upper and lower beam direction elements 674 and 676, respectively, are used so that each output beam 678 and 680, respectively, can be directed at the precise angle expected by the projection system mirrors, such as the folding reflector mirrors 106 and 108 in FIG. 1A. In addition, upper and lower polarization filters 682 and 684 are used to remove any contaminating polarization content from each of the upper and lower output beams 678 and 680 so as to prevent artifacts visible in the projected image.

The traditional form of the beam splitter 22 typically uses prisms coated with conventional polarization-diffracting inorganic multi-layer film stacks and/or a plurality of glass plates making Brewster's Angle with the light direction. The more plates in the Brewster stack, the more efficient the beam splitting characteristics, but the less overall light that is transmitted. Neither of these approaches are preferred, however, for use with the above embodiments because they typically operate too inefficiently over the wide range of wavelengths and wide range of incidence angles involved in commercial forms of the optical system 10. Prior art beam-splitters have not been developed for these purposes as can be noted by reference to FIGS. 76–78.

Figure 76:
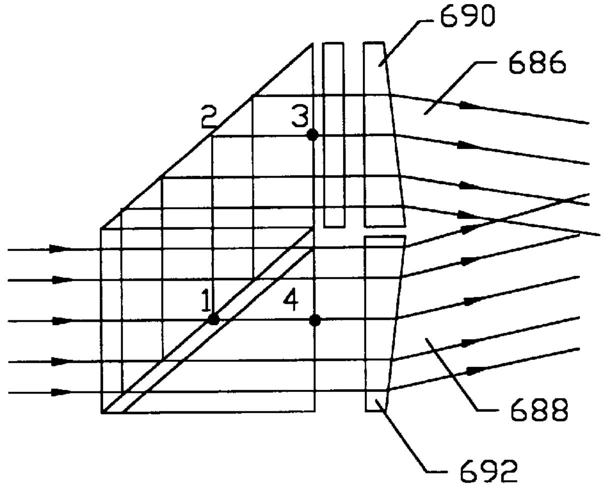
FIG. 76 shows a prior art splitter.

As one example of the preferred embodiments of the inventions consider first a prior art beam splitter as shown in FIG. 76. This structure is generally unsuitable for use with the inventions described above, because the resulting output beams 686 and 688, while being directed by the action of elements 690 and 692, are heading in the same direction, rather than opposite directions. The elements 690 and 692 also are used for the purpose of beam overlap, rather than to separate the desired final beam location. Moreover, the two output beams 686 and 688 of FIG. 76 are arranged to have the same, rather than orthogonal polarizations. Preferred splitter embodiments of the invention are indicated in FIGS. 79 and 81–83 and these embodiments arrange for the two output beams 678 and 680 from FIG. 74 to travel in opposite directions in a plane that is perpendicular to the input beam direction. More fundamentally, however, the design of FIG. 76 does not produce the output beams 686 and 688 having equal optical path lengths, a deficiency that if not corrected would interfere with the creation of a well-focused image. The difference between optical path lengths 1-2-3 and 1–4 in FIG. 76 is approximately D/n, where n is the refractive index of the prism medium and D is the height of the entrance aperture.

Figure 77:
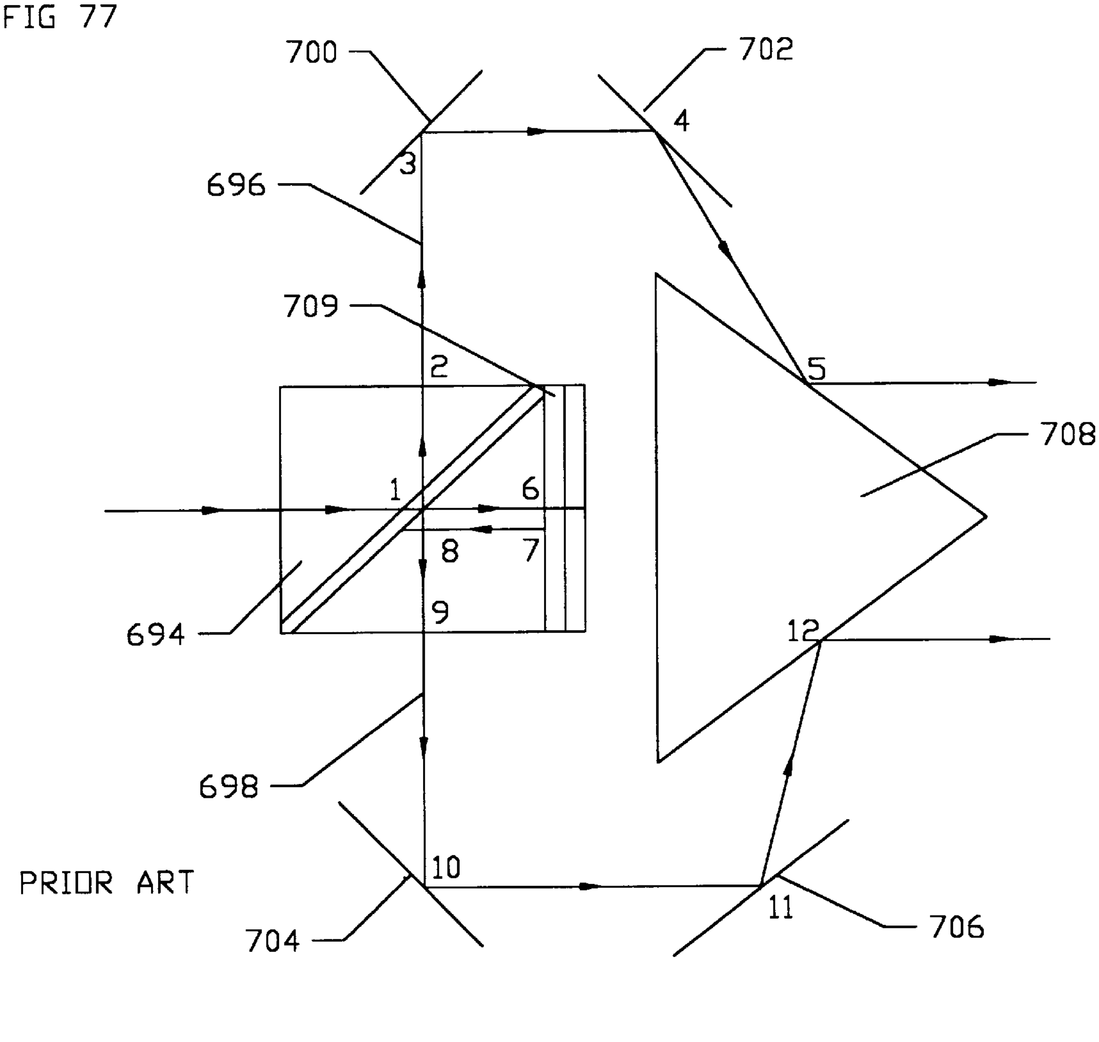
FIG. 77 shows a prior art splitter.
Figure 78:
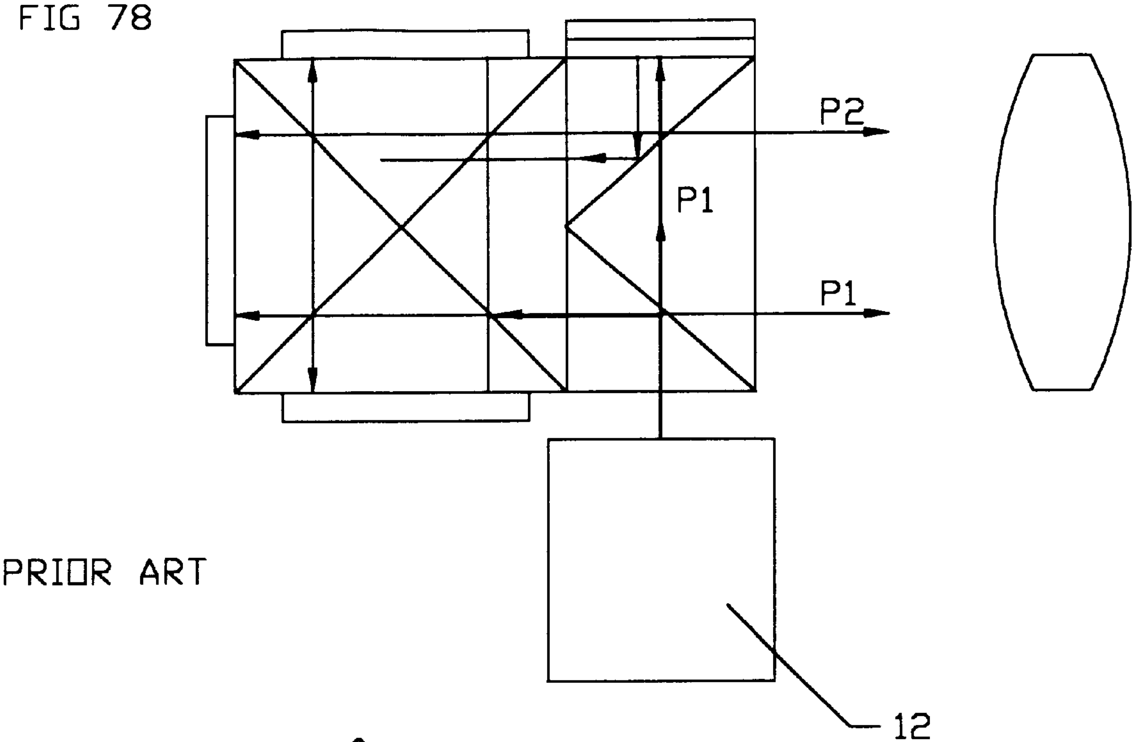
FIG. 78 shows another prior art splitter.

As another example, consider the prior art beam splitter 694 of FIG. 77. In this case, although there appears to be an upper beam 696 and lower output beam 698 that head in opposite directions in a plane perpendicular to the input beam direction, directing elements 700, 702, 704, 706 and 708 are employed, as in FIG. 76, to make these beams adjacent and heading in the same direction. Moreover, converting elements 709 are employed to make these beams 696 and 698 the same, rather than of orthogonal polarization. In addition, as in FIG. 76, there is an uncorrected difference between the optical path lengths of the upper beam 696 and the lower beam 698 that is also equal to D/n.

Figure 79:
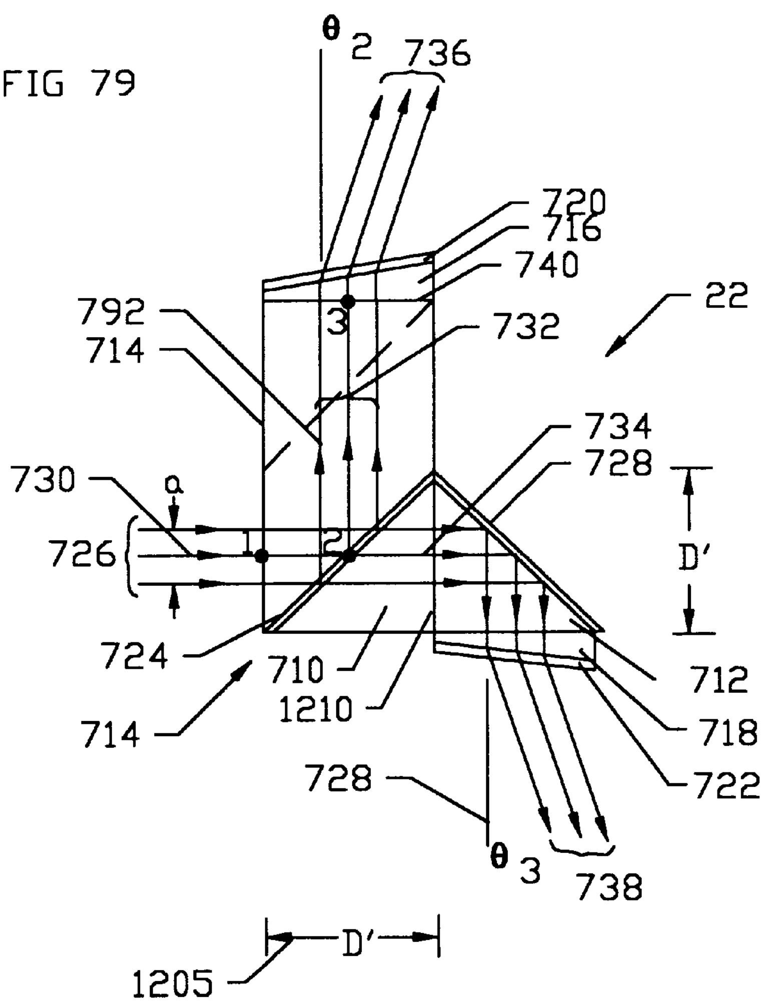
FIG. 79 shows a split-image prism beam-splitter embodiment corrected for use with light after a projection lens.

In a preferred embodiment of the invention, the beam splitter of FIG. 79, has been arranged for use in situations like that of FIG. 1A. The beam splitter 22 is composed of a 45 degree-45 degree-90 degree (Porro) prism 714 composed to two smaller Porro prisms 710 and 712, refractive element 714, two refractive beam directors 716 and 718, and two polarization filters 720 and 722. In this case, polarization splitting layer 724 is preferably the same wide band polarization type selective reflecting materials described hereinabove and referred to as polarization selective reflectors such as those containing the wide band selective reflecting polarizer materials 116 or 118 as in for example FIG. 1A. These materials enable the full angular extent of input beam 726 to be handled as efficiently as possible. Inefficiencies in polarization splitting can translate into spatial intensity variations across the upper output beam 736 and can require additional compensating elements. The use of wide band materials such as the 3M-type multi-layer dielectric stack film described before, obviates or minimizes the need for such correction. Reflecting layer 728 is a metal or metal-like film, or in some cases, a total internal reflecting layer. Illustrative input ray 730 of mixed polarization states P1 and P2 is split into two rays by the beam splitter 22, an upward ray 792 is in polarization state P2 and ray 734 heading left-to-right is in the orthogonal polarization state P1 polarization. The ray 792 proceeds upwards until it is filtered by the polarization filter layer 720, preferably by a high-quality absorption polarizer oriented to absorb polarization P1 and pass P2. When the output beam 736 refracts into air, the tilt of the beam-director 716 causes the output beam 736 to point in the direction (or tilt at an angle $\theta_2$) indicated by the embodiment of FIG. 1A, or by the particular projection system embodiment used. The orthogonally polarized ray 734 is redirected without change in polarization by the reflecting layer 728 (which can be either the boundary between the prism 712 and air or a reflective material) and passed sequentially through the beam-director 718 and the polarization filter 722 as lower output beam 738.

Figure 80:
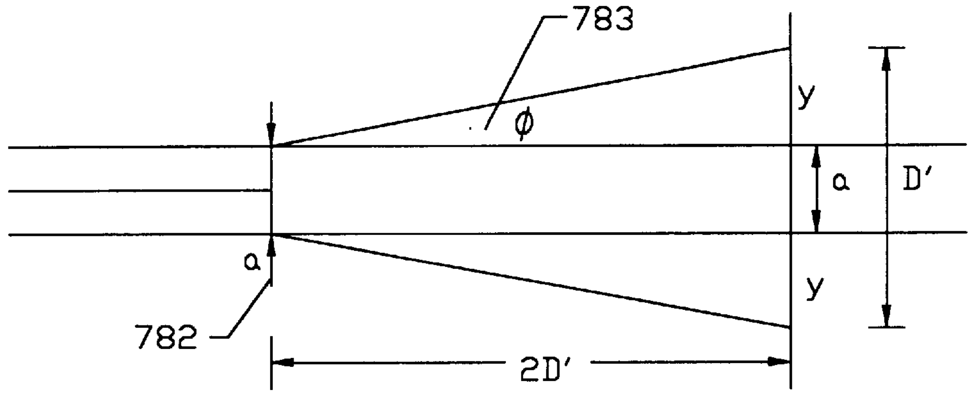
FIG. 80 shows optical beam size and path length relationships in prismatic beam-splitters.

In the preferred embodiment of FIG. 79, it is desirable to control the size D' of input face 740 relative to the diameter, a, of the input beam 726. Upper beam path 1-2-3 has a length equal to 2D/n. Although the input beam 726 is drawn as being highly collimated, for clarity and scale, it is actually representative of the bundle of rays that are output from the projection lens 20. When the projection lens 20 has f/2.5 and with an angular range of +/−35 degrees in air on the diagonal, the beam angle in the vertical plane is +/−22.8 degrees and in the refractive medium, 15 degrees. The actual beam spread in the refractive medium, when the un-folded beam path is properly represented, FIG. 80, must be taken into account when choosing the size D' of the beam splitter 22 that works optionally. The relationship between a and D' is given by:

$$D' = \frac{a}{1 - 4\tan\phi_{m[\ ]}}$$

where D' and a are as previously defined, and indicates that the beam splitter 22 of FIG. 79 is generally impractical for beam angles larger than about +/−12 degrees in the medium, where D' would be no greater than about 1.5". Such restrictions can limit use of this beam splitter 22 in the practice of the above inventions to situations where the projection lens 20 has a maximum angular range no larger than about +/−26 degrees on the diagonal in air. Use of a more divergent form of the projection lens 20 requires using a different class of the beam splitter 22 compared to that of FIG. 79.

For the splitter 22 to be practical over the fill angular range desired in preferable embodiments of the inventions, such as FIG. 1A, its size is governed by an equation where:

$$1 - N\tan\phi_m > 0$$

and, for compactness as defined by element size no larger than 1.5", where $$N\tan\phi_m < 5/6$$

For the case where the beam angle in the medium is +/−15, N must be less than 3.1. In general, for this to be possible, the beam path from the input face to the output face through the beam splitter 22 should not be greater than 3D', which for best results means the value D'.

Figure 81:
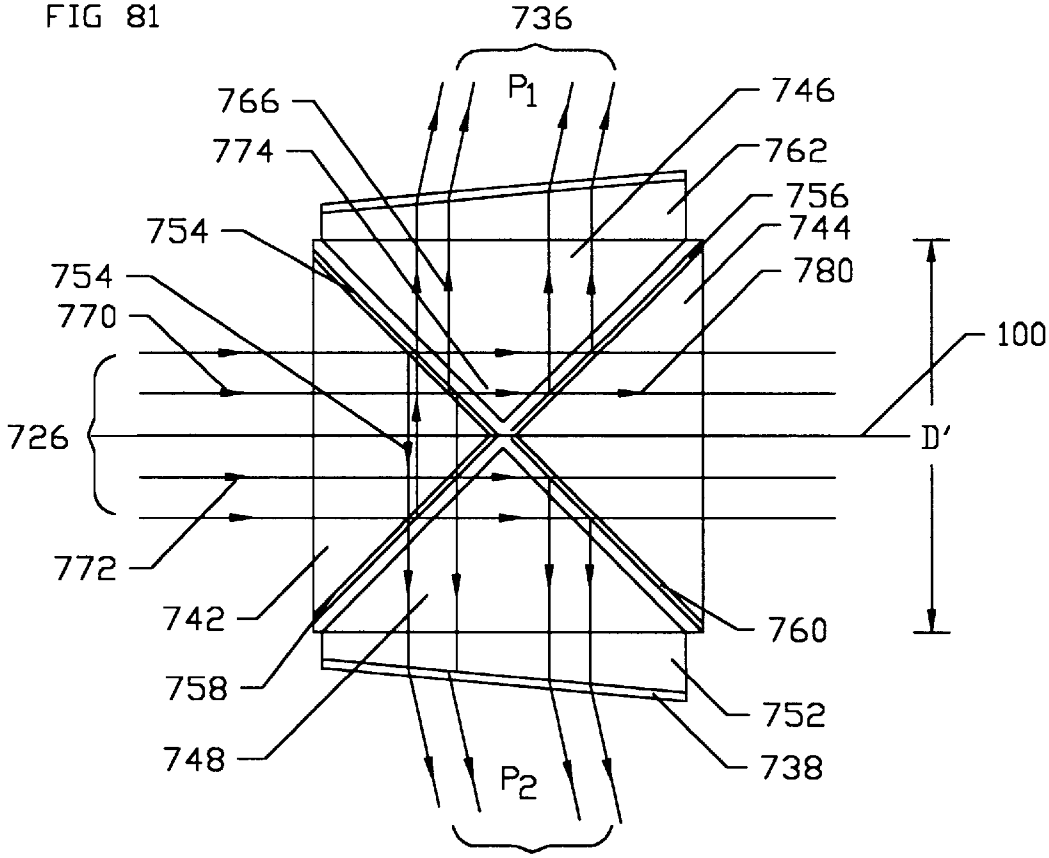
FIG. 81 shows another split-image corrected prism embodiment for use with light after a projection lens.
Figure 82:
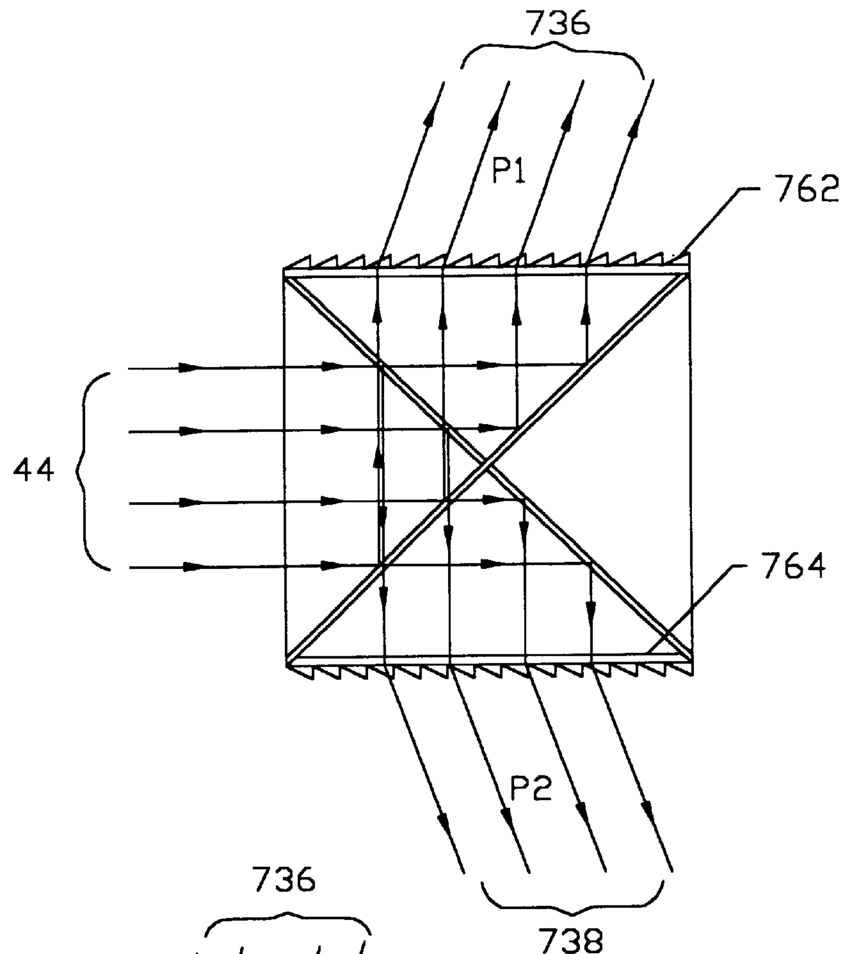
FIG. 82 shows a variation of a beam splitter embodiment with prismatic film beam directors.
Figure 83:
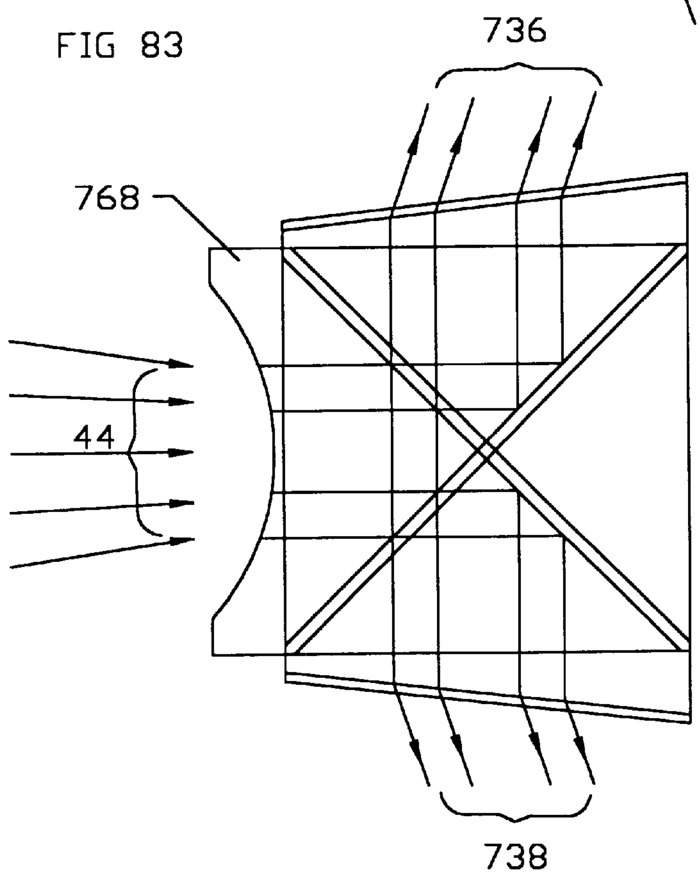
FIG. 83 shows a negative lens variation of beam splitter embodiment for use with converging input light.

One example embodiment in FIG. 81 is of a splitter configuration with input-to-output path length equal to D'. A cube is arranged with four individual Porro prisms 742, 744, 746 and 748 and including polarization filtering and beam directing elements 752 and 762, and the use of 3M or Merck-type material wide band polarization selective reflecting films, respectively. An example of the tapered wedge type beam director 752 and 762 is shown in FIG. 81. Incoming light rays 766 impinge at normal incidence and proceed through the beam director 762 until reaching the wedge/air boundary. At this location the light rays 766 refract away from the normal to the boundary per Snell's Law. The beam director 752 and 762 can also take the form of a series of identical microprisms, as shown in FIG. 82 and described for the method of FIG. 27 (the elements 402 and the deflection angle β). FIG. 81 is drawn in an exploded perspective to show, as one example, the film attachment of the polarization selective reflecting film 754 and 758 to the prism 742 and the films 756 and 760 to the prism 744. In addition, a splitter embodiment that can be used in locations where input light is converging, includes a negative lens section 768, as shown in FIG. 83. Notice that the embodiments of FIGS. 82 and 83 are substantially similar to the basic embodiment of FIG. 81 except for the condition of input light which is converging in FIG. 83 and collimated in FIGS. 79 and 83, and the form of the beam director element, which is prismatic in FIG. 82 and wedged in FIGS. 79 and 83. Each embodiment includes crossed selective reflecting layers 754, 758, 756, and 760 (see FIG. 81), which preferably comprise the layers 754 and 760 aligned to transmit light of polarization P1 and reflect light of polarization P2. The layers 758 and 756 are aligned orthogonally, so as to transmit light of polarization P2 and reflect light of polarization P1. As shown, the layer 754 is separately applied to the upper hypotenuse surface of the prism 742, and the layer 758 is attached to the lower hypotenuse surface of the prism 744. Conversely, the layer 756 is separately applied to the upper hypotenuse surface of the prism 744 and the layer 760 to the lower hypotenuse surface of prism 744. These selective reflecting layers 754, 756, 758 and 760 can also be any conventional dielectric multi-layer coating having the above described polarization splitting properties, although the use of wide band material is preferred in applications where post projection lens beam angles in the refractive medium of the beam splitter 22 can be as large as +/−15 degrees.

Illustrative light ray 770 within the input beam 726, as shown for example in FIG. 81, enters the beam splitter 22 heading left-to-right along the optic axis 100. When the ray 770 first strikes the properly designed selectively reflecting layer 754, approximately one half its intensity is reflected downwards as ray 772 in polarization state P2 and half is transmitted to the right as ray 774 in polarization state P1. On its downward path, substantially all of the ray 772 passes out as part of the lower polarized beam. The ray 774 in polarization state P1 is reflected upwards by its interaction with the layer 756 as the ray 766, and continues upward as part of the upper polarized beam 778. Any trace amount of polarization state P2 in ray 774 is transmitted by the element 756 as ray 780, which also contains any P1 that fails to be reflected. This ray flux is removed from the optical system 10 and cannot contaminate the output imate quality. When such an element is used at the output of the projection lens 20, as envisioned for example, in FIG. 1A–C, the prism element size D' is given by:

$$D' = \frac{a}{1 - 2\tan\phi_m}$$

where a is the diameter of exit pupil (see, for example 782 in FIG. 80) of the projection lens 20,$\phi_m$ is the extreme ray angle in the plane of view (see for example 783 in FIG. 80) in the refractive medium. Hence, for previous examples of the projection lens 20 with +/−35 degree maximum angle in air, and the exit pupil 782 of 0.2", the minimum beam splitter size, D', is about 1.25" on a side.

It is also preferable, though not required, to practice all the optical system inventions described with highest possible projected image brightness. To do so, there are three primary factors influencing overall projection efficiency and brightness, that should be optimized, whether individually or together: (1) the cross-sectional shape of the beam illuminating the SLM aperture, (2) the polarization of the illuminating beam, and (3) the efficiency with which light emitted by the light source 12 can be utilized by the projection screen 26 constrained by the SLM 14 and projection optics. Despite the wide range of advancements available, today's rear projection system products remain extremely inefficient, with lamp to screen efficiencies typically no higher than 5–10%.

Beam shape is a particularly important factor in achieving good screen efficiencies. One reason for this is that matching the illuminating beam shape to that of the rectangular SLM aperture offers a potential gain in screen brightness over ordinary projection systems of 1.64. Another reason is that conventional beam-splitting methods for achieving polarized illumination suffer serious uniformity deficiencies when using circular as opposed to rectangular input light beams. Without the means to improve beam-shape, the beam-splitting methods of polarization control are largely impracticalThe availability of efficiently-polarized light is important preferred embodiments of the polarization-dependent projection system 10 inventions introduced above. Efficient polarization control is also advantageous, in general, as it offers a gain in screen brightness for polarization-dependent LCD-type SLMs of as much as 2.0 over conventional unpolarized systems.

Accordingly, the corresponding potential for overall efficiency improvement in a projection system is significant. Combining the aforementioned performance gains from beam-shaping and polarization recovery, without loss, implies a potential improvement in screen brightness over conventional systems approaching a factor of about 3. Then, incorporating additional means for improving the percentage of light flux that can be passed from the light source 12, through the shaping means, through the polarization recovery means, through the folded-optic projection system and to the projection screen 26, affords the potential for even greater performance gain in comparision with that of conventional methods.

Each of the three components of a projection system's screen brightness are hereafter described in sequence: Beam-Shape, Polarization Recovery, and Flux-Utilization.

The potential efficiency improvement possible from beam-shaping alone, can be understood from the following discussion. Projection systems using the standard TV 4:3 aspect ratio with circular illumination sources, waste 39% of the incident light, as this much energy falls outside the inscribed 4:3 rectangle. If this wasted light could be recovered and recycled usefully within the inscribed 4:3 rectangle, doing so would increase the rectangle's flux density by 64%. Suppose a 100 W arc lamp (such as the Philips MHD 200 c) generating 6000 lumens is used in a conventional LCD based projection system design, and that as a result 250 lumens of light flux falls usefully on the projections screen 26 (4% efficiency). In this case, if the system's circular output beam contained 1000 lumens before entering the LCD aperture 14, as for example in FIGS. 61 and 63, 500 lumens would be discarded by the LCD's polarizer, and of the remaining 500 lumens, only 61% or 305 lumens would be passing through the rectangular aperture and would be available for the projection screen 26. With only a 60% efficient approach for transforming and recycling (rather than truncating) the system's circular beam cross-section, 60% of the formerly truncated lumens, or 117 lumens, could be added to the 305 lumens or available flux, leading to a potential brightness gain of 1.4. (A 70% efficient approach would lead to a brightness gain of 1.45.) Given the implied projection efficiency of 82%, the 100 W lamp would generate 346 lumens rather than the 20 lumens without this beam-shape transformation. Then, with an 80% efficient means to recover the 500 lumens of wasted polarization, and the same ratios as before, 328 additional lumens can be transmitted to the projection screen 26, raising the total screen lumens to 674 lumens, a combined improvement over the original 250 lumens of 2.7. If 250 lumens were considered an adequate number for the optical system 10, the same result can be obtained, not with a 100 W arc source, but rather with a comparably efficient (60 lumens/watt) 37 W arc light source 12. Accordingly, using a 50 W arc source, one would expect to yield 337 lumens on the projection screen 26, which is still 35% more screen brightness than is generated with the unimproved conventional system's 100 W source. Lower wattage arc sources are generally preferred for several reasons. Aside from the implied energy savings, lower wattage sources have longer operating lifetimes and contribute less heat.

Figure 86:
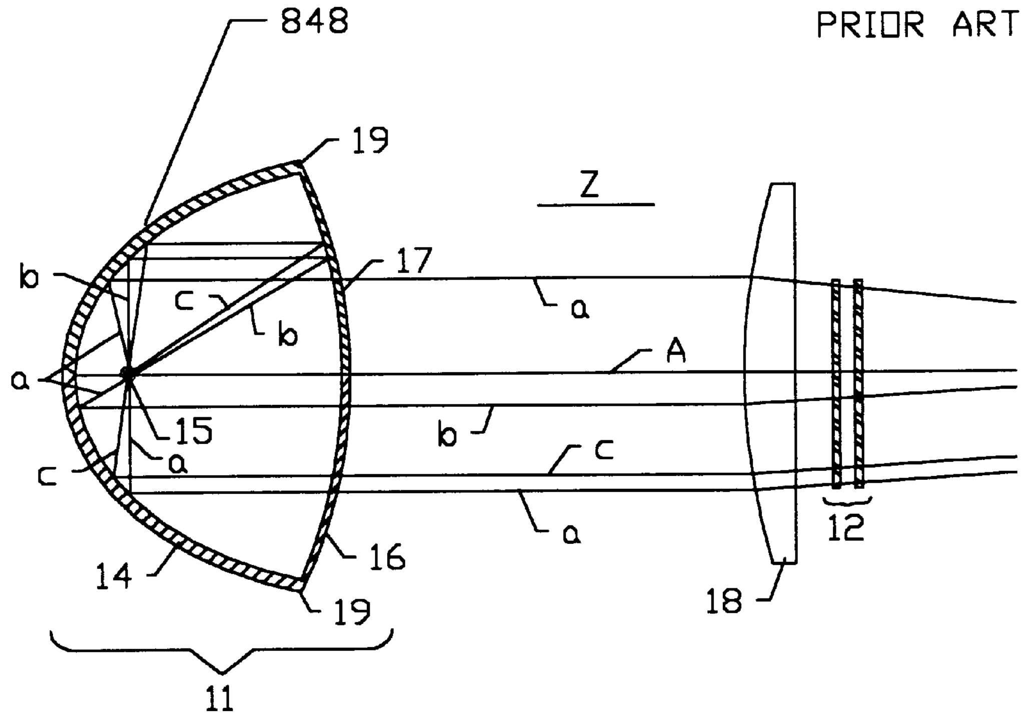
FIG. 86 illustrates a prior art reciprocating mirror method for illumination beam shape transformation.
Figure 87:
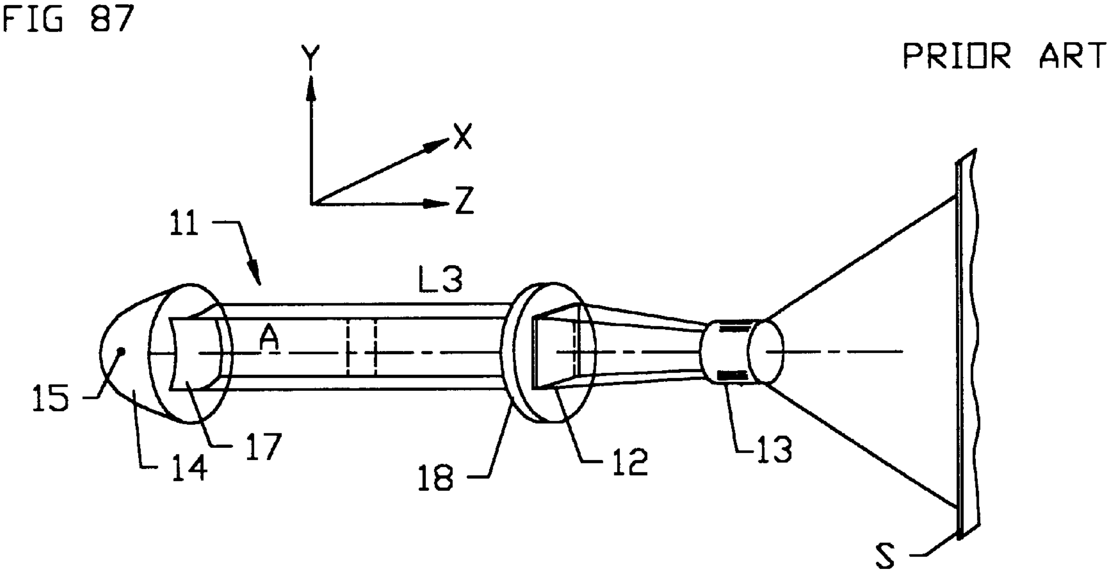
FIG. 87 illustrates another prior art mirror system for beam shape transformation.
Figure 89A:
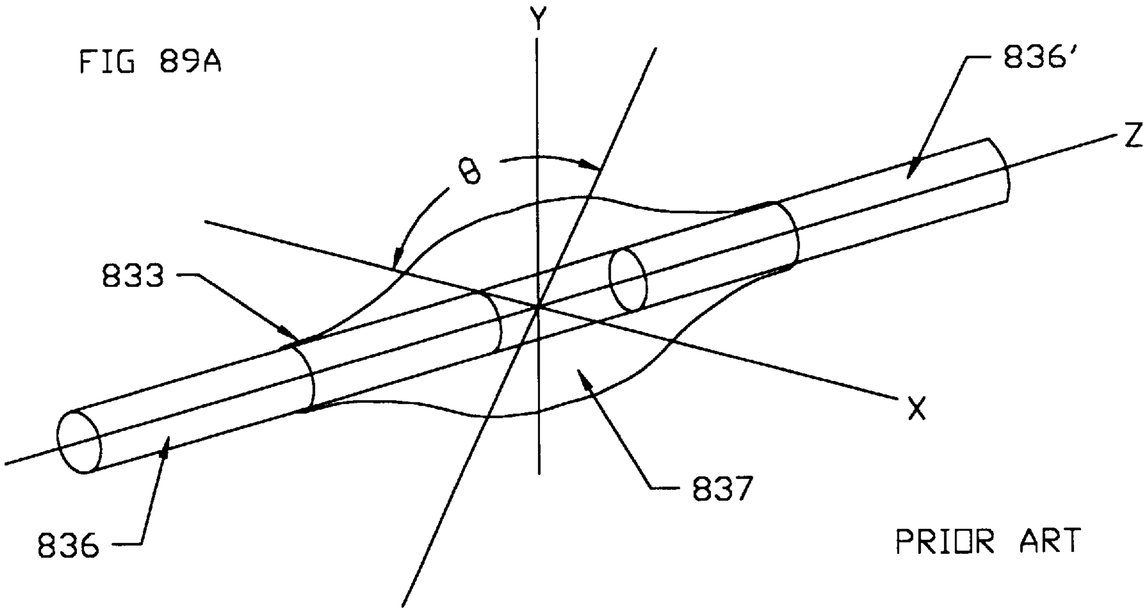
FIG. 89A is a perspective illustration of a conventional arc lamp and FIG. 89B is a perspective display of the near-field brightness distribution of a conventional (d.c.) arc source.
Figure 89B:
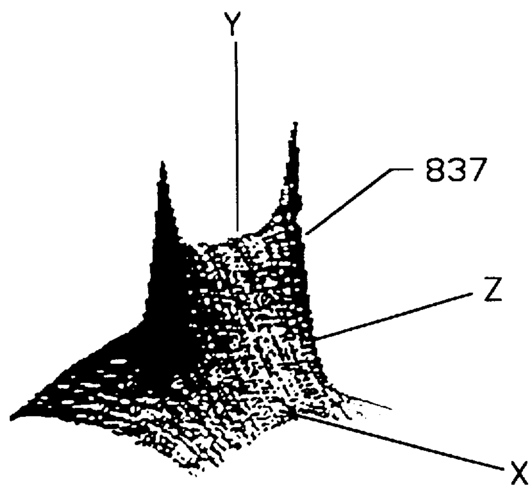
Figure 91:
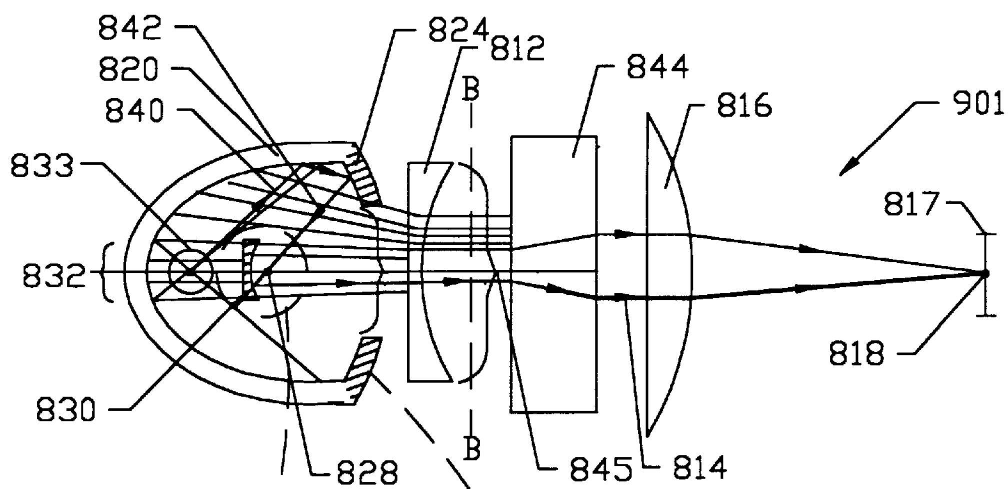
FIG. 91A is a variation on the embodiment of FIG. 90 with a beam expander and bracketing lens elements.
FIG. 91B shows a cross-sectional view along line B—B toward the arc source in FIG. 91A.
FIG. 91C is a magnified view of an alternative convex mirror for the embodiment of FIG. 91B.
Figure 91:
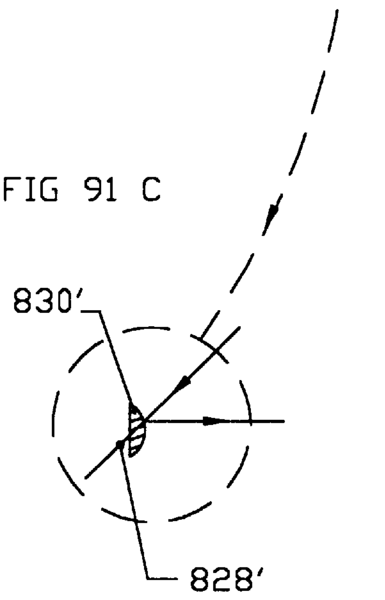
Figure 91:
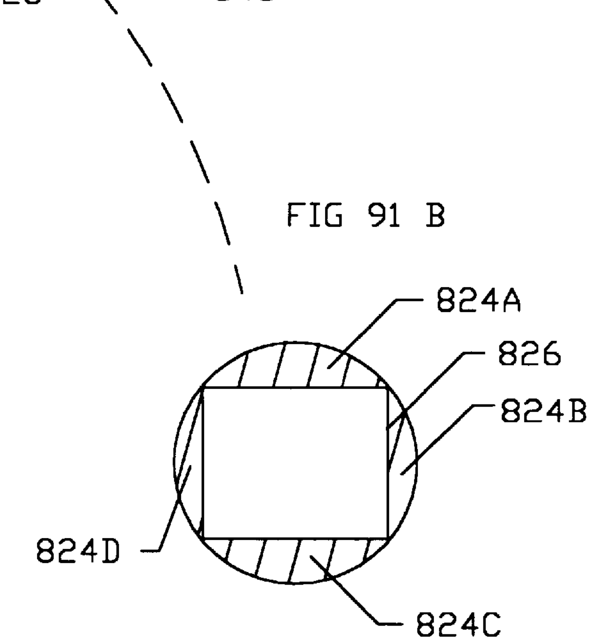

An efficient method for converting a light beam of circular cross-section to rectangular cross-section is described in FIGS. 90-91, using reciprocating mirrors 824 (824B) and 830 (830B) that re-cycle otherwise wasted light from the periphery of the circular output beam and into the central core of the correspondingly rectangularly-shaped output beam. These reciprocating mirrors 824 and 830 operate in conjunction with the conventional paraboloidal or ellipsoidal illuminators illustrated in FIG. 88 and 92, using the conventional glass-enclosed arc discharge light source illustrated in FIG. 89, and they do so without passing any of the recycled light through or near the arc. Perspective views of a conventional arc source's physical structure and near-field radiant distribution are shown in FIG. 89A and 89B respectively. Conventional beam-shaping methods are described by FIG. 86 and 87.

The embodiments of FIGS. 90 and 91 avoid problems of returning rays through the arc region 833 (see FIG. 86), and also use a reciprocating mirror design arranged so as to both recycle light and preserve beam uniformity. The example embodiment of FIG. 91 uses a negative lens 812 to pre-collimate output rays 814 for beam displacement, and a positive lens element 816 to re-converge the displaced rays to an appropriate focal point 818.

Using the embodiment of FIG. 90A as an example, light from the standard light source 12, which can be the ellipsoidal illuminator system 808 of FIG. 92, or the aspherized ellipsoidal systems described hereinafter, is collected from the output of FIG. 92 and directed towards the lens pupil 817 at the nominal focus 822 of the ellipsoid. A circular mirror of hyperboloidal or modified hyperboloidal form 824, with an axial aperture of rectangular cross-section matching the shape of the SLM 14, reflects light to the smaller concave (or convex) mirror 830 (or 830' in the embodiment of FIG. 90D). At this point the light is reflected by the small mirror 830 so that it is also directed towards the nominal focus 822 of the ellipsoid and the entrance pupil 817 of the system's projection lens 20. This arrangement is made feasible by the incorporation of a beam expander 844, which will be described shortly, as in for example FIGS. 97 and 98. The beam-expander 844 takes the interior (or formerly occluded area) in the center of the light beam produced by the light source 12, which can be the ellipsoidal arc source system 808 of FIG. 92 and then expands it to accommodate the light added by the small mirror 830 (or 830'), so that the overall etendue is preserved and so that there are no localized peaks in power density. By this manner, maximum use is made of the available light, as light that would have otherwise been unable to pass through the aperture of the SLM 14 is re-routed, as for example by the mirror set 824 and 830, through the SLM 14 and towards the entrance to projection lens 20 in a useful distribution.

In the first stages of designing such a light recovery system, the mirror 824 begins with a hyperboloidal form, but is then refined further to take on a modified form that preserves beam uniformity. The small mirror can be concave (830) or convex (830') and have a hyperboloidal or a modified hyperboloidal contour. These mirrors can also have an ellipsoidal or modified ellipsoidal contour, can be segmented, faceted or Fesnelized.

Arranged in the simple illustrative manner of FIG. 90A, a peripheral ray 840 is re-directed by the mirror 824 as ray 842 passing through the point 828 (or 828'), and is then re-directed by the mirror 830 (or 830') towards the focal point 822. As such, the peripheral ray 840 is transformed to an interior ray fitting within an occluded spatial zone 832.

The output light distribution from the mirror 830 mimics that of the light pattern on the reciprocating mirror 824, where incident light such as the ray 840 strikes one of the four peripheral crescent sections 824A, 824B, 824C or 824D (see FIG. 90C). Unless deliberately altered, the output distribution from the mirror 830 then has a rectangular interior dark zone corresponding to and proportional to the rectangular clear aperture 826 of the mirror 824. More significantly, the power (or flux) density that results in the four reduced-size crescent sections 827A, 827B, 827C and 827D in FIG. 90B located within the field of mirror 830 (or 830'), becomes significantly higher than the corresponding density within the surrounding beam areas. The overall beam profile is shown schematically in FIG. 90B for a cross-section along line B—B just to the right of the beam expander 844 in FIG. 90A. While there can be some applications that can withstand such a locally-skewed interior light distribution, it is generally preferable in most applications of the projection systems 10, to arrange for the flux in these crescent areas to be re-distributed evenly (or substantially evenly) throughout an interior light circle 835 shown in FIG. 90B, otherwise filling in the intrinsically vacant rectangular hole.

There are two basic steps to redistributing this light uniformly within the field of mirror 830 (or 830'). The first step, anticipated above, is that the entire beam is expanded by means of the beam-expander 844 so that the average flux density within the expanded interior light circle 835 approximately equals the average flux density in the exterior portion of the beam. The second step involves corresponding mirror shape changes that cause the light distribution of the reduced size crescent images 827A, 827B, 827C and 827D (see FIG. 90B) to be re-arranged within and throughout the region of light 831 projected by mirror 830 (or 830'). This re-arrangement can be accomplished by one of several possible means, each acting to distort or re-structure the crescent images on the mirror 830 (or 830') so that they take up more of the available interior region 831 of the light circle 835. One means for doing so involves modifying the functional shape of one or both of the conicoidal mirrors 824 and 830 (or 830') by means of their aspherizing terms to cause the crescent patterns to become purposefully distorted and overlapping. Another means involves segmenting, faceting or fresnelizing the surfaces of one or both the mirrors 824 and 830 (or 830') so that there is a deliberately designed distribution of the focal points 828 (or 828'), and so that the resulting light distribution on the surface of the mirror 830 (and within the light circle 835) is not a sharply focused image. A third and most preferable approach is to arrange to systematically blur the focusing precision of the reciprocating mirrors 824 and 830 (or 830') so that the points for the sharply-focused crescent images are not only blurred, but selectively blurred. This latter de-focusing method will be described in greater detail, as follows.

The reciprocating mirror method described above is applied to closely match the shape of the beam of light rays to the rectangular shape of the SLM 14 when the rays cross the plane of the SLM 14. It is preferable that any inhomogeneities developed within the rectangular cross-section be eliminated or minimized. The surpression of non-uniformity is achieved by means of secondary mechanisms that are applied to create the localized non-imaging behavior that blurs or evens-out any region of non-uniform flux densities, such as those of the crescent areas discussed above.

Each point on the SLM 14 is illuminated by a finite cone of light rays such as that meeting the requirements of an f/2.5 form of the projection lens 20. As a result, the aperture structure of the ellipsoidal (or modified ellipsoidal) illuminator 808 of FIG. 92 is, for example, pre-determined by surrounding every marginal point on the rearward projection of the principal rays through the margin of the SLM 14 with a small circle whose diameter is set by the f/number of the projection lens 20. The illumination system's circular output aperture is made large enough to include the combined area generated by the sum of these small circular areas of light.

The four outlying crescent areas 829A, 829B, 829C and 829D in FIG. 90B are defined by the area difference between the rotationally symmetric illumination system's circular output aperture, as above, and the inner area corresponding to the rectangular shape of the SLM 14. The combined crescent area can be seen to represent 39% of the overall circular beam area for the 4:3 rectangular aspect ratio used in the above examples.

In order to make use of the substantial amount of light contained in these crescent-shaped areas, the size of the circular region into which this flux is to be deposited is expanded, as taught above, so that the resulting expanded area equals that of the four crescent areas referred to above, namely the sections 824A, 824B, 824C and 824D. With this modification, the most efficient transfer of light energy from these out-lying crescent areas to the expanded interior region occurs when the entendue is preserved, a condition satisfied when a substantially uniform distribution of light is pre-arranged within the expanded area.

Beam uniformity is achieved by making corresponding shape modifications to one or both the reciprocating mirrors 824 and 830 (or 830'). Specifically, the curvatures of the segments of the mirror 824 are chosen so the contour generated by the principal rays encountering these segments, is a reduced and deliberately "blurred" image of the light pattern falling on the larger mirror segments. If only principal rays are taken into account, the result would be a sharply-focused illuminated area on the small mirror 830 (or 830') which has a rectangular clear area of the same proportion as that of the mirror 824. Since additional rays surround each principal ray due to the finite aperture of the projection lens 20, the imagery on the small mirror 830 is not point-to-point, but rather point-to-circular area. Because of this, the resulting imagery is intrinsically "blurred," and the rectangular clear area can be made to have a more uniform distribution of light because of the calculated overlaps of these areas of light. Preferably, the degree of intrinsic "blurring" is deliberately increased and directed so as to achieve a substantially uniform light distribution. The forms of the mirror crescent sections 824A, 824B, 824C, and 824D are individually adjusted such that a highly distorted light mapping is carried out by the principal rays. Then the combination of this adjustment with the aforementioned point-to-area mapping caused by the surrounding rays is used to secure the preferred degree of even illumination in the pupil of the projection lens 20 for all points in the area of the SLM 14.

A corresponding adjustment of the small mirror 830 (or 830') contour is also made to ensure that together with an even filling of the small mirror area that there will be a properly controlled angular distribution of radiant energy.

In yet a further embodiment of this general light shaping method, the beam-expander 844 can be used that creates a vacant area strip (or stripe), rather than the vacant area circle of FIGS. 90 and 91, and correspondingly, the reciprocating mirror 824 with the rectangular clear aperture 826 is replaced by one or two pairs of flanking cylindrical mirrors.

Another arrangement is shown in FIG. 93A using the light source 12 as the paraboloidal illuminator system 897 of FIG. 88. In this embodiment, the outer reciprocating mirror 824P has a paraboloidal or modified paraboloidal surface with the focal point 828P (or 828P'), and the smaller interior mirror 830P (or 830P' in FIG. 93B) also has a paraboloidal or modified paraboloidal surface with the common focal point 828P (or 828P').

An additional embodiment is described in FIG. 94 for paraboloidal illuminator systems 810. (The same approach can be applied to the ellipsoidal illuminator 808 of FIG. 92 by inserting a negative lens to weaken or eliminate the ellipsoidal convergence.) The embodiment of FIG. 94 uses the paraboloidal or modified paraboloidal reflector 848 to collect a significant angular fraction of the flux re-directing this wide angular range into a collimated output beam of circular cross-section that is output through the rectangular aperture 826 in the larger reciprocating mirror 824E. Preferably, the circular cross-section extends beyond the rectangular aperture 826 so that the resulting output beam is rectangular in cross-section. Doing so, causes that portion of light striking the reciprocating mirror 824E to be re-directed back towards the smaller reciprocating mirror 830E. Light rays missed by the paraboloidal or modified paraboloidal reflector 848 are also re-directed by the larger reciprocating mirror 824E to smaller reciprocating mirror 830E. So that the smaller reciprocating mirror 830E can re-direct both sources of re-cycled light, as above, to the interior portion of the output beam, the form of the larger reciprocating mirror 824E is made in sections, as will be described hereinafter. The beam-displacer 844 is provided to apply the correct amount of beam diameter expansion so that the power density of re-directed light matches the power density of light collimated by paraboloidal collector 848. A front view of embodiment of FIG. 94A as seen from the plane perpendicular to the line C—C in FIG. 94A is shown in FIG. 94E. The view in FIG. 94E shows the major sections 824E1–5 of the larger reciprocating mirror 824E, the output aperture 848' of the ellipsoidal or modified ellipsoidal reflector 848, and the output aperture 830E' of the smaller reciprocating mirror 830E. The outer toric section 824E5 of the ellipsoidal or modified ellipsoloidal mirror 824E, receives light rays directly from the arc source 833 and its focal point 850, and re-directs those light rays towards the first focal point 852 of the corresponding portion of the smaller reciprocating mirror 830E. The smaller reciprocating mirror 830E is paraboloidal or modified paraboloidal, with a second focal point at infinity. Accordingly, in this example, the re-directed output rays from the smaller reciprocating mirror 830E are made to run parallel to those of the paraboloidal or modified paraboloidal reflector 848. The inner crescent sections 824E1, 824E2, 824E3 and 824E4 of larger reciprocating mirror 824E, receives light rays that have been re-directed by the paraboloidal or modified paraboloidal reflector 848 that are substantially collimated. Accordingly, these mirror sections have a different shape than the mirror's outer toric section 824E5. In this case, the inner crescent sections 824E1, 824E2, 824E3 and 824E4 are designed to re-direct the in-coming collimated light rays towards focal point 828E, whereupon these rays will be output as collimated rays as shown in the magnified cross-section of FIG. 94D. Also, see the detailed portions of this embodiment in FIGS. 94B and 94C. Additional modifications to the shape of one or both the reciprocating mirrors 824E and 830E, including that of the individual sections as described above, are made to maximize beam uniformity in the same manner as illustrated for the embodiment of FIGS. 90–93.

Figure 95:
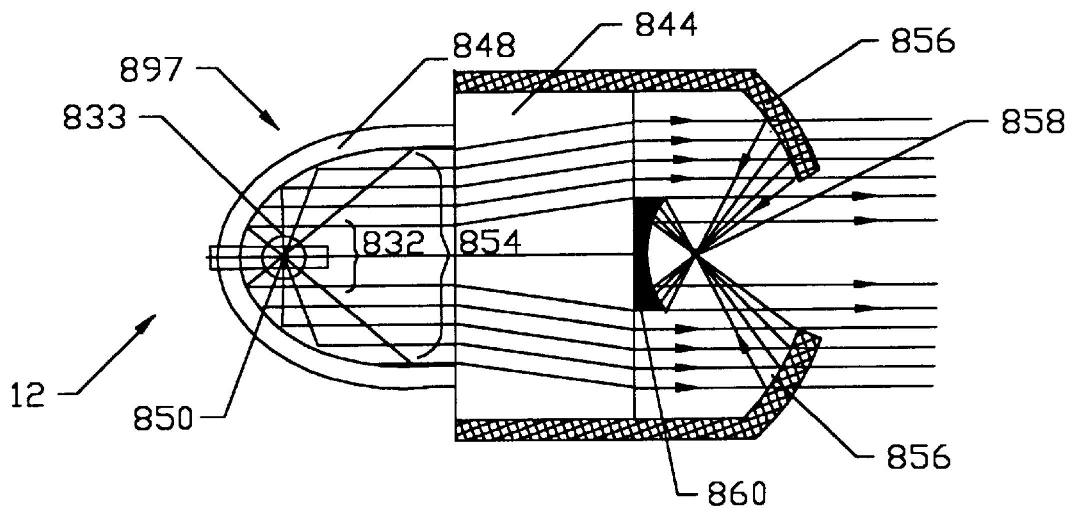
FIG. 95 is a variation on the embodiment of FIG. 90 with a collimated light source, beam expander, and external concave reciprocating mirror set.
Figure 96:
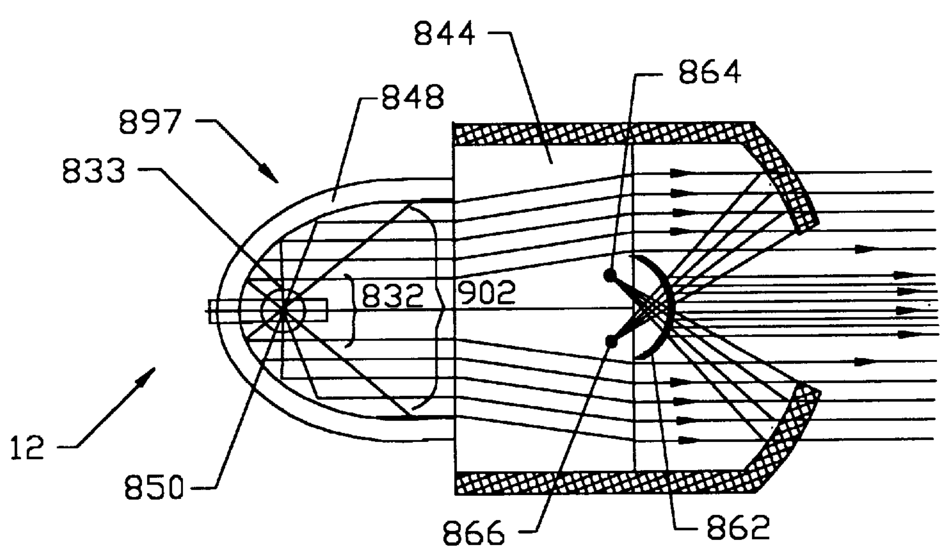
FIG. 96 is a variation on the embodiment of FIG. 90 with collimated light source, beam expander, and external convex/concave reciprocating mirror set.

It can be even more preferable to expand the beam 854 first and then perform the reciprocating mirror beam shape transformation, as done in FIGS. 95 and 96 shown for the paraboloidal illuminator system 808 of FIG. 88. This arrangement of elements leads to an integratable package, and is taken with the ellipsoidal illuminator system 808 of FIG. 92 as well, using the negative lens 812 as a pre-collimator. In FIG. 95, exterior mirror 856 is a paraboloid with focus at 858; and interior mirror 860 is, for example, a paraboloidal sector with focus at the point 850, although other forms are equally possible. FIG. 96 represents the case where the interior mirror 862 is convex. This format is advantageous as the virtual focal point can be located within the beam displacer 844 without interference. In either case, it is possible, as in FIG. 96, to design the system with two foci, 864 and 866.

In the numeric example provided hereinbefore, it was estimated that there might be 500 lumens in the circular output ray bundle 846 of FIG. 90 and that 61% or 305 lumens would pass through the rectangular aperture 826. Another 23.4% would be available after reflection and other losses for recycling and redistribution within the occluded spatial zone 832. This implies that the occluded spatial zone 832 would need to accommodate 117 lumens. Ordinary occluded zones are not expected to be larger than about 3 mm in diameter at plane 868 in FIG. 90 when the diameter of the concave mirror 915 is proportionally about 20 mm. Accordingly, there would be a dis-proportionally higher flux density in the occluded spatial zone 832 (about 1600 lumens/$cm^2$) than in the rectangular output aperture 826 (about 160 lumens/$cm^2$), which is impractical. With this flux density differential left uncorrected, the arrangements of FIGS. 90, 91, 93 and 94 would each exhibit a significant (10×) hot spot in the center of the output ray bundle 846 that would carry forward through the optical systems 10 of, for example, FIGS. 1A, 7–13, 20, 21, 32–38 and 54 and appear as a center brightness peak on the projection screen 26.

A preferred way to adjust for this imbalance on the projection screen 26 is to physically enlarge both the illuminator's output rectangle diameter and simultaneously the diameter of the occluded spatial zone 832 (see FIG. 91). For the numerical example used above, enlarging the occluded spatial zone 832 to 9.65 mm, and proportionally enlarging the outermost beam diameter, balances the inner and outer flux densities, and yields a uniform output ray bundle profile (average flux density of about 160 lumens/$cm^2$). Another approach would be to adjust the optical power of the concave mirror 830 (or 830') (see FIGS. 90A and C) so that the redirected rays have a proportionally larger output angles, yet still fall with the range where they would be able to pass through both the SLM 14 aperture and the entrance aperture of the projection lens 20. Of these two approaches, which can be applied separately or in combination, it is typically more efficient to enlarge the beam diameter by means of the beam displacer or expander 844.

Figure 97:
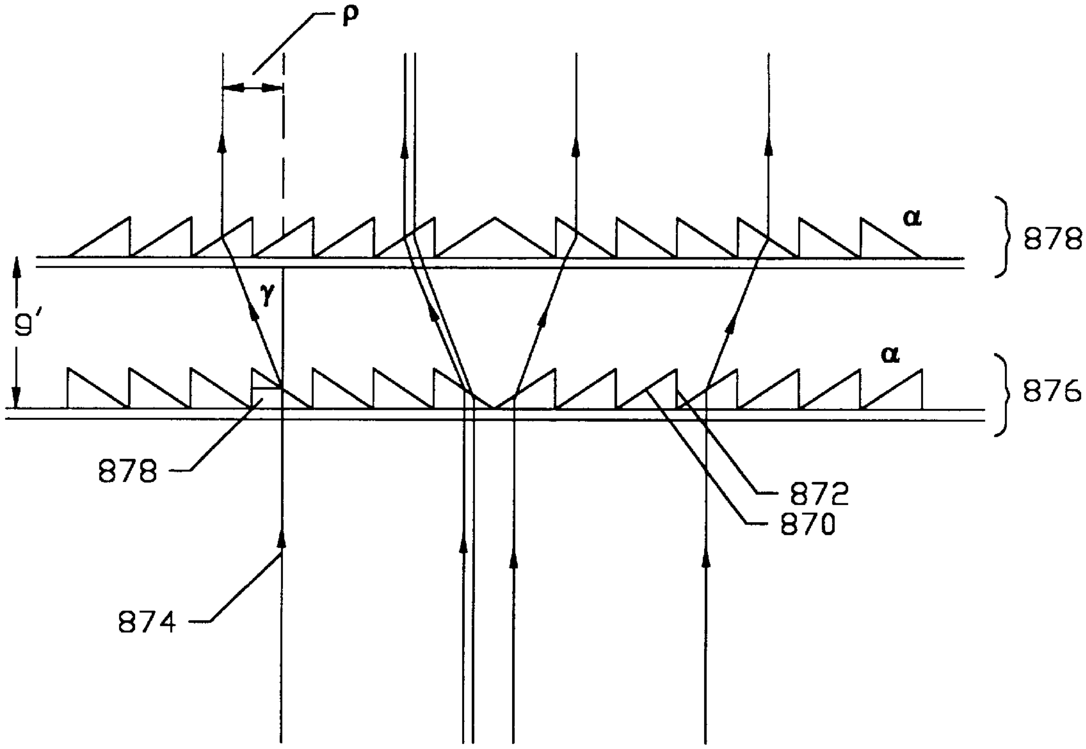
FIG. 97A is a beam-shape transformation element with double Fresnel-type prismatic beam expansion components.
FIG. 97B shows the detailed angular arrangements of the light rays passing through FIG. 97A.
FIG. 97C is a variation on the embodiment of FIG. 90 with a collimated light source and prismatic beam expander.
Figure 97:
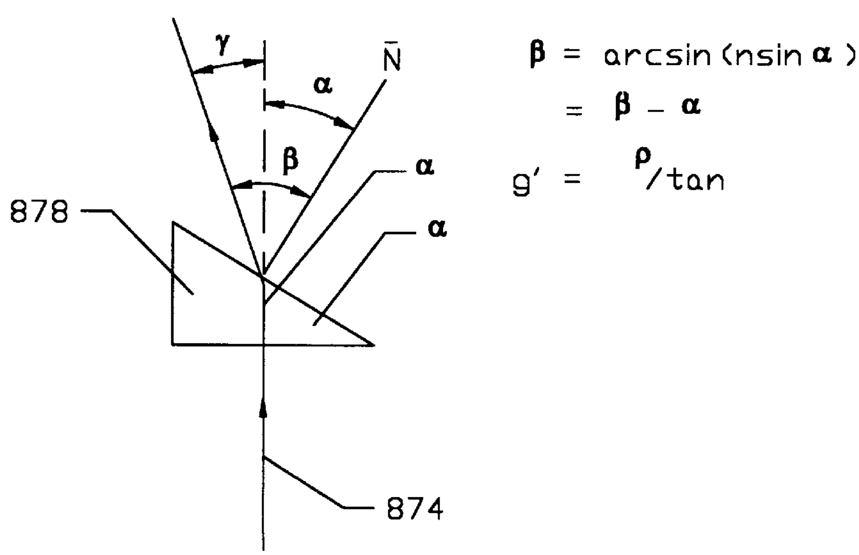
Figure 97:
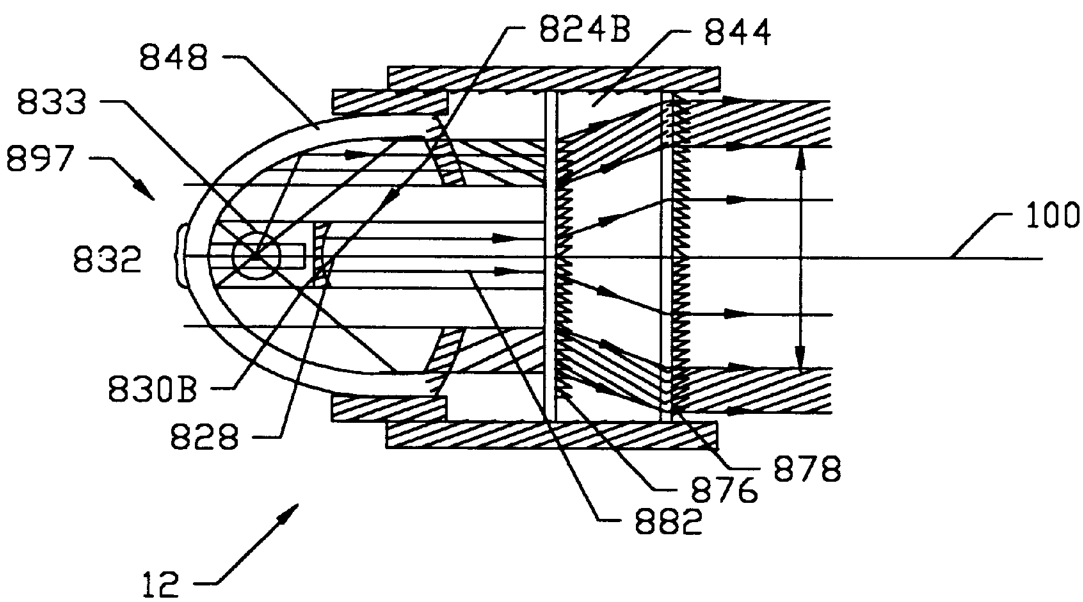

One way to expand the light beams 846 of the type in FIG. 90A is to apply the collimated light prismatic beam-displacement method of FIGS. 26–28, which in one example, the Fresnel-like radially-grooved prismatic film element sheets 402 and 406 separated by the gap, g, were used for the opposite purpose, to reduce a beam's diameter. While the system developed in FIGS. 26-27 functions in both directions, and a light beam incident on the prismatic film layer 406, for example, would exit the prismatic film layer 402 with a larger diameter, some inefficiency would be caused by light rays falling undesirably on prism side facets such as side facet 872, rather than on the hypotenuse facets such as facet 870 (see FIG. 97A). A more preferable arrangement for beam expansion by this method is shown in FIGS. 97A and 97B has each of the prism film layers 402 and 406 in FIG. 27 rotated by 180 degrees about the horizontal axis forming a new set of prism film layers 876 and 878 respectively, so that in this orientation the prism's side-facets 872 do not come into play Consider light ray 874 in FIG. 97 incident on the prismatic layer 878 at normal (or near normal) incidence. This light ray 874 passes through the second prismatic layer 878 and refracts into air at an angle to the normal, γ, given by $$\gamma=\beta-\alpha$$

where α is the prism angle (the same was assumed in this case for both the prismatic layers 876 and 878), n is the prism refractive index and $$\beta=\arcsin(n\sin\alpha)$$

Accordingly, the relationship between beam expansion ρ and the gap, g', becomes $$\rho=g'\tan\gamma$$

Figure 93:
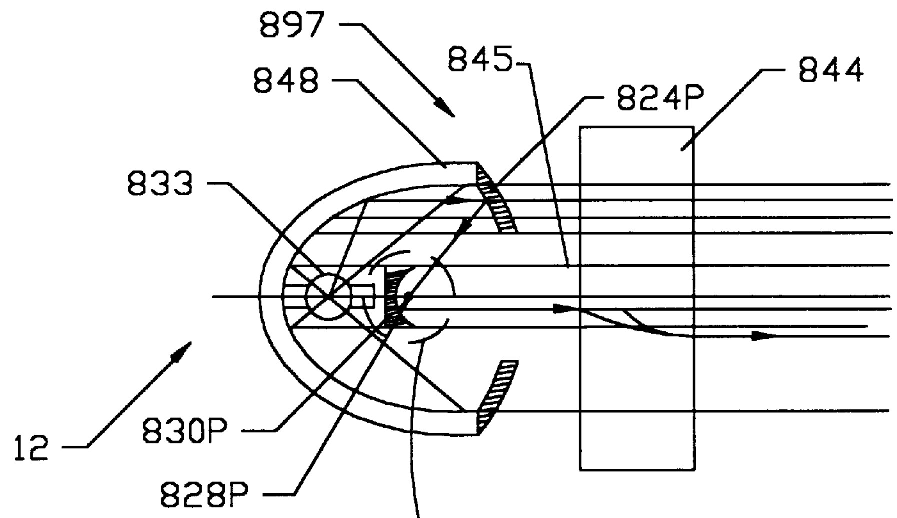
FIG. 93A is a cross-sectional view of a variation of the embodiment of FIG. 90 with a collimated light source and FIG. 93B is an alternative convex mirror for the embodiment of FIG. 93A.
Figure 93:
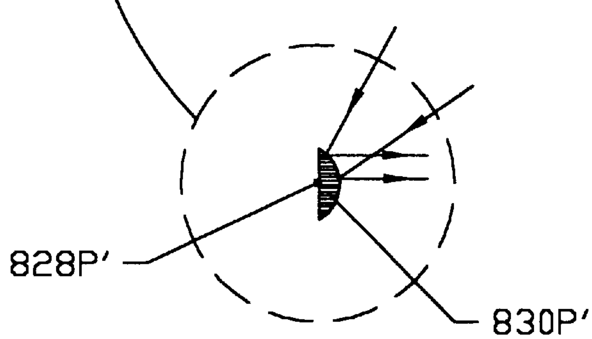

For a 30 degree form of the prismatic layer 878, the gap, g, associated with a 9.65 mm displacement (4.825 mm on each side) is 12.6 mm, which is an extremely compact solution. The combination of this system within the embodiment of FIG. 93 is illustrated in FIG. 97C.

The prismatic film layer 876 and the second prismatic film layer 878 can be formed with either be macro-sized or micro-sized prisms (as in the diamond-cut grooves typical of Fresnel-type lens elements or the so-called Brightness Enhancing Film (BEF) as manufactured by 3M Corporation). The only limitation is that the prism periodicity should be chosen to avoid optical interference from Moire patterns which can be generated between the two prismatic film layers 876 and 878, as well as between these elements and the SLM 14. Common methods of Moire avoidance include making each elements prism period different, and making the prism periods sufficiently smaller or larger than the SLM 14 pixel dimensions (10–20 microns).

One other example of a means for enlarging the occluded spatial zone 909 (see for example FIG. 98B) is shown as refractive element 880 in FIG. 98A. The example of collimated input rays 882 is used for simplicity, and the same reciprocating mirror method illustrated in FIG. 97C. The collimated input rays 882 can always be provided either by the paraboloid system 810 of FIG. 88, or by using a negative lens (not shown) at the output of the ellipsoidal system 808 of FIG. 92. The refractive element 880 that enlarges the central zone can be formed of any suitable transparent plastic or glass material. In one embodiment shown in FIG. 98B, the refractive element 880 is located preferably directly to the right of the larger reciprocating mirror 824. In the specific example of a 20 mm beam diameter, and forming the element using a medium of refractive index 1.5, the overall length, L, as in FIG. 98A, of the conic element along the optic axis 100 would be 22.59 mm (or 0.89"). It is also possible to locate the refractive element 880 to the left of the concave mirror 824, but the element's shape would preferably be modified to account for the more complicated ray paths.

Figures 99A, 99B:
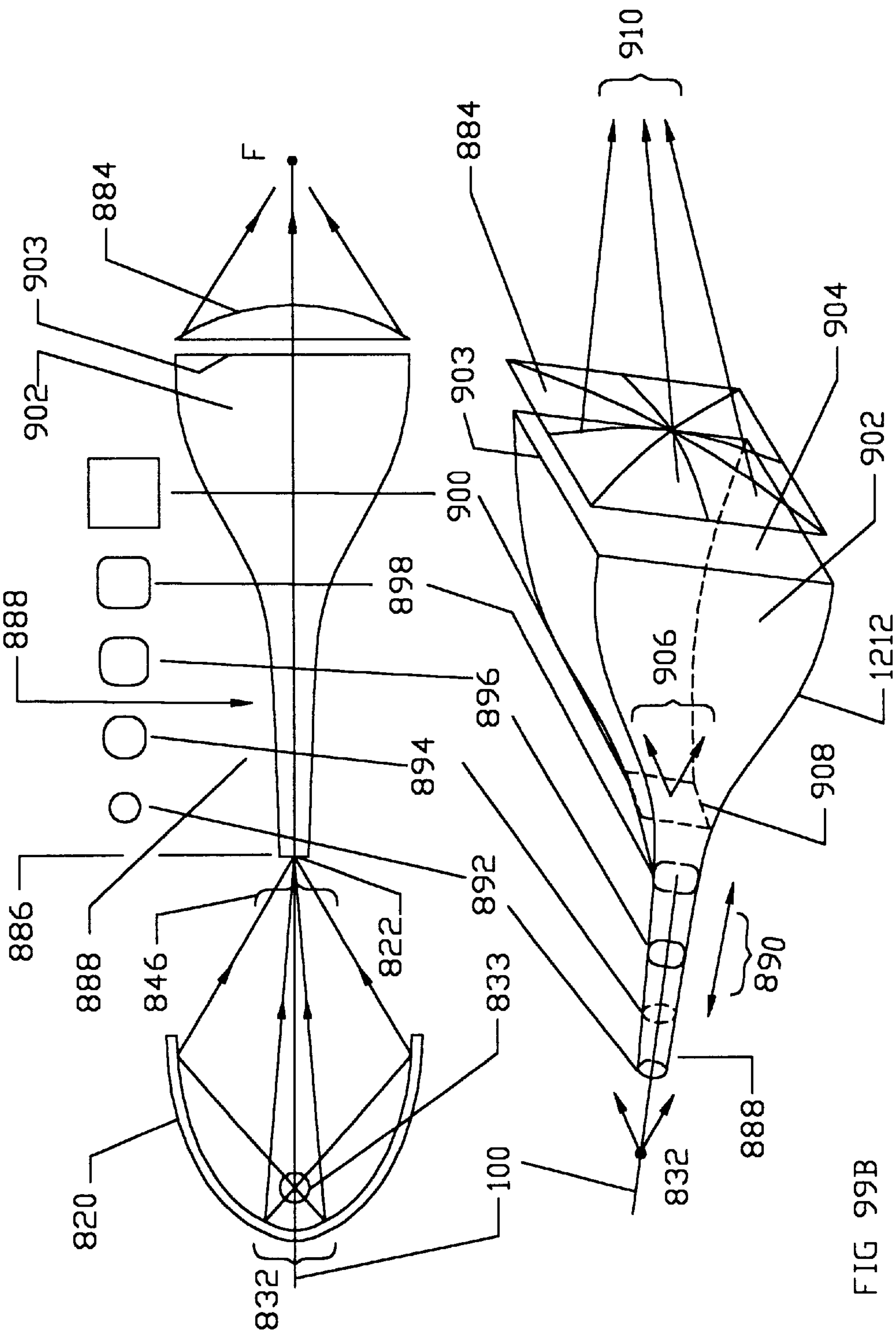
FIG. 99A is a cross-sectional view of an adiabatic beam-shape transformation and non-imaging collimation system using the converging light source of FIG. 92
FIG. 99B is a perspective view of the light pipe section used in FIG. 99A.

Another method for efficiently transforming the shape of the circular output ray bundle 854 or 846 (see FIGS. 88, 90 and 92 for example) produced by the ellipsoidal or paraboloidal light source reflector systems 808 and 897, is depicted in FIG. 99A for the ellipsoidal light system case. The method of FIG. 99A consists of a converging output lens 884, to provide for proper focal point F for the projection system 10. The circular bundle of the converging input light 846 fills the input aperture 886 of a well-matched lightpipe 888 of circular input cross-section that has been formed of glass or plastic. The cross-sectional area of this lightpipe 888 is pre-formed to a shape that extrudes mathematically from circular to rectangular, and preferably does so adiabatically, over a necessary length 890 so that there is minimum associated loss from either the scattering caused by too abrupt slope changes or from any associated total internal reflection (TIR) failures caused within the lightpipe 888 during the process. Several illustrative cross-sections are shown as 892, 894, 896, 898 and 900 in FIGS. 99A and 99B. Once the necessary shape transformation has been effected, or as part of the adiabatic shape transformation process, the lightpipe's diameter is increased in a prescribed way so that the calculated cross-sectional profile of a non-imaging optical angle transformer 902 is developed with end face 904 (conventionally referred to as a Compound Parabolic Concentrator, "CPC"). It is the designed property of this angle transformer 902 that ray bundle 906 at its entrance aperture cross-section 908 propagates in the dielectric element 902 by TIR (total internal reflection) at the sloped sidewalls 1212 formed by the dielectric air boundary layer, such that the angular-aperture area transformation equality known as the Sine Law operates or substantially operates between the aperture cross-section 908 and the end face 904 as: $A_1\mathrm{Sin}^2\,\theta_1=A_2\mathrm{Sin}^2\,\theta_2$, where $A_1$ is the rectangular cross-sectional area at the cross-section 908, $\theta_1$ is the half angle of the ray bundle 906, $A_2$ is the rectangular cross-sectional area of the end face 904, and $\theta_2$ is the half angle of output ray bundle 910.

Both the shape of the CPC sidewall and the output angle of the ray bundle 910 can be modified by optionally including the converging lens element 884. Elements represented schematically by FIGS. 99A and 99B have been designed and analyzed using Breault Research Organization, Inc. optical modeling/tracing software ASAP, and were found to have practically no geometrical conversion loss between the circular and rectangular cross-sections indicated.

Once the illumination source has been so arranged to have a rectangular beam cross-section, the methods for doing so can be combined with one of a number of split-beam polarization recovery and color sequencing methodsto deliver a deliberately polarized beam of rectangular cross-section suitable for the optical systems 10 of FIGS. 1A, 7–13, 20, 21, 32–38 and 54.

In such modifications, it is further desirable to utilize efficient collimated, unpolarized light sources making use of the beam-shaping methods described above. Therefore, four collimated, unpolarized rectangular light (CURL) source arrangements 916, 918, 920 and 922 are summarized schematically in FIGS. 100–103, based on the various embodiments described hereinbefore. Each contains either the paraboloidal or modified paraboloidal reflector 848 for the arrangements 916 and 920 or the ellipsoidal or modified ellipsoidal reflector for the arrangements 918 and 922, the arc source 833, the reciprocating mirror set, such as for example, 830 and 824, 830P and 824P, or 862 and 856, the beam expander 844, and in addition for the case of the arrangements 918 and 922, the negative collimating lens 812. When combined with a method for purely polarizing each system's unpolarized output, a collimated and purely polarized beam having rectangular cross-section is so generated. Such purely polarized light sources 12 are highly preferred with the above polarization-dependent image projection system 10 inventions, to obtain bright, uniform, and ghost-free projected images.

Figure 104:
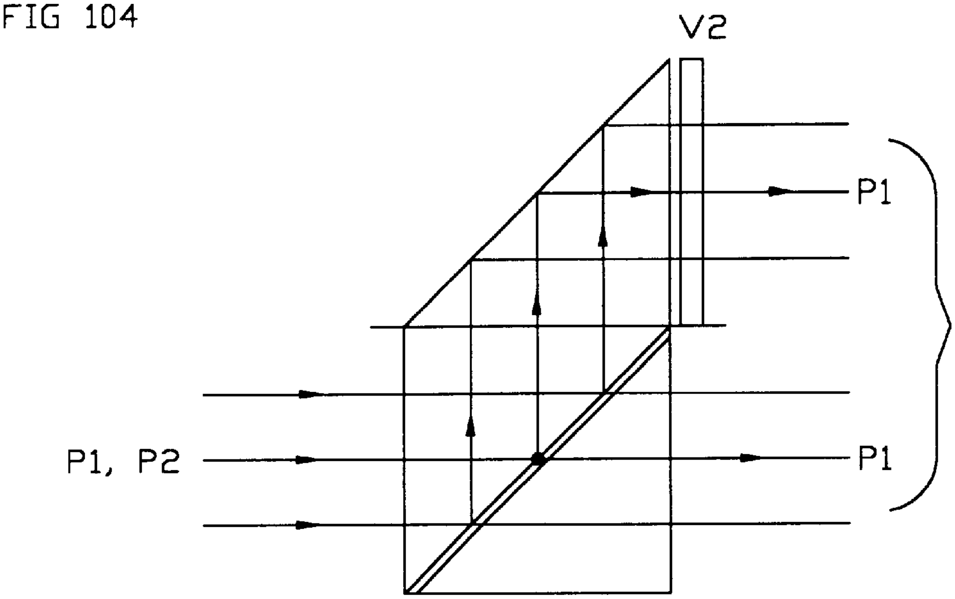
FIG. 104 shows a prior art light source polarizer.
Figure 105:
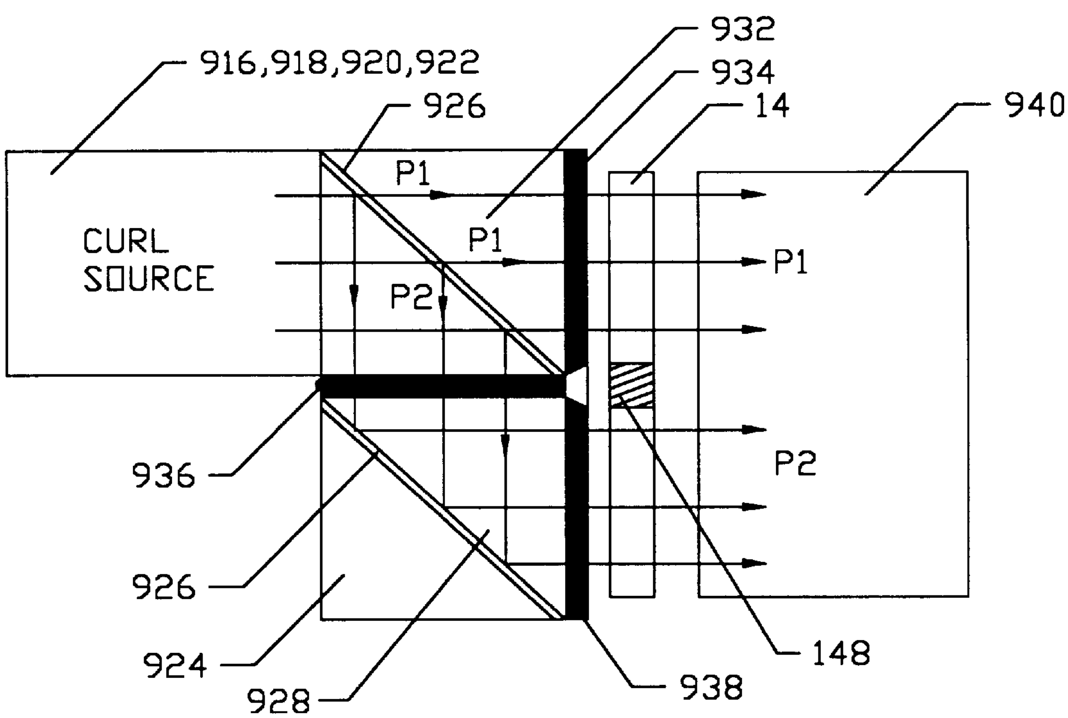
FIG. 105 shows a light source polarizer embodiment used with the CURL sources of FIGS. 100–103, a split-image SLM and a projection lens.
Figure 106:
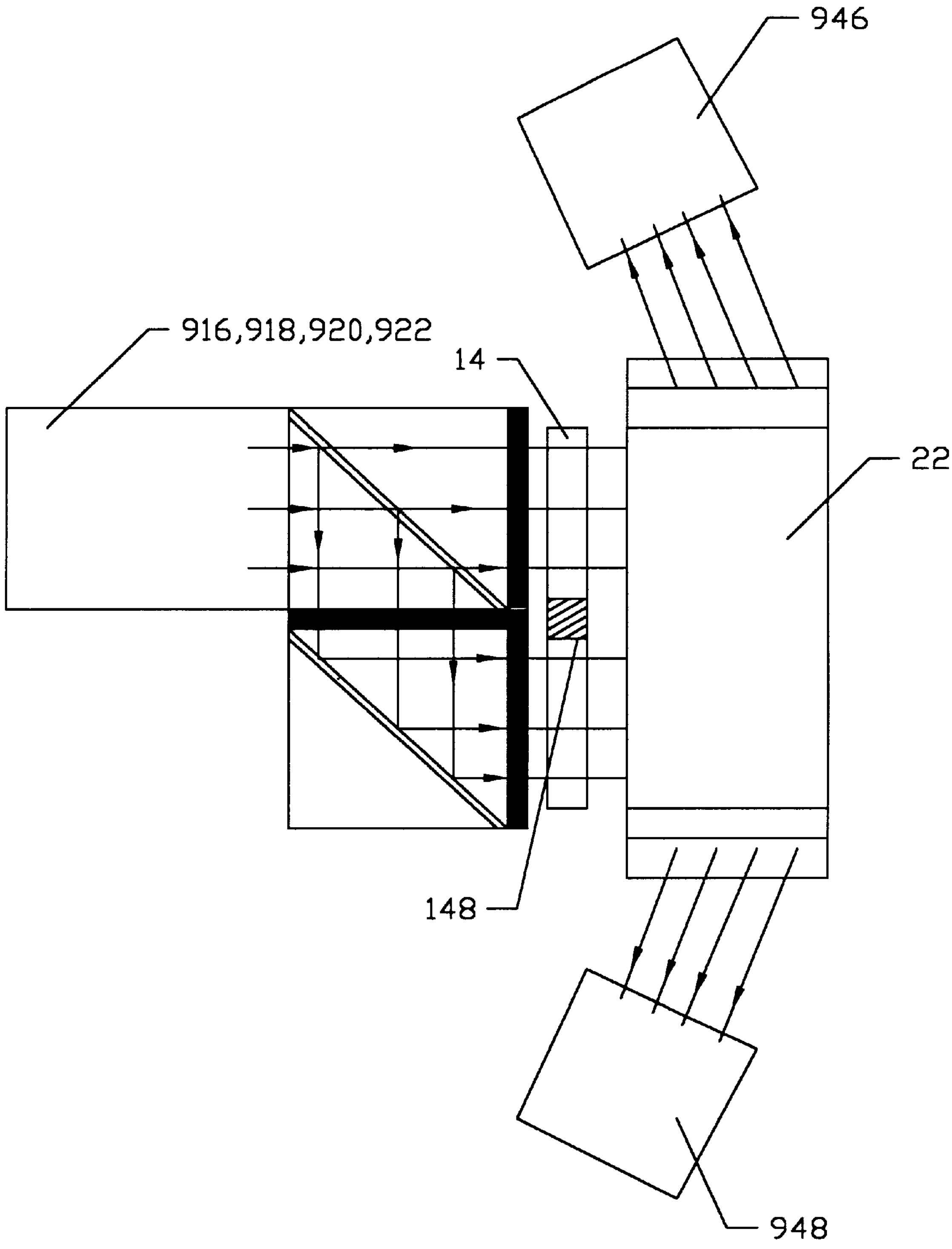
FIG. 106 shows a two projection lens variation of the embodiment of FIG. 105.

A conventional polarization recovery system is shown in FIG. 104 for generating a polarized output beam. A preferred wide band polarization recovery system suitable for use with the projection systems 10 utilizing the CURL sources 916, 918, 920 and 922 is illustrated in FIGS. 105 and 106. In the embodiment of FIG. 105, one of the four CURL Sources 916, 918, 920 and 922 is combined with a polarizing beam splitter consisting of preferably, a wide band 3M-type polarization selective reflecting or beam splitting film 926, such as for example layers 116 and 118 in FIG. 1A. Also included are layers 754, 756 758 and 760 in FIG. 81, and in FIG. 105 four Porro prisms 924, 928, 930 and 932, three absorption type polarizers 934, 936 and 938 as discussed above with the absorption polarizer 934 blocking P2, the polarizer 936 blocking P1 and the polarizer 938 blocking P1, the SLM 14 with the buffer zone 148, and in this case, telecentric projection lens 940. In the embodiment of FIG. 106, a second beam-splitter 22 is used to re-direct the light at the SLM 14 output orthogonal to the original direction and in opposite directions, each to an upper and lower telecentric projection lens 946 and 948.

Figure 107:
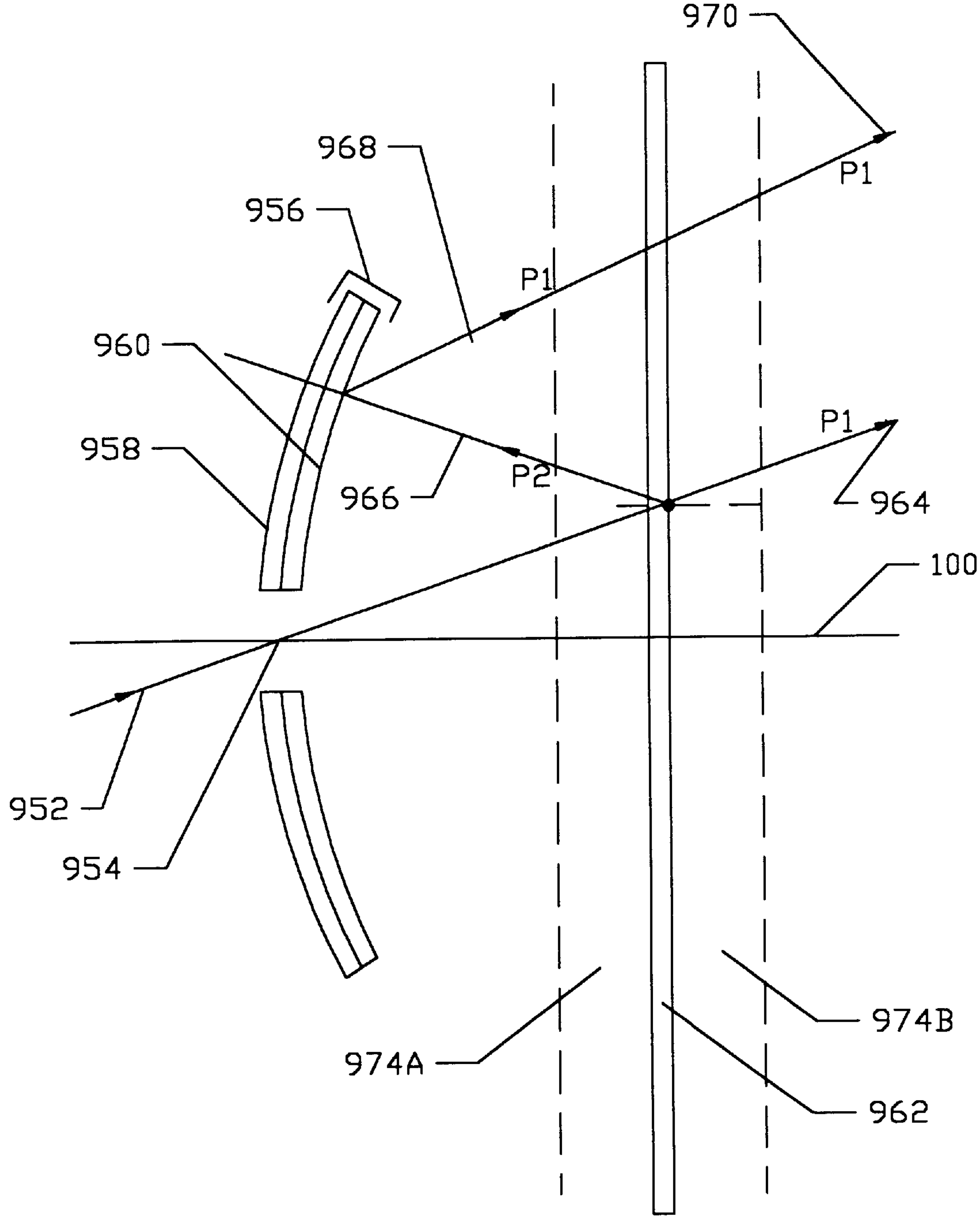
FIG. 107 shows the cross-sectional view of a light source polarizer based on polarization-converting and selective-reflecting reciprocating mirrors.

In FIG. 107 is shown another embodiment for efficiently pre-polarizing light generated by the converging-type light source 12, rather than the collimated-type light source 12. An acceptable form of the converging source 12 can be the ellipsoidal system 808 of FIG. 92, the paraboloidal system 897 of FIG. 88 with a converging or condensing lens (such as, for example, a plano-convex lens) or any one of the CURL-type sources 916, 918, 910 and 922 of FIG. 105 with such a converging or condensing lens. This embodiment uses two reciprocating reflecting elements 956 and 962, the element 962 being arranged in conjunction with refractive media 974A and 974B, the element 956 being arranged with a small light inlet hole 954. Together, the elements 956 and 962 selectively pass, convert and recycle polarized light so as to convert unpolarized input light rays such as ray 952 to polarized output light rays such as ray 964. The illustrative input light ray 952 passes through focus at or near the small physical hole 954 in the first reflecting element 956 which is centered on the ray's point of convergence. The reflecting element 956 is composed of two layers: a metal or metallic reflective layer 958 (see previous description of the polarization handedness conversion at a metal or metal-like film layer)) and a preferrably quarter-wave polarization retardation layer 960 (see previous description of the wide band retardation layers). The reflecting element 962 is composed of a single wide band polarization selective material that passes P1 and reflects P2 (see previous descriptions of wide band polarization selective reflecting materials). The illustrative ray 952 continues left-to-right through the hole 954 and the refractive media 974A until it strikes the second reflecting element 962, whereupon it is split into two orthogonally polarized rays 964 and 966. The polarized ray 964 is transmitted left to right in polarization state P1, and the other polarized ray 966 is back-reflected towards the polarization-converting and reflecting element 956 in the orthogonal polarization state P2. The back-reflected polarized ray 966 on approaching the reflecting element 956 first passes right-to-left through the polarization retardation layer 960, strikes the polarization converting reflective layer 958, which converts polarization state (right hand circular to left hand circular and vice versa) and redirects the ray back towards the second reflecting element 962 as P1 ray 968, orthogonal to the polarization of the ray 966. As such, the orthogonally polarized ray 968 passes through the reflecting element 962 as output ray 970, having the same polarization state P1 as the originally polarized ray 964. In effect, this mechanism develops two beams, one original and one recycled, having the same polarization states. The illustrative light ray 952 can be said to have been polarized by the polarization selective reflecting element 962, and the orthogonally polarized ray 966 said to have been recycled and converted to the same polarization as the original output light ray 964. The relative shapes of the two reflecting elements 956 and 962, as well as their positions can be adjusted, along with the associated inclusion of other means of optical power, such as first and second refractive materials 974A and 974B, so that the two resulting output polarized rays 964 and 970 overlap in such a way that their composite behavior is as of a single beam of light. For example, the polarization selective reflecting layer 962 can be either a flat plane or a weakly curved as a conicoid, with or without aspherizing terms. The first reflecting element 956 can be a conicoid with or without aspherizing terms. The addition of aspherizing terms can be used as a means to provide final adjustment on achieving sufficient the preferable amount of spatial beam uniformity or the preferable angular distribution of rays or both.

Figure 108:
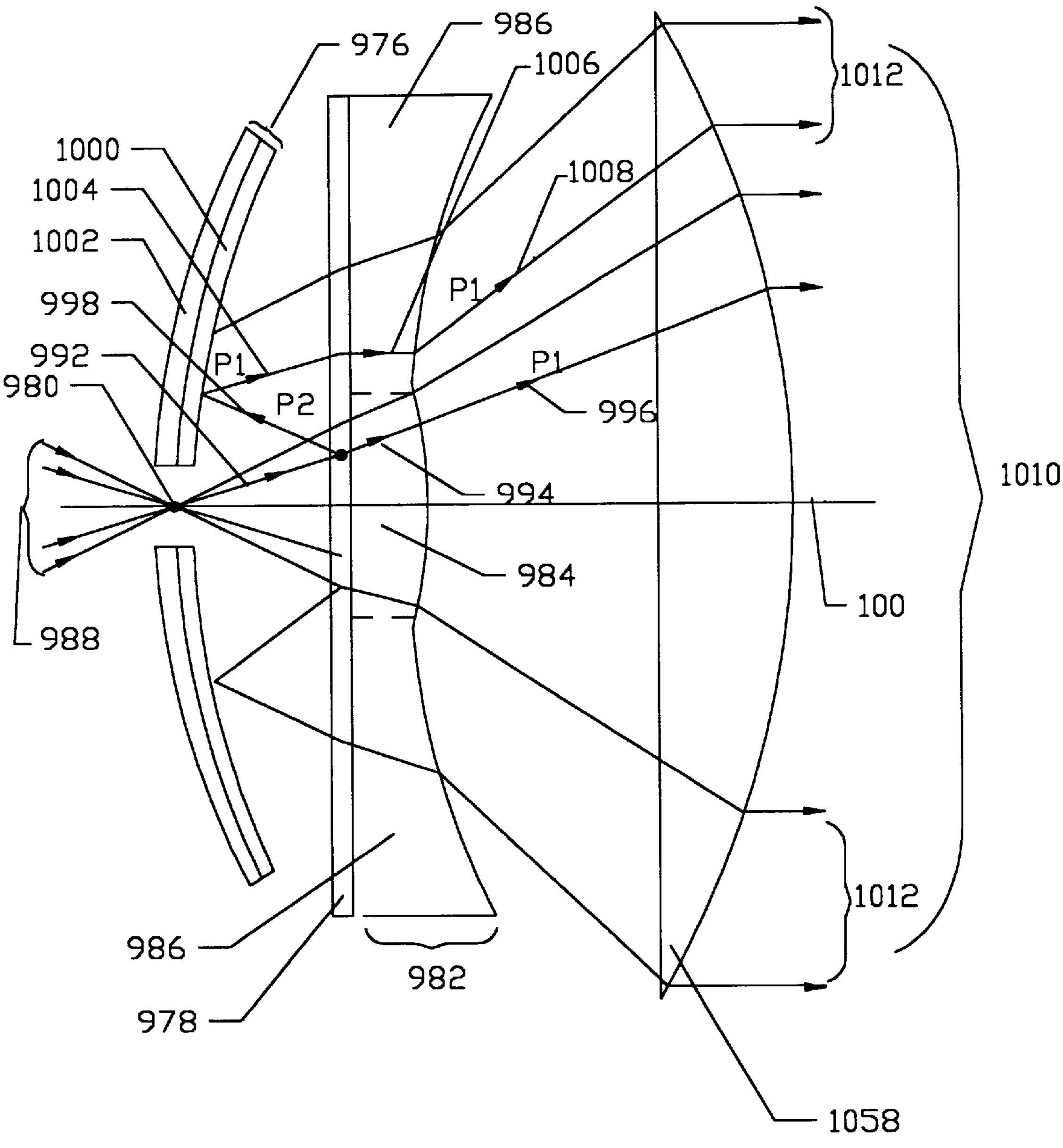
FIG. 108 shows the cross-sectional view of an embodiment of FIG. 107 based on a concave polarization-converting reflector with inlet hole, selective-reflecting plane, composite lens element and collimating lens.

In a further embodiment in FIG. 108 a first reflector 976 is a paraboloidal (or modified paraboloidal) section with a radius of curvature of 30 mm and a second polarization selective reflector 978 (such as the previously discussed 3M type polarization selective reflecting film) separated from the first reflector's paraboloidal vertex 980 by 2.5 mm. The polarization selective reflector 978 is further combined with a composite refractive element 982 whose central portion 984 operates like a plano-convex lens, and whose peripheral portions 986 operate like plano-concave (negative) lenses. Incoming un-polarized light beam 988 converges to the aforementioned paraboloidal vertex 980, and then diverges symmetrically about the system's optic axis 100 left-to-right towards the polarization selective reflector 978. Ray 992, for example, on striking the second reflector 978 , is partially transmitted as, linearly polarized light ray 994 of polarization state P1 within the refractive lens portion 984 and transmitted as output ray 996 of polarization state P1. When the ray 992 strikes the second reflector 978, the non-transmitted fraction is reflected, for example, as linearly polarized light ray 998 of the orthogonal polarization state to P1, P2. This back-reflected light ray 998 of polarization P2 continues left-to-right until it passes through the first polarization-converting layer 1000, in this case preferably a quarter-wave retardation film, and becomes left-hand circularly polarized. When this so-converted ray 998 is re-directed by metalized reflecting layer 1002, the incoming left-hand circularly polarized light ray 998 is converted to an outgoing right-hand circularly polarized ray 1004 as has been described several times previously, which upon such re-direction, passes back again through the converting layer 1000 and is polarized as P1. The P1 polarized ray 1004 proceeds towards the second reflector 978 at an angle determined by the surface contour of the first reflector 976. On striking the reflector 978, the ray 1004 in polarization state P1 is transmitted as ray 1006 and refracted within negative lens portion 986 of the composite lens 982, emerging as output ray 1008 within the upper output beam 1012. By design, the output rays 996 and 1008 both appear to have come from (or very near) the original point of entry at point 980. The result, when all the rays of the incoming unpolarized beam 988 are traced, is a single diverging output beam 1010 of a single (linear) polarization. A characteristic of this output beam 1010 is that the peripheral rays 1012 are made up of rays whose polarization is ordinarily discarded, but that, by virtue of this design, have been recycled, converted and recovered as rays of useful polarization.

The embodiment of FIGS. 107 and 108 can be applied just as easily to produce an output beam with the upper image region 82 polarized as P1 and the lower image region 84 polarized as P2, which is the form preferred for practice with the split-image optical systems 10. In this preferred variation, instead of making the second reflector 978 a continuous sheet of 3M-type material that passes P1 and reflects P2 as in both FIGS. 107 and 108, the element 978 can be made with two orthogonally oriented portions, an upper portion of the element 978 that passes P1 and reflects P2, and a lower portion of the element 978 that passes P2 and reflects P1. The corresponding structure of the first reflecting element 976 remains unchanged, however, since the element 976 acts to re-direct incident light in its orthogonal linear polarization state, whether the incident state is P1 or P2. Equivalent combinations of shaped converting reflectors like the first reflector 976 and lens combinations separated by a flat or weakly-curved polarization selective reflecting planes are equally feasible; for example, the arrangements illustrated in FIGS. 50–55 can also be adapted for this purpose.

It is also most preferable for these embodiments that an output lens element such as 1058 in FIG. 108 be used either to pre-collimate the diverging output rays or alternatively to bring them to convergence at a pre-determined point. For example, consider the arrangement of FIG. 109, which combines the polarization recovery methods of FIG. 108 with the simple unpolarized ellipsoidal light source 808 of FIG. 92 and the collimating output lens 1058 as before. In this case, a collimated output beam 1016 of circular cross-section is produced with either a single or split polarization, depending on the form of the reflecting element 978. In addition, in FIG. 109, cylindrical mounting sleeves 1018 and 1020 are used to illustrate a particularly compact means for achieving the preferred co-axial and axial alignments of elements. This lens-barrel mounting method facilitates the addition of further elements and openings, as needed, for the general purposes of heat extraction, filtering and cooling.

Figure 109:
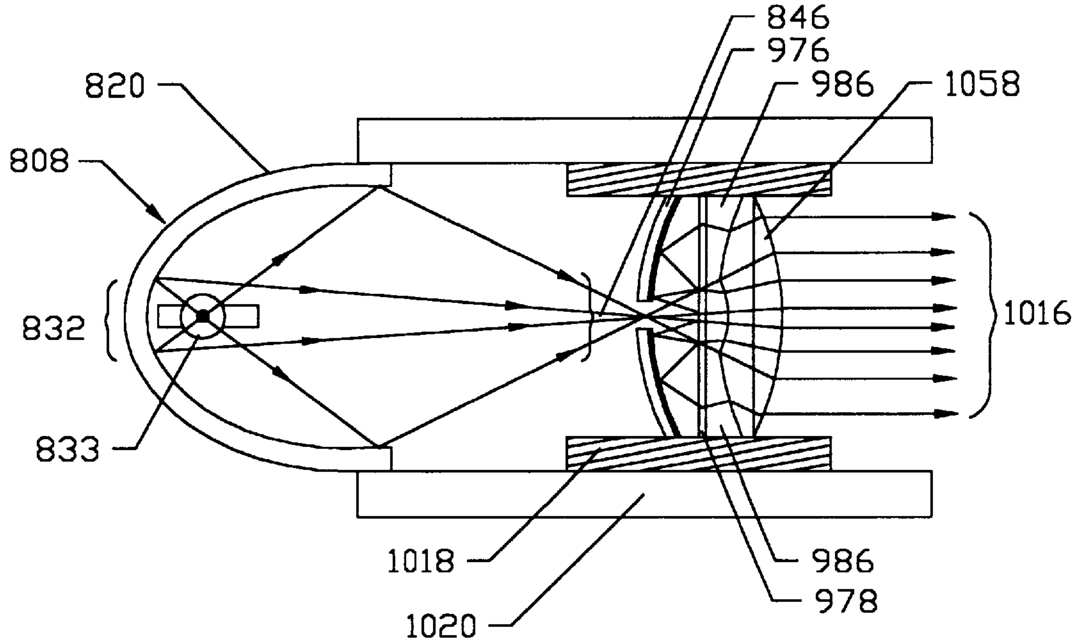
FIG. 109 shows a circular beam-shape variation on the polarizing system of FIG. 108 based on the converging light source of FIG. 92.
Figure 110:
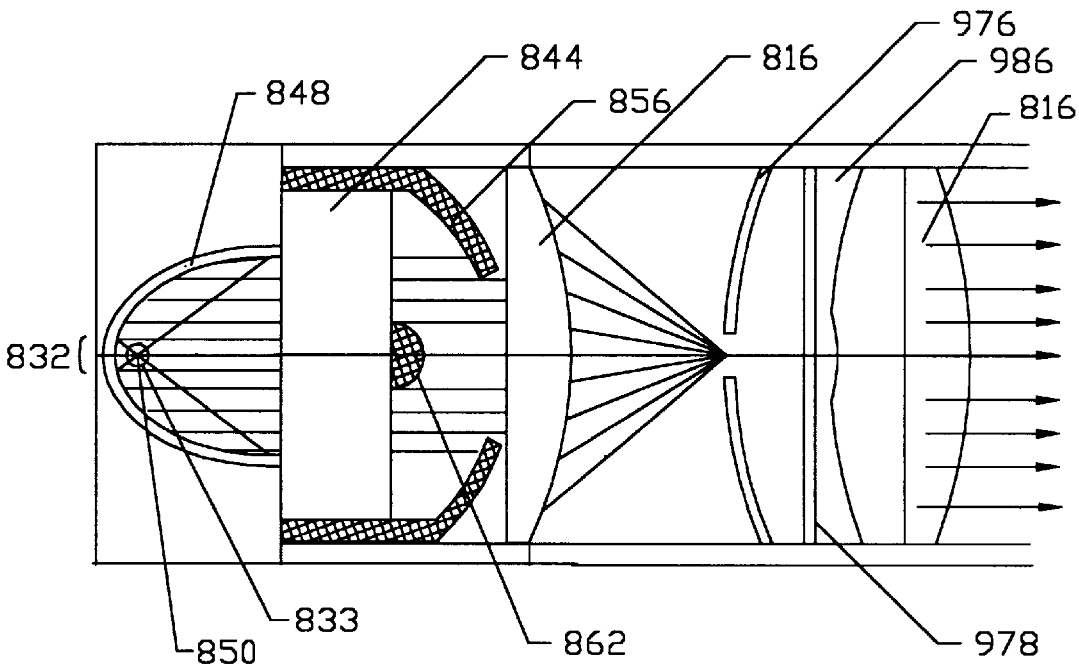
FIG. 110 shows a rectangular beam-shape variation of the polarizing system of FIG. 108 based on the collimated light source of FIG. 102 and a condensing lens.

A further variation on the embodiment of FIG. 109 is illustrated in FIG. 110. This embodiment achieves both the rectangular beam-shape transformation of FIG. 102, for example, and the polarization processing of FIG. 108.

Figure 102:
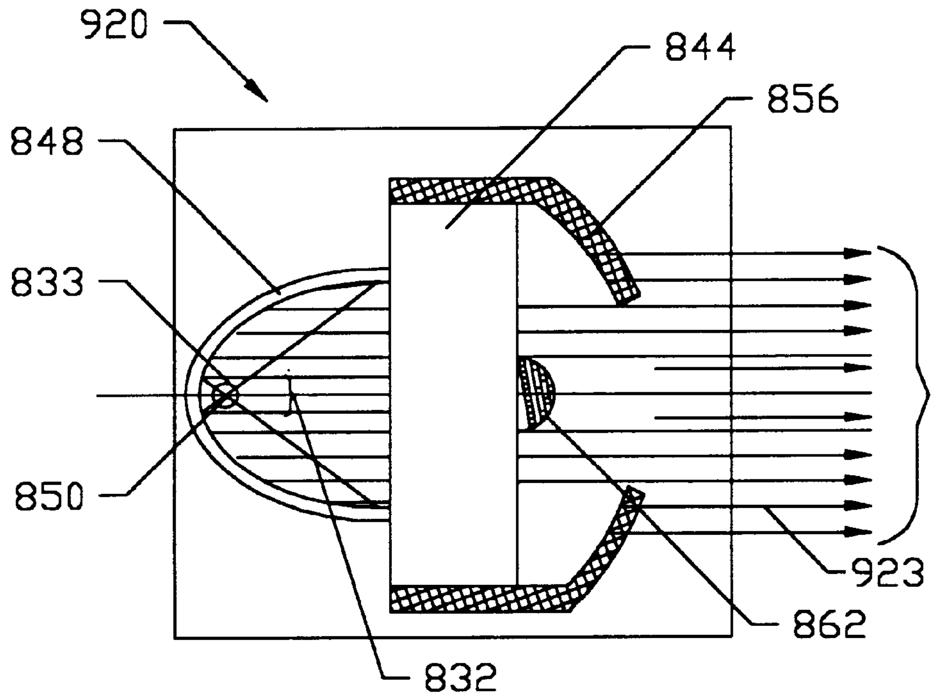
FIG. 102 is another CURL source variation based on the embodiment of FIG. 96.
Figure 103:
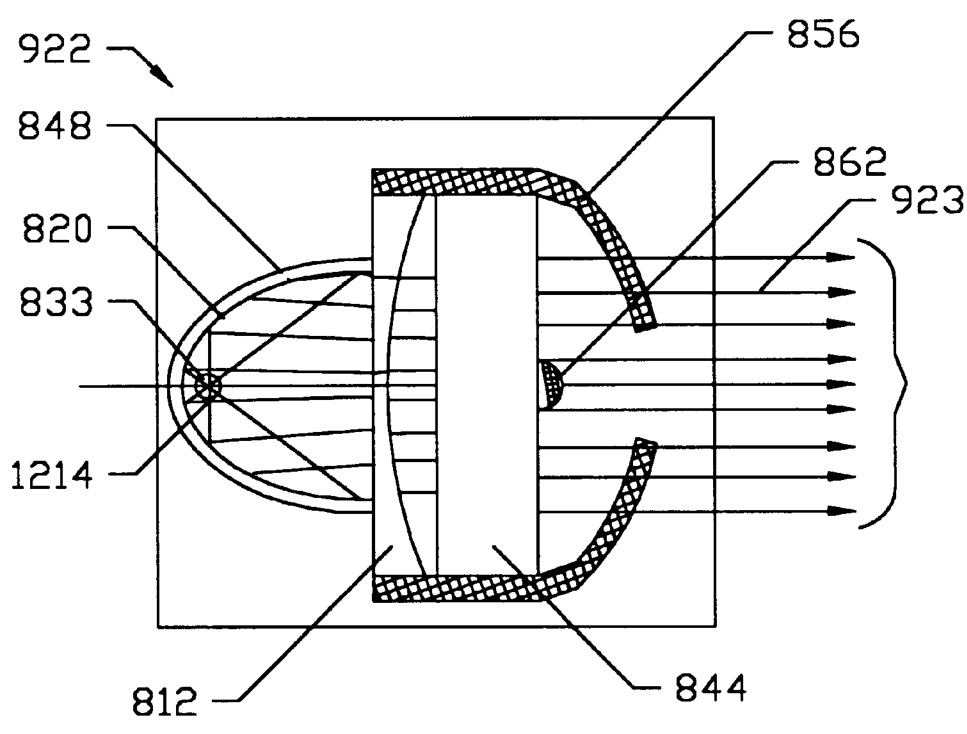
FIG. 103 is another CURL source variation based on the embodiment of FIG. 96.
Figure 111A:
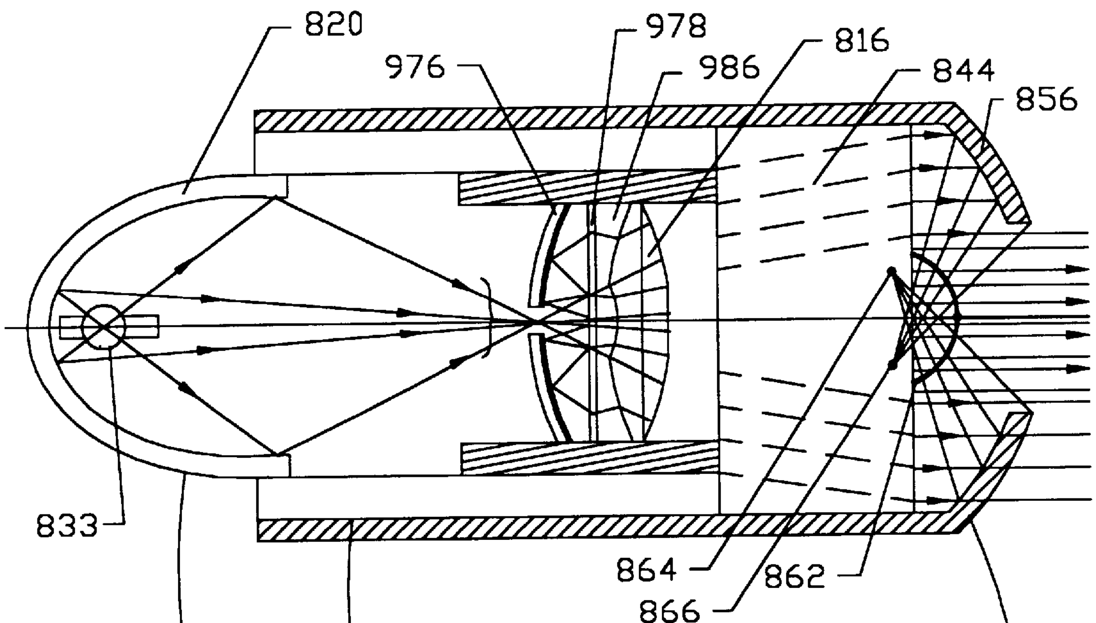
FIG. 111A is a rectangular beam-shape variation on the embodiment of FIG. 109 using the system of FIG. 96
Figure 111B:
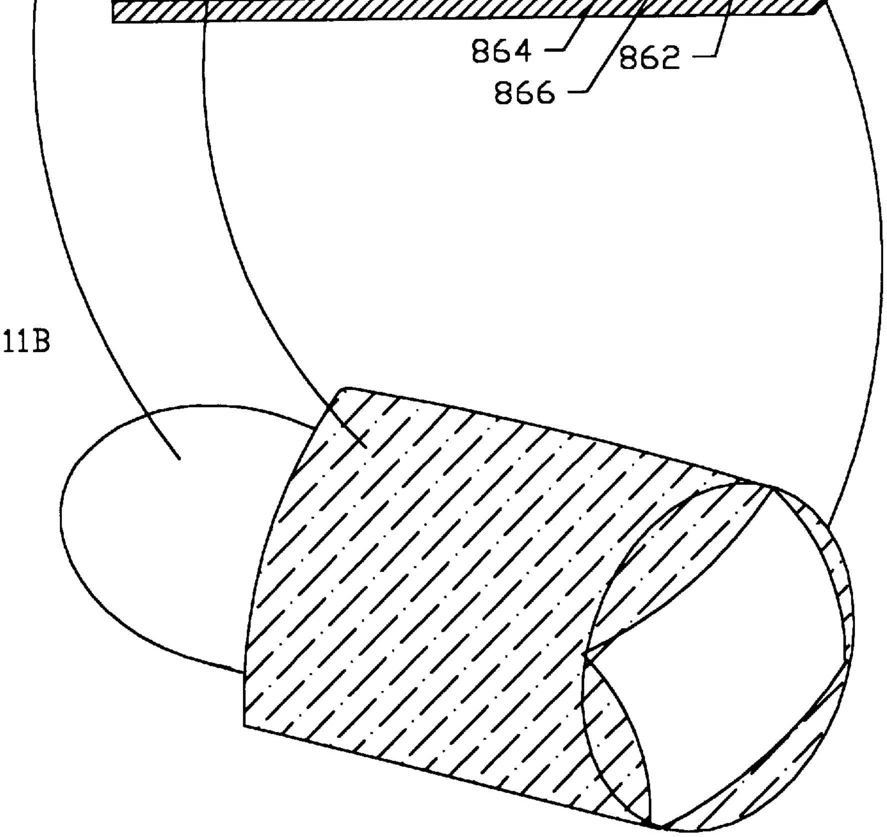
FIG. 111B is a perspective view of the system of FIG. 111A.

Another embodiment is illustrated in FIGS. 111A and 111B, where the polarizing arrangement of FIG. 108 is combined with the beam-shape transforming method of FIG. 102. FIG. 111B also shows a perspective view of the outer package that applies qualitatively to FIGS. 109 and 110 as well, although neither of which has the output mirror 856 arrangement shown in FIGS. 111A and 111B.

Yet another embodiment is illustrated in FIG. 112 where the embodiment of FIG. 108 is combined with a variation on the general reciprocating mirror beam shape transformation method of FIGS. 93 and 98B, but in this case with the reciprocating mirrors elements 838 and 824 located outside the ellipsoidal (or modified ellipsoidal) light source 808 of FIG. 92 as in FIG. 102, and using the beam expander method of FIGS. 98A and 98B. Converging light 1056 in FIG. 112 enters the polarization embodiment of FIG. 108 as before and is collimated by the plano-convex lens element 1058. The interior mirror 838 is mounted axially on (or just within) the lens 1056 surface, and is hidden within the shadowed or occluded region 1015 of the interior output beam 1016 of the polarizing embodiment's output lens 1058. The collimated output bundle 1016 passes through the refractive beam expander 1062, which enlarges the beam diameter, and in particular the diameter of the vacant beam interior as discussed previously, from in this case 1015 to 1017, as shown in FIG. 112. Rays on the beam 1016 periphery falling between the circular outer diameter and the inscribed 4:3 (or other) rectangular aspect ratio, are clipped off by the mirror 824 and recycled to the mirror 838 as described previously, and out the interior channel through the beam expander 1062.

Figure 113A:
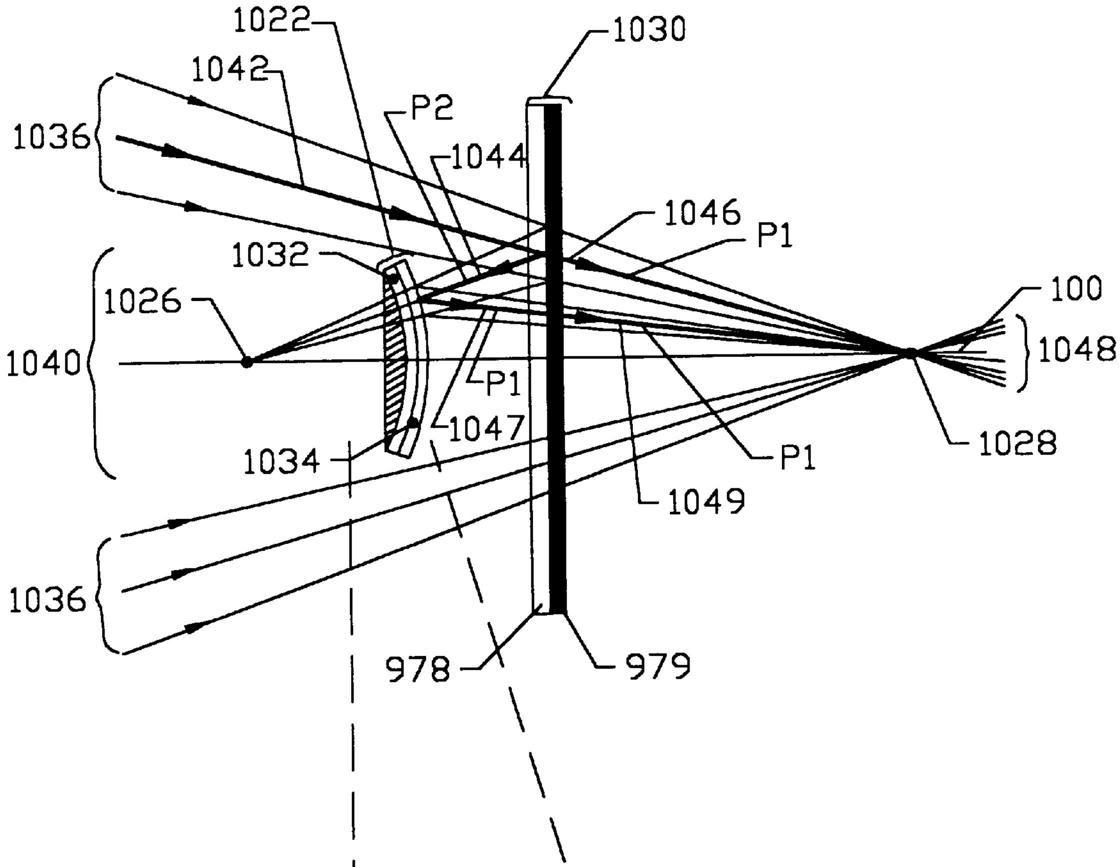
FIG. 113A shows a light source polarizer based on a variation of FIG. 107 with the polarization-converting reflector hidden in the interior of a converging unpolarized light beam using a hyperboloidal polarization-converting reflector and selective-reflecting plane and FIG. 113B is an alternative embodiment of the quarter wave converting and reflector elements used in FIG. 113A.

In another embodiment shown in FIG. 113A, a first reflector 1022 is a convex conicoidal reflecting surface parallel to a plane orthogonal to optic axis 100 and located at the system origin, in this case a hyperboloid with focal points 1026 and 1028 at minus 5 mm and 15 mm. A second reflector 1030 is a selectively-reflecting plane (or weakly curved) surface composed of the wide-band polarization selective reflecting (or splitting) film discussed hereinbefore and separated from the first reflector's origin by a 5 mm layer or air-gap. In this arrangement, reflector 1030 is composed of the polarization selective reflecting layer 978 such as that used previously in FIG. 108, and it is applied to a transparent substrate 979 made of glass or plastic for rigidity and support. The first reflector 1022 in one form of the embodiment has two polarization-converting layers, a metallic polarization-converting film 1032 that changes the handedness of circularly polarized light as described earlier, and preferably a quarter-wave retardation layer 1034, such as the wide band retardation films described numerous times above.

Figure 113B:
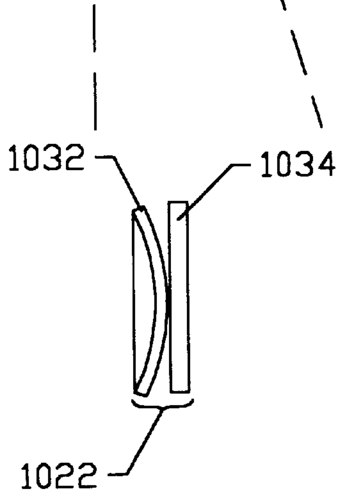

A second form of the embodiment for the reflector 1022 is shown in FIG. 113B. The polarization-converting, quarter wave layer 1034, rather than conforming to the shape of the reflector element 1022, is placed just in front of the element 1022 as a separate plane. One advantage of this form of the element 1022 is there is minimal chance of any conversion inefficiency caused by the orientation mismatches in making a flat sheet conform and adhere to an even slightly curved surface. In this case, incoming and converging unpolarized beam 1036 is heading towards the first reflector's focal point 1028, but has been preprocessed, for example by means of the beam expansion methods of FIGS. 97A and 98A, to enlarge the beam's interior angular acceptance hole 1040 sufficiently to accommodate the size of the first reflector element 1022, which is otherwise opaque. Illustrative principal ray 1042 converges towards the focal point 1028, passing left-to-right above the reflector 1022 and heading towards the second reflector 1030. When the principal ray 1042 reaches the second reflector 1030, it splits into two orthogonal linearly polarized rays, a reflected ray 1044 of polarization P2, and a transmitted ray 1046 of polarization P1. The reflected ray 1044 is redirected back towards the first reflector's other focal point 1026, but strikes the first reflector 1022 on the way. When the reflected ray 1044 reaches the first reflector element 1022, it passes through the quarter wave polarization-converting layer 1034 and becomes, in this example, left-hand circularly polarized. Upon striking the metallic polarization (handedness) converting layer 1032, the reflected ray 1044 then becomes right-hand circularly polarized and is redirected back to the right, passing once again through the quarter wave polarization-converting layer 1034, and emerging as output ray 1047 with the orthogonal linear polarization state P1, which on reaching the second reflector 1030, is transmitted within the previously unoccupied interior region 1040 as ray 1049. Accordingly, all such rays selectively-reflected as P2 at the second reflector 1030 are subsequently converted and redirected by the first reflector 1022, so as to be recycled within the interior core of output beam 1048.

Figure 98:
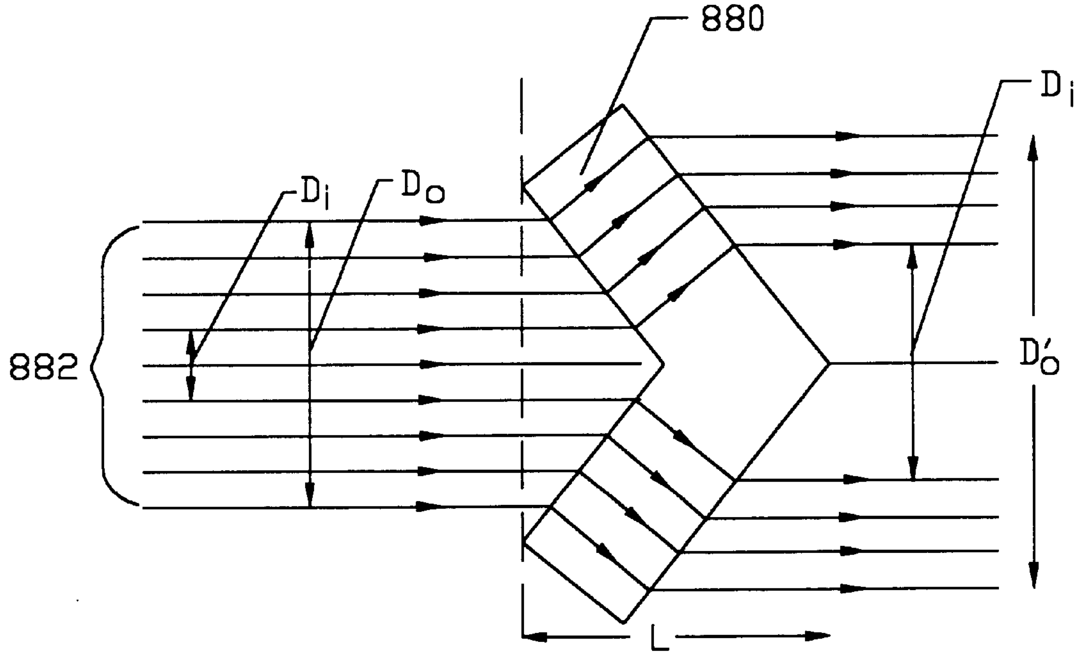
FIG. 98A is a cross-sectional view of a conic refractive beam expander and FIG. 98B is cross-sectional view of the collimated reciprocating-mirror light source of FIG. 93 with the conic beam-expander of FIG. 98A.
Figure 98:
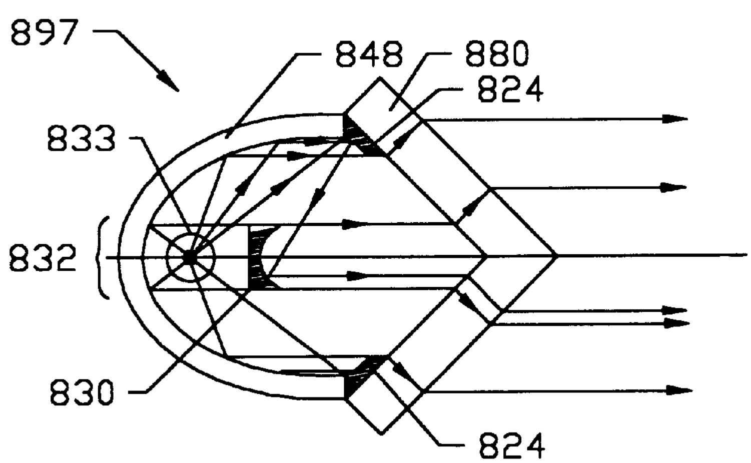
Figure 114:
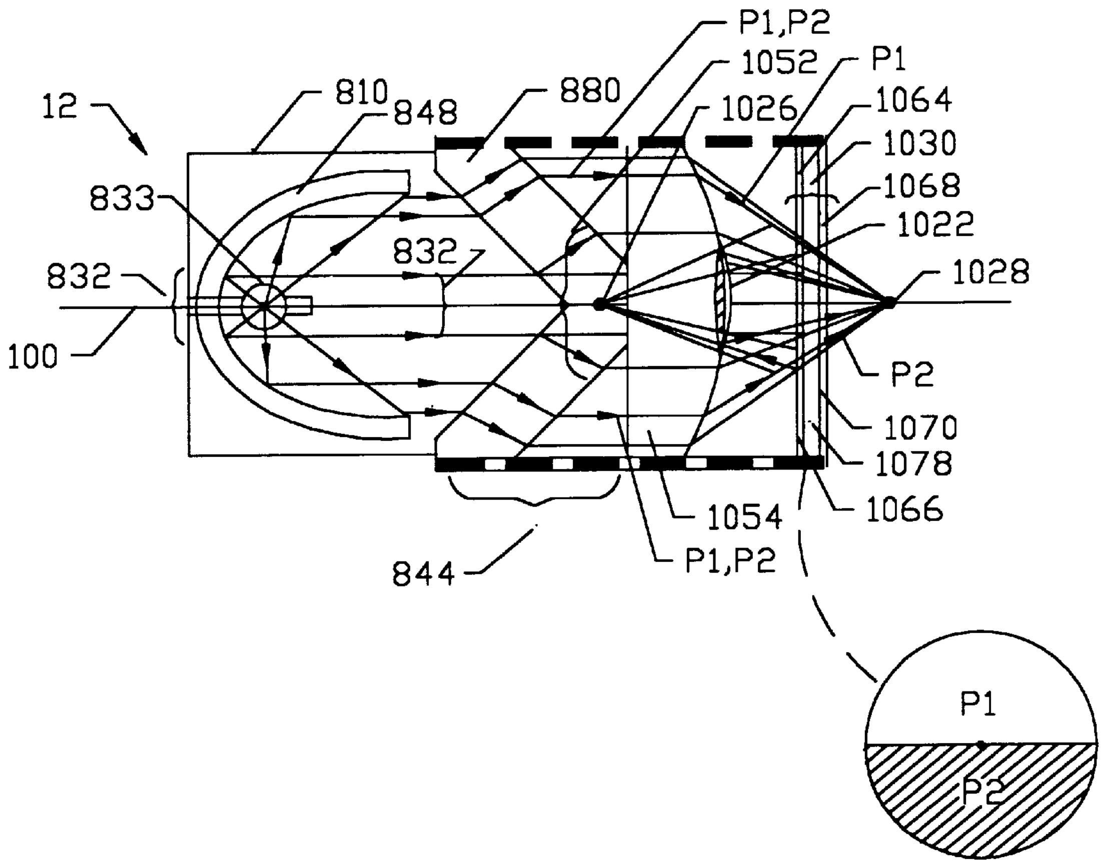
FIG. 114 shows a light source embodiment based on beam expansion and the polarizing method of FIG. 113 with the beam-expansion method of FIG. 98; also shown is the split polarization beam at the screen.
Figure 115:
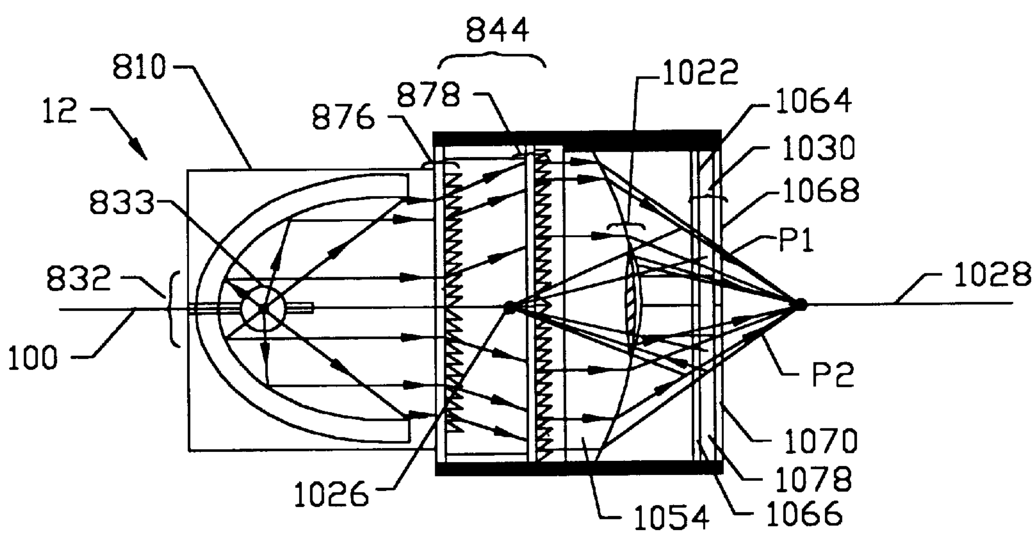
FIG. 115 is a variation of FIG. 114 with the beam-transformation method of FIG. 97; also shown is the split polarization beam at the screen.

As mentioned above, the input beam's interior core 1040 is preferably expanded to make room for these recycled rays and to make sure that the recycling reflector element 1022 is hidden within the expanded shadow region, by either the method of FIGS. 97A or 98A. Since the beam expanders 880 of FIGS. 97 and 98 are preferably used with collimated light, and since the method of FIGS. 113A and 113B requires converging light, an alternative arrangement such as that in FIGS. 114 or 115 using collimated input light is generally preferred. For example, in the embodiment of FIG. 114, the natural interior occluded spatial zone 832 of the paraboloidal light source 810 is pre-enlarged by the action of the refractive beam expander element 880 to a diameter 1052, sufficient to shadow the polarization converting and re-directing first reflector 1022, which is mounted axially on converging (or condensing) lens 1054. The surface shape of the reflector 1022 is made such that its virtual (back) focus is at the focal point 1026 and its front focus coincides with the lens element 1054's point of convergence, the focal point 1028. Additional compactness is then achieved by truncating the apex of the expander element 1050 nearly to the edge of the expanded shadow diameter 1052, and by mounting the re-directing reflector element 1022 directly on the converging lens 1054. The same barrel-mounting methods of FIGS. 109–112 are applied just as advantageously for these embodiments. The 3M-type polarization selective reflector (or beam splitter) used in, the reflector 1030 of the example embodiments of FIGS. 114 and 115, consists of two film sections, an upper layer 1064 that passes P1 and reflects P2, and a lower layer 1066 that passes P2 and reflects P1. Because of this orthogonal film orientation structure, the output polarization distribution is half P1, half P2, and thereby is appropriate for the split-image projection system 10 methods described above. If the reflector element 1030 were covered with either the upper or lower layer, 1064 or 1066, over its entire support substrate 1078, the output distribution would have a single polarization, and would therefore not be suited for use with the split-image projections systems 10 above. In addition, polarization filter clean-up layers are applied as upper clean up layer 1068 and lower cleanup layer 1070. For the case illustrated, the upper clean up layer 1068, is made to block P2, and the lower cleanup layer 1070 is made to block P1, assuring polarization purity for use with the split-image projection systems 10. A similar approach can be taken to assure single polarization purity when using the embodiments discussed hereinbefore with the single polarization projection systems 10, such as for example the embodiments of FIGS. 14–25, 32–38, and 50–55.

Figure 116:
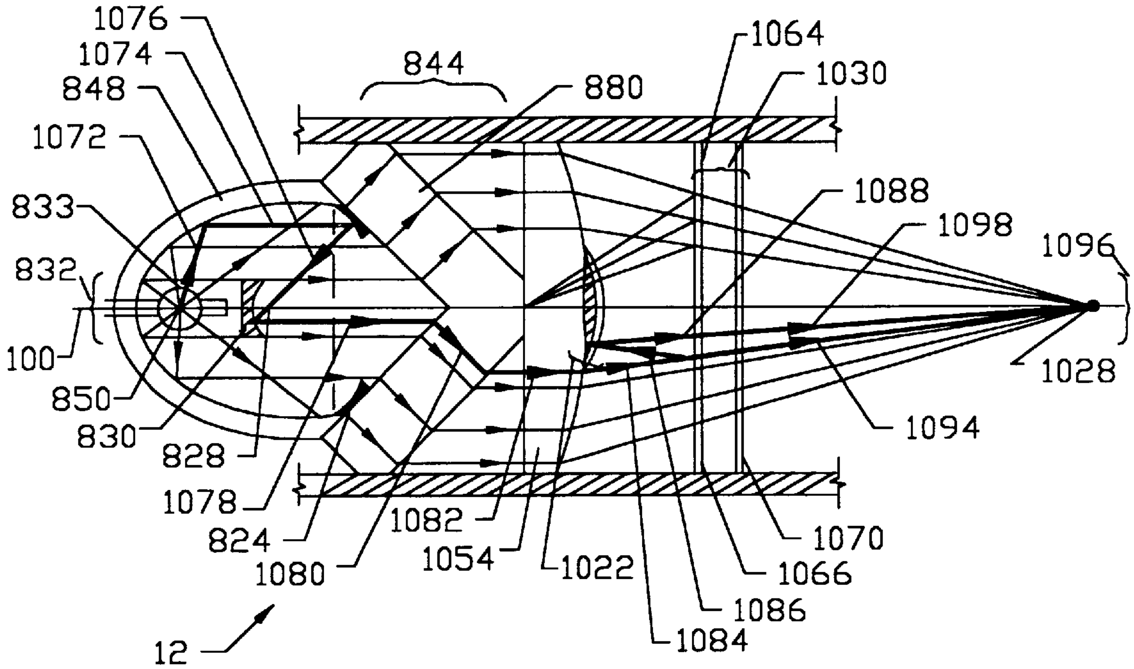
FIG. 116 illustrates another type of light source system based on the polarizing method of FIG. 113 with the beam-shape transformation method of FIG. 98.
Figure 117:
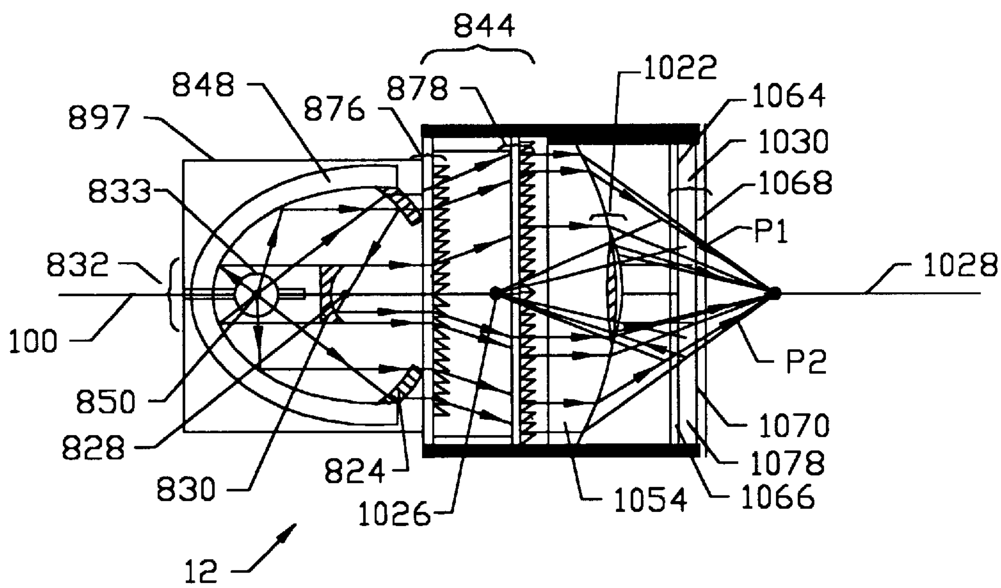
FIG. 117 is a variation of FIG. 116 with the beam-transformation method of FIG. 97.

Since the current polarization processing methods are used with a means of beam expansion to assure that incoming light is able to bypass the obstruction represented by reflector 1030, two preferable combinations that incorporate the rectangular beam-shape transformation methods of FIGS. 97-98 are illustrated in FIGS. 116 and 117. In FIG. 116, the beam-shape transformation method of reciprocating mirrors is employed within the paraboloidal system 897 of FIG. 88, as previously illustrated in FIG. 93A. Sufficient beam expansion is provided for by the refractive beam expander element 880 of FIG. 98A so that substantially all the re-cycled flux clears the polarization processing reflector element 1030. The same approach is illustrated in FIG. 117, except that the prismatic film beam expander element set 876 and 878 of the method illustrated in FIG. 97A–C is used. The gain in efficiency that is possible by such sequential recycling is illustrated by the principal ray path 1072-1074-1076-1078-1080-1082-1082-1084-1086-1088 in FIG. 116. The arc light source 833 at the paraboloidal or modified paraboloidal reflector 848 focal point 850 outputs the principal ray 1072, which is collimated or substantially collimated by the action of the paraboloid 848. As this particular ray 1072 falls outside the rectangular beam shape desired, it is blocked by reflector 824 and re-directed through the focal point 828 as the ray 1076, to reflecting element 1092, which then re-directs the ray 1076 left-to-right parallel to the optic axis 100 as the ray 1078. This ray 1078 encounters the conic beam expander element 880 and is refracted through it as ray 1080. When the ray 1080 exits the element 880 into air, it becomes collimated as ray 1082 and refracted by the lens 1054 as ray 1084, whereupon on reaching reflector 1030 it is split into the two orthogonally polarized rays, with output ray 1094 of polarization P1 transmitted and reflected ray 1096 of polarization P2 recycled to the reflector element 1022, converted as before, re-directed as ray 1088 of polarization P1 and then transmitted through the element 1030 as recycled output ray 1098.

Figure 118:
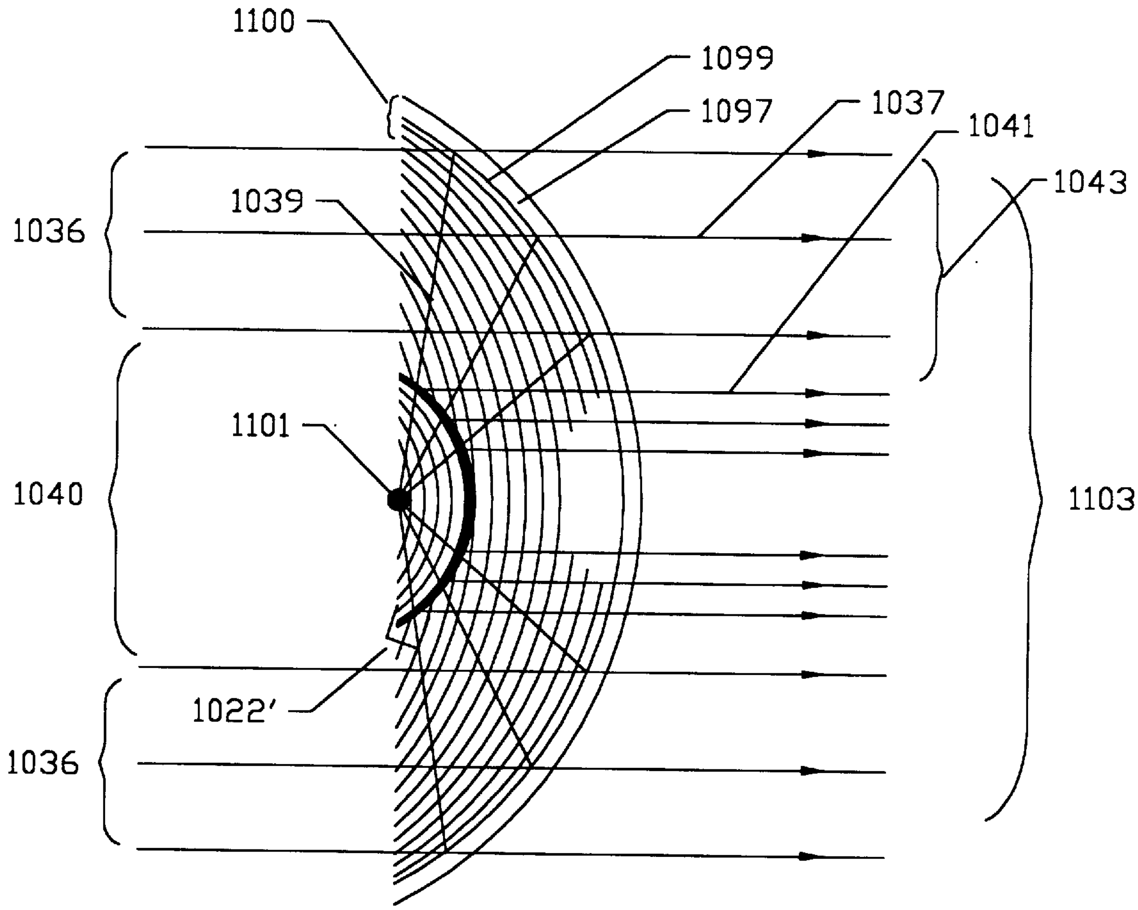
FIG. 118 shows a collimated light source polarizing variation on FIG. 113 and FIG. 32 using reciprocating polarization converting and selective reflecting conicoids.
Figure 119:
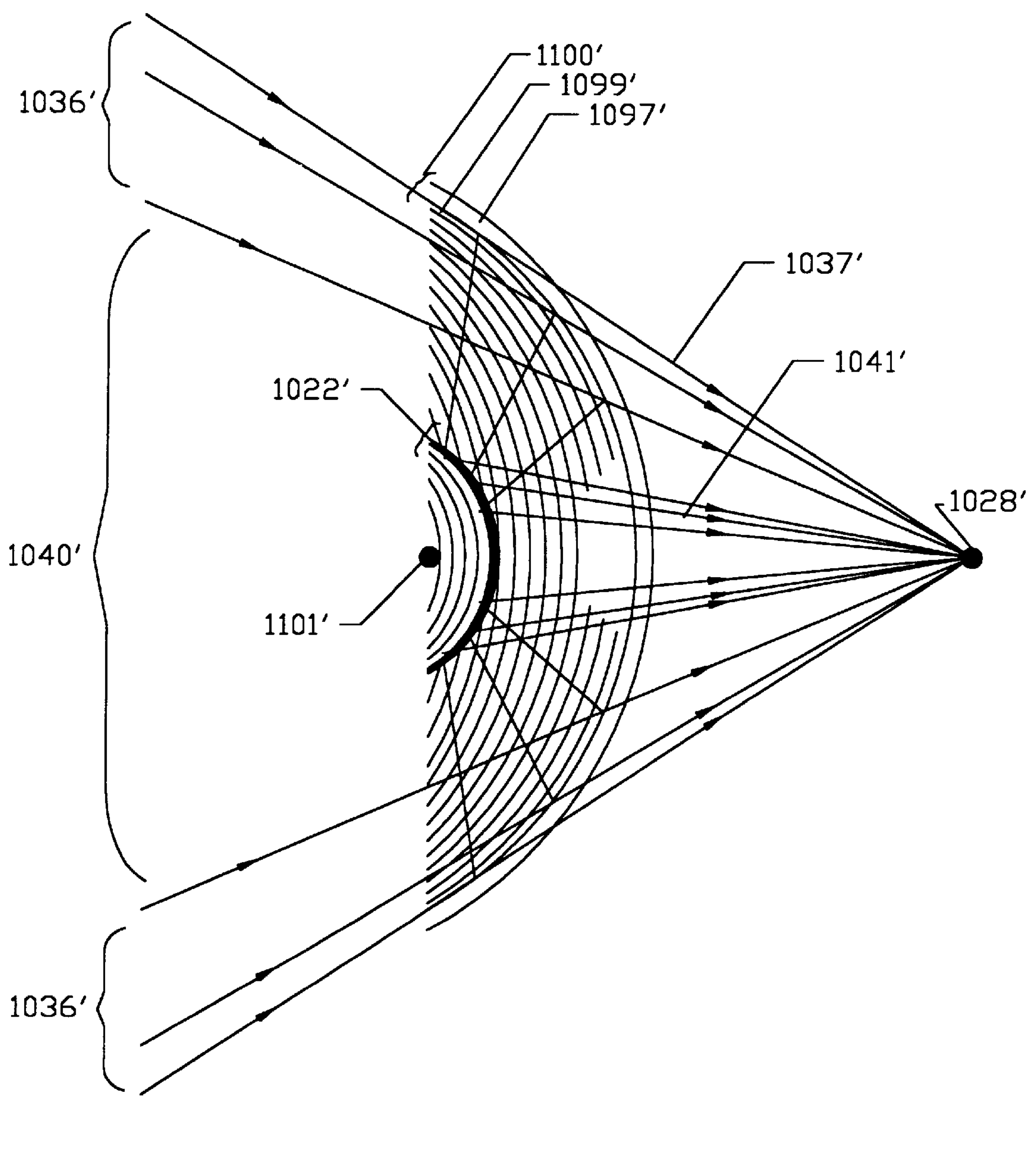
FIG. 119 is a variation on the embodiment of FIG. 118 for converging light.

Another form of the polarization recycling of FIG. 113A is based on collimated and converging input light embodiments illustrated in FIGS. 118 and 119 respectively. In both cases, the conicoidal form of a smaller first reflector 1022' made of the same construction as reflector 1022 is hidden within the interior core 1040 of the input beam 1036 as before. In addition, a second reflector 1100 is a shaped conicoidal surface, rather than as the plane or weakly-curved reflector 1030 of FIGS. 113–117. This second reflector 1100 is arranged, in one case, with an interior reflecting layer 1099 of the 3M-type polarization selective reflecting film that passes polarization P1 and reflects polarization P2, and a transparent exterior support layer 1097. In the example of FIG. 118 the pre-expanded collimated or substantially collimated incoming rays 1036 bypass the first reflector 1022' and first strike the conicoidal reflecting interior layer 1099 of the second reflector 1100. The layer is shaped as a paraboloid or modified paraboloid having a focal point 1101. The second reflector 1100 splits the directly incoming collimated light rays 1036, outputting two sets of rays, one set of collimated rays 1037 of polarization P1 unchanged in direction, and one set of reflecting or redirected rays 1039 of polarization P2 converging towards the interior focal point 1101. Before reaching this interior focal point 1101, however, this set of converging rays 1039 strike the surface of first reflector 1022', which is shaped in this case as an hyperboloid or modified hyperboloid with focal points at 1101 and infinity. Having the same polarization converting structure and properties as the reflector 1022, the reflector 1022' receives rays of polarization P2 and outputs rays of polarization P1 heading back towards the first reflector 1100 in a collimated or nearly collimated beam, that then pass through the second reflector 1100 as collimated output rays 1041 of polarization P1. The result is a consolidated output beam 1103 of contiguous polarization P1, an annulus 1043 of the rays 1037 whose polarization remained unchanged, and an interior region 1040 filled with the rays 1041 whose polarization has been converted from P2 to P1. Arranging for the output beam 1103 whose upper and lower halves are orthogonally polarized is accomplished just as in the method of FIGS. 114–117, by splitting the polarization selective reflecting layer 1099 into a corresponding upper and lower half, an upper portion that passes P1 and reflects P2, and a lower portion that passes P2 and reflects P1, as has been described previously. The outer annulus of this beam 1103 corresponds to those rays within the beam 1036. The beam expansion is pre-arranged so that the flux density within the interior region 1040 equals the flux density in the annulus region of the beam 1036.

The example of FIG. 119 behaves analagously to FIG. 118, except that the incoming rays 1036' are pre-arranged to converge towards a focal point 1028', and first and second reflector elements 1022' and 1100' are shaped as hyperboloids or modified hyperboloids respectively, with a common focal point at 1101' and 1028'. The incoming rays 1036' are split by the second reflector 1100' into two sets of rays, one set 1037' retaining polarization P1 that continues converging towards focal point 1028' and another set 1039' of polarization P2 that converges on the focal point 1101'. The rays that are made to converge to 1101', are converted from P2 to P1, as before, and redirected towards 1028' as rays 1041', filling the output beam's interior region 1040'.

Figure 49:
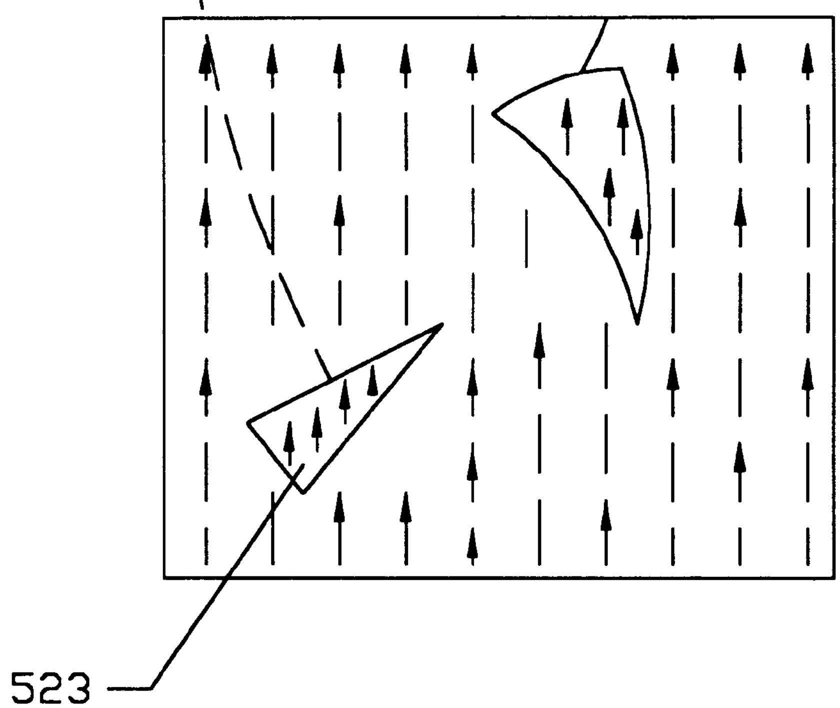
FIG. 49 shows the method of pre-cutting radial facet-sections of the film used in FIG. 48.
Figures 120A, 120B:
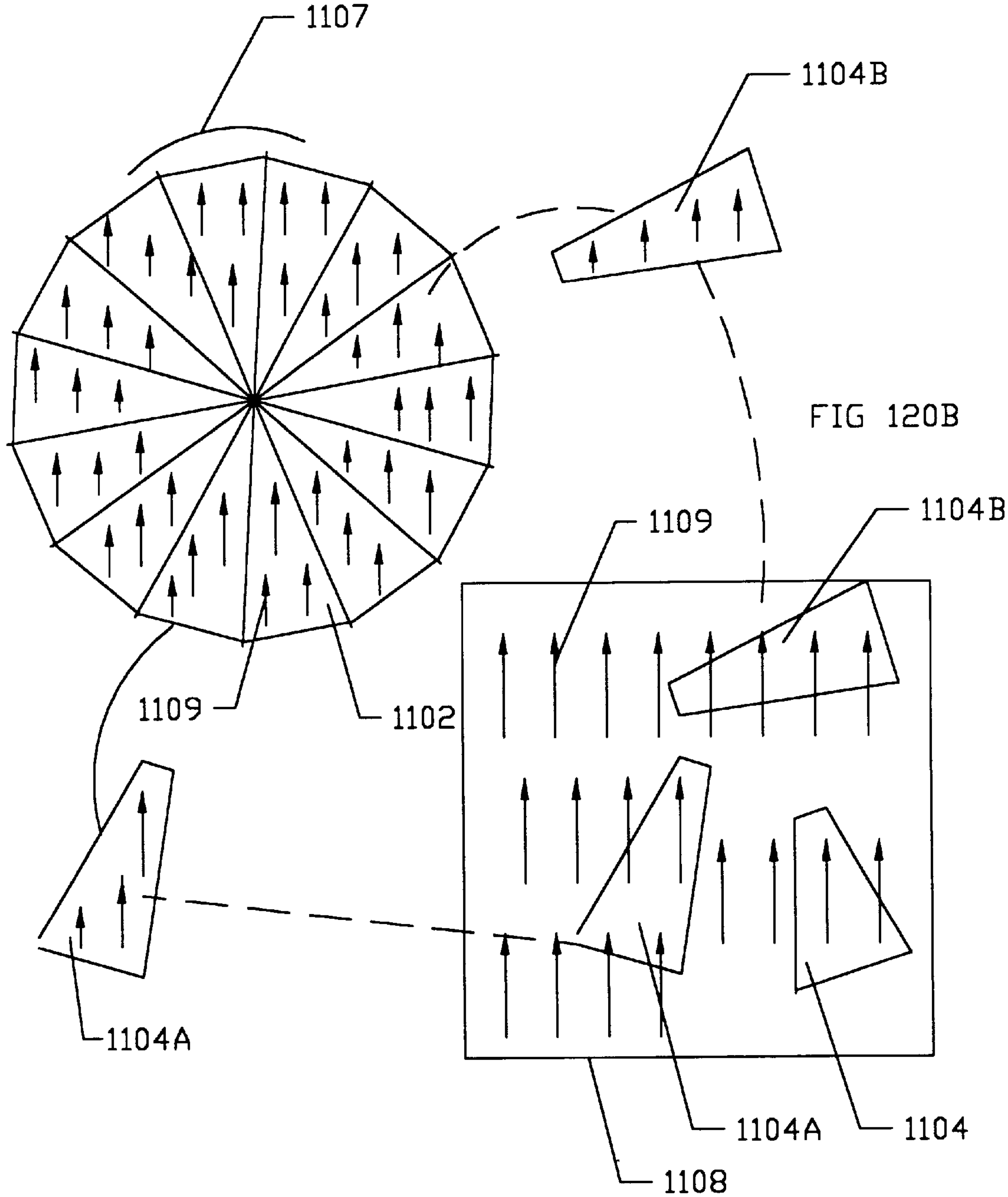

The second reflector, whether 1100 or 1100', contains an interior layer made from a wide band polarization selective reflectoring material, such as the 3M dielectric multi-layer stack film discussed above. Similarly, the first reflector, whether 1022 or 1022', contains an outer layer made of a wide band (preferably quarter wave) birefringent-type phase retardation film. Both these materials have preferred alignment directions. Because of this, their attachment to the curved surfaces of the reflectors 1100, 1100', 1022 and 1022', should be done thoughtfully. Rather than simply applying film sheets to smooth and continuous conicoids, the preferred embodiments will instead use faceted conicoid reflector element 1107, as shown in FIG. 120A, applying the associated polarization selective reflecting material 1108 as shown in FIG. 120B, pre-cut as elements 1104A, B, C, etc. to fit each facet 1102 in the ideal orientation for the facet 1102. The ideal orientation 1109 is shown, for example, by the parallel arrows drawn on both the reflector element 1107 and on the material 1108. The more facets 1102, the more efficient the associated performance and the more correspondingly demanding the attachment process. Whenever the conicoidal reflector element 1107 is weakly curved, however, as in the example of FIGS. 114–117, the inefficiency caused by directly laminating or deforming a plane sheet of film stock 1108 to fit the weakly-curved surface will be minor. Whenever the conicoidal surface of the reflector element 1022 is deeply curved, as in the example of FIGS. 118 and 119, the faceted approach is preferable. Although film attachment to such faceted surfaces is considerably more challenging than film attachment to plane surfaces, an automated process for doing so can be developed. A steel-ruled die can be used to punch the designated and properly oriented facet-shaped film pieces, such as for example 1104A and 1104B in FIGS. 120A and 120B, from the flat film stock 1108 with the preferred orientation 1109, as illustrated. The pre-cut film stock 1108 can then be fed, for example, by an automated die set that simultaneously loads one section per facet, and applies the necessary conformal pressure (and/or heat) adequate to deform of the film elements 1104 and set the pressure sensitive adhesive layer pre-laminated to the initially flat film material 1108. Alternatively, pressure sensitive adhesive can be pre-applied to the faceted substrate, as can numerous other adhesive bonding agents, such as uv curing epoxy. Other than the radial facets 1102 shown in FIG. 120A, and previously in FIGS. 48 and 49, similar results can be obtained using other segmented transformation geometries, but the deeper the conicoidal curve, the more segments are used to match the film section to the preferred orientation. With precisely cut film pieces 1104, the registration of adjacent film pieces at the facet boundaries will permit use with any of the above polarization selective forms of the optical system 10 since there will be enough mixing within the output beam that any slight optical discontinuities at the facet boundaries will not be carried through to the projection screen 26.

In FIG. 121 is illustrated another two-reflector polarization recycling embodiment for efficiently pre-polarizing the un-polarized light generated, for example, by the light sources 808 and 897 of FIGS. 92 and 88, respectively. This embodiment is shown in a longitudinal cross-section in FIG. 121A with the ellipsoidal light source 808 of FIG. 92, and in FIG. 122 for the paraboloidal light source 897 of FIG. 88. The embodiment uses a special variation on the form of the split-image optical system 10 of FIG. 13. The elements in FIG. 121 are circularly symmetric about the optic axis 100 and un-polarized light beam 1118 converging towards focal point 822 is split into two still converging, but orthogonally polarized light beams 1121 and 1119. The first polarized beam 1121 continues along the original direction towards the focal point 822, but the second polarized beam 1119 is folded by a circularly symmetric conicoidal mirror 1116 along a different path (a-b-c as opposed to a-c), but ultimately to the same focal point 822. Polarized rays are redirected towards the conicoidal mirror 1116 by a transparent 45 degree conic refractive element 1120 made of plastic or glass and fitted with a polarization selective reflecting surface layer 1122, preferably the wide band 3M dielectric multi-layer stack film discussed hereinbefore, which for example passes P1 and reflects P2. The circularly-symmetric and converging, ray bundle 1118 exits the ellipsoidal reflector 820 heading towards the reflector's focal point 822, and then encounters the refractive element 1120 on the way. This substrate of the conic refractive element 1120 can be made of either glass or plastic. In order to assure optimal alignment of the axis of splitting layer 1122 with the out-going polarized beam 1112, the conic refractive element 1120 is faceted in the manner described, for example, in FIGS. 120A and 120B. Ray bundle 1118 impinging on the conic refractive element 1120, splits equally into two orthogonally polarized groups of rays, one group that passes straight through the conic element 1120 towards the focal point 822, and another group that is re-directed radially towards a new radial focal point 1126. The focal point 1126 is actual the folded location of the focal point 822. Consider for example the illustrative ray paths a-b-c and a-c. Ray 1128 is emitted by the arc source 833 and is re-directed by the ellipsoidal reflector 820 towards the focal point 822, as the ray 1124. This ray 1124 is then split by the selective reflecting surface layer 1122 into the transmitted ray 1112 and the re-directed ray 1114. The re-directed ray 1114, heading for the virtual focal point 1126, impinges on the shaped reflecting rim of the conicoidal mirror 1116, which can be integrally constructed or added as an extension on the ellipsoid reflector 820. Alternatively, this toric reflecting surface of the conicoidal mirror 1116 can be made as part of the conic refractive element 1120. The conicoidal mirror 1116 is composed of the same two-layer polarization re-directing and converting structure introduced above in numerous examples such as the reflector element 1022 in FIG. 114. The re-directed ray 1114 is reflected at the surface of the conic element 1120 because its polarization P2 is orthogonal to the polarization P1 that is highly transmitted by the multi-layer selective reflecting surface layer 1122. When the re-directed ray 1114 strikes the conicoidal mirror element 1116, it is redirected as output ray 1132 in a polarization state that can be made either P1 or P2. Whether the output ray 1132 is of polarization P1 or P2 depends on the composition of the mirror element 1116. If the mirror element 1116 does not contain a quarter-wave conversion layer, the output ray 1132 will be of polarization P2. If the element 1116 contains a quarter-wave conversion layer 1119, as in the embodiments of FIG. 114, the output ray 1132 will be of polarization P1. Hence, the output ray bundle 1134, as shown in the beam cross-section of FIG. 121B, has a circular cross-section containing an inner core 1136 of polarization P1 corresponding to the ellipsoidal light source's original beam diameter, and an annulus region 1138 containing the recycled ray flux, whose polarization is arranged as either P1 or P2. Making the upper half of the beam polarized as P1, and the lower half beam polarized as P2, however, is also possible, and is accomplished by using one set of polarization selective reflecting materials for the upper portion of the conic element 1122 and an orthogonally-polarizing set for the lower portion of the conic element 1122. For example, as shown in FIG. 121C, a polarization selective reflecting layer 1122U that passes P1 and reflects P2 is applied to only the upper half of the conic element 1120, and, a polarization selective reflecting layer 1122L that passes P2 and reflects P1 is applied to only the lower half. In this manner, the rays transmitted through the upper half of the conic element 1120 will be in polarization state P1, and those transmitted through the lower half of the conic element 1120 will be in polarization state P2. Thus, all rays reflected towards the upper half of the mirror element 1116 by the upper half of the conic element 1120 and its selective reflecting layer 1122U, will be converted to P1, and become part of the upper half of the output beam 1134. All rays reflected towards the lower half of the mirror element 1116 by the lower half of the conic element 1120 and its selective reflecting layer 1122L, will be converted to P2, and become part of the lower half of the output beam 1134. This approach was previously used in the embodiments of FIGS. 114 and 115.

Since the re-directing surface in the embodiment of FIG. 121 has a constant slope, the rays originally heading to a focus at the point 822, instead are directed towards a locus of focal points on the ring surrounding the system's optic axis 100 of radius equal to the distance between the optic axis 100 and the focal point 1126. In the embodiment illustrated in FIG. 121A, the toric mirror element 1116 is preferably hyperboloidally-shaped, with one focus at the (virtual) point 1126 and the other at the point 822.

In another embodiment illustrated in FIG. 122, the double mirror arrangement can be fed with collimated rather than converging input light, either by using the paraboloidal light source 897 of FIG. 88 or by inserting a negative lens 1140 at the output of the ellipsoidal light source 808 of FIG. 92, as illustrated. When the negative lens 1140 is used at the input to provide collimated light, and a positive lens 1143 is used at the output to re-converge the collimated light to point 822, as in FIG. 122, the mirror element 1116 of FIG. 121A becomes a 45 degree plane conic section. The same result can be obtained without the positive output lens when the mirror element 1116 is formed as an off-axis toric paraboloid. This method can, for example, be applied, in the manner of FIG. 121, to form an output beam of a single polarization, one with one polarization state in the beam's inner core 1136, and its orthogonal state in the annulus 1138, or one with one polarization state in the upper half of the beam and its orthogonal state in the lower half of the beam. It is this latter configuration where the beam is bifurcated into two orthogonal polarization states that is preferable for use with the split-image optical system 10.

Figure 123:
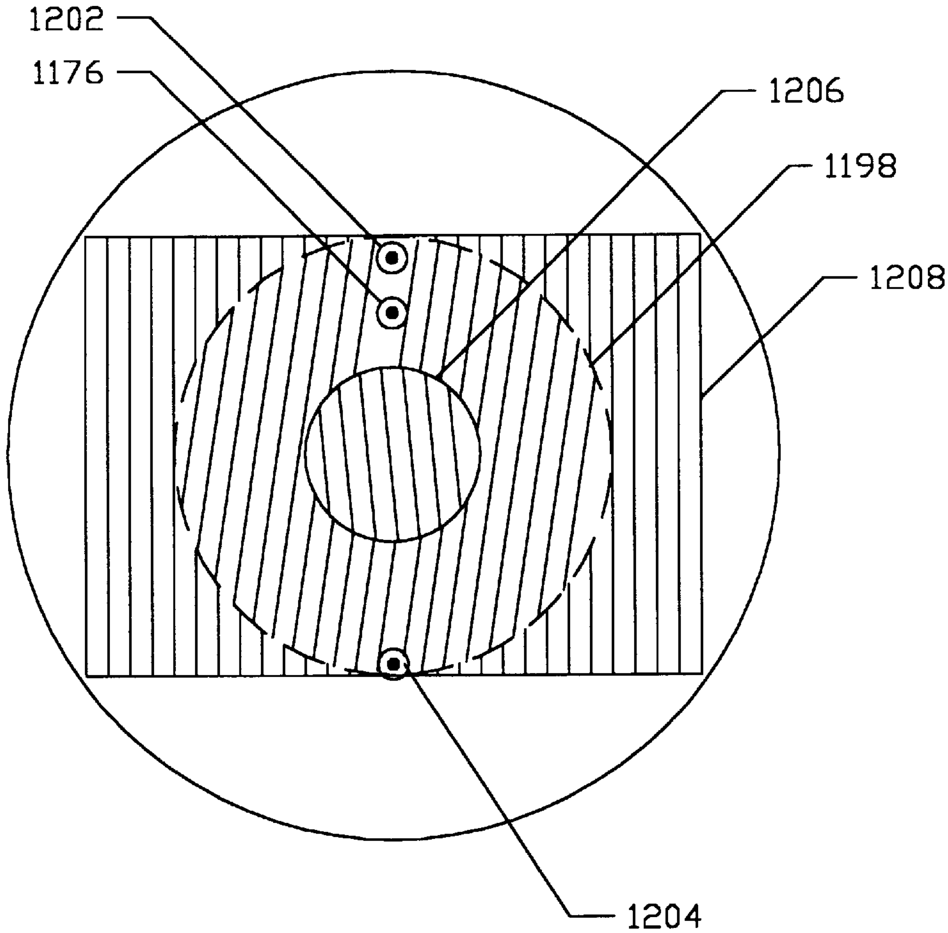

In the embodiment of FIGS. 122 and 123 the ellipsoidal light source 808 of FIG. 92 is combined with a negative lens 1140 to provide collimated light 1142 to conic element 1144 made with polarization (selective reflecting) splitting layer 1122 and re-directing/converting layers 1148 and 1150 of the axially-aligned toric mirror 1116'. In the embodiment of FIG. 123A, two additional axially-aligned mirrors are added, as discussed previously, to provide a means for beam shape transformation. An axially aligned concave mirror 1152 of the previously described two mirror beam shape recycling mirror-set of for example FIGS. 95 and 96 is placed on the output surface of the conic element 1144 and hidden within interior occluded region 832 of the input beam 1142. The reciprocating toric mirror 1158 of the two mirror beam shape recycling mirror-set is formed on the interior surface of conic beam displacer (or expander) 1156. The concave mirror 1152 (which can also be convex, as discussed earlier re FIGS. 90, 91, 93, 94, 96, 102 and 103) and second concave mirror 1158, share a common focal point 1160 and, for the present collimated light embodiment, each are parabolically shaped (or modified parabolically shaped) in profile. Moreover the uniformity enhancing de-focusing adjustments discussed earlier involving aspherizing terms and multiple focal point positions are used in this embodiment as well. Illustrative source ray 1162 leaves the arc source 833 at the point 1130 and is re-directed by the ellipsoidal reflector 820 as ray 1164. This ray 1164 is refracted by the negative lens 1140 such that it emerges as substantially collimated ray 1166 on the output surface of the negative lens 1140 and proceeds, left-to-right through the conic element 1144 until it strikes the beam-splitting surface layer 1122, which as above, divides the collimated ray 1166 into two rays, 1170 traveling upwards in polarization state P2, and 1172 proceeding left-to-right as before parallel to the optic axis 100 in polarization state P1. The ray 1172 proceeds generally left-to-right unimpeded until it is displaced outward along its path 1174 through the conic beam displacer 1156, and becomes a part of the polarized output bundle as output ray 1176. The upward orthogonally-polarized ray 1170 in polarization state P2 is re-directed to the right by the toric mirror 1116' and the action of its re-directing and converting layers 1150 and 1148, as previously described, and becomes ray 1178 in polarization state P1. The beam cross-section at line B—B in FIG. 123A just before recycling concave mirror 1158 is shown in FIG. 123B. Outer beam diameter 1180 (see FIG. 123B) corresponds to the beam enlargement due to annulus 1182 of recycled polarization P1. Interior beam diameter 1184 corresponds to original beam diameter 1186 of the ellipsoidal light source 808 (see FIG. 123A) enlarged slightly by the collimating action of the negative lens 1140. Dotted diameter 1188 in FIG. 123B corresponds to the cylindrical layer location of the ray 1178 (also shown as a point location in FIG. 123B). The ray 1178 exists outside the rectangular beam-shape 1192 in FIG. 123B that is the preferred output. Accordingly, the ray 1178 strikes the concave mirror (shaded) 1158 at its upper midpoint and is re-directed (or recycled) back through focal point 1160 and the mirror element 1152. Other features of interest in FIG. 123B are the inner most diameter 1190, which corresponds to the diameter of the reciprocating mirror element 1152, and also the diameter of the input beam's occluded region 832 (enlarged slightly by the negative lens 1140). All the so-recycled peripheral rays, that is all rays passing left-to-right that fall in between the mirror's rectangular opening 1192 and the beam's outer diameter 1180, are returned as output rays substantially within the interior region diameter 1190. After striking the mirror element 1158, the ray 1178 is re-directed downwards through the focal point 1160, to the mirror element 1152, whereupon it is re-directed once again as a substantially collimated ray traveling left-to-right towards the conic beam displacer 1156. Ray 1178 is traveling in the cross-sectional view of FIG. 123A, and as such hits the mirror element 1158. Had the ray 1178 been traveling in a some other cross-sectional slice, such as for example a diagonal slice 1194 shown in FIG. 123B, instead of central slice 1196, the ray 1178 would have missed being clipped by the mirror element 1158, as illustrated by the point 1178' in FIG. 123B. If this were the case, ray 1178 would have passed through the mirror's rectangular opening 1192 as an output ray subject only to the beam displacement of the conic beam displacer 1156. The mirror element 1152 used in this example collimates all incoming rays, such as the ray 1178, which passes through (or very near) the focal point 1160. The so-polarized and rectangularly-shaped output beam cross-section is shown in FIG. 123C. Inner diameter 1198 corresponds to the light ray bundle that proceeded from the arc source 833 as described above, but that passes through the conic element 1144 and its polarization selective reflecting layer 1122. This bundle is bounded, in FIG. 123A and 123B by ray paths 1202 and 1204. Innermost diameter 1206 in FIG. 123C is the expansion of the interior diameter 1190 of FIG. 123B due to the action of the conic beam displacer 1156. Rectangular aperture 1208 corresponds to the outermost boundary of the output region containing rays, and thus represents the transformed beam's output profile. This rectangular aperture 1208 is inscribed within the circular region of diameter 1210 which corresponds to the natural output cross-section of the ellipsoidal light source 808, in the absence of the reciprocating mirror elements 1152 and 1158. The central or axial point in each of FIGS. 123B and 123C corresponds to the optic axis 100 (equivalently, the system 10 axis of symmetry).

Figure 99C:
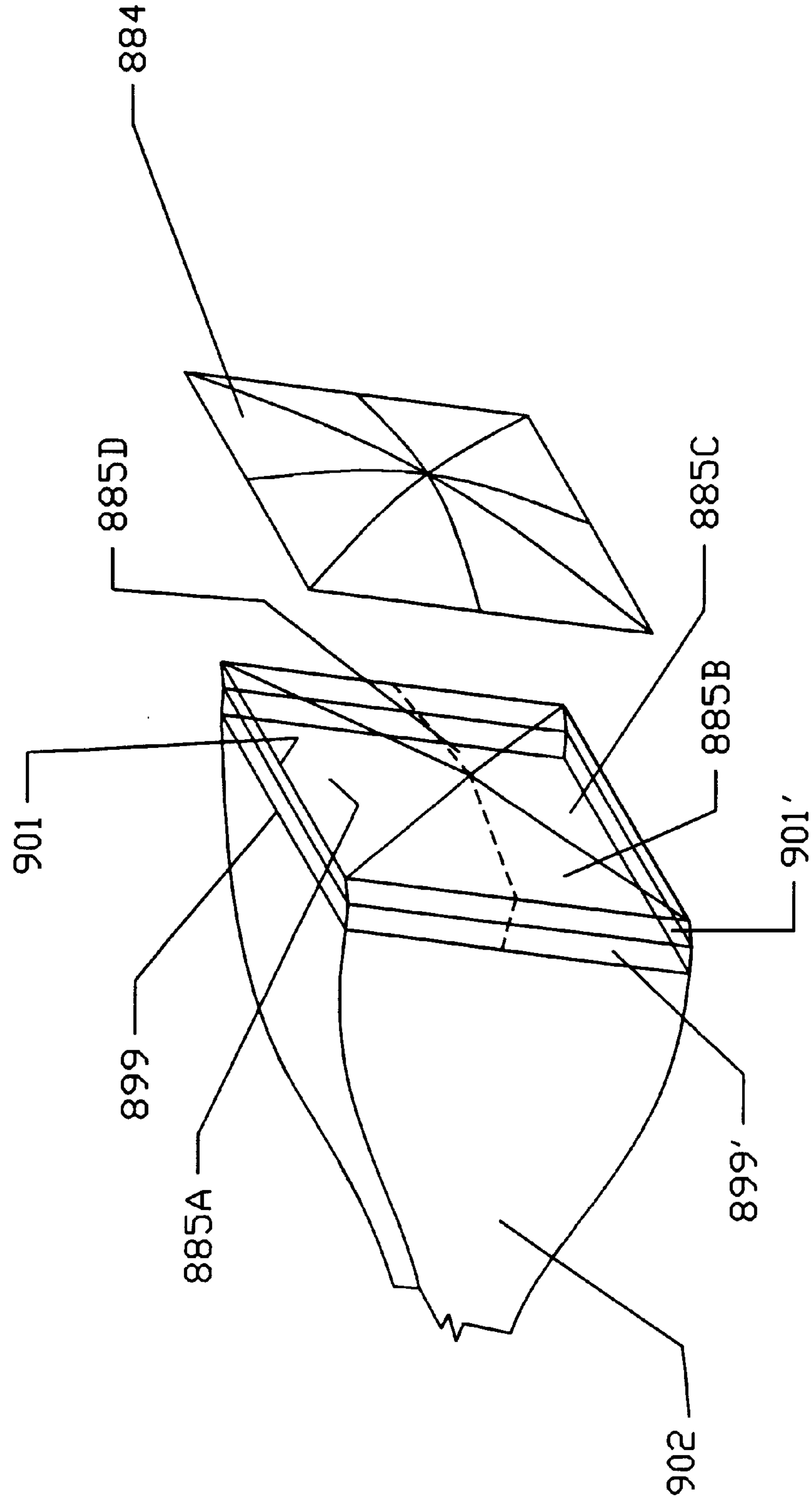
Figure 100:
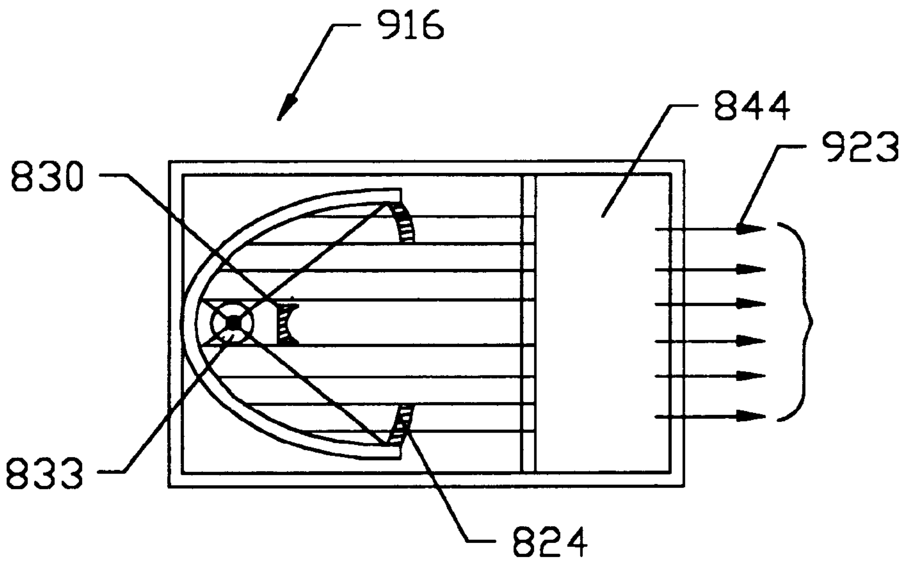
FIG. 100 is a collimated unpolarized rectangular light (CURL) source variation based on the reciprocating mirror embodiments of FIG. 93.
Figure 101:
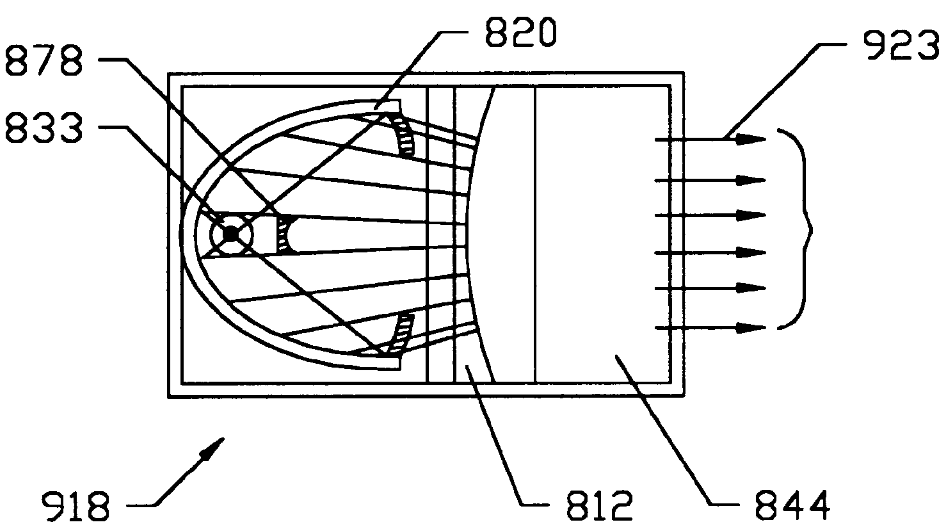
FIG. 101 is another CURL source variation based on the embodiment of FIG. 91.

It is also possible to produce a rectangularly-shaped polarized output beam compatible with the projection systems 10 by means of the beam shape and angle transforming system described in FIGS. 99A–99C. To do this, the same approach is used as described above, with orthogonally oriented polarization selective reflecting layers 901 and 901' applied to the upper and lower halves of the associated light beam (see FIG. 99C). If these selective reflecting layers 901 and 901' are applied to the plane surface indicated by 903 on the angle transformer 902 in FIG. 99A, the output light 910 will be polarized, for example, as P1, but the orthogonal half with the polarized light flux, P2, will be turned back into the transformer 902, heading generally right-to-left on its way back through this transformer 902, and its input aperture 908, by total internal reflection at its dielectric boundary side-walls 1212, to the ellipsoidal or modified ellipsoidal reflector 820 and the arc source 833. If, however, the above polarization selective reflecting layers 901 and 901' are applied to a faceted, conic or curved surface, such as the example of faceted surfaces 885A–885D in FIG. 99C, substantially all the reflected light flux polarized as P2 can be arranged to remain within the element 902 by total internal reflection at its dielectric boundary side-walls 1212. Therefore, reflections which reverse the direction of ray travel from substantially right-to-left to substantially left-to-right, cause substantially all the once rejected rays to re-appear at the rejecting surfaces 885A–885D and their selective reflecting layers 901 and 901', with practically no rays lost by their passing left-to-right back through the aperture 908 (see FIG. 99B). These recycled rays of polarization P2 continue to recycle in this manner until they convert to polarization P1. Any rays arriving at the faceted surfaces 885A–885D in polarization state P1, pass through as part of the output rays 910. Some polarization conversion can occur during the multiple total internal reflections at dielectric element 902's sidewalls increasing the output light flux proportionally; other conversions can occur as a result of small amounts of birefringence in the dielectric medium of the dielectric element 902. For highest polarization conversion efficiency, however, it is preferable to add a wide band quarter wave retardation film layer 899 and 899' as described numerous times above, in this instance, just beneath (or to the left of) the polarization selective reflecting layers 901 and 901' applied to surfaces 885A–885D. In this manner, the reflected rays of polarization P2 pass once through this quarter wave polarization converting layer 899 or 899' when first traveling back right-to-left upon rejection at the layers 901 or 901', and a second time when returning left-to-right towards the layers 901 or 901', thereby converting from P2 to P1 in the process.

There is another improvement with regard to the efficiency of the paraboloidal and ellipsoidal light sources 897 and 808 of, for example, FIGS. 88 and 92 themselves. The conventional reflector shapes do not take into account the finite size of the radiating source, such as the arc discharge indicated as the region 837 in FIGS. 89A and 89B, nor the need for a bundle of rays of finite extent which will enter the pupil of a projection lens with an f/# in the region of f/2.5. In particular, neither reflector shape was intended for use with extended sources such as even the new miniaturized short-arc sources represented in FIG. 89. The smallest arc sources available emit radiation from arc volumes roughly 1.2 mm in cross-section. Both the standard paraboloidal and ellipsoidal reflectors such as 848 in FIG. 88 and 820 in FIG. 92 are highly aberrated for rays (such as ray 1224B in FIG. 124 for example) that are emitted from points, such as the point 130, that are removed from their mathematical focal point 1214. The effect of these aberrations is to cause a significant number of rays emitted from the arc source 833 and reflected at the reflecting surface of the standard paraboloid 848 or ellipsoid 820 in FIGS. 88 and 92 respectively, to deviate from the directions, such as 1220 and 1218, that otherwise would take them through the SLM 14 and subsequently through the pupil 1216 of the projection lens 20. The smaller the size of the SLM 14 relative to the scale of the reflector, the more mis-directed rays from the light source 897 or 808 will fail to make the proper passage through the optical system 10. Similarly, tighter constraints on the projection lens 20 reduce the diameter of the lens pupil 1216 and also result in a loss of mis-directed rays. Given the recent practical trend towards the use of smaller and smaller SLM 14 apertures (10 mm by 14 mm) and the rather narrow angular constraints of rays in their passage through the SLM 14 (+/−10 degrees for the DMD and usually less for the LCD whose contrast ratio drops when high-angle light is used), the inefficiency of these standard designs is not surprising. It is not uncommon for less than 1000 lumens from a 6000 lumen source to effect a passage through the SLM 14 and the lens pupil 1216 to the projection screen 26, as was discussed earlier.

One way to minimize the effects of such aberrations is to increase the size of the example reflectors 848 and 820 relative to the size of the light source's emitting volume as illustrated in FIGS. 89A and 89B, and to reduce the angular spread of the rays that will ultimately go through the SLM 14 and the lens pupil 1216. While these approaches are technically feasible, either alone or in combination, they may not be practical because of system constraints on projection systems 10 such as the invention disclosed in FIG. 1A where compactness is both an important technical and marketing differentiator.

Rather than use only traditional paraboloidal and ellipsoidal reflector shapes, a generalized conicoidal reflector can be used whose shape is determined by an iterative process that takes into account the system 10 constraints. By generalized conicoidal reflector, or simply conicoidal reflector, we mean multi-dimension, particularly a three-dimensional surface function, that while based on a standard ellipsoid, paraboloid, hyperboloid or spheroid, departs from these standard functions by means of the addition of aspherizing terms, such as a, b, c and d, referred to the conic equation described hereinbefore as well as below, and set by the aforementioned iterative process. Since the two most critical optical constraints determining the system efficiency apply sequentially to the projection lens 20, its entrance aperture 1216 and to the aperture of the SLM 14, the design program is carried out, not by launching rays from the arc source 833, but rather by pre-launching a specific grid of rays from the lens pupil 1216 backwards towards the arc source 833, a ray set designed to fill the lens pupil 1216 in a representative way, so that each ray represents an equal area of the pupil (and fraction of the available flux). Sets of such rays are pre-launched so that all the rays in each set go through one of a small number of specific test points in the SLM 14, whereupon they are launched through the lens and reflector system to a target area. Typically four or five points in the SLM 14 are used, namely at the center of the SLM 14, at 0.5 of the semi-diagonal, at 0.70 of the semi-diagonal and at the full semi-diagonal of the SLM 14. This method is shown in FIG. 125 for the converging conicoidal reflector 1230, the SLM 14, the projection lens pupil 1216, two illustrative grid points 1234 and 1236, and a target zone 1238 located near the conicoid's focus 1240. This target zone 1238 typically corresponds to the spatial and angular cross-section of the arc source plasma shown in FIGS. 89A and 89B, and lies generally in the vicinity of the reflector's focus. The rays are traced in reverse from their launching points on the grid, through the SLM 14, to the surface of the conicoid reflector 1230 and into the target area 1238. The number of rays which traverse one of the specified points in the SLM 14 and fall within a designated target area is a measure of the brightness with which that SLM 14 point will appear on the projection screen 26 as in FIG. 1A (optionally weighted by the lamp's actual brightness distribution function as discussed below). This formalism determines those constructional parameters which result in the maximum number of rays for each SLM 14 point reaching the target area. In order to secure this result, additional design parameters are introduced, over and above those implied by the traditional paraboloidal or ellipsoidal shapes. Both paraboloidal and ellipsoidal shapes can be represented by the mathematical formula:

$$Z = \frac{\rho H^2}{(1+q)}$$

where Z is the distance along the reflector axis of a point on the reflector, ρ is the vertex point, $q^2=1-(k+1)\rho^2H^2$, $H(H^2=x^2+y^2)$ is the distance of that point 1232 from the axis of the reflector 1230, and k is the conic constant as before. A mathematical representation of the modified paraboloidal or ellipsoidal shape is created by adding so-called and above mentioned aspherizing terms, such as those shown as a, b, c and d:

$$Z = \frac{\rho H^2}{(1+q)} + aH^4 + bH^6 + cH^8 + dH^{10}$$

The "aspherising terms" enable the "shaping" of the conicoidal reflector surface to develop the optimum design, which can be executed either as a smoothly varying surface function or as a Fresnelized surface. A computer program, Appendix 3 (DOIC2), has been developed to enable that this design sequence can be carried out effectively, although any one of the commercially-available non-sequential raytracing programs, such as for example, ASAP, Super Oslo, OptiCad or Code V can be programmed for the same purpose.

The starting point of the program of Appendix 3 is (1) the diameter of the lens pupil 1216 and its position relative to the system origin, (2) the diagonal size of the SLM 14, (3) the needed clearance between the plane of the SLM 14 and the closest approach of the reflector 1230, (4) the arc size or a target area as described above, and (5) the angular distribution of the light emanating from the arc source.

With such input, the program evaluates the parameters of the conicoid 1230, and then executes the reverse raytrace on a grid of nominally 1600 launching points for sets of rays. Typically four (or five) sets are traced for points in the plane of the SLM 14. Conformance tests are performed on these rays as they pass through the system. The first measure of conformance is whether or not a launching point lies within the lens pupil 1216, which is circular. This effectively reduces the maximum number of rays in the rectangular grid which might reach the target area to (400)(π) or 1256 rays. The second measure of conformance determines whether or not when a ray is directed from the reflector 1230 to the target area 1238 it lies within the light emitting angle of the light source (see illustrative angle θ in FIG. 89A). Only those rays that satisfy this criterion are candidates for acceptance as image producing rays. The final test of conformance is to determine that when a ray arrives at an intersection point with a plane through the reflector 1230 axis, it does so within the bounds of the target area. Only rays which satisfy this last criterion are counted as image forming rays.

A measure of the projection screen 26 illumination efficiency is arrived at by the ratio of grid rays that survive all three conformance criteria to those that survive only the first criterion. Such ratios also characterize the uniformity of projection screen 26 illumination. When the light source used is known to have an angular and spatial variation, such as that shown characteristically in FIG. 89B (for near-field spatial variations; far-field patterns, not shown, relate intensity versus angle), these data are arranged in the form of look-up tables, and used to weight the otherwise conforming rays, so as to discount their contribution to efficiency accordingly.

In the event that the uniformity of projection screen 26 illumination is not satisfactory, one method of uniformity optimization involves moving the arc or target zone center away from the mathematical focal point of the conicoid. This adjustment is allowed by the program of Appendix 3.

Each of the aspherizing terms described previously are varied individually and the results of all variations are used in a so-called damped least squares program to determine that set of values providing best results. Least squares programs are routinely used in the practice of other optical designs where an exact solution to the problem is not possible because the constraints imposed by system considerations outnumber the number of available system parameters.

A variation on this embodiment, as mentioned above, includes an incorporation of the ray-set definitions that realistically mimic the actual, experimentally-determined, near-field (spatial) and far-field (angular) radiant properties of the light source to be used within the aspherized conicoidal system of FIG. 125, as illustrated, for example, by the double-peaked angular distribution previously illustrated for the d.c. arc source 833 of FIG. 89B. In this case, the data of FIG. 89B shows a double-peaked near-field radiation pattern typical for a d.c. arc discharge. In cases such as this, where the distribution of light along the length of the arc is non-uniform, an appropriate weighting factor (or weighting factors), proportional to the indicated relative near-field spatial and far-field angular intensities, is used with each ray that encounters the target area. These weighting factors are then taken into account in performing the above optimization. Another variation on this method uses separate sets of weighting factors for each of the three primary colors, in cases where the arc source 833 radiates differently at each wavelength band of the primary colors.

Yet another variation on this embodiment uses a separate set of weighting factors according to the importance given to the screen brightness and the ratio of corner-to-center brightness on the screen. As one example, it might be decided that the overall goals of the projection system 10 design can best be met by accepting a level of illumination at the corners of the projection screen 26 that is only 60% of the brightness level at the center of the projection screen 26. This constraint can be satisfied by use of the weighting factor method described above.

As one illustrative example, consider the case where the 200 mm entrance pupil of an f/2.5 projection lens 20 is placed at a distance of 500 mm from the ellipsoidal illuminator of FIG. 92 so that the principal rays of the system are substantially parallel to the optic axis 100, as preferred both for an LCD and for a DMD. The diagonal of the SLM 14 aperture used is taken as 18 mm with a clearance of 10 mm between the SLM 14 and the closest point on the prototype illuminator of FIG. 92. The arc source used is taken as radiating light through an angle of plus or minus 60 degrees, and the length of the arc is taken as 1.5 mm, with an arc width of 1.5 mm. In this example, the arc is presumed to radiate uniformly along its length, but with appropriate angular weighting factors applied to actual experimentally-determined radiant distribution data, a more realistic result is just as readily obtained. The constraints of this system are met if the prototype ellipsoid has an eccentricity of 0.994, with a major semi-axis of 266.2 mm and a minor semi-axis of 28.77 mm. The center of the arc is located at the first focus of this ellipsoid. Under these conditions only 1240 rays out of a possible 1256 pass through a point at the center of the SLM 14 and encounter the target area represented by the arc source within the given plus or minus 60 degrees of the light emitting angle. Of these rays, however, only 800 pass the final criterion of encountering the target area within the bounds of the arc size. This means that the maximum possible brightness of the image of a point at the center of the SLM 14 has not been achieved under the constraints stipulated for the conventional ellipsoidal illuminator of FIGS. 92 and 125. Moreover, performing the same analysis for rays which pass through a point at the corner of the SLM 14 shows that only 324 rays meet the final criterion.

These results can be improved slightly, at least in the center of the field, by moving the arc 0.25 mm further from the pole of the ellipsoid. When this adjustment is made, the number of rays though a point at the center of the SLM 14 which satisfy all criteria increase from 800 to 1052. Yet, at the same time, the number of rays through a point at the comer of the SLM 14 which satisfy all criteria actually drops from 324 to 292. In order to obtain this increase in the number of rays through the center of the SLM 14 and at the same time increase the number of satisfactory rays through a point at the comer of the SLM 14, we can see that the simple ellipsoidal surface is inadequate, and that a more complex conicoidal surface function is preferred.

As discussed above, the additional adjustable parameters preferred are provided by the conicoid's aspherizing terms a, b, c, and d. As one example of this adjustment, consider the case when the aspherizing term, a, is set at $(0.1)10^{-3}$. The effect of this perturbation taken, for example, with the aforementioned 0.25 mm displacement of the arc source 1238 from the focus 1214 of the unperturbed ellipsoid as in FIG. 125 and 126A is to decrease the number of axial rays 1236 from 1052 to 1028, but to increase the number of rays at the edge 1233 of the SLM 14 aperture from 292 to 324. As yet another example invoking additional aspherizing terms, consider the case when a is $(0.6)10^{-3}$, b is $(0.2)10^{-6}$, c is $(0.1)10^{-8}$, and d is set at zero. In this case, the number of axial rays 1236 increases 1.18 times (18%), and the number of rays going through the edge of the SLM 14 aperture increases 1.31 times (31%). In each illustrative example, the increases and decreases in the number of rays meeting the criteria listed above are referenced to the case of the standard, unperturbed, ellipsoid. With a complete optimization of the conicoidal form for the above constraints, it is possible to improve system throughput by as much as about 1.5 times (50%) depending on system details. The efficiency improvement, in general, depends on the specific set of constraints and dimensions selected, and the corresponding location of the arc source 1238 center with respect to the focus 1214 of the ellipsoid 1230.

Each conicoidal adjustment yields an efficiency increase (or decrease) corresponding to each of the indicated test points 1231 in the SLM 14 aperture, as in FIG. 125. When separate weighting factors are used for the color dependent radiating characteristics of the arc source 1238, as mentioned above, the number of efficiencies, so determined, is multiplied by three, one set for each of the three primary colors (i.e. red, green and blue). Determining the optimum adjustment, therefore, depends on the set output criteria established by the system designer for each specific projection system 10 arrangement and market objective. In this manner, the optimization can be applied to achieve a particular color balance, uniformly across the projection screen 26, or it can be applied to constrain an acceptable range of red, green and blue differences, while maximizing the brightness in the center of the screen 26. The optimization can also be applied to increase brightness by some amount at every point on the screen 26, or to sacrifice some brightness increase in the center of the screen 26, to increase brightness by a greater amount in the comers of the screen 26. Whatever the output criteria, the above adjustments can be performed to find the best possible conditions for meeting them.

In some cases, it can be preferable to add a substantially telescopic lens pair 1321 to the modified conicoidal system of FIG. 125, as shown in one possible form (a Galilean telescope) in FIG. 126C, using as an example, a generalized ellipsoidal reflector 1230. It is also possible to use an inverted telescope form. Adding the lens pair 1321 increases the effectiveness of the above optimization method, as will be explained hereinafter. In the Galilean telescope form, parallel or substantially parallel rays of light traveling right-to-left from the SLM 14 first encounter negative lens 1319, which forms a virtual image at the focal point 822, also the focal point of a positive lens 1317. The rays that emerge right-to-left from the positive lens 1317 do so as collimated or substantially collimated. The magnification of the lens pair 1321 is equal to the diameter of the ray bundle emerging right-to-left from the positive lens 1317 divided by the diameter of the ray bundle entering the negative lens 1319. In the case of an inverting telescope, rays considered rightto-left as above, the first lens encountered is a positive lens that forms a real image at its focal point, which lies at the focal point of a larger positive lens further to the left towards the reflector 1230. The magnification, in this case, is based on the same diameter ratio as above. In either case, however, a field-stop can be inserted at the common focal plane to define the area to be covered by the field of illumination.

The inclusion of telescopic or approximately telescopic lens systems in the optical systems 10 reduces the spread of light rays about the principal rays and thereby increases the number of rays generated by the light source 12 that participate in the projected image on the projection screen 26. As discussed above, the light sources 12 based on the standard paraboloidal or ellipsoidal systems of FIGS. 88 and 92 show considerable aberrations, mainly in the form of higher order coma and oblique spherical aberration. Although these aberrations are controlled to some degree by the aspherizing methods described above, further improvement is still possible. One means for extending the range to which such aberrations can be alleviated is by adding the approximate telescopic lens pair 1321 as shown in FIG. 126B, comprising the positive lens 1317 and the negative lens 1319 (or two positive lenses as previously described). Moreover, aspheric surfaces can be added on one or both such lenses to further increase the degree to which aberrations can be reduced and/or to provide an independent means of light control beyond that of only the modified conicoidal surface described above. By means of this type of lens pair, the spread of rays about the principle rays is reduced, as in a previous example, from plus or minus 11 degrees to a value of plus or minus (11)/M degrees, where M is the magnification of the approximately telescopic system. The form of the aspherized (ellipsoidal) conicoid is such as to bring the principal rays to an focus at the appropriate focus of the conicoid. Accordingly, the same reduced spread of the rays surrounding the principal rays results in this conicoidal case, in a reduced aberrational spread of the rays surrounding the principal rays. This in turn translates into the ability to make more rays satisfy the above system constraints, which thereby increases the effective system efficiency beyond the level possible by aspherizing the conicoidal reflector of FIG. 125 or 126A by itself.

One variation on this telescopic method, is to apply the aspherizing terms on the telescopic elements themselves (or alternately, on any other lens elements or plates in the system 10), for example, to control the light emanating from just one portion of the peaked light source distribution shown in FIG. 89B, while letting the separate second set of aspherizing terms on the conicoidal reflector surface apply to the light emanating from the other portion of the peaked light source distribution. Once again, the final surfaces can be either smoothly varying conicoidal functions or they can be fresnelized. This approach makes it possible for more of the rays from such a non-uniform light source 833 to satisfy the conformance criteria than would be the case were all aspherizing terms applied with respect to an average point chosen in the center of the arc source of FIG. 89B or with respect to one of the two peaks and not the other.

The use of two or more sets of spherized conicoidal surfaces as described hereinabove, can also be applied to achieve more independent control of the number of effective axial rays versus the number of effective rays at the edge of the SLM 14 aperture. When only one surface is aspherized, such as that of the conicoid reflector 1230 of FIG. 125, adjustments that increase the number of effective axial rays can correspondingly decrease the number of effective rays at the edge of the SLM 14 aperture, or visa versa. Using two different aspherized surfaces, however, allows the aspherizing terms applied to one aspherized surface to optimize, for example, the number of effective axial rays, while the aspherizing terms applied to the second aspherized surface can optimize, for example, the number of effective rays at the edge of the SLM 14 aperture. In this case, the best location for the two aspherized surfaces is that which causes the maximum possible independence between the two simultaneous optimizations.

The method of FIG. 125 as described above and as executed with, for example, the program given in Appendix 3, is applicable to the design of a continuous, integral piece for the conicoid reflector 1230 as shown in FIG. 125. It is also applicable, by extension to the more complicated series of multiply ogived or connected toric conicoid sections shown in FIGS. 126A and 126B. Since the emission of most of the arc sources 833 is generally circularly symmetric (or nearly so) about the arc source's electrode axis, whenever that electrode axis is aligned with the projection system's optic axis 100, the reflector used to redirect the arc's emission is preferably made circularly symmetric as well, unless the method of FIG. 125 is otherwise applied to transform the light source's output beam cross-section to a non-circular format.

The most common conventional method for achieving color images using the LCD 14 is to incorporate three identical LCD's, one for each primary color: red (R), green (G) and blue (B). Color selective (dichroic) filter materials are ordinarily used for this purpose in conjunction with conventional mirror elements that spatially separate the white input light into the three color bands, and pass these separate colors through respectively separate LCDs. The three resulting mono-colored image beams are re-combined into one, and projected onto the viewing screen with perfect pixel-to-pixel registration. The most compact of the conventional methods uses a prismatic cube 1246 with dichroic filter layers on the internal prism faces, as shown in FIG. 127.

Preferred embodiments of the instant invention which operate with the split-image optical systems 10, are given, for example, in FIGS. 128–130. In the system of FIG. 128, unpolarized light 1248 is supplied by one of the four CURL sources 916, 918, 920 and 922 of FIG. 105 and 106. The rectangularly-shaped narrow-angle beam 1248 enters the four-prism (1249, 1250, 1251, and 1253) polarization beam splitter 23 and proceeds upwards. A first beam-splitfing layer 1252 reflects P2 and passes P1. The nomenclature WP1 and WP2 designates "white" P1 and "white" P2 respectively, with the same designation applied to R, G, and B as well.) A second polarization beam-splitting layer 1254 is oriented to pass P2 and reflect P1. Intermediate layers 1256 and 1258 are laminated to each other with the layer 1258 above the layer 1256. The layer 1256 is a wide band half wave polarization converting film that converts WP1 into WP2. The layer 1258 is preferably a high-transparency absorption-type polarizer aligned to absorb any residual P1 after conversion by the layer 1256. Boundary layers 1262 and 1260 are a wide-band quarter-wave polarization converting film and a metal or metallic reflecting film, respectively, as described numerous times above. Their purpose, as before, is to reverse both the incident light's polarization and direction. All the four prisms 1249, 1250, 1251, and 1253 are preferably are Porro prisms. Adjacent prism elements 1264 and 1266 of splitter section 22 re-direct the output beams from the upper and lower regions 82 and 84 of the respective LCD 14 (R, G, and B) images and elements 1268 and 1270 cause the light to point at precisely the oblique angles preferred by the projection system 10 mirrors. Exit aperture layers 1272 and 1274 remove substantially any traces of the wrong polarization from the beams. In this case, the upper (preferably telecentric) projection lens 1276T projects polarization P2, and the aperture layer 1272 is arranged to pass P2 and absorb P1.

The color and polarization separations are illustrated in FIG. 128 for the unpolarized light (white) 1248. The solid path shows how leftward heading WP2 is filtered into RP2, BGP2 and then BP2 and GP2. The solid ray path also details how RP2 travels through the upper half of the red LCD 14RL, reflects and changes polarization and re-traces its path as RP1, eventually entering lower projection lens 1276L as RP1. The dotted path shows similar details for the upward travel of the WP1 ray, which is split into the primary colors, all of which enter the upper projection lens 1276T as RP2, GP2 and BP2, representing image information from the upper image region 82 of the LCD 14.

In the arrangement of FIG. 128, it is assumed that the upper and lower image regions 82 and 84 of the LCD 14 correspond to the actual upper and lower portions 86 and 88 of a complete image on the projection screen 26 (see FIG. 1A for example). It is also possible for special viewing embodiments that each regions is programmed electronically to be different views of the same image (e.g., left eye and right eye) with special adaptations of the methods optical systems 10 (as will be introduced below) or more conventional folded-optic systems arranged to superimpose these two images on each other in a way that produces a three-dimensional image when viewed with proper polarizing glasses. This embodiment will be discussed in more detail hereinbelow.

A variation on FIG. 128 is shown in FIG. 129 and is suitable for the split-image optical systems 10 using a single image beam, such as, for example, in the inventions of FIGS. 14–20, 32–38 and 54. In this embodiment, the output beam-splitter 22 and corresponding projection lenses 1276 of FIG. 128 are replaced by the single telecentric projection lens 1276. The R, G, B image information from the top or upper region 82 of the LCD 14 is retained in polarization state P2, and the image information from the lower region 84 of the LCD 14 is retained in the orthogonal state P1. These two polarization states can be used, as mentioned above, to facilitate three-dimensional viewing, each color image being in an orthogonal polarization, or the two polarizations can be separated post-projection of the lens 1276 by an output beam-splitter 22, such those illustrated previously in FIGS. 79 and 81–83 used in conjunction with the split-image portions of a single beam full-screen image, as with any of the split-image projection system 10 embodiments.

In another embodiment given in FIG. 130, the output light provides the color image in one polarization state, P1. This format is appropriate for the projection system 10 methods of, for example, FIGS. 14–20, 32–38 and 54, where an image separator or the buffer zone 148R, 148B and 148G is needed, but where the image information is preferably in a single polarization state. In this case, the half-wave polarization converting element 1256 of FIGS. 128-129 is eliminated and the polarization filtration element 1258 used above to remove unwanted P1 is replaced with element 1259 to remove unwanted P2.

A further variation of the embodiment of FIG. 129 is given in FIG. 131. In this case, the rightward output from the projection lens 1276 exit aperture is separated into two orthogonally polarized beams by beam-splitter 22 and the method of FIG. 81, the aperture layer 1272 acting to purify the output polarization P2, and the aperture layer 1274 purifying the output polarization P1, both from residual traces of their orthogonal polarization states. This embodiment is suited to use with any of the split-image projection system 10 methods, and can also be adapted for three-dimensional viewing.

Yet another variation on the embodiment of FIG. 128 is given in FIG. 132, in this case with an alternative system 23 for processing light from one of the four collimated (optionally rectangular cross-section) light (CURL) sources 916, 918, 920 and 922 of FIGS. 100–103. In this instance, a polarization separator and coupler 23 is used based generally on the methods of FIGS. 104 and 105, and is positioned between the standard color splitting cube shown in FIG. 78 comprising the three LCDs (or SLMs) 14R, 14G, and 14B and the simple polarization beam-splitter 22 of FIG. 128. This method also eliminates the half-wave polarization converting element 1256 of FIG. 128 and uses the purifying element 1259 to removes any traces of P2.

Still another variation on the embodiment of FIG. 128 is given in FIG. 133. This embodiment employs a two-stage polarization processor 1280 the second stage of which provides means for coupling polarized light between the color splitting cube 1247 and its three LCDs (or SLMs) 14R, 14G and 14B and the polarization beam-splitter 22. The prism elements comprising the first stage of the polarization processor 1280, output white light in two equally polarized beams, one in polarization P1 and the other in the orthogonal polarization state P2. In this case, the left-hand side 3M-type polarization selective reflecting film layer 1254 transmits WP2 ("white" P2 as above) and reflects WP1 to the right, the orthogonal polarization from the unpolarized incident light 1278 originating on the left-hand side of the chosen CURL source 916, 918, 920 or 922. This reflected light is sequentially converted to WP2 by the action of half-wave converting layer 1284 and then filtered to remove any trace P1 by the action of the sequential filtration element 1258, preferably a high-transmissivity absorption-type polarizer, as previously discussed. This filtration step assures that WP2 is purified with regard to any contaminating WP1, which, as has already been discussed, is critical to the methods of projection system 10. The converted WP2 proceeds to the right until it is sequentially processed by the converting and reflecting boundary layers 1260 and 1262, which act to reverse both polarization state and direction, so that WP1 is out-coupled by reflection at the polarization selective beam splitting layer 1252. Unpolarized light from the right-hand side of the CURL source 916, 918, 920 or 922 used is handled in a similar manner.

The internal light within the processor element 1280 is thereby polarized in two beams, both proceeding right-to-left into the LCD color-splitting prism coupling cube 1247. The two beams are first processed within the processor 1280, by a bi-directional prism-coupling cube formed by two Porro prism elements 1288 and 1290, and an intervening layer of two orthogonally oriented 3M-type polarization selective reflecting layers 1252 and 1254, each covering one half of the diagonal interface between the prism elements 1288 and 1290. In this manner, left-hand side light rays WP2 from the processor 1280 interior proceed upwards until striking the beam splitting layer 1252, whereupon they reflect to the left, and head into the aforementioned LCD color-splitting cube 1247. In the cube 1247 the light rays are split into rays of primary colors R, G and B, passed into and out of the associated LCDs 14, and reversed in polarization by their round-trip passages through the LCDs 14, recombining on the horizontal axis beam splitting layer as superimposed rays of R, G, and B in polarization state P1. These rays are passed through the polarization selective reflecting layer 1252, and subsequently split upwards and out to the telecentric projection lens 1276T by the action of reflective layers 1292T and 1292L. These layers can be, for example, identical plane metal or metalized reflectors or polarization selective reflecting layers, and 1292T passes P2 and reflects P1, while 1292L is made to pass P1 and reflect P2. The same mechanism applies to light from the right-hand side of the polarization processor 1280, through the action of the 3M-type polarization selective reflecting layer 1254, which reflects WP1 and passes R, G, B rays in polarization state P2.

An alternative variation on the method of FIG. 133 is given in FIG. 134. In this case the CURL sources (one of the 916, 918, 920 and 922) is oriented 90 degrees to the orientation of FIG. 133, requiring the use of a different polarization processor. The ability to have alternative orientations of the light source component train is important when finding component orientations that lead to the minimum volume for a particular projection system method and cabinet. In this case, the polarization processor is arranged for horizontally-oriented input light and vertically-oriented output light. The processor element 1280 of FIG. 133 was arranged for vertically-oriented input light and vertically-oriented output light. In the method of FIG. 133, light from the upper region 82 and the lower region 84 of the LCD image were in orthogonal polarization states, separated by the beam-splitter 22, and projected using the two separate projection lenses 1276T and 1276L. In the embodiment of FIG. 134 it is preferable, though not required, to image this light directly with the telecentric projection lens 1276, and perform the beam-splitting function after (to the right of) the projection lens 1276, as in the method of FIG. 131.

The methods of FIGS. 128–134 involve one LCD (SLM) 14 for each of the three primary colors, R, G and B. The LCDs 14 are physically divided into upper and lower regions 82 and 84, each region corresponding to one half of the complete image to be projected by the methods described above. Each region of the LCD 14 is magnified by the optical system 10 and applied to the upper and lower portions 86 and 88 of the projection screen 26, where the complete magnified image is reconstructed as a whole. In another embodiment the two orthogonally-polarized image portions could alternatively represent different views or perspectives of the same image scene and be superimposed on each other in such a manner that three-dimensional viewing were made possible. Such three-dimensional viewing using the split-image LCD approaches described, sacrifices image resolution, as each of the LCD image regions 82 and 84 must contain a complete image. This means that if the LCD 14 were, for example, of 1280×1080 resolution, the three-dimensional full-screen projected image would appear as if 640×540 in resolution, provided other electronic means were not applied to compensate for this dilution.

It is possible to avoid a loss of resolution, however, by using two of the LCDs (or the SLMs 14) rather than one for each primary color image region. One possible embodiment for doing so is shown in FIG. 135. In this embodiment, two identical color splitting LCD 14 prism cubes 1247A and 1247B each consisting of the three LCDs 14 as above, 14RL, 14GL, 14BL and 14RT, 14GT, 14BT, sharing a mutual optic axis 100 are oriented in mirror symmetry to a plane perpendicular to the optic axis 100, and separated by polarization processing cube 1294, which was used previously as the beam splitter 22 in the embodiment of FIG. 131. In this embodiment, the polarization processing cube 1294 is multi-functional, in that it simultaneously directs input light of one polarization to the left-side color-splitting LCD 14 prism cube, directs input light of the orthogonal polarization to the right-side color-splitting LCD 14 prism cube, and it outputs the resulting mixture of polarized R, G, B light beams produced by each left-side and right-side color-splitting LCD 14 prism cubes. Unpolarized vertically incident light from one of the CURL sources 916, 918, 920 and 922 is transformed into orthogonally-polarized light that is directed leftwards as polarization WP1 (white P1) and rightwards as WP2 (white P2) into the respective color-splitting LCD 14 prism cubes 1247A and 1247B. Each of the color-splitting LCD 14 prism cubes 1247A and 1247B operates as previously described and returns color processed image light in the orthogonal polarization state to that which was first applied. In this case, the left color processing cube 1247A is fed with white light of polarization P1 and outputs colored image light of polarization state P2. Conversely, the right color processing cube 1247B is fed with white light of polarization P2 and outputs colored image light of polarization state P1. The multi-functional polarization processor 1294 outputs a single vertically directed beam within which the two images (one from the left-hand color processing cube 1247A and one from the right-hand color processing cube 1247B) are precisely superimposed as a spatially-organized mixture of R, G and B rays that are sorted by their polarization state. The telecentric projection lens 1276 is able to image each set of the LCDs 14 on precisely the same optical path length, so that a single projected image can be achieved in sharp focus. Since each image is in an orthogonal polarization state and contains the full resolution of each LCD, the projected image can be viewed in three-dimensions, without loss of resolution, if the left and right images represent different views or perspectives of the same scene, as customarily done in three-dimensional viewing systems, as shown in FIG. 136. The image appropriate for the so-called "left-eye" viewing is applied to the driving circuitry for the left-hand LCDs (or the SLMs 14), and the corresponding "right-eye" images are applied to the driving circuitry for the right-hand LCDs (or the SLMs 14). The associated methods for the electronic programming of LCD images has already been discussed earlier.

Another variation on the method of FIG. 136 is given in FIG. 137, where the polarization beam-splitter 22 of FIG. 131 is used after the projection lens to provide one image for the lower image region 86 of the split-image systems 10 of, for example, FIGS. 1A and 11–13, and another for the upper region 82 as, for example, in the embodiments of FIGS. 128–134, but where each image region is applied to a complete LCD (or the SLM 14) rather than to one-half of an LCD (or the SLM 14). The advantage of doing this is that the projected image can be made twice the resolution of the images formed with the single split-LCD approaches. The only correction that would be applied is that an anamorphic projection lens system would be used to compress each image half into the correct aspect ratio desired. Without compression the re-constructed projected image would be of 4×6 aspect ratio, rather than the industry-standard 4×3 U.S. TV aspect ratio. There can be applications where a 4×6 aspect ratio is desirable, or the anamorphic correction can be applied to whatever aspect ratio is set upon.

An alternative embodiment of the method of FIG. 137 is given in FIG. 138, where the images can be arranged to be superimposed and projected by the single-polarization projection methods of FIGS. 14–20, 32–38 and 54, avoids the need for an anamorphic system, and limits the resolution to that of a single LCD (unless some form of interlacing is used to interleave the image rows). In this case, the output of one side of the polarization beam splitter 22 is modified with a wide-band half-wave polarization converting film 1296 located to the left of the polarization purification exit aperture layer 1272. By this modification, both the lower and upper image regions 84 and 82 are arranged to be in the same polarization state (P1), and when properly superimposed can be projected in perfect registration as a single image.

The embodiment of FIG. 137 can be used, alternatively, as in FIG. 138 for three-dimensional viewing, provided the LCDs (or SLMs 14) are driven with the appropriate left-eye and right-eye material, and the system 10 is selected or adjusted as above for superimposed image alignment.

The two-projection lens embodiments of FIG. 137 are given in FIG. 140 and 141 respectively for double resolution split-image projection and for normal resolution three-dimensional projection.

In FIG. 142 the embodiment of FIG. 128 is modified for the case where two of the CURL sources 916, 918, 920 and 922, rather than one, are to be used. One advantage of this approach is the potential for increased screen brightness. Despite the fact that two unpolarized light sources 12 are used, only a single one of the color splitting LCD (or SLM 14) prism cubes 1247 is needed. The composite output beam contains split-image information in the same polarization state for use with single polarization systems 10, such as those of FIGS. 14–20, 32–38 and 54.

In the embodiment of FIG. 143, the resulting output beam 1302 codifies the split-image information in orthogonal polarization states as appropriate for the split-image projection system 10 methods of FIGS. 1A and 11–13. In this case, the polarization beam splitter 22 is used, as before, in conjunction with two projection lenses 1276T and 1276L, one for each of the image regions 82 and 84.

The embodiment of FIG. 144 projects the split-images using a single one of the projection lenses 20 via the single polarization projection systems. Output layer 1298 converts one image half from P2 to P1 to match the polarization of the lower image region 84, and identical polarization purification filters 1300 are used to prevent any contamination from the orthogonal polarization.

The embodiment of FIG. 145 retains each image region in its orthogonal polarization and uses the beam splitting method after the projection lens 1276 to develop upper and lower image beams from the systems 10 requiring orthogonal polarizations.

An embodiment is shown in FIG. 146 for the case where the SLM 14 is a reflective digital micromirror device (DMD) 14D. In this case some special arrangements are needed to assure compatibility with the tilting mirror DMD. For example, one of the above CURL sources 916, 918, 920 and 922 are combined with one of the previously described and applied polarization processing methods (e.g., the polarization processor 1310 to output collimated and spatially polarized light. This light is focused by condensing lens (or lens set) 1304 so that the light passes through the color sequencing wheel 1306 using the smallest possible transmission area. The color sequenced light is re-constituted by lens sub-system 1308 and applied to the DMD aperture so as to pass through the projection lens 1276 whenever image light is to be projected onto the projection screen 26. Whenever no light is to be projected, the DMD mirrors are oriented so that light cannot be transmitted by the projection lens 26 to the beam splitter 22 shown.

An embodiment is shown in FIG. 147 that is a variation on the split-image projection system 10 embodiment of FIG. 13 for use with the three-dimensional viewing capability of the embodiment of FIG. 141. In the embodiment of FIG. 141, output light emanates from two projection lenses 1276T and 1276L, one providing R, G, and B image content in polarization state P1, and the other providing different R, G, and B image content in polarization state P2. The embodiment of FIG. 147 utilizes two projection lenses, the beam-generating sub-system 1297 of FIG. 141, two orthogonally-polarized image beams 1304 and 1306, a crossed set of 3M-type polarization selective reflecting mirror elements 1302 and 1303 (each containing a polarization selective reflecting layer and a transparent supporting substrate as illustrated several times above), and a set of shaped polarization converting a redirecting mirror elements 1308T and 1308L, each composed of two curved sections, 1314T and 1316T, and 1314L and 1316L. The polarization selective reflecting mirror element 1302 is arranged to pass P1 and reflect P2, whereas polarization selective reflecting mirror element 1303 is arranged to pass P2 and reflect P1. Accordingly, light rays from projection lens 1276T pass through mirror element 1302, and are converted (to P2) and redirected (towards mirror elements 1302 and 1303) by contact with mirror element 1308T or the appropriate section of mirror element 1308T, either 1314T or 1316T. The mirror elements 1302 and 1303 fold the virtual source point 1314 to virtual source points 1314T and 1314L, so that, for example, the shaped mirror element 1308T redirects light rays 1306 over the surface of mirror element 1302 as if the rays actually originated at source point 1314T, and by folding, at source point 1314. As such, the P2 rays emanating from mirror element 1308T, pass through mirror element 1303 and strike mirror element 1302, whereupon they are redirected towards the Fresnel lens 110 and the projection screen 26, forming a sharply focused image of polarization P2 covering the entire projection screen 26. The same process extends to the rays 1304 that emanate from projection lens 1276L in polarization state P2. Ultimately these rays pass through mirror element 1303, are converted to P1, and also form a sharply focused image covering the entire projection screen 26. Hence, there are two sharply focused and overlapping images on projection screen 26, one in polarization state P1, and the other in polarization state P2.

The cabinet thickness the results with the illustrative embodiment of FIG. 147 is approximately D/3 and somewhat greater than the D/4 depth associated with the method of FIG. 13. Other preferred variations of the embodiment of FIG. 147 include curved (conicoidal) forms of mirror elements 1302 and 1303.

While preferred embodiments of the invention have been shown and described, it will be clear to those of skill in the art that various changes and modifications can be made without departing from the invention in the broader aspects set forth in the claims hereinafter. In particular, the various subcomponent elements and systems described herein, as well as their optical equivalent, can be used in combination with, or when operatively proper substituted for, the other elements and systems set further herein. 1-34/2

What is claimed is:

1. An image projection system, comprising:

means for generating image information including a spatial light modulator;

a polarized light source system for illuminating said spatial light modulator such that light of a first polarization state from the light source system covers one region of said spatial light modulator and light of a second polarization state from the light source system covers another region of said spatial light modulator;

a screen for viewing the image information;

a projection lens for enlarging and projecting the image information as images onto said screen;

a first set of polarization selective light processing elements including a first conicoid element which passes light of the first polarization state and reflects light of the second polarization state and further including a first optical element for converting light of the first polarization state into the second polarization state, thereby enabling output of light of the second polarization state onto one portion of the screen for viewing; and a second set of polarization selective light processing elements including a second conicoid element which passes light of said second polarization state and reflects light of said first polarization state and further including a second optical element for converting light of the second polarization state into the first polarization state, thereby enabling output of light of the first polarization state onto another portion of the screen for viewing.

2. The image projection system as defined in claim 1 wherein said first optical element and said second optical element comprise at least one of a curved mirror and a surface inclined from perpendicularity relative to said screen.

3. The image projection system as defined in claim 1 wherein said first and second conicoid elements include aspherized surfaces.

4. The image projection system as defined in claim 1 wherein said conicoid elements are modified by adjusting at least one of conicoid eccentricity, conicoid major axis and conicoid aspheric terms.

5. The image projection system as defined in claim 1 wherein said first conicoid element and said first optical element are disposed on one side of an optic axis of said image projection system.

6. The image projection system as defined in claim 1 wherein said first conicoid element and said second optical element are disposed on one side of an optic axis of said image projection system.

7. The image projection system are defined in claim 1 further including a polarization converting mirror disposed on an optic axis of said image projection system.

8. The image projection system as defined in claim 1 wherein the first optical element is disposed parallel to said screen.

9. The image projection system as defined in claim 1 wherein the first and second conicoid elements are disposed substantially parallel to said screen.

10. The image projection system as defined in claim 1 further including means for beam displacement for overlapping images of said one portion and said another portion of the screen.

11. The image projection system as defined in claim 1 wherein said first and second optical elements comprise conicoids.

12. An image projection system, comprising:

means for generating image information including a spatial light modulator having a characteristic input aperture shape;

a polarized light source for illuminating said spatial light modulator such that light of a first polarization state covers one region of said spatial light modulator and light of a second polarization state orthogonal to the first polarization state covers another region of said spatial light modulator;

a screen for viewing the image information;

a projection lens for enlarging and projecting the image information as images onto said screen;

a first set of polarization selective light reflecting elements including a first reflecting element which passes light of the first polarization state and reflects light of the second polarization state, and a second reflecting element which converts light of the first polarization state into light of the second polarization state with an image output beam from the second reflecting element being reflected from said first reflecting element and light of the second polarization state output for viewing on one portion of said screen; and a second set of polarization selective light reflecting elements including a third reflecting element which passes light of the second polarization state and reflects light of the first polarization state, and a fourth reflecting element which converts light of the second polarization state into light of the first polarization state with the image output beam from the fourth reflecting element being reflected from said third reflecting element and light of the first polarization state output for viewing on a second portion of said screen.

13. The image projection system as defined in claim 12 further including a polarization beam splitter for separating light of the first polarization state from light of the second polarization state, and light of the first polarization state processed by said first set of light reflecting elements and said light of the second polarization state processed by said second set of light reflecting elements.

14. The image projection system as defined in claim 13 wherein said polarization beam splitter comprises a prism having a first layer for transmitting light of wide band colors and of the first polarization state and reflecting light of the second polarization state, and a second layer for transmitting light of wide band colors and of the second polarization state and reflecting light of the first polarization state.

15. The image projection system as defined in claim 14 wherein said second layer for reflecting the separated light of first polarization state, and said first layer for reflecting the separated light of second polarization state cause the reflected light of both the first and second polarization states to have parallel beam paths of substantially opposite directions.

16. The image projection system as define in claim 13 wherein said beam splitter includes a wide band quarter wave retardation layer for changing polarization state of at least one of the light of first and second polarization state.

17. The image projection system as defined in claim 13 wherein said beam splitter comprises a 45° prism and a parallelepiped.

18. The image projection system as defined in claim 13 wherein said beam splitter comprises four 45° prisms and a beam-directing element.

19. An image projection system, comprising:

means for generating image information including a spatial light modulator;

a polarized light source system for illuminating said spatial light modulator with polarized light, said polarized light source system comprised of means for transmitting light of a first polarization state and a polarization selective reflector and a conicoid including a polarization converting layer and a reflecting layer for processing light of a second polarization into the first polarization state with the recycled light being transmitted through the means for transmitting light;

a beam shaping element disposed between said polarized light source system and said spatial light modulator;

a screen for viewing the image information; and a projection lens for enlarging and projecting the image information as images onto said screen.

20. The image projection system as defined in claim 19 further including a composite refractive element for producing a diverging output beam of light.

21. The image projection system as defined in claim 20 further including a convergent output lens element to converge the diverging output beam of light.

22. The image projection system as defined in claim 21 wherein said polarized light source system further includes reciprocating mirror elements for recycling peripheral light and repositioning the peripheral light within the converged output beam of light.

23. The image projection system as defined in claim 19 further including means for performing a rectangular beam shape transformation.

24. The image projection system as defined in claim 19 wherein said polarization selective reflector is selected from the group consisting of a substantially planar layer and a conicoid.

25. The image projection system as defined in claim 19 further including means for correction of a hole in a light beam from said light source.

26. The image projection system as defined in claim 25 wherein means are provided to fill the hole with black rays having no image information by including means for providing a buffer zone.

27. The image projection system as defined in claim 26 further including means for beam displacement for collapsing the buffer zone to form a continuous image on said screen.

28. The image projection system as defined in claim 19 wherein said polarized light source system comprises a converging type light source system.

29. The image projection system as defined in claim 28 wherein said converging type light source system is selected from the group consisting of an ellipsoidal system, a paraboloidal system and a CURL-type system.

30. An image projection system, comprising:

means for generating image information including a spatial light modulator;

a polarized light source system for illuminating said spatial light modulator, said light source system comprised of a light source and a reflector for producing light of at least a first and second polarization state;

a screen for viewing the image information with the screen having a first and second portion;

a projection lens for enlarging and projecting the image information as images onto said screen; and a set of light reflecting and polarization converting elements for receiving the light from said polarized light source system and from said projection lens, said set of elements converting polarization state of the light and reflecting the light of at least two polarization states onto said screen for viewing, and said set of light reflecting and polarization converting elements disposed for selectively reflecting light of the first and second polarization states and also for selectively converting light of the first polarization state to the second polarization state and likewise converting light of the second polarization state to the first polarization state with the light of first polarization state being applied to the first portion of the screen and the light of second polarization state being applied to the second portion of the screen.

31. The image projection system as defined in claim 30 wherein said set of light reflecting and polarization converting elements comprises a conicoid selected from the group consisting of an ellipsoid, a paraboloid and a hyperboloid.

32. The image projection system as defined in claim 31 wherein said conicoid shape is modified by an aspherizing function.

33. The image projection system as defined in claim 30 further including a beam shaping element comprised of a beam sizing element.

* * * * *